US012039478B2

(12) United States Patent
Wozniak

(10) Patent No.: US 12,039,478 B2
(45) Date of Patent: Jul. 16, 2024

(54) DYNAMICALLY ASSOCIATED PREDICTIVE DIGITAL QUEUES

(71) Applicant: FLOQQUE, LLC, Winter Garden, FL (US)

(72) Inventor: Michael J. Wozniak, Winter Garden, FL (US)

(73) Assignee: FLOQQUE, LLC, Winter Garden, FL (US)

( * ) Notice: Subject to any disclaimer, the term of this patent is extended or adjusted under 35 U.S.C. 154(b) by 0 days.

(21) Appl. No.: 18/535,963

(22) Filed: Dec. 11, 2023

(65) Prior Publication Data

US 2024/0135285 A1 Apr. 25, 2024

Related U.S. Application Data

(63) Continuation-in-part of application No. 17/929,600, filed on Sep. 2, 2022, now Pat. No. 11,900,292, and
(Continued)

(51) Int. Cl.
*G06Q 10/00* (2023.01)
*G06N 20/00* (2019.01)
(Continued)

(52) U.S. Cl.
CPC ....... *G06Q 10/06316* (2013.01); *G06N 20/00* (2019.01); *G06Q 30/0205* (2013.01); *G06Q 10/02* (2013.01); *G06Q 50/12* (2013.01)

(58) Field of Classification Search
None
See application file for complete search history.

(56) References Cited

U.S. PATENT DOCUMENTS 6,829,583 B1 12/2004 Knapp et al.
6,845,361 B1 1/2005 Dowling
(Continued)

FOREIGN PATENT DOCUMENTS

CN 105808574 A 7/2016
CN 111353615 A 6/2020
(Continued)

OTHER PUBLICATIONS

Millhiser, W. P., & Veral, E. A. (Dec. 2016). A decision support system for real-time and dynamic scheduling of multiple patient classifications in ambulatory care services. In 2016 Winter Simulation Conference (WSC) (pp. 2053-2064). IEEE. (Year: 2016).*
(Continued)

*Primary Examiner* — Matheus Ribeiro Stivaletti
(74) *Attorney, Agent, or Firm* — Thompson Patent Law Offices PC

(57) ABSTRACT

Apparatus and associated methods relate to automatically generate an interactive display for event scheduling based on a maximum expected wait time at a user selected trigger time. In an illustrative example a central orchestration engine (COE) may generate, in response to a request for service with a maximum wait tolerance (MOT) from a service seeking entity (SSE), a display of available time slots for the requested service. The COE may, for example, generate an array of service providers (SPs) as a function of a geofence filter. For each SP, the COE may generate an expected wait time (EWT) based on an anticipated service flow at the SP. The COE may, for example, select and display available time slots of the SPs with the EWT less than the MOT. Various embodiments may, for example, advantageously present an interactive display of available time slots at one or more SPs for selection.

20 Claims, 62 Drawing Sheets

Related U.S. Application Data a continuation of application No. PCT/US2022/072857, filed on Jun. 9, 2022, said application No. 17/929,600 is a continuation of application No. 17/303,837, filed on Jun. 9, 2021, now Pat. No. 11,481,705, said application No. PCT/US2022/072857 is a continuation-in-part of application No. 17/303,837, filed on Jun. 9, 2021, now Pat. No. 11,481,705.

(60) Provisional application No. 63/267,448, filed on Feb. 2, 2022.

(51) Int. Cl.
  *G06Q 10/0631* (2023.01)
  *G06Q 30/00* (2023.01)
  *G06Q 30/0204* (2023.01)
  *G06Q 10/02* (2012.01)
  *G06Q 50/12* (2012.01)

(56) References Cited

U.S. PATENT DOCUMENTS

| | | | |
|---|---|---|---|
| 6,889,900 B2 | 5/2005 | Davies et al. | |
| 8,214,241 B2 | 7/2012 | Kaiser | |
| 8,645,064 B2 | 2/2014 | Bednar et al. | |
| 8,831,963 B2 | 9/2014 | Backer et al. | |
| 9,024,752 B2 | 5/2015 | Tumayan et al. | |
| 9,129,266 B2 | 9/2015 | Nagaraj | |
| 9,741,021 B2 | 8/2017 | Yu et al. | |
| 9,741,064 B2 | 8/2017 | Kaiser | |
| 10,571,294 B2 | 2/2020 | Forutanpour et al. | |
| 11,720,941 B2 | 8/2023 | Rosenfeld et al. | |
| 2003/0061078 A1 | 3/2003 | Shimosako et al. | |
| 2005/0080676 A1 | 4/2005 | Lovegreen et al. | |
| 2008/0133283 A1 | 6/2008 | Backer et al. | |
| 2008/0155550 A1 | 6/2008 | Tsafrir et al. | |
| 2014/0136259 A1 | 5/2014 | Kinsey et al. | |
| 2014/0282040 A1 | 9/2014 | Alfaro | |
| 2014/0343995 A1 | 11/2014 | Backer et al. | |
| 2015/0019271 A1 | 1/2015 | Abuelsaad et al. | |
| 2015/0081348 A1 | 3/2015 | Avera et al. | |
| 2015/0248651 A1 | 9/2015 | Akutagawa et al. | |
| 2016/0055215 A1 | 2/2016 | Kauwe | |
| 2016/0350721 A1 | 12/2016 | Comerford et al. | |
| 2016/0371439 A1* | 12/2016 | Salazar | G06F 16/9535 |
| 2017/0018041 A1 | 1/2017 | Fox | |
| 2017/0046800 A1 | 2/2017 | Zomet et al. | |
| 2017/0083831 A1 | 3/2017 | Ghosh et al. | |
| 2017/0098174 A1 | 4/2017 | Venigalla | |
| 2017/0272550 A1 | 9/2017 | Rodriguez | |
| 2017/0278204 A1 | 9/2017 | Mimassi | |
| 2018/0101793 A1 | 4/2018 | Steinberg | |
| 2019/0180391 A1 | 6/2019 | Ford et al. | |
| 2019/0213506 A1 | 7/2019 | Greenberger et al. | |
| 2019/0272695 A1 | 9/2019 | Schwartz et al. | |
| 2019/0354905 A1* | 11/2019 | McCullough | G06Q 10/06 |
| 2020/0160233 A1 | 5/2020 | Chopra | |
| 2020/0286004 A1 | 9/2020 | Backer et al. | |
| 2021/0201213 A1 | 7/2021 | Mimassi | |
| 2021/0209524 A1 | 7/2021 | Oppelstrup et al. | |
| 2021/0306280 A1* | 9/2021 | Dorofiyenko | G06Q 10/02 |
| 2021/0326951 A1* | 10/2021 | Rosenfeld | G06Q 30/0635 |
| 2022/0101400 A1 | 3/2022 | Kaiser | |
| 2023/0260353 A1 | 8/2023 | Geraghty et al. | |

FOREIGN PATENT DOCUMENTS

| | | |
|---|---|---|
| CN | 112686777 A | 4/2021 |
| CN | 112734185 A | 4/2021 |
| CN | 114118494 A | 3/2022 |
| CN | 114298352 A | 4/2022 |
| JP | 2019207740 A | 12/2019 |
| KR | 101912884 B1 | 10/2018 |
| KR | 102377121 | 3/2022 |
| WO | 2022261661 A1 | 12/2022 |

OTHER PUBLICATIONS

Abusair, M., Sharaf, M., Hamad, T., Dahman, R., & AbuOdeh, S. (Mar. 2021). An approach for queue management systems of non critical services. In 2021 7th International Conference on Information Management (ICIM) (pp. 167-171). IEEE. (Year: 2021).*

Baron, et al, Strategic Idleness and Dynamic Scheduling in an Open-Shop Service Network: Case Study and Analysis. Manufacturing & Service Operations Management 2016, retrieved from the internet Mar. 11, 2021, https://doi.org/10.1287/msom.2016.0591.

Chapter II Demand Brief and PCT Art. 34 Amendments filed Mar. 28, 2023 in PCT/US2022/072857, 34 pages.

Ha, A., Yelp Adds Predictive Wait Times and a New Way for Restaurants to Share Updates, TechCrunch, 2019, retrieved from the internet Feb. 18, 2021, https://social.techcrunch.com/2019/09/12/yelp-connect-predictive-waittimes/.

Ibrahim, et al, Wait-Time Predictors for Customer Service Systems with Time-Varying Demand and Capacity. Operations Research 2011, 59 (5), 1106-1118, retrieved from the internet Feb. 17, 2021, https://doi.org/10.1287/opre.1110.0974, <http://pubsonline.informs.org/doi/abs/10.1287/opre.1110.0974.

International Preliminary Report on Patentability, issued by the Korean Intellectual Property Office dated Aug. 23, 2022, in International Application No. PCT/US2022/072857, 4 pages.

International Search Report and Written Opinion of the International Searching Authority in related International Application No. PCT/US2022/072857, dated Nov. 9, 2022, 12 pages.

Istrate, et al, Advance Reservation System for Datacenters, 2016 IEEE 30th International Conference, (Year: 2016), 8 pages.

Kimes, S., Restaurant Revenue Management; CHR Reports; The Center for Hospitality Research at Cornell University, 2004, retrieved from the internet Feb. 17, 2021, https://ecommons.cornell.edu/xmlui/bitstream/handle/1813/71185/Kimes_2004_Restaurant_revenue.pdf>.

Kurniawan, et al, Development of Hospital Reservation Information Systam With UDC Method and Sus Testing, Jisa, Jun. 1, 2023, 7 pages.

Lawrence et al, Passenger-Based Predictive Modeling of Airline No-Show Rates. Proceedings of the ACM SIGKDD International Conference on Knowledge Discovery and Data Mining 2003, retrieved from the internet Feb. 17, 2021, https://doi.org/10.1145/956750.956796.

Li, et al, Individualized No-Show Predictions: Effect on Clinic Overbooking and Appointment Reminders. Prod Oper Manag 2019, 28 (8), 2068-2086, retrieved from the internet Feb. 18, 2021, https://doi.org/10.1111/poms.13033, <https://onlinelibrary.wiley.com/doi/abs/10.1111/poms.13033.

McKeever, A., How Restaurants Can Deal With No-Show Diners. Apr. 22, 2013, retrieved from the internet Feb. 17, 2021, https://www.eater.com/2013/4/22/6445903/how-restaurants-can-deal-with-no-show-diners.

Mohr, C., Nowait: Never Wait Around for a Restaurant Table Again. Mar. 2, 2017, retrieved from the internet Feb. 17, 2021, https://wonderoftech.com/nowait-app/.

Restaurant Den, The Best Online Reservation System For Your Restaurant. Feb. 13, 2017, retrieved from the internet Feb. 17, 2021, https://restaurantden.com/online-reservation-system/.

Shannon, M., Predicting No. Shows to Create an Effective Overbooking Policy for Restaurants, Northwestern University, 2015, retrieved from the internet Feb. 17, 2021, https://mmss.wcas.northwestern.edu/thesis/articles/get/908/Shannon2015.pdf.

Trusty Ox Systems, Ltd, Showly Restaurant No Show App App for iPhone, Showly Restaurant No Show App for iPad & iPhone at AppPure. Nov. 1, 2019, retrieved from the internet Feb. 17, 2021, https://iphone.apkpure.com/showly-restaurant-no-show-app/com.showlyai.theapp.

Tse, et al, Modeling No-Shows, Cancellations, Overbooking, and Walk-Ins in Restaurant Revenue Management. Journal of Foodservice

(56) References Cited

OTHER PUBLICATIONS

Business Research 2017, 20 (2), 127-145, retrieved from the internet Feb. 17, 2021, https://doi.org/10.1080/15378020.2016.1198626. <https://www.tandfonline.com/doi/full/10.1080/15378020.2016.1198626.
Vojtek, et al, P. Decision Support System for Predicting the Number of No-Show Passengers in Airline Industry. 2021, 12.
WalkUp, "WalkUp-Restaurant Finder-Apps on Google Play," Google Play, May 13, 2022. https://play.google.com/store/apps/details?id=uk.co.walkinapp.prod&hl=en&gl=US.

* cited by examiner

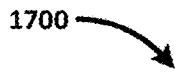

| 08:00 AM | New Patient Exam | 45-minute, 5-minute buffer after |
| 09:00 AM | Existing Patient Exam | 15-minute, 5-minute buffer after |
| 09:30 AM | LASER Treatment | 25-minute, 5-minute buffer after |
| 10:00 AM | Existing Patient Exam | 15-minute, 5-minute buffer after |
| 10:20 AM | New Patient Exam | 45-minute, 5-minute buffer after |
| etc | | |

FIG. 17

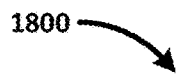

| Date | Res. Time | Pred. Time | Status | Name | Size | Max Size | Confidence |
|---|---|---|---|---|---|---|---|
| 01/15/2021 | 5:45pm | | G | Smith | 2 | 2 | 50% |
| 01/15/2021 | 5:45pm | | W/L | Thompson | 2 | 4 | 100% |
| 01/15/2021 | 6:00pm | | G | Jones | 5 | 6 | 90% |
| 01/15/2021 | 6:00pm | | W/L | Heinz | 3 | 3 | 90% |
| 01/15/2021 | 6:00pm | 6:00pm | G | Moore | 5 | 5 | 85% |
| 01/15/2021 | 6:15pm | 6:30pm | G | Cooper | 4 | 4 | 100% |
| 01/15/2021 | 6:15pm | 6:00pm | G | Waid | 4 | 5 | 80% |

FIG. 18

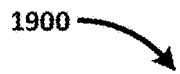

| Res. Time | Pred. Time | Status | Name | Size | Max Size | Confidence | Req ASF |
|---|---|---|---|---|---|---|---|
| 5:45pm | | G | Smith | 2 | 2 | 50% | 0 minutes |
| 5:45pm | | W/L | Thompson | 2 | 4 | 100% | 15 minutes |
| 6:00pm | | G | Jones | 5 | 6 | 90% | 15 minutes |
| 6:00pm | | W/L | Heinz | 3 | 3 | 90% | 30 minutes |
| 6:00pm | 6:00pm | G | Moore | 5 | 5 | 85% | 0 minutes |
| 6:15pm | 6:30pm | G | Cooper | 4 | 4 | 100% | 10 minutes |
| 6:15pm | 6:00pm | G | Waid | 4 | 5 | 80% | 15 minutes |

FIG. 19

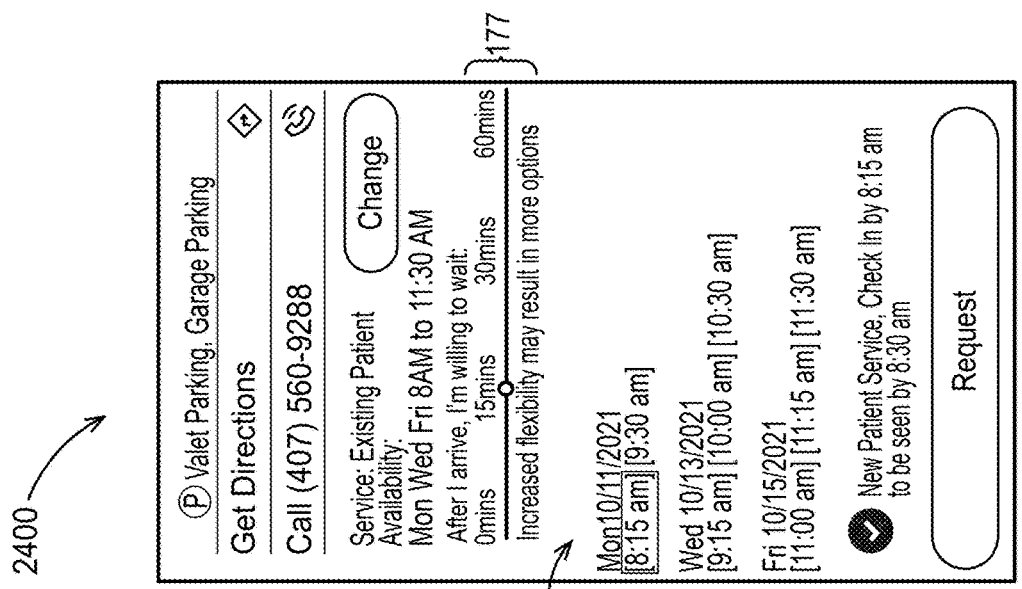
FIG. 24
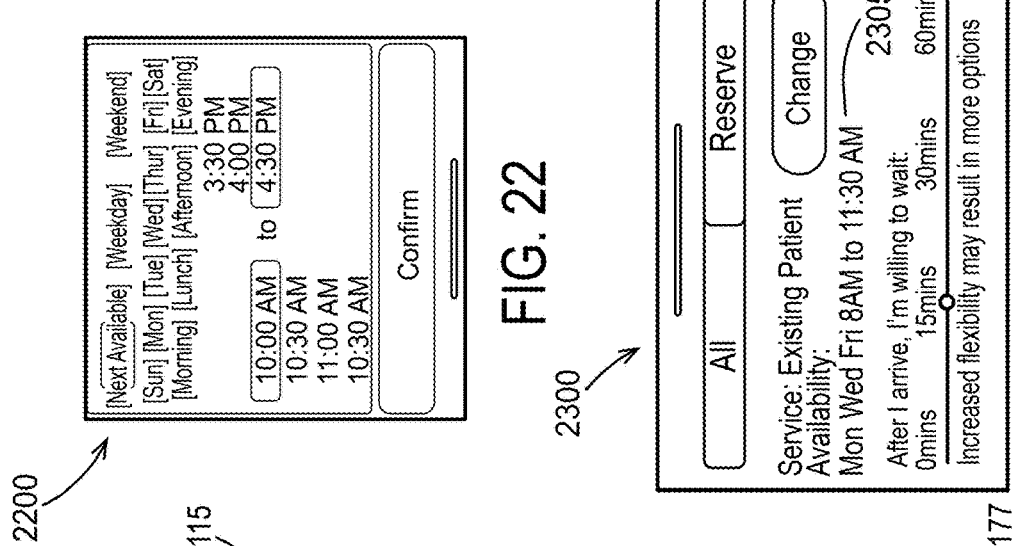
FIG. 22
FIG. 23
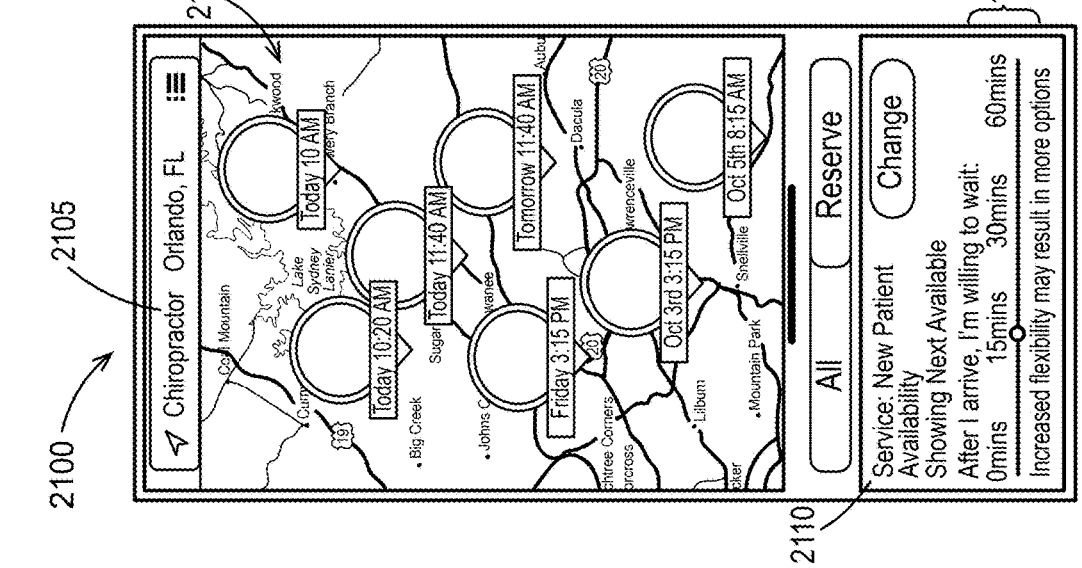
FIG. 21

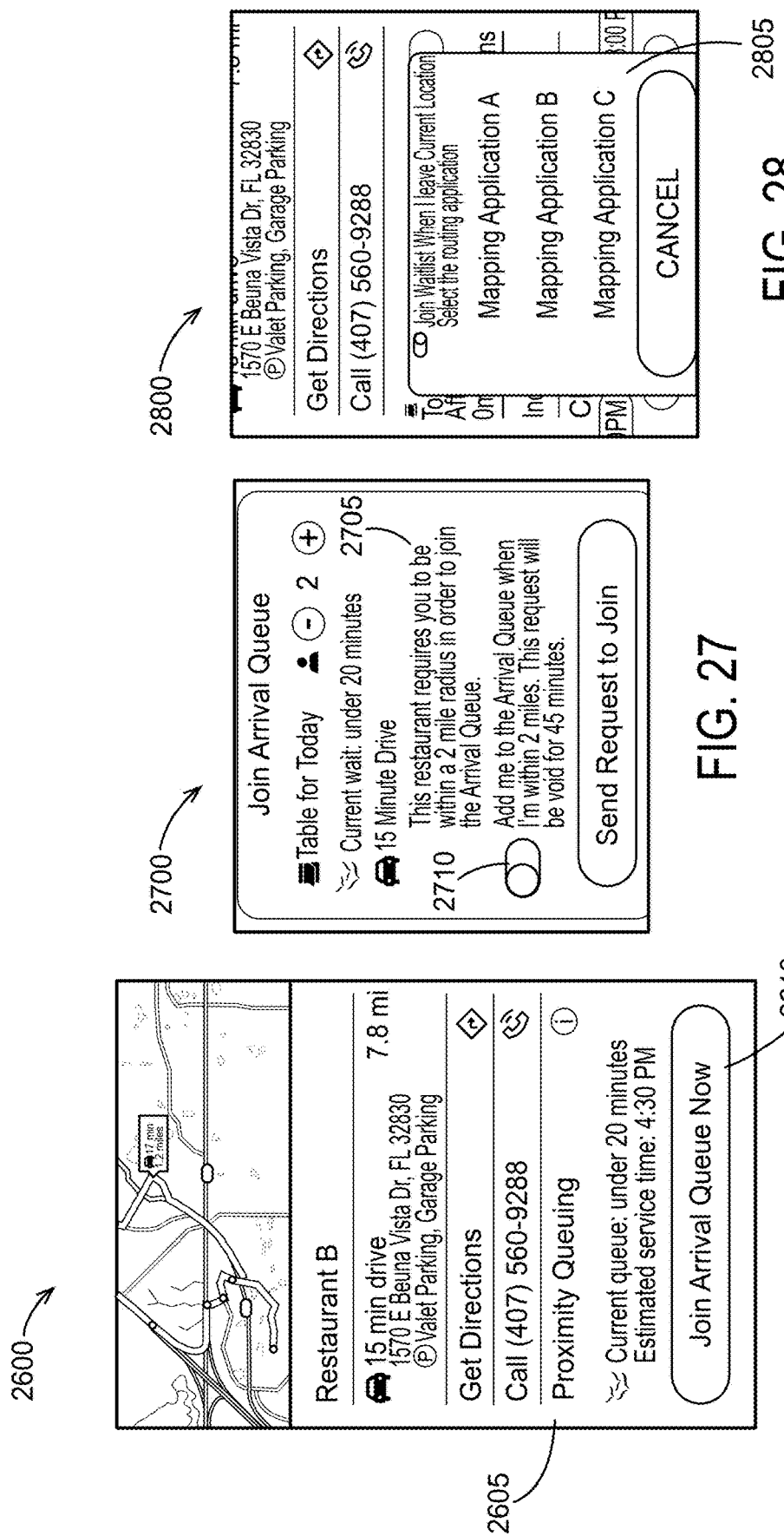

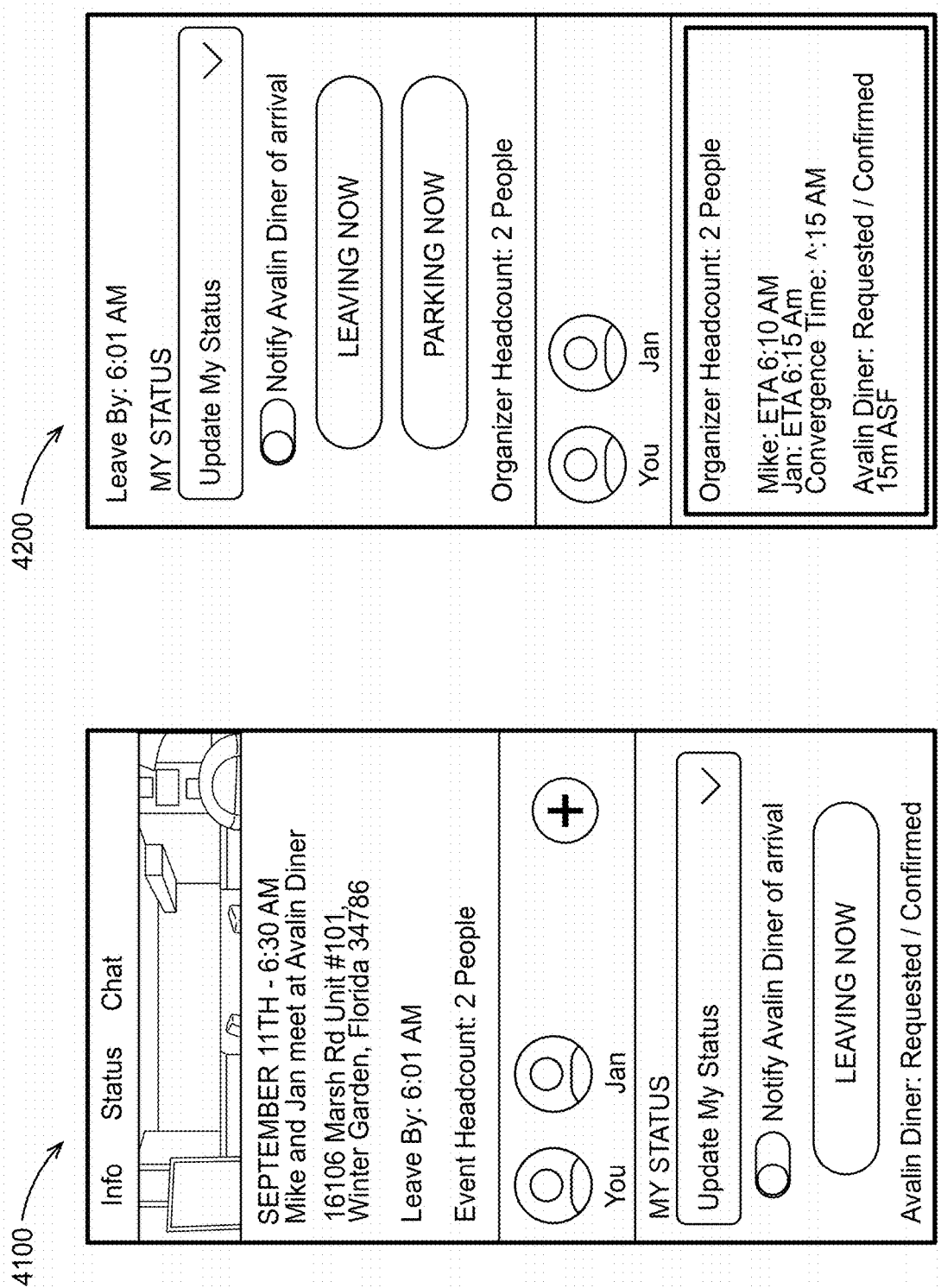

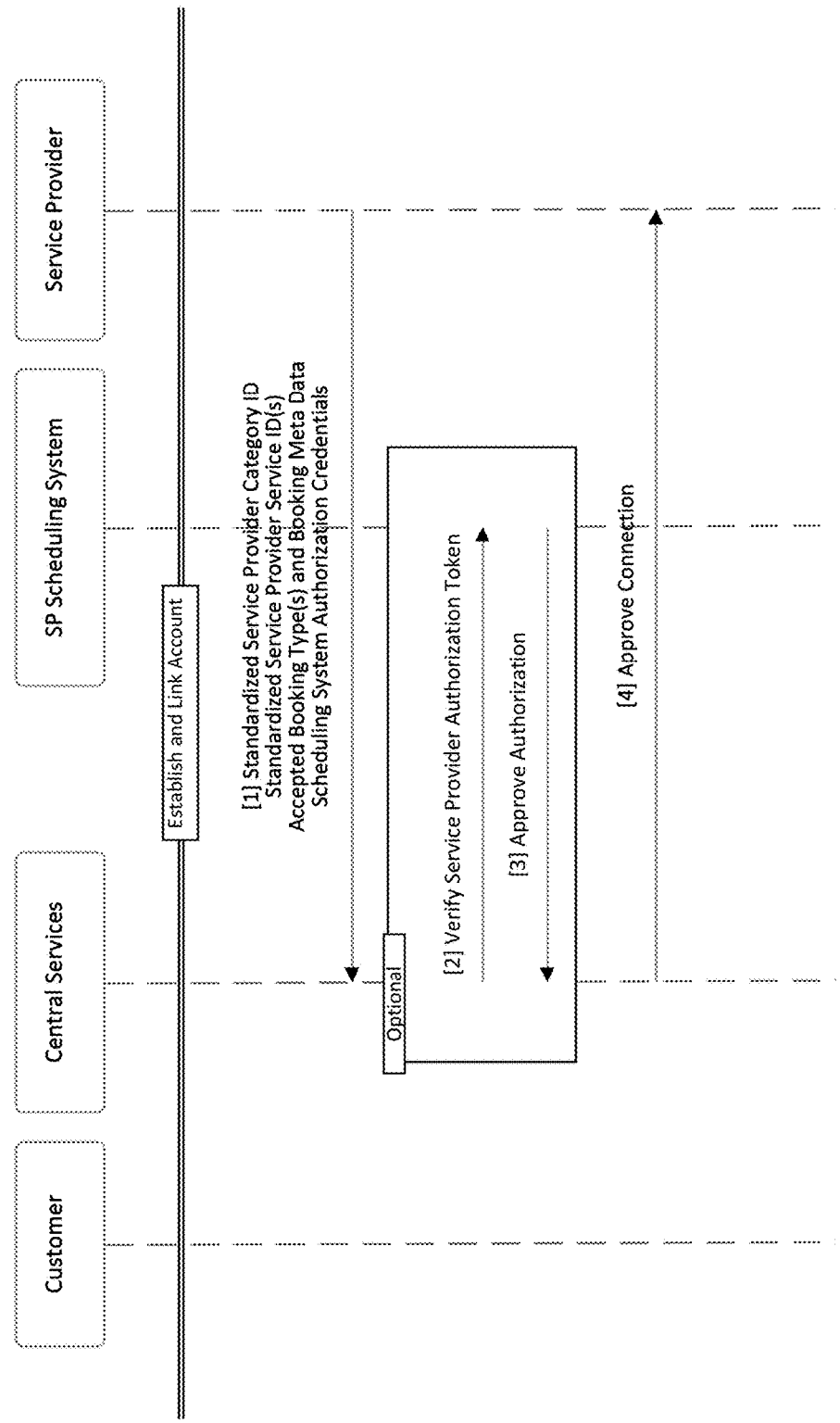

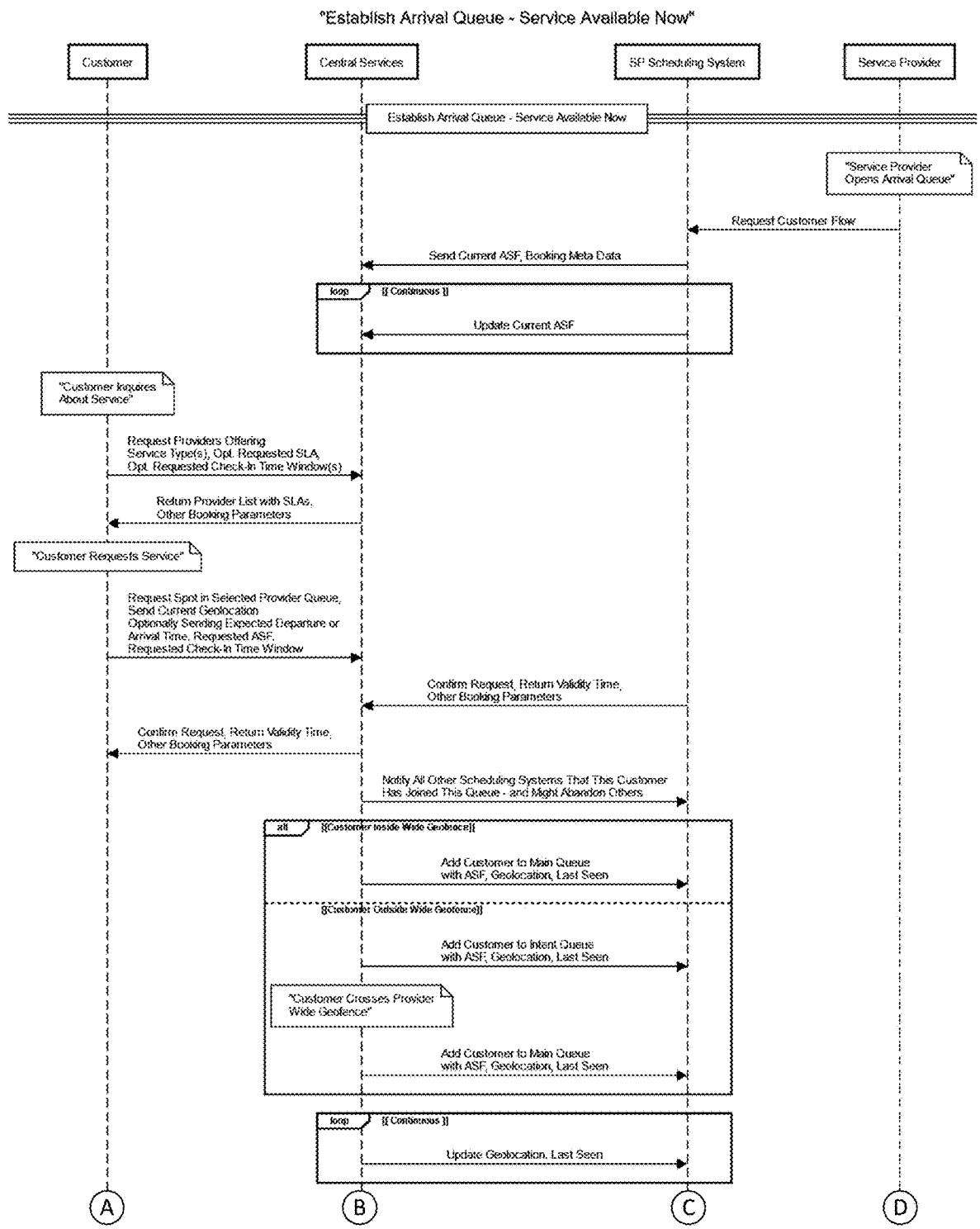
(CONTINUED ON NEXT SHEET)
FIG. 44A (CONTINUED FROM PREVIOUS SHEET)

(CONTINUED FROM PREVIOUS SHEET)

DYNAMICALLY ASSOCIATED PREDICTIVE DIGITAL QUEUES

CROSS-REFERENCE TO RELATED APPLICATIONS

This application is a Continuation of, and claims the benefit of, International Application No. PCT/US2022/072857 (the '857 application), titled "DYNAMICALLY ASSOCIATED PREDICTIVE DIGITAL QUEUES," filed by Michael J. Wozniak on Jun. 9, 2022, which application claims the benefit of U.S. Provisional Application Ser. No. 63/267,448, titled "DYNAMICALLY ASSOCIATED PREDICTIVE DIGITAL QUEUES," filed by Michael J. Wozniak on Feb. 2, 2022. This application is a Continuation-in-Part of, and claims the benefit of, U.S. application Ser. No. 17/929,600 (the '600 application), titled "DYNAMIC COORDINATION OF SERVICE PROVIDERS AND SERVICE SEEKING ENTITIES," filed by Michael J. Wozniak on Sep. 2, 2022. The '600 application is a Continuation of, and the '857 application is a Continuation-in-part of, and each claim the benefit of, U.S. application Ser. No. 17/303,837, titled "DYNAMIC COORDINATION OF SERVICE PROVIDERS AND SERVICE SEEKING ENTITIES," filed by Michael J. Wozniak on Jun. 9, 2021.

This application incorporates the entire contents of the foregoing applications herein by reference.

TECHNICAL FIELD

Various embodiments relate generally to dynamic digital queues.

BACKGROUND

Various businesses may serve customers. For example, some businesses may serve customers in person on the businesses' premise, in person at the customer's location, in person at a third-party location, remotely (e.g., via mail-order), or some combination thereof. Various businesses may have limited capacity for service. For example, barbers, healthcare providers, and consulting engineers may have limited capacity to serve customers at any given time and/or place. One example of a capacity-limited venue is a restaurant.

Restaurants may have tables and chairs to seat customers for a meal. Some customers may make a reservation to ensure that the restaurant has capacity to give them a table for a meal at an agreed upon time. Some customers may come in a party with more than one individual. Various size parties may show up at a restaurant (or other venue) without a reservation. Parties without a reservation may be denied or delayed until capacity becomes available.

SUMMARY

Apparatus and associated methods relate to automatically generate an interactive display for event scheduling based on a maximum expected wait time at a user selected trigger time. In an illustrative example a central orchestration engine (COE) may generate, in response to a request for service with a maximum wait tolerance (MOT) from a service seeking entity (SSE), a display of available time slots for the requested service. The COE may, for example, generate an array of service providers (SPs) as a function of a geofence filter. For each SP, the COE may generate an expected wait time (EWT) based on an anticipated service flow at the SP. The COE may, for example, select and display available time slots of the SPs with the EWT less than the MOT. Various embodiments may, for example, advantageously present an interactive display of available time slots at one or more SPs for selection.

Various embodiments may achieve one or more advantages. For example, some embodiments may advantageously permit the SSE to communicate an updated expected check in time to dynamically receive an updated EWT. Various embodiments may, for example, advantageously provide adaptive anticipated service flow prediction using machine learning. Various embodiments may, for example, advantageously provide automatic check in based on one or more predetermined criterion, including but not limited to, for example, geolocation, an expected wait time at the SP, and actual time.

The details of various embodiments are set forth in the accompanying drawings and the description below. Other features and advantages will be apparent from the description and drawings, and from the claims.

BRIEF DESCRIPTION OF THE DRAWINGS

FIG. 17 depicts an exemplary waitlist for an illustrative doctor office for a single doctor's schedule.

FIG. 18 depicts an exemplary predicted queueing profile (PQP).

FIG. 19 depicts an exemplary PQP with a corresponding wait tolerance.

FIG. 21 depicts an exemplary 'next available' UI.

FIG. 22 depicts an exemplary change UI.

FIG. 23 depicts at least a partial portion of an exemplary updated UI.

FIG. 24 depicts an exemplary provider detail UI displayed to the SSE once the SSE inputs a selection of an SP.

FIG. 26, FIG. 27, and FIG. 28 depict an exemplary dynamic UI corresponding to an Arrival Queue augmenting a FIFO queue.

FIG. 39, FIG. 40, FIG. 41, and FIG. 42 depict exemplary social event coordination UIs.

FIG. 43 depicts a swim lane flowchart of an exemplary method 4300 of configuring and/or operating SP Arrival Queueing.

FIG. 44A and FIG. 44B depict a swim lane flowchart of an exemplary method 4400 of establishing an Arrival Queue for "service available now."

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a priority remote check in system and a dynamic queueing prioritization system (DQPS) are introduced with reference to FIGS. 1A-1B. Second, that introduction leads into a description with reference to FIGS. 2-4 of some exemplary embodiments of priority seating process and user interfaces. Third with reference to FIGS. 5-6, exemplary embodiments are discussed with reference to dynamic resource prioritization engines (DRPEs). Fourth, with reference to FIGS. 7-47B, exemplary embodiments are discussed with reference to dynamic queueing engines having a wait tolerance-based queueing system. Fifth, to help introduce discussion of various embodiments, an exemplary central orchestration engine (COE) system configured to dynamically prioritize queues is introduced with reference to FIGS. 48-51. Sixth, that introduction leads into a description with reference to FIGS. 52-57 of some exemplary embodiments of dynamic prioritization using anticipated flow states. Seventh, with reference to FIGS. 58-68, exemplary embodiments of dynamic prioritization using geolocation are described. Eighth, with reference to FIGS. 69-70 the discussion turns to exemplary embodiments that illustrate dynamic coordination of coordinating entities according to dynamic flow states. Finally, the document discusses further embodiments, exemplary applications and aspects relating to priority seating, dynamic queueing prioritization, and dynamic prioritization.

Figure 1A:
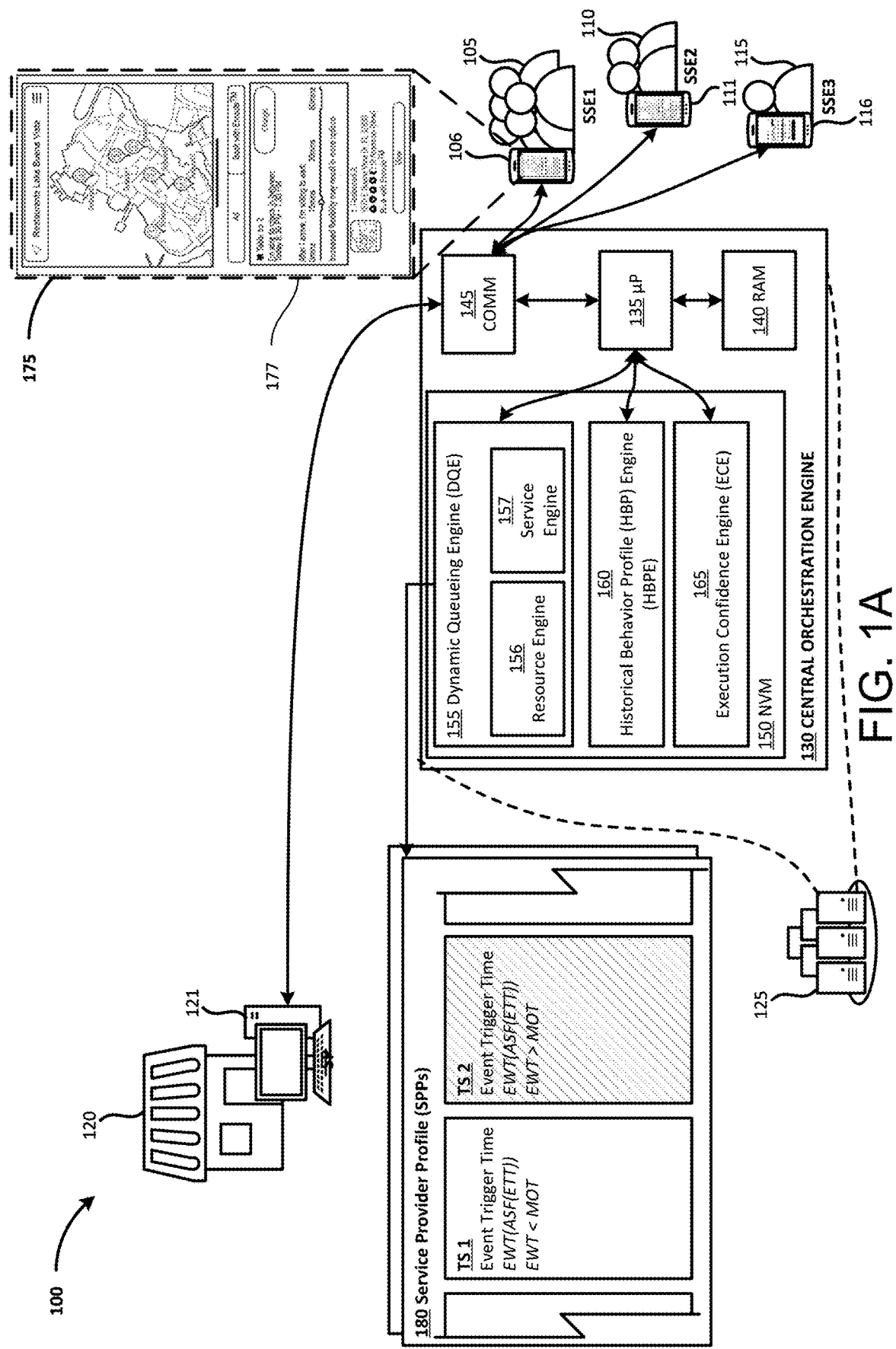
FIG. 1A and FIG. 1B depict an exemplary central orchestration engine (COE) employed in an illustrative use-case scenario.
Figure 1B:
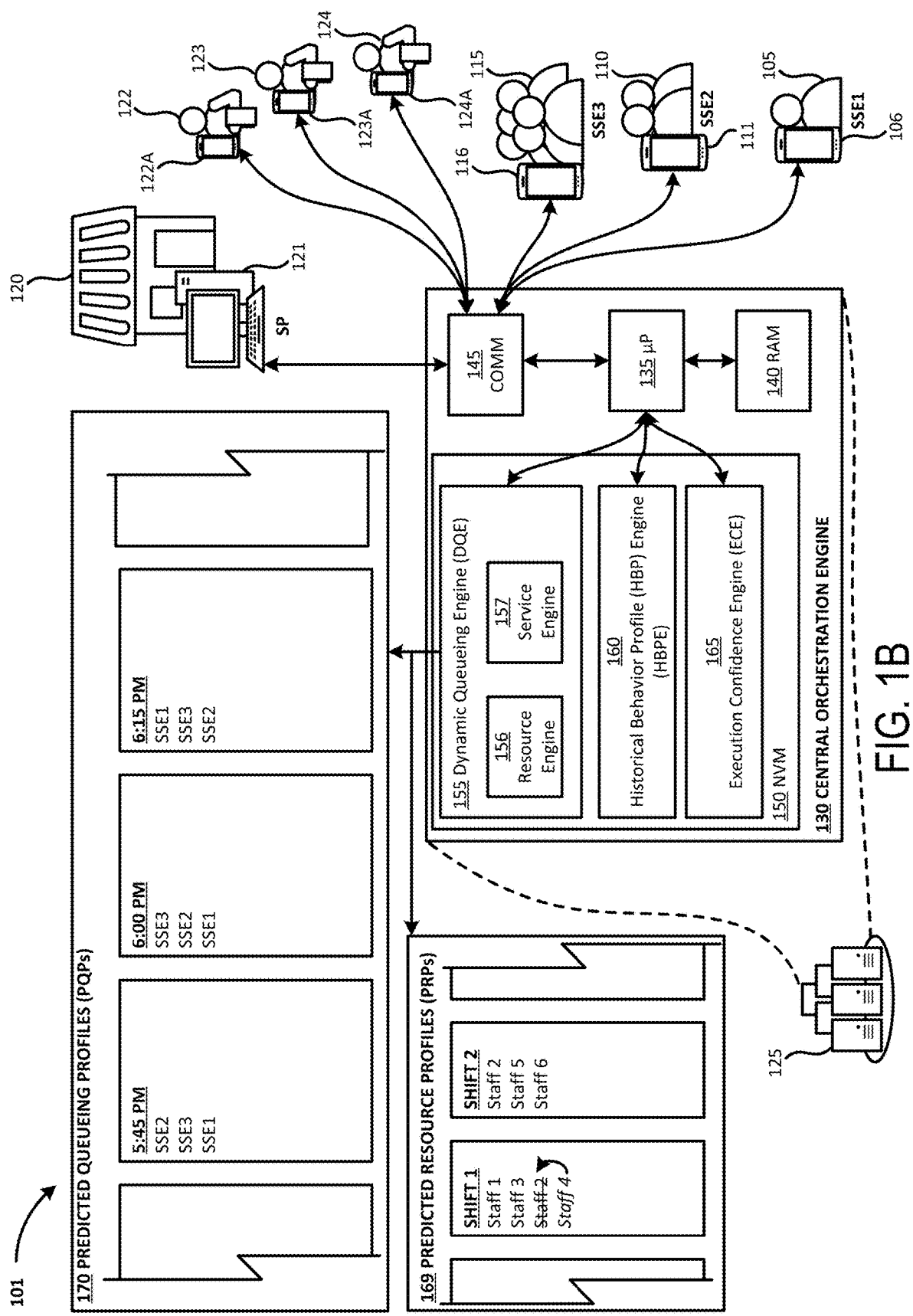

FIG. 1A and FIG. 1B depict an exemplary central orchestration engine (COE) employed in an illustrative use-case scenario. In a depicted scenario 100 as shown in FIG. 1A, a first service seeking entity 105, a second service seeking entity 110, and a third service seeking entity 115 are seeking priority seating at a service provider 120 (e.g., a restaurant). For example, the service seeking entity 105, 110, and/or 115 may be currently located remotely (e.g., 1-50 km) from the service provider 120. The service seeking entities 105, 110, and 115 interact with a mobile device 106, a mobile device 111, and a mobile device 116, respectively, to connect to a central orchestration system 125 (e.g., networked computing system, cloud service). The service provider 120 is connected to the central orchestration system 125 (e.g., including and/or implemented as a COE) by a computing system 121.

The central orchestration system 125 includes at least one COE 130. As depicted, the COE 130 includes a (micro) processor 135 (labeled μP), a random-access memory (RAM) module 140, and a communication module 145. As depicted, the devices 106, 111, 116, of the service seeking entities and the computing system 121 of the service provider communicate with the COE 130 via the communication module 145. For example, devices may communicate with the communication module 145 via wired and/or wirelessly carried electromagnetic signals.

The COE 130 includes at least one non-volatile memory module (NVM 150). The nonvolatile memory module 150 includes a dynamic queueing engine (DQE 155), a historical behavior profiles (HBP) engine (HBPE 160), and an execution confidence engine (ECE 165). Engines 155, 160, and 165 may, by way of example and not limitation, be implemented as respective programs of instructions configured to be executed by the processor 135, (integrated) circuits, or some combination thereof.

As shown, the first service seeking entity 105 is using a priority remote check-in application (PRCA 175) to schedule a priority remote check-in at a service provider (e.g., the service provider 120) within a geographical distance within a specified location. As shown in the close-up diagram in the depicted example, the PRCA 175 may display a number of pushpins representing various possible service providers available for the first service seeing entity 105 to schedule a remote check-in. In some implementations, each of the push pins may represent one or more time slots available satisfying a user-selected requirements of the first service seeking entity 105.

In some implementations, the PRCA 175 may send a service request to the central orchestration system 125 to request for available service providers and time slots for priority remote check-in. For example, the service request may include a target location, a service type, a user selected time window (e.g., a time window of expected service at a service provider location), and a maximum wait tolerance (MWT). For example, the first service seeking entity 105 may determine the MWT as the maximum wait time tolerated after checked-in at a service provider.

The central orchestration engine (COE 130), within the central orchestration system (central orchestration system 125), includes a dynamic queueing engine (DQE 155). Upon receiving the service request, the DQE 155 may generate an array of service provider objects (SPOs) as a function of a geofence filter. For example, the array of SPOs may include service providers within a predetermined distance (e.g., less than 2 km, 5 km, 10 km, 30 km, 50 km) from the target location specified in the service request.

The DQE 155, in some implementations, may use a resource engine 156 to process the array of SPOs. For example, the resource engine 156 may generate an anticipated service flow (ASF) of each of the service providers associated with the SPPOs using a HBPE 160. In some implementations, the HBPE 160 may provide historical behavior profiles associated with the service provider 120 to the DQE 155. For example, the HBPE 160 may generate a historical profile of a service provider including time slots available for priority remote check in and a predetermined service time associated with each of the time slots. In various examples, the predetermined service time at each of the time slots may be generated based on the ASF provided by the service provider, and an estimated number of service seeking entity receiving service at and around the time slots.

In this example, after generating a historical behavior profile for each of the SPPOs, the DQE 155 generates multiple service provider profiles (SPP 180) available for user selection. For example, the SPP 180 may include information of the service provider including name, address, and contact information. In this example, the SPP 180 further includes multiple time slots (TS) available based on the received service request. As shown, each of the TS includes an event trigger time and an expected wait time (EWT). For example, the event trigger time of TS1 may be 7:00 μm, and the event trigger time of TS2 may be 7:45 pm. As shown, the EWT may, in some implementations, be determined based on an ASF associated with the event trigger time.

In some implementations, the time slots TS1, TS2 may be dynamically determined based on a time period specified by the SP, the user selected time window, and the maximum wait tolerance of the user. For example, the SP may pre-set that remote priority check in is available at 6-9 pm, and the user selected time window is 5:30 pm-7:30 pm with the maximum wait tolerance of 15 minutes. As an illustrative example, the COE 130 may determine time windows within 6:00-7:30 pm having wait times of less than 15 mins. For example, the COE 130 may determine that the time windows 6:30-6:45 pm and 7:10-7:30 pm may have expected wait time of less than 15 minutes. In this case, in some implementations, the COE 130 may generate three time slots 6:30, 6:45, and 7:15 for user selection.

Based on the EWT and the MWT, the DQE 155 may determine whether a time slot is presented at the PRCA 175 for user selection. As shown, the DQE 155 may determine that TS1 is presented because EWT≤MOT. For example, the ASF associated with the time slot is determined as a function of the event trigger time and other parameters including, for example, number of people confirmed check-in at the same time slot, number of people confirmed check-in at adjacent time slots, current traffic, weather, current service flow at the service provider and other service providers within a geofence, and/or other related parameters. For example, the DQE 155 may determine that TS2 is presented (as shown as a greyed-out box) because EWT>MOT.

As shown, the PRCA 175 may generate, based on a result data received from the central orchestration system 125, a user interface (UI) displaying various restaurants within the predetermined distance from the target location having available time slot satisfying the user-specified time window and a wait tolerance input. For example, the first service seeking entity 105 may select one of the push pins to view further priority seating information of the selected service provider. The PRCA 175 UI includes a (slider) wait tolerance control 177 to change the MWT. For example, when the first service seeking entity 105 operates the (slider) wait tolerance control 177 to a higher value, the DQE 155 may dynamically generate more result satisfying the user selection.

After a user confirmed a selection within the PRCA 175, the user may, in some implementations, receive a confirmation screen. For example, the user may use the confirmation screen to update a confirmed priority seating arrangement. For example, signals may be sent from device(s) (e.g., by a user) which may be used to update an expected arrival or check-in time at the service provider, to notify that travel to the service provider has begun, to connect the PRCA 175 to a GPS application to share instant location during a journey to the service provider, and/or other related information to the priority seating arrangement. In some implementations, after receiving user interaction, the COE 130 may use an execution confidence engine (ECE 165) to adjust a confidence level related to the user. For example, the ECE 165 may increase a confidence level associated with the user after receiving an interaction. Further discussion of the confirmation UI is described with reference to FIG. 4.

Accordingly, the central orchestration system 125 may advantageously remotely provide a priority seating service with transparent wait time estimation at various service providers. For example, without the central orchestration system 125, a remotely located service seeking entity (e.g., a person who is 30 minutes away from the target location by car) may be required to call each of the service providers found on a search engine to check whether a service is available at a desired time. Additionally, the service seeking entity may lack confidence on whether the service (e.g., a table at a restaurant, a hairdresser, a healthcare professional) is still available after arriving (e.g., 30 minutes later) at the service provider. On the other hand, service providers may lack confidence at a random caller stating an arrival in time, for example, 30 minutes. By holding a table for a no-show customer, in some cases, may mean loss of revenue for a restaurant. In some examples, the central orchestration system 125 may advantageously facilitate the service seeking entities and the service provider to conveniently transact services with higher confidence of attendance and wait time certainty using a remote priority seating system.

Furthermore, if the requested service is available at an SP, the expected wait time after arrival given by the SP may be grossly inaccurate. In various implementations, the central orchestration system 125 may advantageously improve the accuracy by dynamically incorporating resources availability and the service seeking entities in real time. As an illustrative example, a service seeking entity may walk up to a restaurant and be told to have 45-min wait. This is because the restaurant may have some ovens malfunctioning and the restaurants may want to reduce its impact on service quality (e.g., from missing committed service time). In some examples, the service seeking entity may instead get the table in 15 minutes because the restaurant's wait time drastically reduce the number of service seeking entities waiting. Using the central orchestration system 125, for example, the restauranteurs may advantageously increase revenue because availabilities of both resources' availability at the restaurant and the service seeking entities may be considered.

Various implementation may, by way of example and not limitation, advantageously solve technical problems arising in the context of computerized networking between service providers and service seeking entities. For example, in a modern networked world, SSEs and/or SPs may expect scheduling and/or service availability to be assessed and/or booked remotely. Before computer networking, SSEs may simply, for example, have walked or driven down a street and looked at queue length to determine which SP has current availability. However, with the advent of smartphones, internet, and 'remote booking,' now even physical viewing queue length may not be accurate (e.g., due to remote queue lists). However, SSEs may, for example, have no practical way of finding SPs having time slots available within a specified MOT and geographical region. For example, SSEs may be forced to visit multiple SP profiles and/or individually call SPs to find available reservation times. Even once an available time slot is found, SSEs may have no practical way of accurately determining a wait time or finding a time slot based on a desired wait time (e.g., maximum permissible wait time). SSEs may, for example, be forced to join a 'first-in-first-served' waitlist with wait times estimated simply on current resource availability (e.g., not based on historical flow of the SP). SPs may, for example, have no practical way of estimating service flow at future times and/or based on historical behavior of the SP and/or SSEs (e.g., future, historic, historic behavior of future SSEs). Accordingly, various embodiments may advantageously provide a technical solution to various problems arising within the realm of networked computer system(s) of SSEs and/or SPs.

In a depicted scenario 101 as shown in FIG. 1B, the service seeking entities 105, 110, and 115 are dynamically prioritized to (potentially) receive service by a service provider 120. As shown in FIG. 1B, the service provider 120 utilizes one or more resources. Resources may, for example, include physical objects and/or spaces, such as, by way of example and not limitation, tables, chairs, rooms. Resources may, for example, include time (intervals). Resources may, for example, include staff members. In the depicted example, the service provider 120 may, for example, be a restaurant. The service provider 120 employs multiple staff members or service resource entities (SREs), including SRE 122, SRE 123, and SRE 124. The SREs 122-124 interact with the central orchestration system 125 via device 122A, 123A, and 124A, respectively. The COE 130 may, for example, dynamically coordinate schedules of the SREs 122-124 according to PQPs associated with the service provider 120.

In response to a request for service (e.g., a dynamic queueing event) from one of the service seeking entities, in this example, the DQE 155 (e.g., via the service engine 157)

may generate a corresponding dynamic queueing event profile (DQEP). For example, may be stored in a memory module (e.g., nonvolatile, random access). The DQEP may, for example, include a requested time of service, an identifier corresponding to the service seeking entity requesting service, and an identifier corresponding to at least one service provider from whom service is sought.

The DQE 155 may retrieve, through the microprocessor 135 by the HBPE 160, at least one historical behavior profile corresponding to the service seeking entity, the service provider, or some combination thereof. For example, a historical behavior profile may correspond to past dynamic queueing event profiles associated with the entity (e.g., service seeking entity, service provider), results of the queueing event (e.g., successfully executed, early, late, canceled, no-show), or some combination thereof. The DQE 155 may communicate with the ECE 165 via the microprocessor 135 to generate a confidence level of execution (CLE) for the dynamic queueing event profile. The ECE 165 may, for example, generated confidence level of execution based at least in part on the corresponding historical behavior profile(s).

The DQE 155 generates at least one predicted queueing profile (PQP) corresponding to the requested time of service for the dynamic queueing event. As depicted, a predicted queueing profile may include a prioritized list of service seeking entities associated with the specific time for the associated service provider. For example, the service seeking entity 105 may request a reservation for service by the service provider 120 at 6:00 PM. Accordingly, the DQE 155 may generate a first dynamic queueing event profile associating the service seeking entity 105, the service provider 120, and the time 6:00 PM. The service seeking entity 110 may request a reservation for service by the service provider 120 at 6:00 PM. Accordingly, the DQE 155 may generate a second dynamic queueing event profile associated with the service seeking entity 110 for the service provider 120 at 6:00 PM. The service seeking entity 115 may request a reservation for service by the service provider 120 at 6:00 PM. Accordingly, the DQE 155 may generate a third dynamic queueing event profile associated with the service seeking entity 115 for the service provider 120 at 6:00 PM. The DQE 155 may generate a predicted queueing profile 170 associated with the first, second, and third dynamic queueing event profiles.

In the depicted example, the DQE 155 further generates (e.g., via a resource engine 156) at least one predicted resource profile (PRPs 169) corresponding to (predetermined) time intervals. The time intervals for PRPs may, by way of example and not limitation, be different than time intervals for PQPs. As depicted, the DQE 155 generates PRPs 169 based on availability of the SREs 122-124. In the depicted example, for example, a Shift 1 (e.g., corresponding to 12 PM-8 PM) may be associated with 3 staff positions. A Staff 1 (e.g., SRE 122), a Staff 3 (e.g., SRE 124), and a Staff 2 (e.g., SRE 123) are scheduled, as depicted. A Staff 4 (not shown) may be available, but not scheduled. The DQE 155 may prioritize the SREs within the PRP (e.g., based on historical behavior, based on geolocation, based on dynamic scheduling such as comparing to other events an SRE is associated with).

In the depicted illustrative example, the DQE 155 may, for example, determine that a confidence interval (e.g., calculated by the ECE 165) for the Staff 2 fails a predetermined criterion (e.g., minimum threshold). The central orchestration system 125 may remove Staff 2's reserved position status from the Shift 1 PQP. The DQE 155 may, for example, determine that the Staff 2 is most likely to arrive for Shift 2 (e.g., based on messaging received from the Shift 2, based on traffic conditions, based on geolocation, based on other events associated with the Staff 2). For example, Staff 2 may have a highest confidence level for Shift 2.

As depicted, the PRP for Shift 2 may be re-prioritized by the DQE 155 to associate the Staff 4 with a reserved position status in the PRP for Shift 2. The central orchestration system 125 may, for example, notify the Staff 4 to arrive for work (e.g., based on predetermined preferences of the Staff 4 and/or the service provider 120). In various embodiments, PRPs may be operated using elements and/or methods disclosed with reference to PQPs. For example, may be associated with PRPs and SREs.

The HBPE 160 may provide historical behavior profiles associated with each of the service seeking entities 105, 110, 115 and the service provider 120 to the DQE 155. By way of example and not limitation, a first historical behavior profile associated with the service seeking entity 105 may indicate that the service seeking entity 105 is historically (e.g., on average, for the current time range in the day, for this type of event, for this day in the week, based on surrounding events, according to weather, for this service provider) approximately 15 minutes late. A second historical behavior profile associated with the service seeking entity 110 may indicate, for example, that the service seeking entity 110 is historically approximate 15 minutes early. A third behavior profile associated with the service seeking entity 115 may indicate, for example, that the service seeking entity 115 is historically approximately on time. The service provider 120 may, way of example and not limitation, not have historical behavior profile, or may have a historical behavior profile associated with serving on time (e.g., these patrons, at this time of day, on this day of the week, for this type of event). In various embodiments the DQE 155 and/or the HBPE 160 may associate, for example, each historical behavior profile with the corresponding dynamic queueing event profile.

The ECE 165 may operate on the first, second, and third dynamic queueing event profiles and associated historical behavior profiles to determine a corresponding first, second, and third confidence level of execution, respectively, for each dynamic queueing event profile at the requested service time (e.g., 6:00 PM). For example, the first dynamic queueing event profile may be associated with a low confidence level of execution. The second dynamic queueing event profile may be associated with a high confidence level of execution. The third dynamic queueing event profile may be associated with a moderate confidence level of execution. The third confidence level of execution may, for example, be greater than the second confidence level of execution which may be greater than the first confidence level of execution.

The DQE 155 may prioritize, for example, the dynamic queueing event profiles in the predicted queueing profile associated with 6:00 PM according to the generated confidence levels of execution. As depicted, the predicted queueing profile associates the third dynamic queueing event profile with the highest priority (e.g., due to being associated with the highest confidence level of execution at the associated time of 6:00 PM), the second dynamic queueing event profile with middle priority, and the first dynamic queueing event profile with the lowest priority (e.g., due to being associated with the lowest confidence level of execution of the associated time). Accordingly, the service provider may advantageously determine a priority of service, an expected demand for service at a specific time, or some combination thereof.

The DQE 155 may further, by way of example and not limitation, determine a time corresponding to a maximum confidence level of execution for each dynamic queueing event profile. The DQE 155 may associate the dynamic queueing event profile with predicted queueing profiles corresponding to times other than the requested time of service. For example, the DQE 155 may associate a dynamic queueing event profile with predicted queueing profiles associated with time intervals adjacent to the requested time. The DQE 155 may associate, for example, a dynamic queueing event profile with a predicted queueing profile associated with a time corresponding to a maximum confidence level of execution for the dynamic queueing event profile (e.g., based on at least one historical behavior profile).

In the depicted example, the maximum confidence level of execution for the first dynamic queueing event profile may, for example, correspond to 6:15 PM. Accordingly, the DQE 155 may associate the first dynamic queueing event profile with a predicted queueing profile associated with 6:15 PM. At 6:15 PM, for example, a confidence level of execution for the first dynamic queueing event profile may be greater than a confidence level of execution for the third dynamic queueing event profile which may be greater than a confidence level execution for the second dynamic queueing event profile. Accordingly, the predicted queueing profile for the service provider 120 at 6:15 PM may prioritize the first dynamic queueing event profile, followed by the third dynamic queueing event profile, followed by the second dynamic queueing event profile.

In the depicted example, the maximum confidence level of execution for the second dynamic queueing event profile may, for example, correspond to 5:45 PM. Accordingly, the DQE 155 may associate the second dynamic queueing event profile with a predicted queueing profile associated with 5:45 PM. At 5:45 PM, for example, a confidence level of execution for the second dynamic queueing event profile may be greater than a confidence level of execution for the third dynamic queueing event profile, which may be greater than a confidence level of execution for the first dynamic queueing event profile.

Accordingly, the COE 130 may dynamically prioritize service seeking entities in predicted queueing profiles according to their historical behavior. The service provider 120 may be, by way of example and not limitation, the restaurant. The service provider 120 (e.g., restaurant) may, for example, reserve service capacity (e.g., tables) for each service seeking entity in order of priority. For example, the service seeking entity 115 may be rewarded for historic timeliness by receiving highest priority at the requested time. The service seeking entity 110 may, for example, advantageously receive highest priority upon arrival 15 minutes earlier than requested. The service seeking entity 105 may, for example, advantageously receive highest priority upon arrival 15 minutes later than requested. The service seeking entity 105 may, for example, advantageously avoid penalization and/or longer wait despite being late to a reservation. The service provider 120 may advantageously allot resources (e.g., wait staff, cooking staff, food, tables) as needed and minimize resources allotted too late and/or too early.

In various embodiments a predicted queueing profile 170 may be regenerated dynamically according to further inputs. For example, a predicted queueing profile 170 may be regenerated in response to a request for service from an additional service seeking entity; a termination of a request for service by at least one of service seeking entities 105, 110, and 115; a change in conditions (e.g., walk-in service requests, accident, traffic, delay of a service seeking entity, weather); or some combination thereof.

As depicted, a single service seeking entity may correspond to one or more individual persons. For example, service seeking entity 105 corresponds to a single individual; service seeking entity 110 corresponds to 2 individuals (e.g., spouses, friends, business associates); and service seeking entity 115 corresponds to 5 individuals (e.g., a party, a church group, a business gathering, a family). Accordingly, a single dynamic queueing event profile may correspond to one or more individuals.

Figure 2:
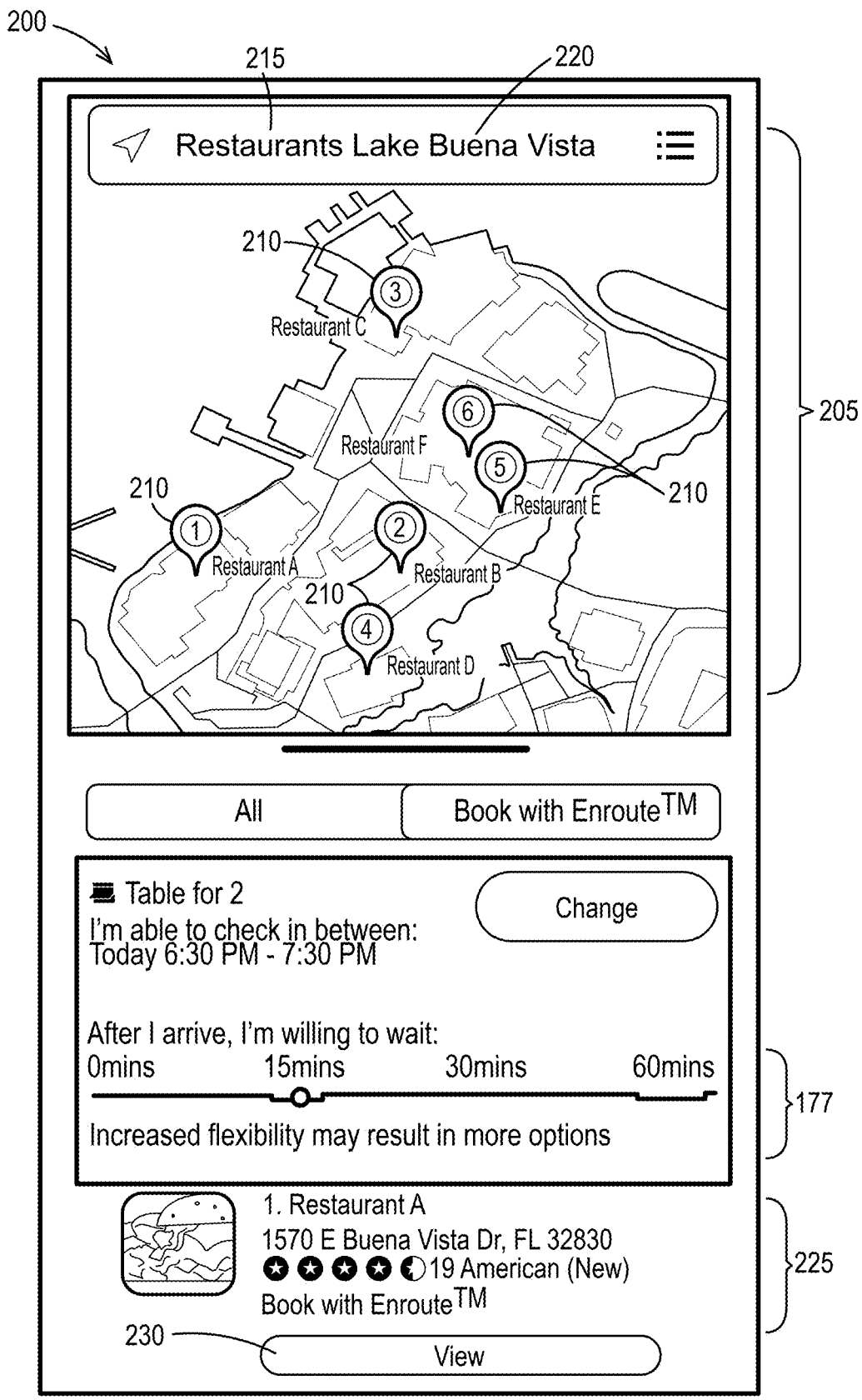
FIG. 2 depicts an exemplary user interface (UI) with a wait tolerance input slider control.

FIG. 2 depicts an exemplary user interface (UI 200) with a slider as a wait tolerance control 177. Various embodiments may, for example, advantageously provide a solution to a requirement that a customer must check in at a host/hostess stand and pray for a short wait. In some implementations, the wait tolerance control 177 may dynamically provide an anticipated customer arrival time (also referred to as "Check-In time") for generating available time slots within a selected SP ("Restaurant A" in this example). In some examples, the wait tolerance may, for example, be determined as a function of a customer's willingness to wait for service after they arrive/check-in. In some implementations, such embodiments may, by way of example and not limitation, replace a reservation time with an arrival time and corresponding wait tolerance. Check-in may, for example, be performed through the PRCA 175 with a predetermined geofence around the selected SP.

In various embodiments, an SP may, for example, configure a maximum wait time (MWT) (e.g., predetermined) at one or more 'tiers' (also referred to as 'levels': resource, type of service being performed, block of time during the day). In various implementations, a SP using a non-DPQS system may, for example, advertise their MWT policies to the central orchestration system 125 to facilitate dynamic matching and/or queueing between an SSE(s) and SP(s).

The SSE may, for example, agree to check-in on or before their chosen check-in time and the SP may agree to serve the customer within the agreed upon MWT (e.g., corresponding to a predetermined wait tolerance) associated with that check-in time. If changes occur, the SP may, for example, attempt to accommodate the same MWT for the SSE. Changes may be communicated between the SSE and the SP in response to (predetermined) prompts and/or predetermined 'commitment event' triggers executed by the COS.

Such a UI (e.g., the UI 200 with the wait tolerance control 177) may allow the SSE to indicate some flexibility in the actual seating time after they agree to a check-in time. The SSE may acknowledge that they will arrive within the geofence of the provider, check in, and then have a drink or go shopping next door until the SP is ready to provide the requested service. The mobile app may, for example, advantageously enable the user(s) to communicate small changes to an expected queueing time. Information collected by the mobile app UI (like when the user changes a control) can be fed to the DPQS, which may accordingly adjust confidence level of the corresponding queue entry as well as update an expected time of arrival (ETA) algorithm (which may, for example, use GPS to determine a predicted arrival time).

The depicted example UI 200 may be considered a "birds-eye view" geographically indicated multiple potential SPs corresponding to a service requested (e.g., time(s), location(s), service(s)), and a corresponding wait tolerance. In some implementations, the PRCA 175 may have two modes: Service Now and Service Later. The UI 200 depicts a Service Later (e.g., Today between 6:30 PM to 7:30 PM) mode.

As an illustrative example, an SSE (e.g., the service seeking entity 105) chooses parameters in the wait tolerance control 177 and a filtered list of SPs who can accommodate those parameters are shown (e.g., in response to signals from a COS) in a map 205 as push pins 210. In some examples, the filtered list of SPs may be displayed in a list view. Using the wait tolerance control 177, the SSE chooses an acceptable amount of waiting time for service after they check-in (e.g., corresponding to 'wait tolerance'). If the wait tolerance control 177, for example, is moved to the left at 0 minutes, this may, for example, correspond to a traditional reservation or appointment (walk in and almost immediately be seated). If the SSE is willing to wait an amount of time, this may be referred to as "priority seating." Priority seating may, for example, mean that a priority spot will be held for the SSE, but the SSE's priority isn't locked in in the corresponding queue until the SSE check in at the provider location. The check-in process may, for example, happens in the app and/or with an SP staff member. Such embodiments may, for example, advantageously enable SPs to provide "priority seating" and/or "priority service" based upon a geofenced check-in while avoiding negative associations with "reservation."

The UI 200 and associated DQPS may, for example, be used for various SPs (e.g., a chiropractor). The SSE can choose a hard appointment (e.g., 0-minute wait tolerance), or they can choose to be "squeezed in" with a small wait (e.g., >0-minute wait tolerance). In the case of choosing a 0-minute wait, the SSE may be given options for service at the beginning of the day and right after the lunch break, when they would be the first people on the schedule and thereby able to provide a priority in queue having a confidence level (e.g., above a predetermined threshold) associated with a 0-minute wait.

As an illustrative example, to get started, an SSE can search a service 215 and a geographical area 220 to find service providers who meet the criteria chosen in the red box. In this case, the app may filter the SPs who can accommodate a customer check-in window between 6:30 PM and 7:30 PM and agree to seat the SSE within 15 minutes of the check-in time chosen by the SSE (the customer may, for example, choose a check-in time on a following screen). That technically means that they would likely be seated/served between 6:30 PM and 7:45 PM (to include a 15-minute wait tolerance value selected by the SSE). In this example, after the SSE select one of the SPs from the map 205, an information area 225 may display information of the selected SP. The information area 225 also includes a view button 230 to view more detailed information of the selected SP. An exemplary UI for displaying the detailed information is described with reference to FIGS. 3A-3B.

Such embodiments may, for example, advantageously provide a technical system enabling an SSE to use a single app instead of running multiple apps from different reservation systems to search a geographic area for availability in each one. Such embodiments may, for example, advantageously enable a computer system to provide an SSE an ability to quickly locate available SPs within a desired service area, time, service type, and wait tolerance level instead of tediously running a mapping application, clicking on a specific provider, searching for availability, not finding it, going back, back, and back and choosing the next provider, and repeating the search.

Figure 3A:
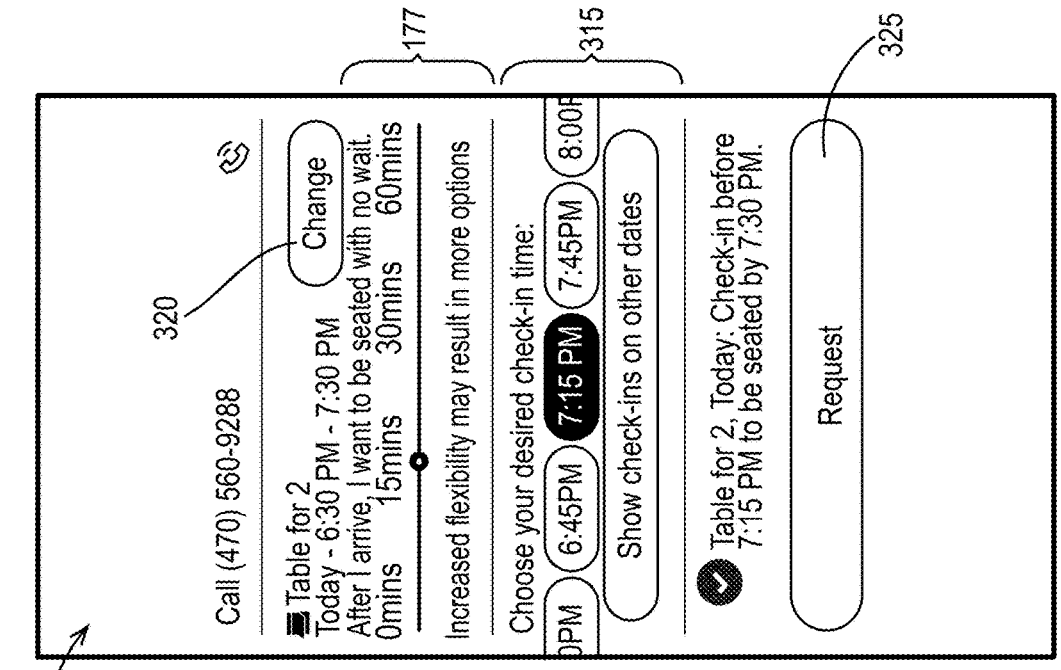
FIG. 3A and FIG. 3B depict an exemplary UI depicting a selected SP detail view.
Figure 3B:
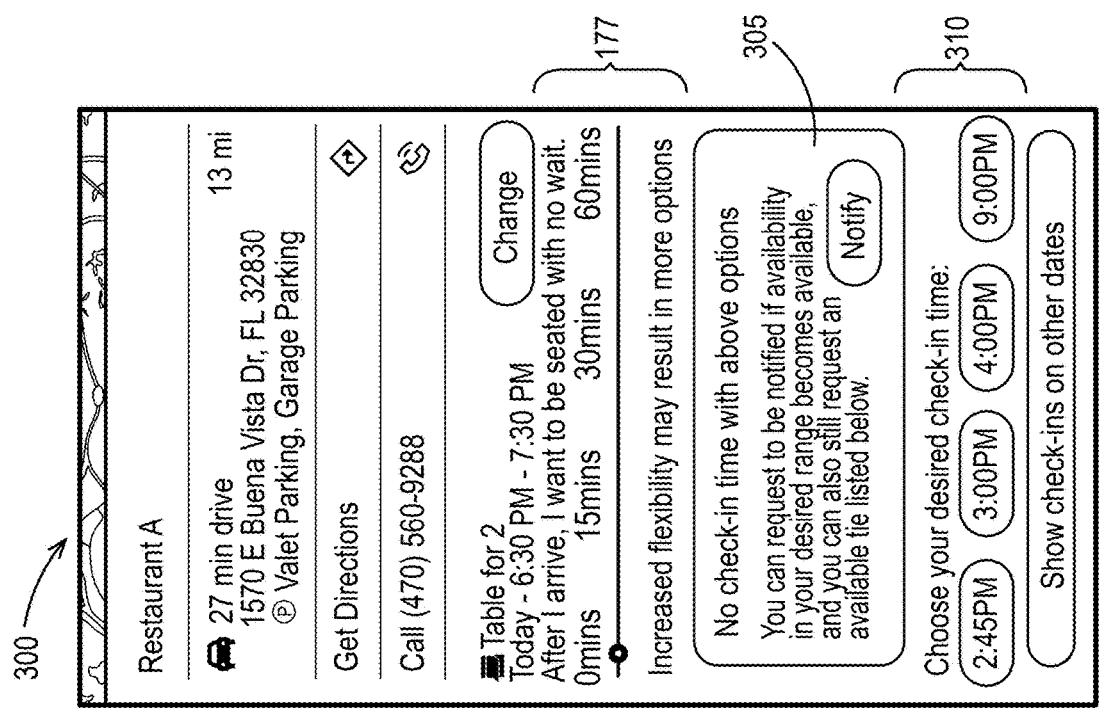

FIG. 3A and FIG. 3B depict an exemplary UI 300 depicting a selected SP detail view. In various embodiments, after selecting one of the SPs—in this case Restaurant A—from the birds-eye view on a previous screen (e.g., using the view button 230), the SSE is presented with the wait tolerance control 177 on the selected SP detail screen. In this case, the list of available check-in times changes, based upon the setting of the wait tolerance control 177. For example, as the customer starts with 0-minute slider time as shown in FIG. 3A, there may be no check-in time available to satisfy the SSE's criteria and a notification 305 is displayed. As shown, the customer will only see tables available before 4 PM or after 9 PM display as time slots 310.

As shown in FIG. 3B, the customer operates the wait tolerance control 177 to a 15-minute slider time. Multiple time slots 315 are available in the SSE's specified time window. In some implementations, the SSE may use the change button 320 to change other user specified criterion including a number of seats requested and the specified time window. In this example, the SSE selected the 7:15 pm time slot. For example, the SSE may confirm this selection by selected a confirm button 325.

In some implementations, as the SSE moves the slider to 15-minute priority seating option in the UI 300 as shown in FIG. 3B, some check-in times during peak dinner time are provided to the SSE as an option. In some embodiments, additional options based on wait tolerance greater than zero may, by way of example and not limitation, (only) come from an SP using predictive 'virtual' queueing (PVQ) and/or Arrival Queue. The further the slider goes to the right, the more options for check-in times appear. In this case, 7:30 PM becomes available when you move the slider to 30 minutes.

As an illustrative example, a restaurant can specify a service level of 0 minutes (a reservation) during off-peak times and offer priority seating (15-minute service level) during prime dinner time. As the SSE adjusts their wait tolerance (e.g., willingness to wait after check-in), more check-in times appear. The available check-in times for given customer desired wait settings may, for example, be configurable by the SP and the queue selection engine automatically selects and presents available queues based on the SP data provided and the SSE request characteristics.

Some embodiments may, for example, provide transparency of the SSE's and/or SP's "on time" rating. Some embodiments may, for example, provide gamification features (e.g., financial rewards, social rewards, service rewards, challenges) to encourage increasing on-time rating, for example.

Various embodiments may reduce friction in reservations and/or waitlists arising from lack of 2-way coordination after the event is established. For example, various embodiments may provide a system of micro commitments and clear communication of expectations for each step of the scheduling process. In some implementations, once the customer has requested a spot in a queue, the rest of the UI/UX is presented in a progress bar dynamic interface. Each step of the dynamic UI may present the SSE what they need to do to get to the next step of the process. For example, once the queue entry has been confirmed by the system, the next step (in the depicted example) is for the SSE to check in by their pre-selected check-in time. A SP may, for example, determine a size of the geofence where the SSE can check in. In some embodiments, an SSE can check in at a podium (e.g., useful if GPS can't be verified or because someone else made the reservation request from another device in another location).

Some of the steps in the depicted dynamic UI may allow the queue prioritization to be adjusted based upon the SSE moving a control on the screen. Various other examples are depicted herein.

Figure 4:
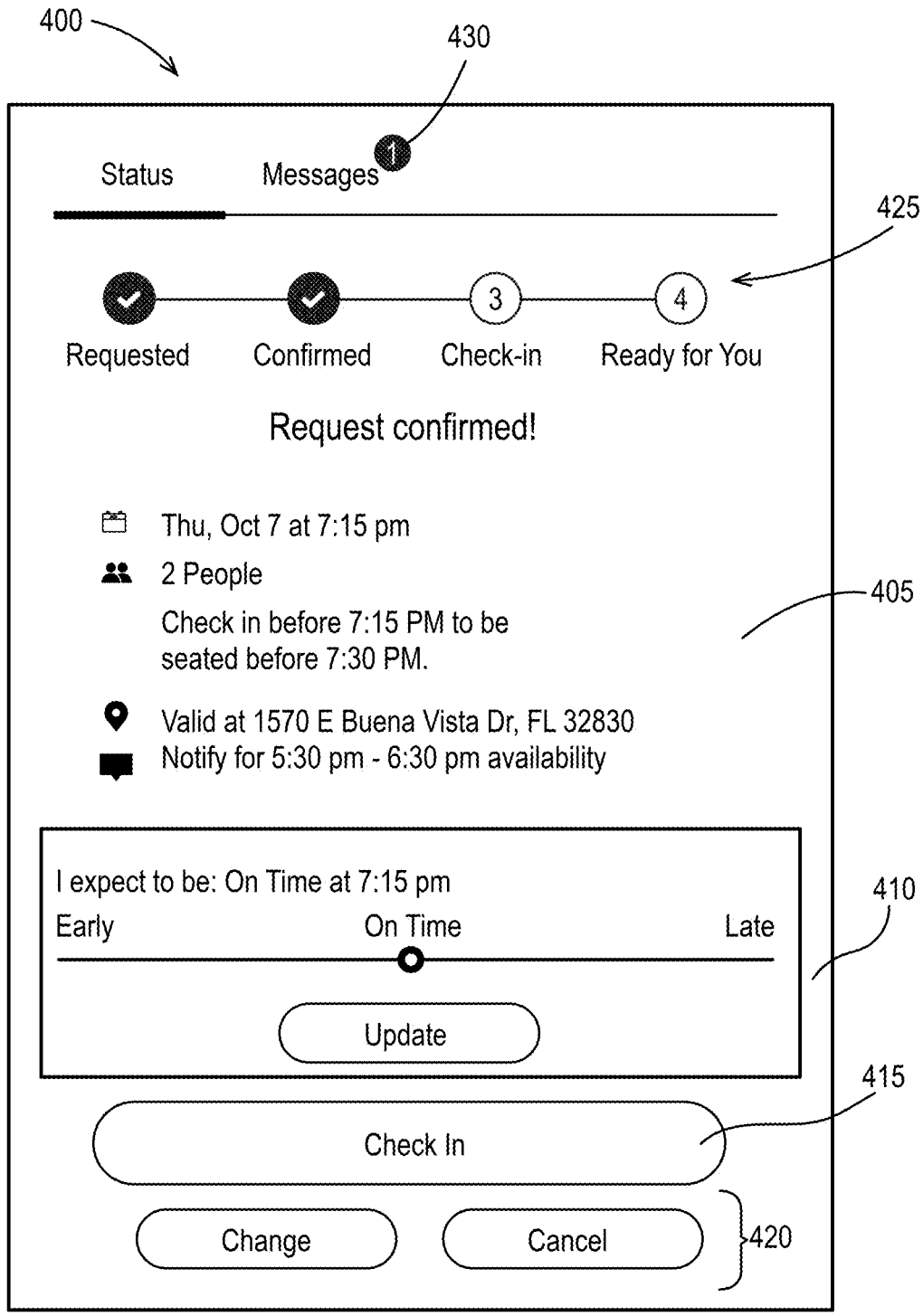
FIG. 4 depicts an exemplary SSE expectation adjustment UI.

FIG. 4 depicts an exemplary SSE expectation adjustment UI 400. For example, the SSE expectation adjustment UI 400 may provide a user an expectation adjustment after a user has confirmed a priority seating arrangement and before arrival at the service provider. The UI 400 depicts a micro-commitment 405 of checking in before 7:15 PM to be seated within a wait tolerance of 15 minutes (7:30 PM). An additional slider control 410 (depicted in a red box) allows the SSE to communicate small changes to their arrival time (in either direction). Whenever the SSE operates the slider, the system receives a 'priceless' amount of information that may, for example, not only increase a confidence level associated with the SSE in the corresponding queue of the SSE coming (e.g., they have initiated contact with the SP through the COS), as well as prioritizing the SSE in the queue based upon the SSE communicating their intent to adjust their check-in time. In various embodiments, data from an SSE through an expectation adjustment control may be used by a COS in association with a predictive queue (advanced queueing') and/or an Arrival Queue.

In this example, the UI includes a check in button 415 for the user to finally check in at the selected SP. In some implementations, the check in button 415 may be activated only when the user device is within a predetermined distance (e.g., 500 m) from the SP. Other changes or cancellation of the priority seating arrangement may be made using a change button and a cancel button 420.

The UI 400 includes a status bar 425 displaying a 4-step service ready process. As shown, before a service is ready for the SSE, the SSE may first request a service, confirm a service, check-in for a service, and finally service may be ready. The UI 400 further includes a message tab 430. In some implementations, the message tab 430 may include message sent from the SP regarding, for example, service disruption, dress code information, promotion, or other service-related information.

In an illustrative example, through the additional slider control 410, the COE 130 may adjust an expected seating time within the micro-commitment 405 based on an updated early/late check in time. In some implementations, if the user selects to be check in early (e.g., the user adjusts the additional slider to be arriving at 6:55 pm), the COE 130 may dynamically re-calculate, based on current information, an updated estimated seating time. In some examples, the updated estimated seating time may be adjusted to an earlier time if the COE 130 determines that the SP can accommodate the user at an earlier time. For example, information in the micro-commitment 405 may be updated based on the updated check in time and the updated estimated seating time. If, for example, the user selects to be check in late (e.g., at 7:30 pm in this example), the COE 130 may update the seating time based on the updated check in time. In some cases, an updated wait tolerance may be longer than the wait tolerance before adjustment. For example, the user may get a 30-minute maximum wait time instead of a 15-minute maximum wait time.

Figure 5:
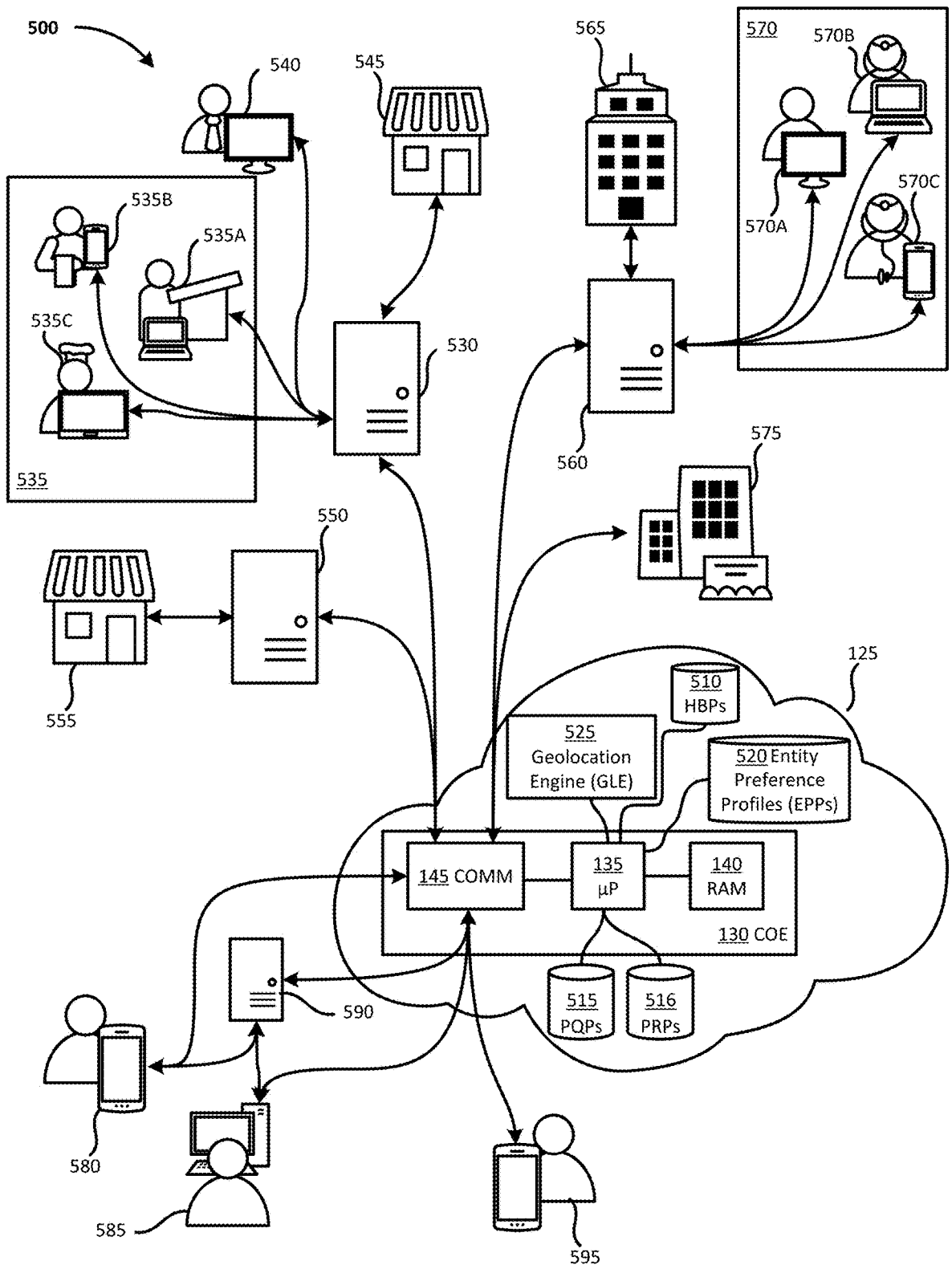
FIG. 5 is a block diagram depicting an exemplary central orchestration engine connecting healthcare and hospitality service providers to service seeking entities.

FIG. 5 is a block diagram depicting an exemplary central orchestration engine connecting healthcare and hospitality service providers to service seeking entities. In the depicted exemplary system 500, the central orchestration system 125 is implemented as a networked (e.g., remote, cloud) system. In addition to the COE 130, the central orchestration system 125 is further provided with at least one data store of historical behavior profiles 510. The central orchestration system 125 is operably coupled to at least one data store of predicted queueing profiles 515. The central orchestration system 125 is operably coupled to at least one data store of predicted resource profiles 516. The central orchestration system 125 is further provided with at least one data store of entity preference profiles (EPPs) 220. The entity preference profiles may, for example, correspond to preferences expressed (e.g., directly expressed and/or stored, determined by machine learning) and/or predetermined by service seeking entities and/or service providers. An entity preference profile may include, by way of example and not limitation, special pricing (e.g., for specific customers, specific times, specific days of the week, specific times of the year, specific confidence levels, specific customer attributes, specific locations, specific products), booking levels (e.g., accept bookings up to a predetermined capacity), confidence interval level preferences (e.g., assign dynamic queueing event profiles a 'guaranteed' status once an associated confidence level reaches a predetermined threshold), geofence zones (e.g., distances, geofence profiles, location preferences), service provider preferences (e.g., types, locations, specific providers), service seeking entity preferences (e.g., historical behavior attributes) or some combination thereof.

As depicted, the central orchestration system 125 is further provided with a geolocation engine (GLE 525). The GLE 525 may, for example, include circuits (e.g., processor module, RAM module, NVM module, dedicated/integrated circuit module) configured to communicate with geo-positioning devices (e.g., client devices, central devices). The GLE 525 may, for example, be configured to communicate with (remote) geolocating services and/or systems, provide an integrated geolocation system, or some combination thereof. In various embodiments the GLE 525 may retrieve, generate, and/or operate on positions determined by global navigation satellite systems (GNSS) such as, by way of example and not limitation, GPS (USA), GLONASS (Russia), Galileo (European Union), BeiDou (People's Republic of China), QZSS (Japan), IRNSS-NAVIC (India), or some combination thereof. Various embodiments may provide geolocation (GL) data (e.g., associated with a service seeking entity and/or service provider, such as corresponding to at least one dynamic queueing event profile) to the DQE 155 and/or the ECE 165.

As depicted, the central orchestration engine communicates, via the communication module 145, with a hospitality management system 530. The hospitality management system 530 may, by way of example and not limitation, be a (third-party) table management system, hotel management system, or some combination thereof. The hospitality management system 530 communicates with a service provider 535 (e.g., a hospitality provider), a (remote) manager 540, and a service provider 545 (e.g., restaurant).

The service provider 535 includes front staff 535A (e.g., hostess communicating through a laptop, front reservation staff at a hotel/restaurant), wait staff 535B (e.g., waiter communicating through a smartphone), and cook staff 535C (e.g., chef communicating through a tablet). Each may communicate directly and/or indirectly (e.g., through a local management system for service provider 535) with the hospitality management system 530. The hospitality management system 530 may, for example, receive reservations (e.g., walk-in reservations and/or phone reservations taken by the front staff 535A), information on current resource levels (e.g., staff, tables, food, table status from wait staff 535B, order status from cook staff 535C), service provider preferences, or some combination thereof. For example, the service provider 535 may manage available tables and/or rooms using at least one display generated by the hospitality management system 530. The service provider 535 may, for example, input substantially all reservations and/or resource updates into the hospitality management system 530. Accordingly, the hospitality management system 530 may communicate a substantially accurate status (e.g., table inventory, hotel room inventory, conference room inventory, service availability) of the service provider 535 to the central orchestration system 125.

In various embodiments the service provider 535 (e.g., restaurant) may, by way of example and not limitation, be a standalone entity, or be operated as part of a larger entity (e.g., a hotel, amusement park, hospital, car dealership, event center). The manager 540 may, for example, be a (remote) manager of the service provider 535 (e.g., a consultant, an administrative manager at a corporate office). The manager 540 may, for example, monitor performance and/or operations of the service provider 535 via the hospitality management system 530.

The service provider 545 may, for example, be a small local café informally using the hospitality management system 530. For example, the service provider 545 may take reservations through the hospitality management system 530 (e.g., through a third-party app and/or website on a mobile device and/or other computing device, not shown), but may provide limited, irregular, or no updates on reservations received via other modes (e.g., walk-in, phone). Accordingly, updates (e.g., of table inventory, service availability) communicated to the central orchestration system 125 by the hospitality management system 530 for the service provider 545 may be of limited accuracy.

The central orchestration system 125 further communicates with a table reservation system 550. The table reservation system 550 communicates (e.g., via a computing device, not shown) with a service provider 555 (e.g., restaurant). The table reservation system 550 may, for example, be a third-party system and/or service, be dedicated (e.g., proprietary) to the service provider 555, or some combination thereof.

The central orchestration system 125 further communicates with a healthcare management system 560 (e.g., third-party service/system, remote computing system). The healthcare management system 560 communicates (e.g., via a computing network(s), not shown) with a service provider 565 (e.g., hospital) and a service provider 570 (e.g., clinic). The service provider 565 may, for example, at least partially manage healthcare resources (e.g., beds, appointments, staff, inventory) via the healthcare management system 560. The healthcare management system 560 may communicate updates at least related to relevant resources (e.g., beds, appointments) to the central orchestration system 125.

The service provider 570 includes administrative staff (e.g., receptionist, bookkeeper, office manager) 570A communicating with the healthcare management system 560 via a (desktop, networked) computer. The service provider 570 further includes healthcare professionals (e.g., physicians, nurses, chiropractors, dentists, pharmacists) 570B and 570C communicating with the healthcare management system 560 (e.g., directly, indirectly via a local management system) via computing devices (e.g., smartphone, laptop, mobile device, computing station in a specific room such as lab, office, exam room). The healthcare management system 560 may, for example, manage appointments, staff schedules, and/or other resources for the service provider 570. The healthcare management system 560 may communicate updates related to relevant resources (e.g., appointments) to the central orchestration system 125.

The central orchestration system 125 further communicates directly with a professional services provider 575 (e.g., a law office) via one or more computing devices (not shown). The law office may, for example, provide appointment availability (e.g., by professional service providers, administrative staff, or some combination thereof) to the central orchestration system 125.

The central orchestration system 125 receives requests for service from service seeking entities 580 and 585. The service seeking entities 580 and 585 additionally communicate with a networking system 590. For example, the service seeking entity 580 communicates with the networking system 590 and the central orchestration system 125 via a smartphone. The service seeking entity 585 communicates with the systems via a desktop computer.

The service seeking entities 580 and 585 may, for example, the view availability and/or request service individually and/or as a party with the service providers 535, 545, 555, 565, 570, and/or 575 directly using the central orchestration system 125, the networking system 590, or some combination thereof. For example, the service seeking entity 5s85 may reserve a table with the service provider 555 using the central orchestration system 125. The central orchestration system 125 may communicate with the hospitality management system 530 to determine service availability at the requested time, book a reservation, and provide prioritization of the request (e.g., as a dynamic queueing event profile) to the service provider 535.

The service seeking entities 580 and 585 (entity 580 and/or entity 585 may, by way of example and not limitation, be an SSE and/or an SRE) may, for example, communicate with the networking system 590 to form a 'social network' acting as a single service seeking entity. The combined party may, for example, seek to book a table at the service provider 545. The networking system 590 may communicate with the central orchestration system 125 to provide service availability and/or book a table (e.g., via the hospitality management system 530) for the combined services seeking entity.

The central orchestration system 125 further communicates with a service seeking entity 595 (the entity 595 may, by way of example and not limitation, be an SSE and/or an SRE) via a mobile device. The service seeking entity 595 may, for example, request an appointment with a physician 570B at the service provider 570. The central orchestration system 125 may communicate with the healthcare management system 560 to determine appointment availability and/or reserve an appointment time. The service seeking entity 595 may, for example, request a video conference with a professional at the professional services provider 575.

The service seeking entity 595 may, for example, communicate directly with the professional services provider 575 via the central orchestration system 125. For example, the central orchestration system 125 may retrieve a schedule from the professional services provider 575 (e.g., already preloaded into an EPP 520 for the service provider, dynamically retrieved from a scheduling system into a random-access memory module of the central orchestration system 125) at and/or around a requested time.

The system 125 may, for example, generate a dynamic queueing event profile. The dynamic queueing event profile may be associated with a predicted queueing profile of the professional services provider 575. The orchestration service may, for example, determine a recommended predicted queueing profile and/or generate a confidence level of execution of the dynamic queueing event profile in response to the request for service from the service seeking entity 595 based on a current location of the service seeking entity 595 and/or professional services provider 575. Accordingly, a service seeking entity and service provider may advantageously coordinate an event in at least one dynamically prioritized queue.

Figure 6:
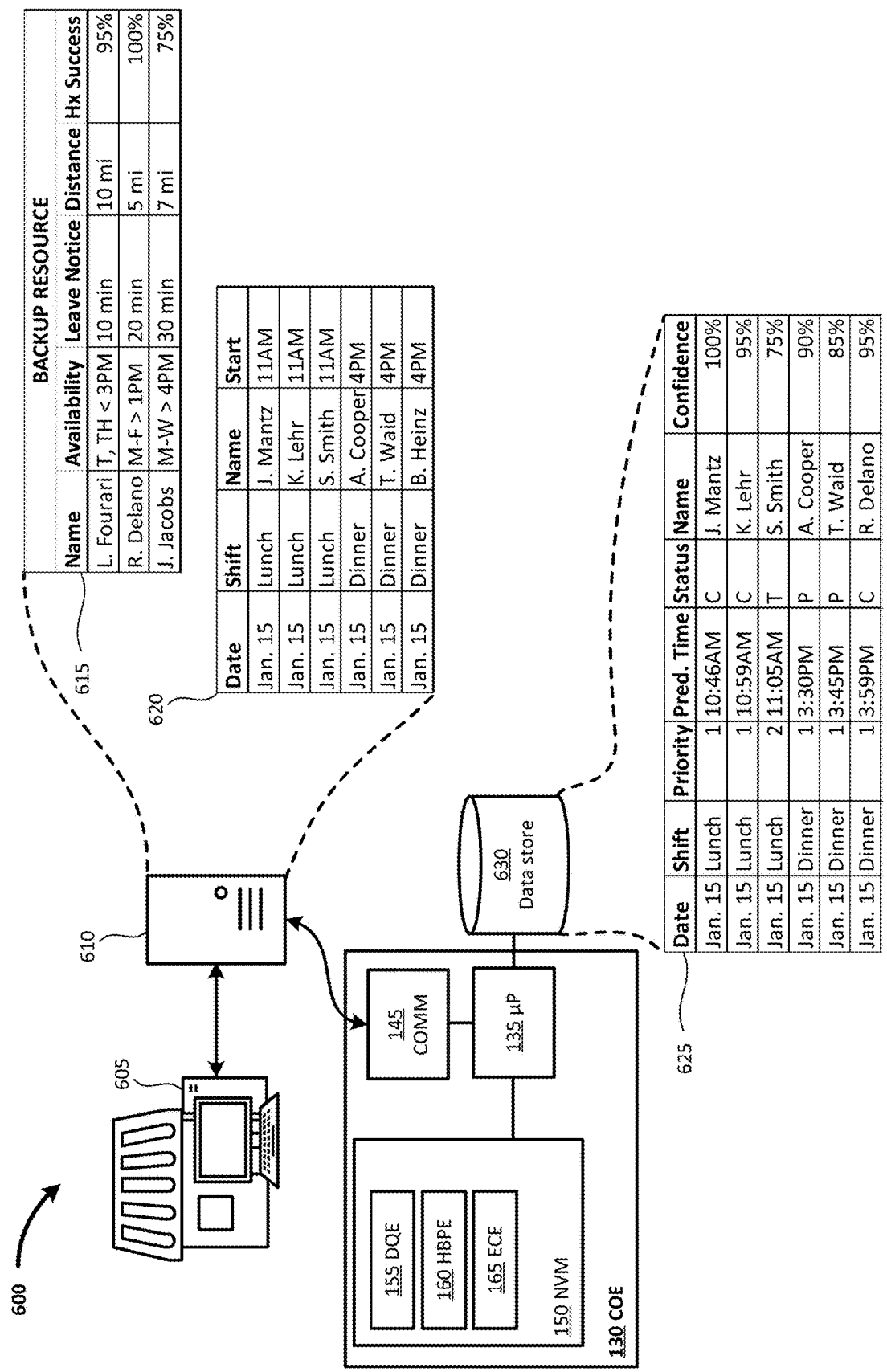
FIG. 6 depicts predicted service resource scheduling profile(s) generated by the exemplary central orchestration engine for an exemplary service provider.

FIG. 6 depicts (predicted) service resource scheduling profile(s) generated by the exemplary central orchestration engine for an exemplary service provider. In the depicted scenario 600, a service provider (e.g., a restaurant) 605 communicates via a computing system with a management system 610 (e.g., a third-party table management service hosted on at least one remote server). The service provider 605 may, for example, input available service times, service resources (e.g., tables, menus), or some combination thereof into the management system 610. The management system 610 may receive, for example, requests for and/or reservations of service (e.g., from a third-party service, from the service provider 605, directly from patrons). The management system 610 may generate queueing requests in response to the requests for and/or reservations of service. The management system 610 may receive, for example, messaging from service resource entities (e.g., staff, inventory software) corresponding to resource availability.

In the depicted example, the management system 610 generates a backup resource profile 615 corresponding to available SREs. The backup resource profile 615 includes, by way of example and not limitation, an entity identification (e.g., SRE last name and first initial), an availability, a leave notice, a distance, and a historical success. In the depicted example, the management system 610 further generates a resource list 620 corresponding to a resource date, resource (start) time, and entity identifier (e.g., SRE last name and first initial). The resource list 620 may, for example, correspond to availability indications associated with SREs having a confidence level (e.g., as determined by an execution confidence engine) associated with the resource interval (e.g., day/time) that is above a predetermined criterion(s) such that the management system 610 assigns them usage. The backup resource profile 615 may, for example, correspond to indications of availability which have not (yet) been assigned usage at the requested date.

Usage assignment may, by way of example and not limitation, be at least partially determined based on predicted resource utilization. Predicted resource utilization may, for example, be determined as a function of PQPs corresponding to time intervals associated with the resource interval. For example, a resource utilization engine (e.g., corresponding with and/or implemented in DQE 155) may determine resource needs based on confidence level(s) associated with in the time-corresponding PQPs. HBPs of the SP(s) and/or associated SSEs may be utilized, for example, to calculate a predicted resource usage as a function of past resource usage corresponding to a current PQP(s).

The management system 610 communicates with the COE 130 via the communication module 145. The COE 130 may, for example, receive from and/or transmit to the management system 610 information corresponding to the backup resources (e.g., depicted in the resource list 620) and assigned resources (e.g., depicted in the backup resource profile 615). The COE 130 generates an integrated service resource list 625. As depicted, the service resource list 625 includes the service date, time, and entity identifier. The service resource list 625 is stored by the COE 130 (e.g., via the microprocessor 135) in a data store 630. The data store 630 may, for example, be integrated into the central orchestration system 125, be a remote data store, or some combination thereof.

Each entry in the service resource list 625 may, for example, correspond to at least one DQEP generated by the COE 130 in response to associated service availability and/or request messages (e.g., received via the management system 610). The COE 130 may retrieve and/or generate a historical behavior profile for each service resource entity and/or the service provider 605 via the HBPE 160. The COE 130 enriches each DQEP in the service resource list 625 with a confidence level of execution ("Confidence"), which may be generated by the ECE 165 based at least partially on at least one corresponding historical behavior profile.

The DQE 155 may generate predicted resource profiles associated with each time interval (e.g., predetermined as shifts) for the service provider 605. The DQE 155 may dynamically prioritize the SREs associated with each PRP. For example, each PRP may be prioritized according to the associated confidence level of execution. As depicted, the COE 130 enriches the service resource list 625 with the priority level associated with each dynamic queueing event profile. For example, a priority level of "1" may be associated with an accepted/assigned resource (e.g., will be paid if arrives such as in the case of an employee). A priority level of 2 may, for example, correspond to 'likely' to be accepted/ assigned.

The COE 130 further enriches the service resource list 625 with a status of each dynamic queueing event profile. The status may, for example, correspond to "C" (e.g., for confirmed), "T" (e.g., for tentative, such as potentially needed), and/or "P" (e.g., for pending, such as offered but not yet confirmed by resource/resource management system such as an inventory management system and/or vendor system). The status may, for example, be determined based on whether the dynamic queueing event profile list generated in response to an entry in the backup resource profile 615 or the resource list 620, based on the priority level in the associated predicted resource profile, or some combination thereof. For example, the COE 130 may receive availability messages via the management system 610, generate and prioritize dynamic queueing event profiles in response, and provide data to the management system 610 corresponding to predicted resource profiles. The management system 610 may, for example, populate the backup resource profile 615 and resource list 620 according to a priority and/or status determined by the COE 130 (e.g., depicted in the service resource list 625).

Accordingly, the COE 130 may advantageously dynamically coordinate and prioritize availability and/or need for service of service resource entities for a service provider 605. The COE 130 may, for example, be advantageously integrated with existing services, systems, and/or infrastructure. In various embodiments the COE 130 may, for example, replace the management system 610.

Figure 7:
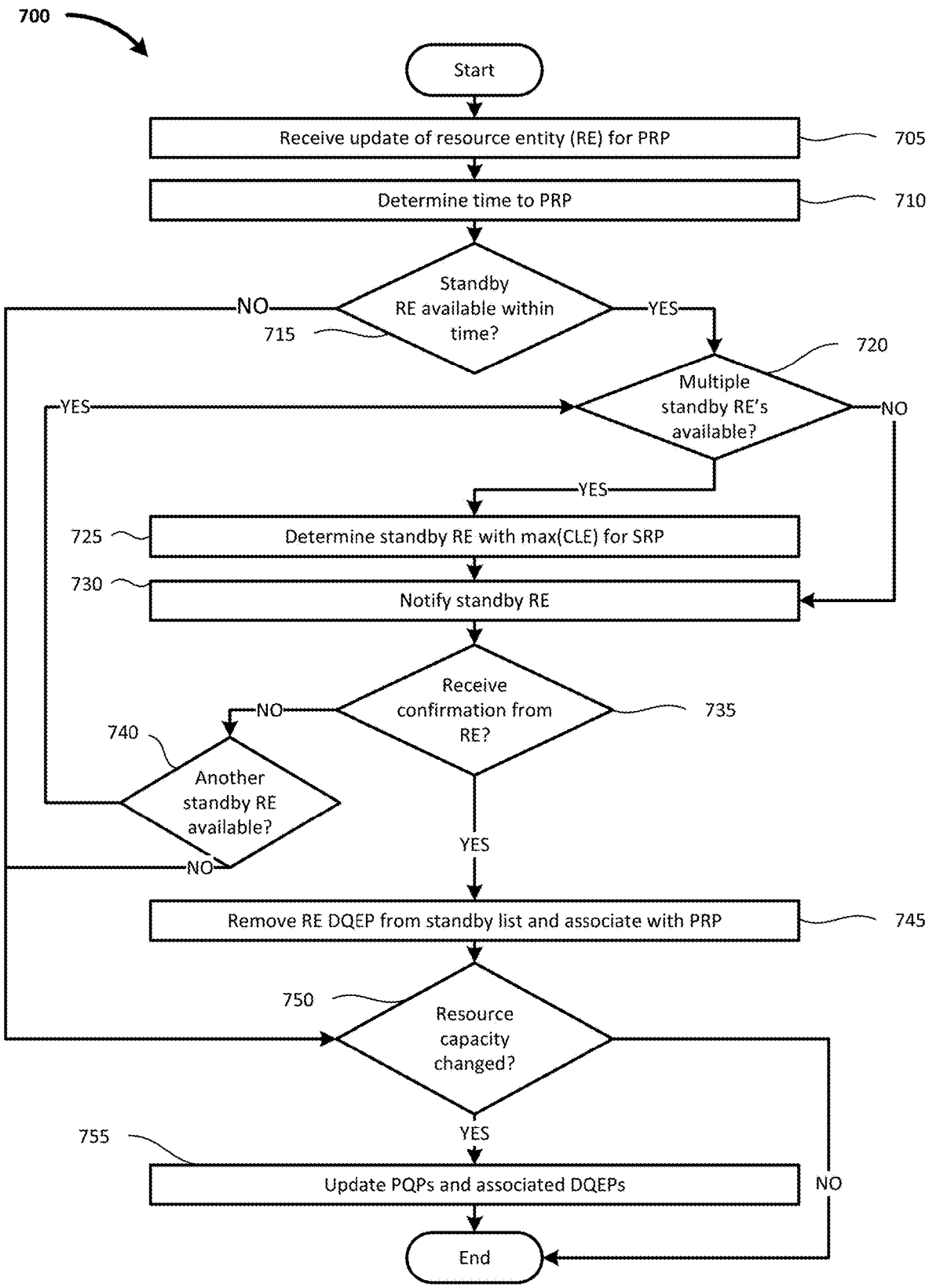
FIG. 7 depicts an exemplary method of dynamically coordinating and/or prioritizing resource entities.

FIG. 7 depicts an exemplary method 700 of dynamically coordinating and/or prioritizing resource entities. A method 700 may, for example, be performed by a COE. In the method 700, in a first step 705, an update of a resource entity (RE) (e.g., SRE) for at least one PRP is received. An update may, for example, correspond to additional requests for service that are not able to be met. An update may, for example, correspond to a loss of resource for a PQP and/or PRP. A time remaining until (start of) the PRP is determined in a step 710. If a standby RE (e.g., as disclosed at least with reference to backup resource profile 615 of FIG. 6) is determined, in a decision point 715, to be available within the time remaining, then the method 700 proceeds to a decision point 720. If no standby RE is available in time, then the method 700 proceeds to a decision point 750.

If it is determined, in the decision point 720, that multiple standby REs are available, then at least one selected standby RE is determined, in a step 725, based on determining a maximum confidence level of execution for the RE in the PRP. After at least one of the multiple standby Res are selected, or if multiple standby REs are determined to not be available (in the decision point 720), then the (selected) standby RE(s) is notified in a step 730. If it is determined, in a decision point 735, that confirmation (e.g., confirmation message, geolocation confirmation, automatically generated confidence level) is received from the notified RE(s), then a corresponding DQEP is removed from the standby list (e.g., the backup resource profile 615) and associated with the PRP in a step 745.

If confirmation is not received (e.g., in a predetermined amount of time), and if another standby RE is determined to be available in a decision point 740, the method 700 returns to the decision point 720. If it is determined, in the decision point 740, that no standby RE is available, the method proceeds to the decision point 750. In the decision point 750, if it is determined that the resource capacity of the service provider has changed (e.g., replacement RE provides more or less capacity than a previous RE, additional RE(s), no standby RE available), then associated/affected PQPs and/or associated are updated in a step 755 and the method ends. For example, additional positions may be available for reservation in PQPs (e.g., by adding additional resources). For example, less positions may be available for reservation in PQPs (e.g., by losing a resource and having no standby). If, in the decision point 750, it is determined resource capacity is not changed, then the method 700 ends.

Accordingly, various embodiments may, by way of example and not limitation, advantageously enable dynamic coordination of resources (e.g., staff, spaces, inventory, equipment, real estate) based on dynamic demand. Various embodiments may, for example, advantageously provide a technical solution to a technological problem of predicting and/or coordinating resources across multiple devices, locations, and/or inventory systems. Various embodiments may, for example, advantageously provide a technical solution to a technological problem of predicting, locating, and/or reserving resources in time for requested service. Various embodiments may, for example, advantageously provide a technical solution to a technological problem of scheduling (uncertain) future and/or predicted service requests and reserving corresponding (uncertain) availability of resources (e.g., in time for the requested service).

Figure 8:
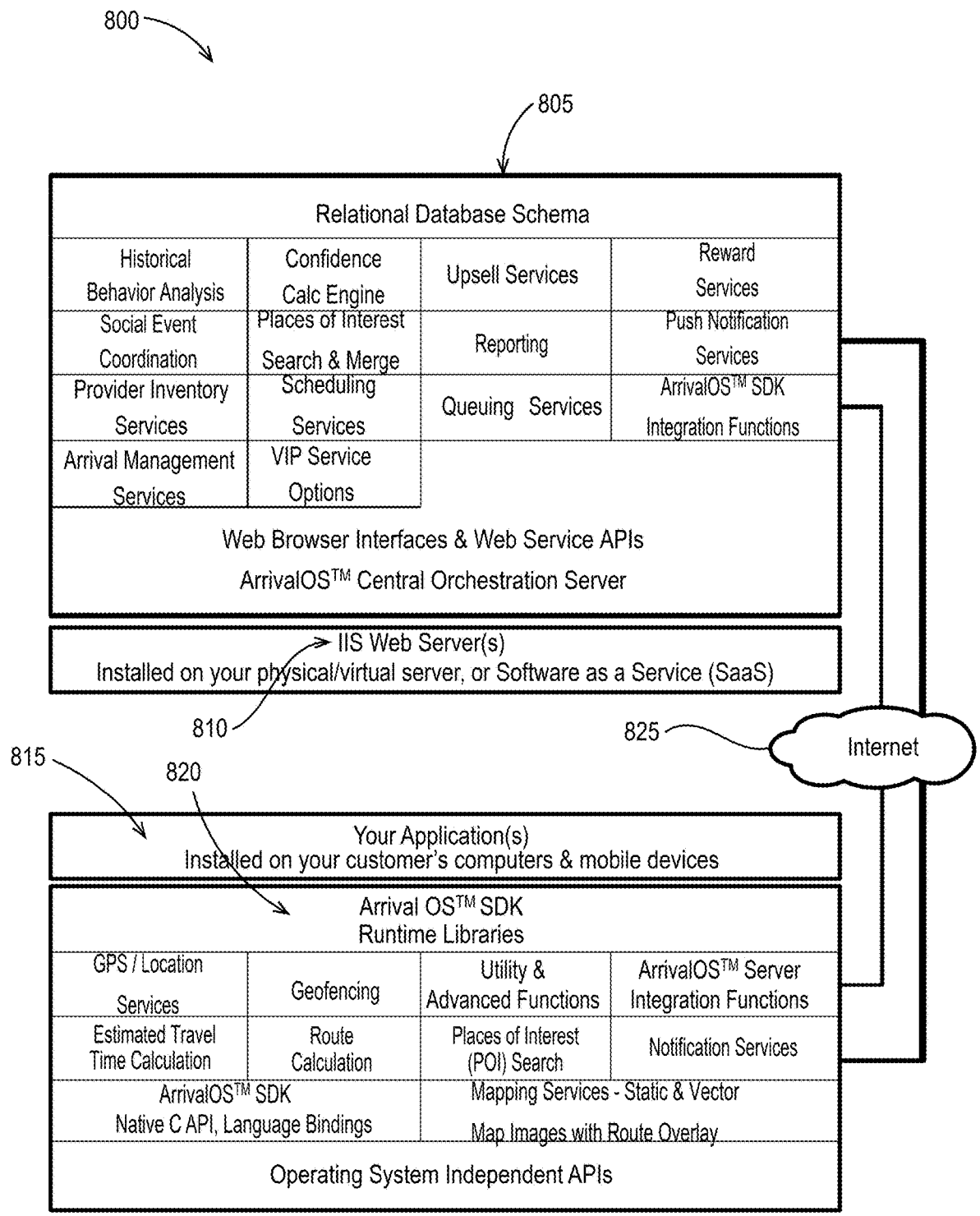
FIG. 8 depicts a block diagram of an exemplary "black box" DPQS deployment system.

FIG. 8 over depicts a block diagram of an exemplary "black box" DPQS deployment system 800. In various embodiments, a DPQS may be at least partially implemented as middleware. The middleware may, for example, be consumed in mobile apps and/or hosted on servers that offer a "black box" of dynamic predictive queueing (DPQ), such as using methods and/or systems disclosed herein. In some embodiments, a DPQS may, for example, include engines, apparatus, and/or methods disclosed with reference to FIGS. 48-70.

For example, in an exemplary DPQS deployment system 800, a backend engine 805 is deployed on a server(s) 810. The backend engine 805, as depicted, includes server engines, database schema, and web interface(s) and services. An application(s) 815 (e.g., deployed on computers, smartphones, tablets, servers) is built using a front-end engine 820. The front-end engine 820 may, for example, be pre-configured to interact with the server(s) 810 and/or the backend engine 805 via a network(s) 825 (e.g., the internet, as labeled in the figure).

The front-end engine 820 (e.g., including client component libraries as shown) may be provided to be used by provider-specific mobile apps (e.g., the application(s) 815). The server(s) 810 (running the backend engine 805) may, for example, provide processing services to provide DPQ for subscribers. As an illustrative example, a company that wanted to develop their own mobile app that offered scheduling services (e.g., a family of restaurants, a hair cutting chain) may build a custom application application(s) 815 powered by the front-end engine 820 and the backend engine 805. In some embodiments, a 'universal' app (e.g., mobile app) may be provided based on the application(s) 815 and/or the backend engine 805 that provides DPQ based on service provider availability data published by multiple service providers (e.g., on disparate booking systems, scheduling systems, waitlisting systems).

Figure 9:
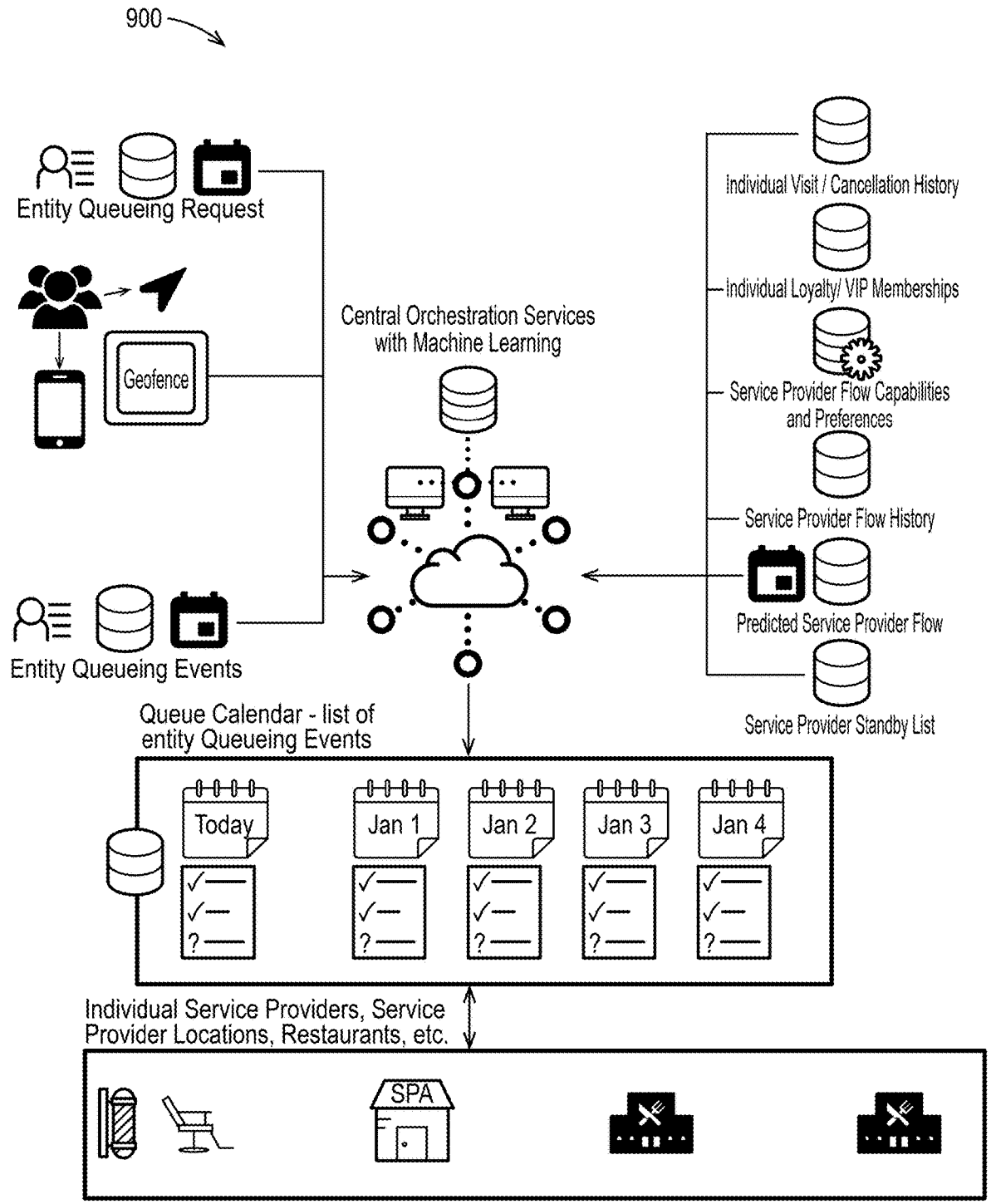
FIG. 9 depicts an exemplary DPQS providing advanced reservations with waitlisting.

FIG. 9 depicts an exemplary DPQS 900 providing advanced reservations with waitlisting. The DPQS 900 automatically coordinates SSEs and SPs and dynamically prioritizes queues. The DPQS 900 may, for example, dynamically prioritize queues based on, by way of example and not limitation, historical behaviors. The DPQS 900 may, for example, dynamically prioritize queues based on geolocation (e.g., using GPS).

In various embodiments, a virtual queue may include a data structure defining one or more physical entities (e.g., CEs, SPs, SSEs) and at least one associated time (window). The data structure may further associate the physical entities and time with one or more corresponding priorities for a limited resource (e.g., service, location, staff). The data structure may, by way of example and not limitation, be created, updated, regenerated, and/or associated with other data structures in response to signals from a central orchestration engine(s), a CE device, a SP device, or some combination thereof. Accordingly, various embodiments may disclose a 'virtual queue' existing on one or more physical, non-transitory media and corresponding to one or more physical entities (e.g., CEs, SSEs, SPs).

Figure 10:
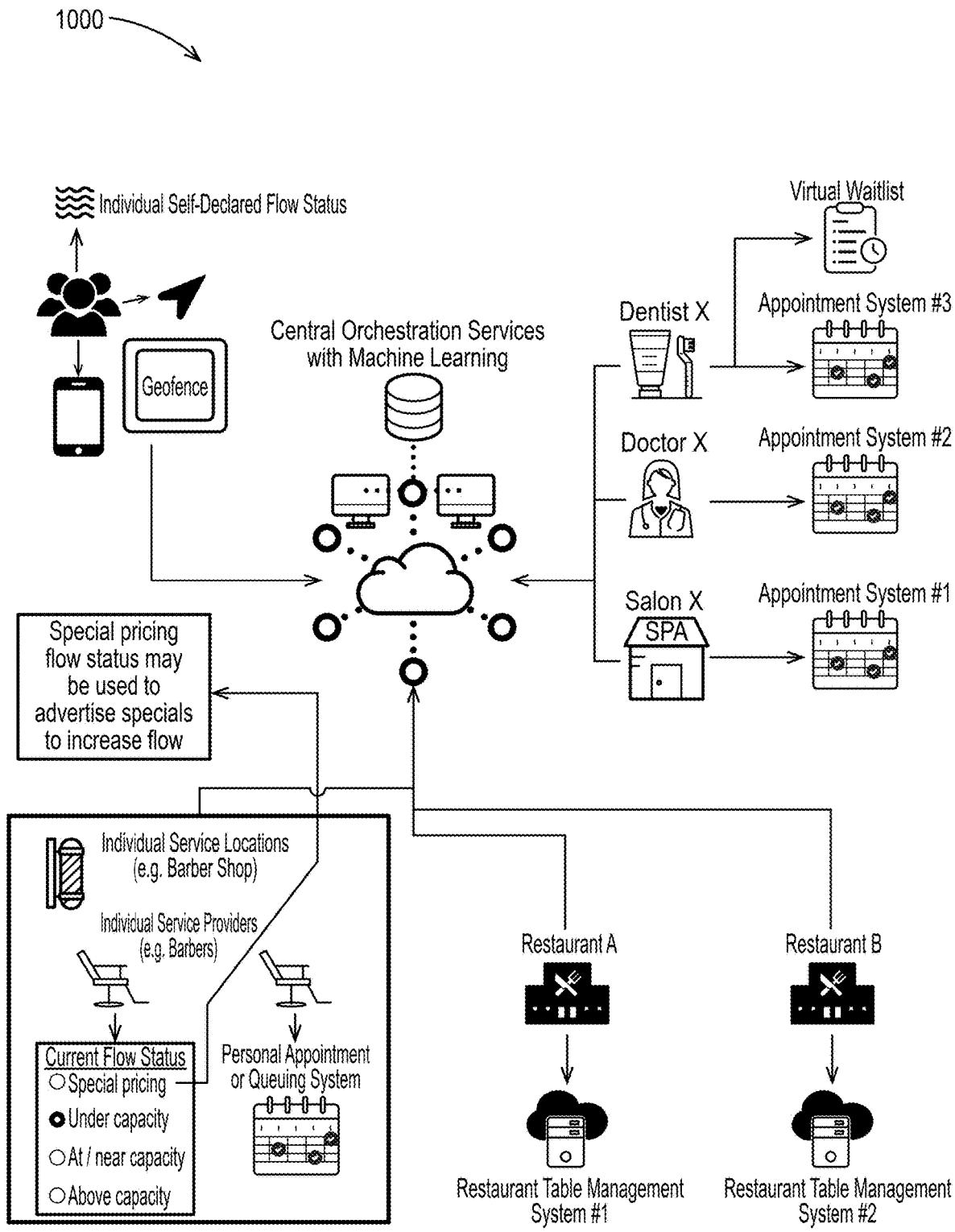
FIG. 10 and FIG. 11 depict exemplary DPQSs in illustrative use-case scenarios.
Figure 11:
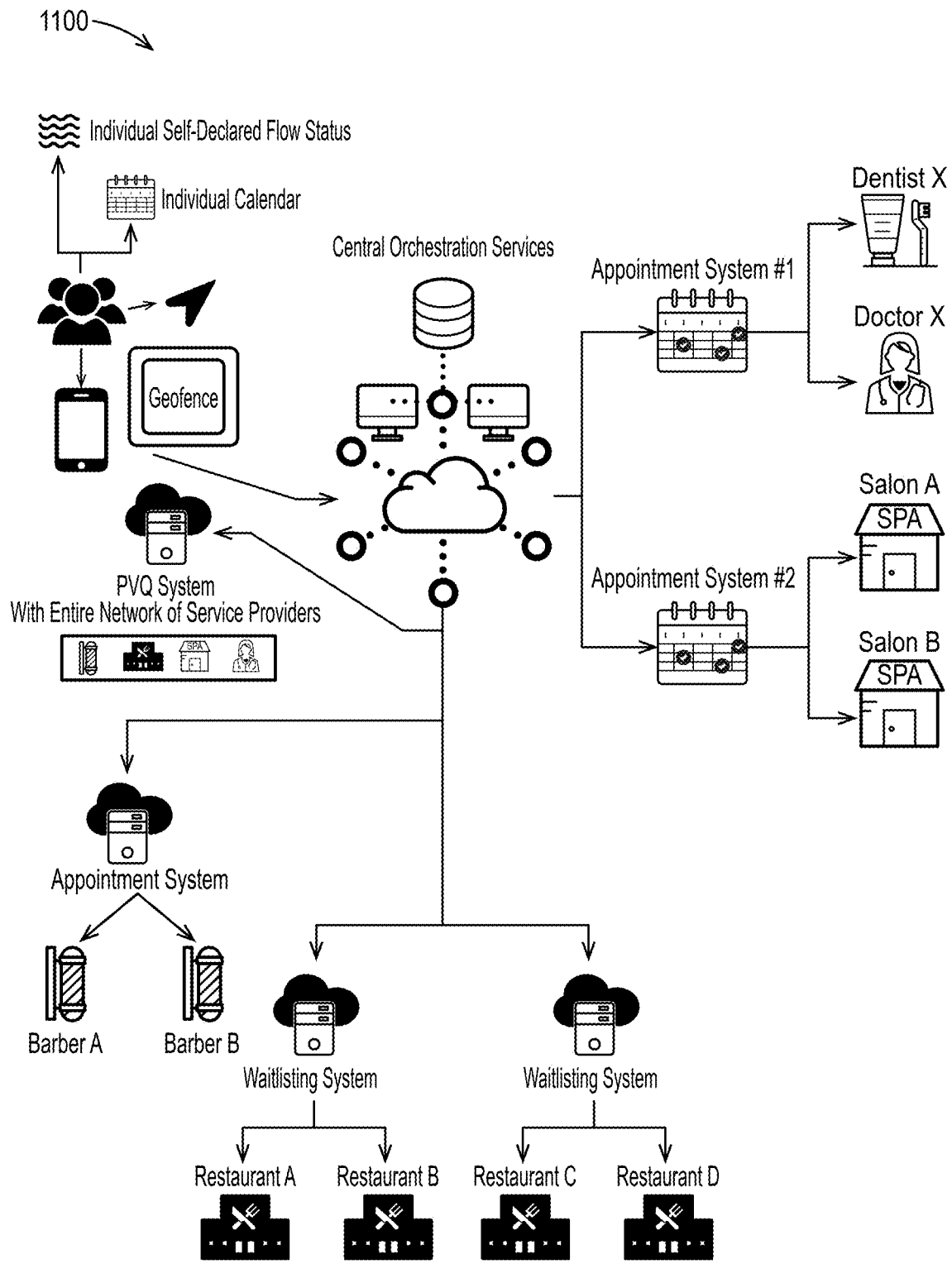

FIG. 10 and FIG. 11 depict exemplary DPQSs in illustrative use-case scenarios. Arrows may indicate connection without limitation with respect to direction of data transfer. As depicted at least in FIG. 10, in the DPQS 1000, various SPs (e.g., an SP as a whole, individual resources at an SP location) can have their own appointment, reservation, waitlist, queueing, and/or table management systems. A central orchestration system may be deployed as a front end to these services. For example, the central orchestration system may offer an enhanced user experience to a social network (e.g., an impromptu social network) of consumers (depicted on the top left side). Various such implementations may advantageously provide a marketplace to connect customers and service providers across technological infrastructures and/or service industries, for example.

As depicted in FIG. 11, a central orchestration system of an exemplary DPQS 1100 may be implemented bringing together multi-SP technical systems and/or networks (e.g., existing booking infrastructures and/or networks). A SP may, for example, provide a scheduling system a signal that they are available for business (e.g., with a predetermined set of service types) now and/or at a time slot in the future. When an SP wants to attract customers now, for example, the scheduling system may interact with the central orchestration system (COS) to enable an Arrival Queue that advertises the queue availability and what service(s) are offered.

Arrival Queue features (described later) may, for example, be available to connect an SSE to the SP. The Arrival Queue may, for example, provide a "mini queue" where an SSE who has requested an Arrival Queue for a specific SP, location, and/or time is subject to a geofence before joining the queue and is subject to a smaller geofence around the provider in order to "check in" to the queue. Customer geolocation may, for example, continually (e.g., periodically, in response to predetermined location criterion) be sent to the waitlisting system, queue prioritization wouldn't be part of this process. The central orchestration system 125 may provide an Arrival Queue engine as a front end and/or connector between SSEs and existing SP systems. For service in the future, a SP may interact with the scheduling system to broadcast a window of availability and (predetermined list of) service(s) offered for that future time period(s).

In various embodiments a DPQS may provide a new type of queue that requires a portable computing device (e.g., mobile phone, tablet, smart watch) app front end for an SSE to be admitted to the queue. In various embodiments, such queues may be implemented as an Arrival Queue(s) and/or Proximity-Based Queueing system(s). Various embodiments may, for example, provide unique user interface(s) and/or user experience element(s). For example, some embodiments may generate "social events" (e.g., associated with one or more SSEs) that can automatically join an associated Arrival Queue as SSEs associated with the social event approach a corresponding SP location (e.g., based on predetermined geolocation criterion(s)).

Figure 12:
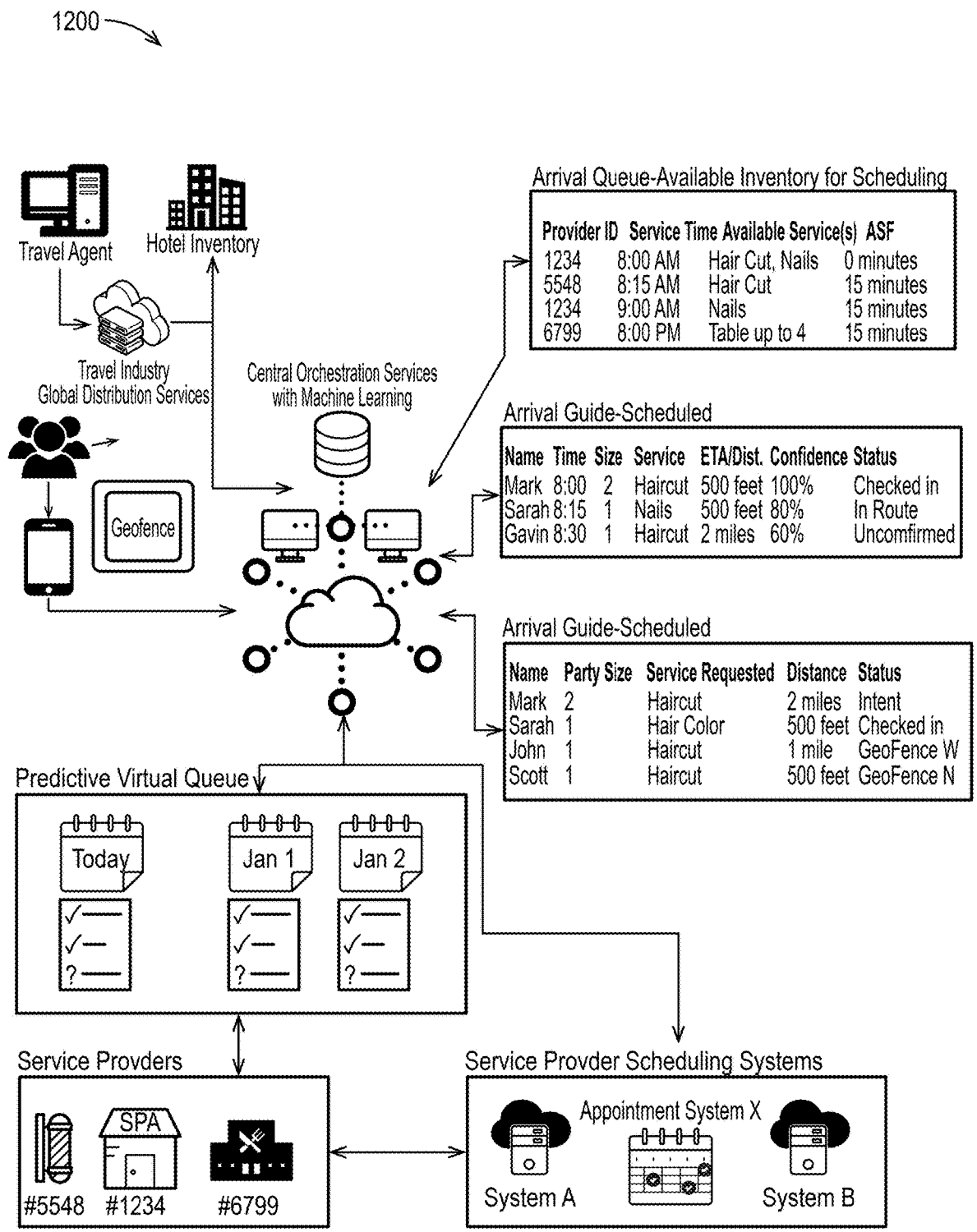
FIG. 12 depicts an exemplary DPQS in an illustrative use-case scenario.

FIG. 12 depicts an exemplary DPQS 1200 in an illustrative use-case scenario. In the illustrative scenario depicted, an SSE (e.g., a customer, a travel agent) may communicate with a COS (e.g., a COS as disclosed with respect to previous figures) to discover inventory data across multiple systems—a predictive virtual queue (PVQ) as well as two different types of Arrival Queues. In addition to a user with a smartphone, FIG. 12 depicts an exemplary connection to a Travel Industry Global Distribution System (TIGDS). The COS interacts with the TIGDS to enable TIGDS users to search for and connect their customers with services from various SPs at desired time(s) and/or location(s) (e.g., based on wait tolerance).

This queue selection engine may enable the mobile app to show a birds-eye view of SPs from multiple scheduling systems who match one or more user-selected condition without having to click on each one of them to then search for availability. Further details are disclosed at least with reference to FIG. 13. As an illustrative example, in the case of wanting to Eat Now, an SSE may, for example, discover predictive queues, advanced reservations (from multiple reservation systems), and/or waitlists (from multiple waitlist systems) advantageously in a single search that meet the criteria the customer has for service.

Figure 13:
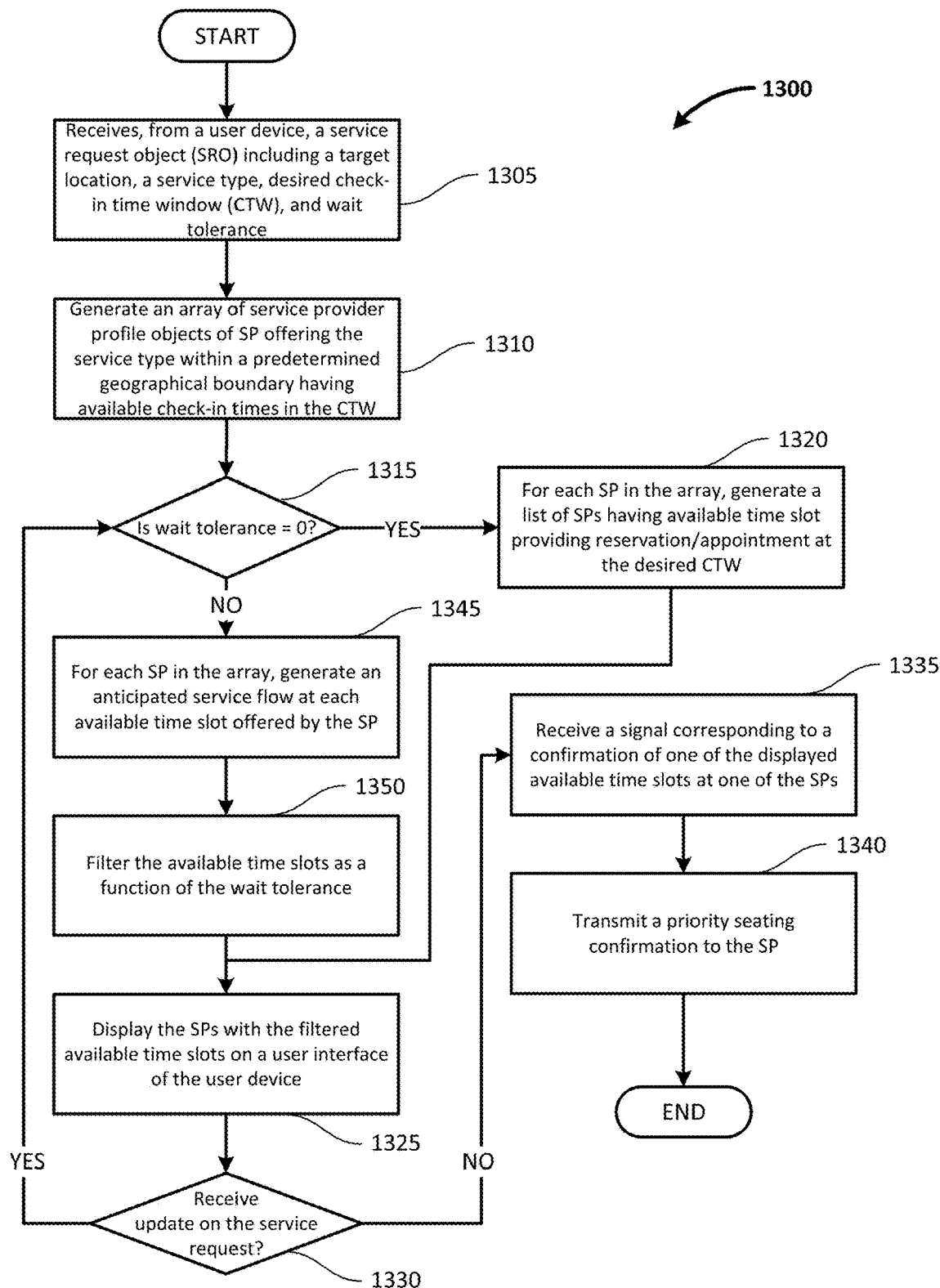
FIG. 13 depicts an exemplary method for a COS queue selection engine using SP data and SSE requested preferences.

FIG. 13 depicts an exemplary method 1300 for a COS queue selection engine using SP data and SSE requested preferences. In the depicted example, method 1300, if one provider operates a PVQ schedule, they would show up in the provider list if the Current Flow State matched the slider. If a provider uses an Arrival Queue that advertises an overall ASF that matches, they will show up in the list. If another provider has a FIFO queue and their current wait time meets the criteria of the customer's willingness to wait, they would also be shown as an available provider. If the slider is set to 0 minutes, for example, all other appointment/reservation system data can be brought in.

The method 1300 begins when, from a user device (e.g., the user device 106), a service request object (SRO) including a target location, a service type, desired check-in time window (CTW), and wait tolerance is received in step 1305. Next, in step 1310, an array of service provider profile objects of SPs offering the service type within a predetermined geographical boundary having available check-in times in the CTW is generated. For example, the DQE 155 may generate the array of SPOs. In a decision point 1315, it is determined whether a wait tolerance is set to 0 minutes. For example, a user may operate the wait tolerance control 177 to 0 minutes. If it is determined that the wait tolerance is set to 0 minutes, then, for each SP in the array, a list of SPs having available time slot providing reservation/appointment at the desired CTW is generated in step 1320. After the list of SPs are generated, in step 1325, the SPs with the filtered available time slots on a user interface of the user device is displayed. For example, the list of SPs with available time slots may be displayed on the UI 200.

After the list of SPs is displayed, in a decision point 1330, it is determined whether an update on the service request is received. If it is determined that an update on the service request is received, then the method 1300 repeat the decision point 1315. If it is determined that an update on the service request is not received, then a signal corresponding to a confirmation of one of the displayed available time slots at one of the SPs is received in step 1335. For example, the user may select the confirm button 325 in UI 300. In step 1340, a priority seating confirmation is transmitted to the SP and the method 1300 ends.

In decision point 1315, if it is determined that the wait tolerance is not set to 0 minutes, indicating that the user is using a service now mode, in step 1345, an anticipated service flow (ASF) at each available time slot offered by the SP is generated for each SP in the array. For example, the DQE 155 may use the HBPE 160 to generate the ASF based on, for example, a committed service time from the SP and a predicted service flow deviation based on a machine learning prediction model. Next, the available time slots are filtered as a function of the wait tolerance in step 1350. For example, the available time slots are filtered out based on ETW(ASF(time slot))>MWT. The step 1325 is then repeated.

Figure 14:
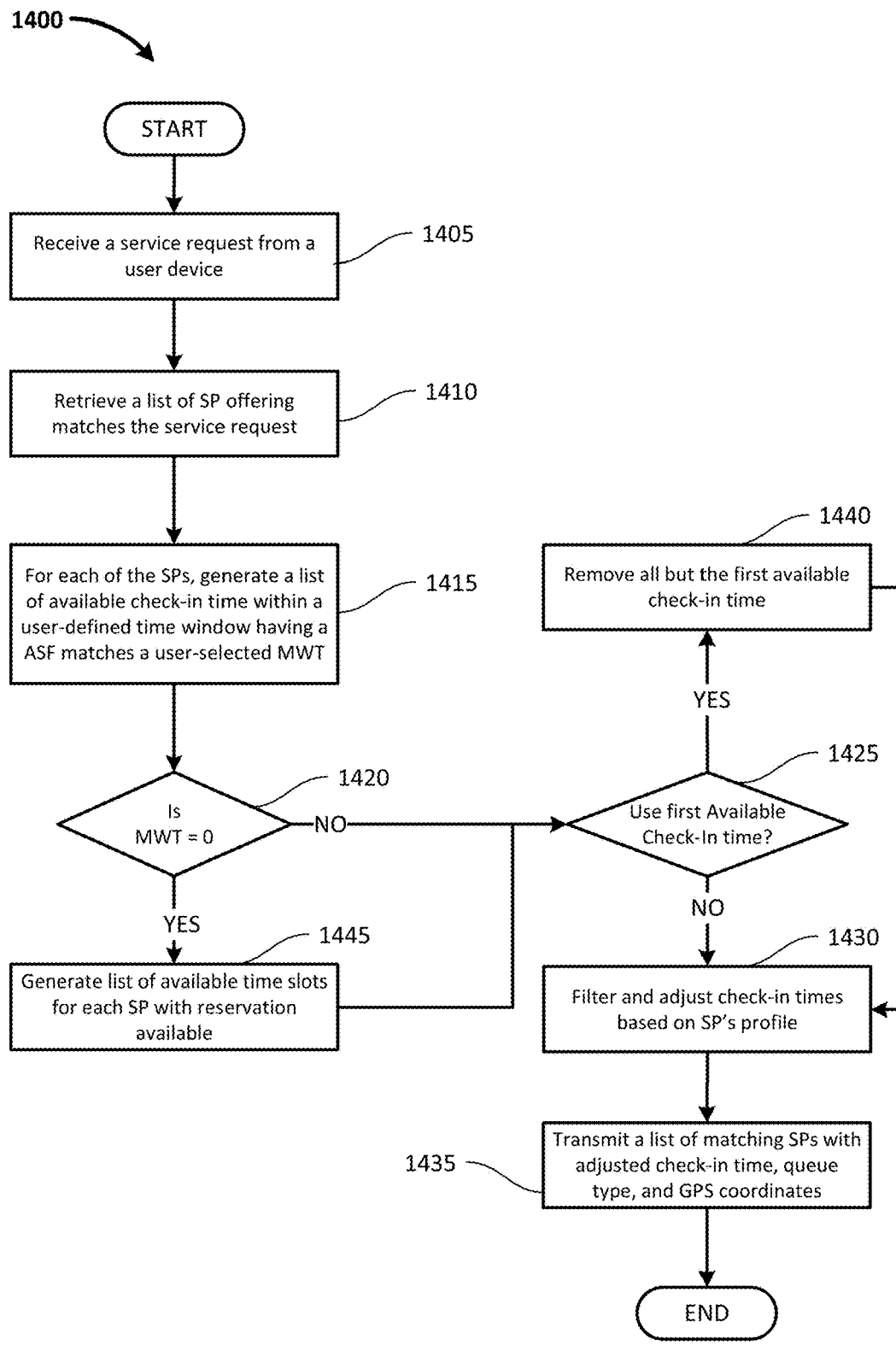
FIG. 14 depicts an exemplary method of automatic queue selection, such as disclosed at least with reference to FIGS. 3A-B.

FIG. 14 depicts an exemplary method 1400 of automatic queue selection, such as disclosed at least with reference to FIGS. 3A-B. In some embodiments, the exemplary method 1400 may be modified to use historical behavior data to dynamically adjust the check-in times.

The method begins in step 1405 when a service request is received from a user device. Next, in step 1410, a list of SPs offering matches the service request is retrieved. For each of the SPs, after the list of SPs is retrieved, a list of available check-in time is generated within a user-defined time window having a ASF matches a user-selected MWT in step 1415.

In decision point 1420, it is determined whether a MWT is zero. For example, the MWT is zero when the SSE operate the wait tolerance control 177 to zero minutes. If it is determined the MWT is not zero, in decision point 1425, it is determined whether first Available Check-In time is used. In step 1430, if it is determined that first Available Check-In time is not used, check-in times based on SP's profile is filtered and adjusted. In step 1435, a list of matching SPs with adjusted check-in time, queue type, and GPS coordinates is transmitted and the method 1400 ends.

In decision point 1425, if it is determined that first Available Check-In time is used, all available check-in time but the first available check-in time are removed in step 1440, and the step 1430 is performed. If it is determined that the MWT is zero, in step 1445, a list of available time slots is generated for each SP with reservation available, and the decision point 1425 is performed.

In various embodiments, the exemplary method 1400 may be modified to use an overall customer rating to adjust the check-in times they see. For example, customers with late-arrival tendencies can be grouped together in a portion of their daily schedule which has a defined low service level setting. Customers who have a good rating may, for example, be given more options when they need to be "squeezed in," (e.g., since they have a lower chance of messing up the rest of the schedule). As an SSE's rating goes up, for example, so does the number of choices that they see for check-in time.

As depicted in a flowchart shown in FIG. 14, in response to a signal corresponding to the 0-minute setting a COS may, for example, aggregate data from the corresponding SP using PVQ as well as existing reservation/appointment systems who also have availability.

In various embodiments, DPQVs may provide a solution for blending advanced reservations and waitlisting into a single flow of customers, which may be advantageously implemented, for example, by a restaurant that has a continual flow of tables to be turned. For example, a Table for 4 is a resource for the restaurant, and they have many resources at the restaurant that can seat a party of 4 people.

Some embodiments may be configured to schedule SSEs at a SP that has limited resources (e.g., doctors), where overbooking the schedule could end in a disaster if it is not done well. Various embodiments (e.g., using a user interface(s) and corresponding DPQS) that schedules people and sets expectations through micro-commitments may, for example, provide enhanced reliability in overbooking limited resources.

Figure 15:
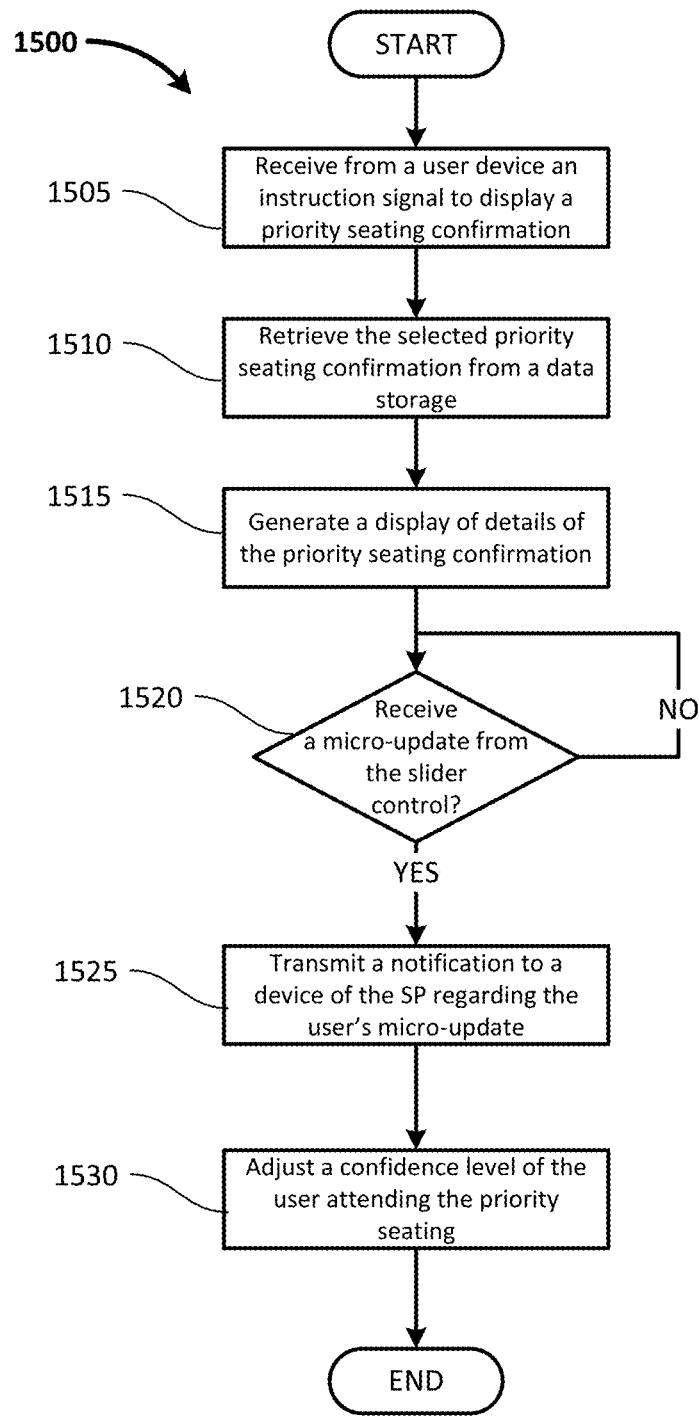
FIG. 15 depicts an exemplary post confirmation update method.

FIG. 15 depicts an exemplary post confirmation update method 1500. For example, the method 1500 may be executed when a user operates the SSE expectation adjustment UI 400 of FIG. 4. The method 1500 begins in step 1505 when, from a user device, an instruction signal to display a priority check-in confirmation is received. For example, an SSE may run the PRCA 175 and select one of the remote priority check in confirmation to view.

In step 1510, the selected priority check-in confirmation is retrieved from a data storage. Next, a display of details of the priority check-in confirmation is generated in step 1515. For example, the UI 400 may be generated. After generating the display, in decision point 1520, it is determined whether a micro-update from the user interface is received. For example, the SSE may operate the slider control 410 to adjust an anticipated arrival time.

If it is determined that a micro-update from the user interface is not received, the decision point 1520 is repeated. If it is determined that a micro-update from the user interface is received, a notification to a device of the SP regarding the user's micro-update is transmitted in step 1525. For example, a notification may be sent to the computing system 121. Next, in step 1530, a confidence level of the user fulfilling the priority check-in event is adjusted (e.g., by the ECE 165), and the method 1500 ends.

In some embodiments, when a DPQS learns behaviors of customers (e.g., using HBPs and/or machine learning (ML) trained using HBPs), different check-in times for the same queue resource block can be presented to different customers in the mobile app UI, based upon confidence intervals (CIs) generated by the system and associated confidence the customer will check-in. Such embodiments may, for example, present a check-in time of 6:45 PM (15 minutes before the real reservation time) to an SSE that has a (maximum) CI associated with a 7 PM queue. For example, if a restaurant table management system believes that it will have a table available within 15-minutes of 7:15 PM, the DPQS can show all customers a 7:15 PM check-in time for that table. However, as the system learns (e.g., using ML model(s) applied to HBPs including historical reservation and corresponding check-in data) that Customer A most commonly shows up 5 minutes after their previously-agreed-upon check-in time, that customer may, for example, be presented with a check in time of 7:10 PM and all other customers see 7:15 PM. This may, for example, advantageously allow the restaurant to increase their table turns based upon knowing the likelihood of when the customer will arrive.

Conversely, if the historical behaviors of the SP indicate that the service level won't be met if they check in at that default time, the system can adjust the check-in time so that both parties have a good experience. Various such embodiments may, for example, implement predictive queueing as disclosed at least with reference to FIGS. 48-70.

Figure 16:
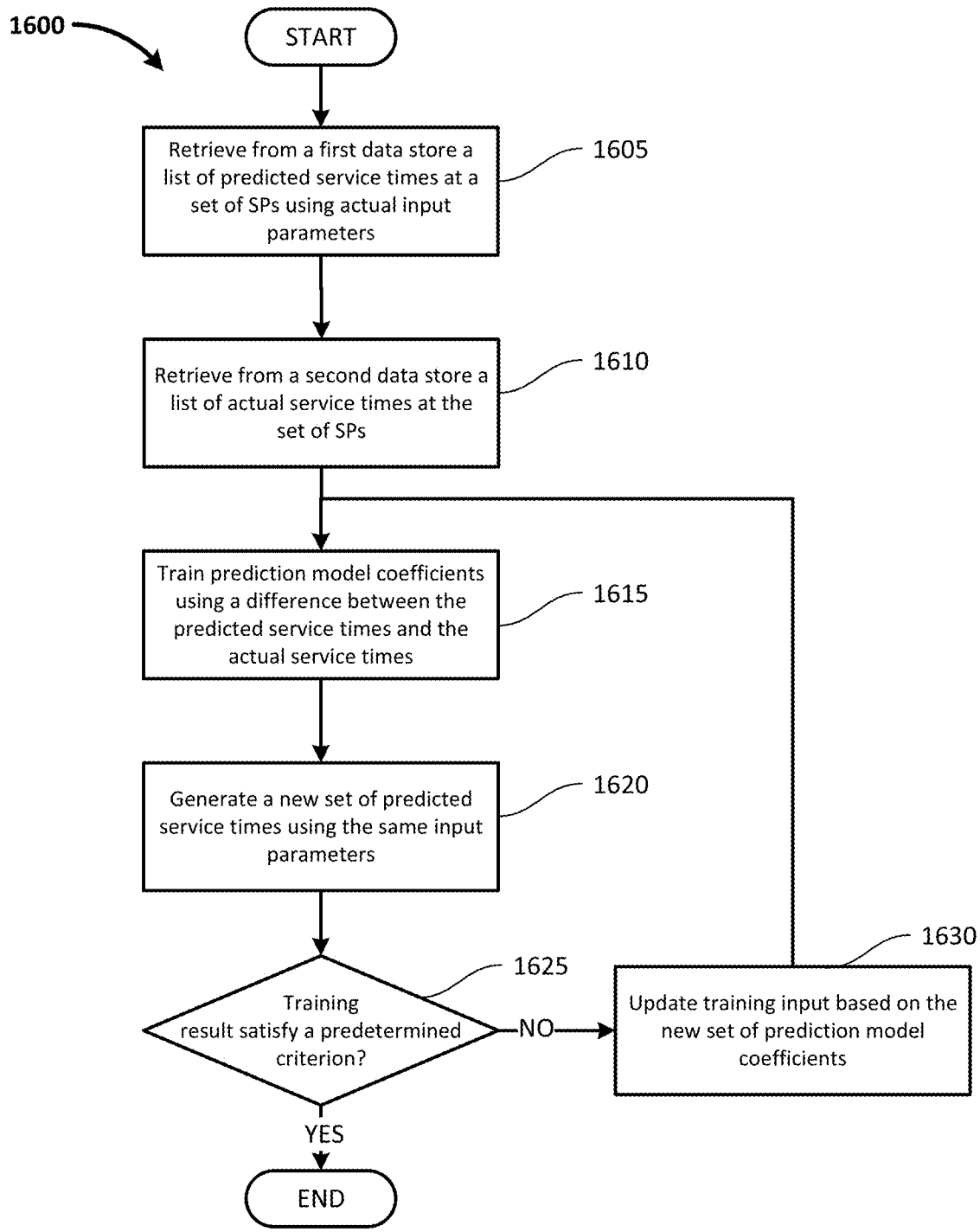
FIG. 16 depicts an exemplary prediction model training method for a machine learning based prediction mode.

FIG. 16 depicts an exemplary prediction model training method 1600 for a machine learning based prediction mode. For example, the HBPE 160 may execute the prediction model training method 1600 periodically to improve ASF prediction accuracy using machine learning algorithms. In various implementations, the COE 130 may determine the ASF based on a service rate of a SP at corresponding time period. For example, the COE 130 may receive input from the SP of their expected service rate (e.g., a number of customers served per minute). Based on the service rate, in some examples, the COE 130 may determine the ASF at various time within the user selected time window. In some implementations, the COE 130 may adjust the expected service rate of the SP using a machine learning algorithm.

As shown in FIG. 16, the prediction model training method 1600 begins in step 1605 when, from a first data store, a list of predicted service times at a set of SPs are retrieved using actual input parameters. For example, a training module of the HBPE 160 may record a sample training set of predicted service flow and actual parameters during runtime and store in the first datastore for model training. In step 1610, next, from a second data store, a list of actual service times at the set of SPs is retrieved. For example, actual service times of the sample training set is stored in a second data store by the training module.

In step 1615, prediction model coefficients are trained using a difference between the predicted service times and the actual service times. For example, the training algorithm of multilayer neural network (MNN), deep learning machine learning, long-short term memory (LSTM), and/or recursive neural network may be used. In some implementations, an ensemble model(s) may be used. After the prediction model coefficients are trained, a new set of predicted service times using the same input parameters are generated in step 1620. In decision point 1625, it is determined whether a training result satisfy a predetermined criterion. For example, a testing set of predicted service flow is generated and compared with the actual service time to check whether a prediction accuracy is above a predetermined threshold. If it is determined that a training result does not satisfy the predetermined criterion, training input based on the new set of prediction model coefficients is updated in step 1630, and the step 1615 is performed. If it is determined that a training result satisfies the predetermined criterion, the method 1600 ends.

FIG. 17 depicts, for example, a waitlist 1700 for an illustrative doctor office for a single doctor's schedule. The 10:00 AM Existing Patient Exam is snuggly squeezed between the 9:30 and 10:20 appointments. As an illustrative example, suppose that the doctor's schedule is completely booked and the 10:00 AM appointment is cancelled, and a patient really wants to have the LASER Treatment and they are using the doctor's mobile app to look for an appointment. A wait tolerance input control in the mobile app provided to a DPQS may allow the customer's check-in time to be calculated to be before the time slot trying to be filled so that the customer's check-in is timely for the available resource performing the service. Such embodiments may, for example, advantageously increase a SP's ability to squeeze people in based on SSE-selected predetermined wait tolerance.

Continuing the illustrative example, in some embodiments, instead of the doctor's office having to choose to overbook that time slot and delay the New Patient Exam (e.g., done by a staff member making a manual override), a mobile app interface (e.g., disclosed previously) would advantageously provide a technical solution to a technological problem of automatically offering service for a time slot (e.g., the cancelled time slot) smaller than the normally schedule time slot without requiring manual override.

For example, a DPQS may generate a confidence level(s) that the SSE wanting the LASER Treatment will show up and determine a likely offset (e.g., X minutes before/after the check-in time presented to the SSE). The DPQS may determine, as a function of at least the SSE's HBP(s), a check-in time such that the SSE is likely to arrive in time to be fit into the available time slot.

Some such embodiments, for example, using a mobile app interface, may advantageously provide a two-way communication mechanism and UI controls described in this document to improve calculation of queueing priority and/or arrival time. Some such embodiments may, for example, be used with non-predictive waitlisting systems through the Arrival Queueing engine(s). In various embodiments, a mobile app connecting to existing waitlisting systems via the COS(s) may advantageously provide a missing piece to allow 2-way communication of SSEs with multiple pre-existing systems.

FIG. 18 depicts an exemplary predicted queueing profile (a PQP 1800). FIG. 19 depicts an exemplary PQP 1900 with a corresponding wait tolerance (labeled Req MWT). Recording the SSE's wait tolerance on the PVQ queue may, for example, advantageously provide a new way(s) of prioritizing a queue. A DPQS may, for example, generate the PQP 1800 based on SSE requests. The DPQS may prioritize individual SSEs within the PQP based, for example, on predicted confidence level and/or predicted arrival time (e.g., based on confidence level).

When an SSE provides a wait tolerance (e.g., using an "I'm willing to wait X minutes" slider) the wait tolerance may, for example, be recorded in the exemplary PQP 1900 generated by the DPQS. As an illustrative example, suppose that 3 weeks out, a restaurant has wide open availability and a DPQS allows someone to make a 6:30 PM 'traditional reservation' queue request with a 0-minute wait after check-in. The DPQS may also allow someone to book a 6:30 PM priority seating request with a 15-minute wait after check-in. Because the wait tolerance(s) are stored in the exemplary PQP 1900, it can be used to further adjust the priority of the queue in advance and/or on day of service. For example, if the 6:30 PM traditional reservation is cancelled, the 6:30 PM priority seating queue entry (requesting service within 15-minutes) can be re-prioritized to become a 0-minute wait (e.g., with or without the customer knowing about this), or the provider can open up another 0-minute wait spot at the 6:30 PM timeslot.

Various embodiments may provide an incredibly powerful way to schedule people by matching customer expectations of waiting (e.g., by wait tolerance) to service provider service levels, and fill provider gaps in service while keeping customers happy. In various embodiments, a DQPS(s) may be configured to learn from historical behavior of SSEs and/or SPs to improve schedule optimization for SSEs and/or SPs.

Figure 20:
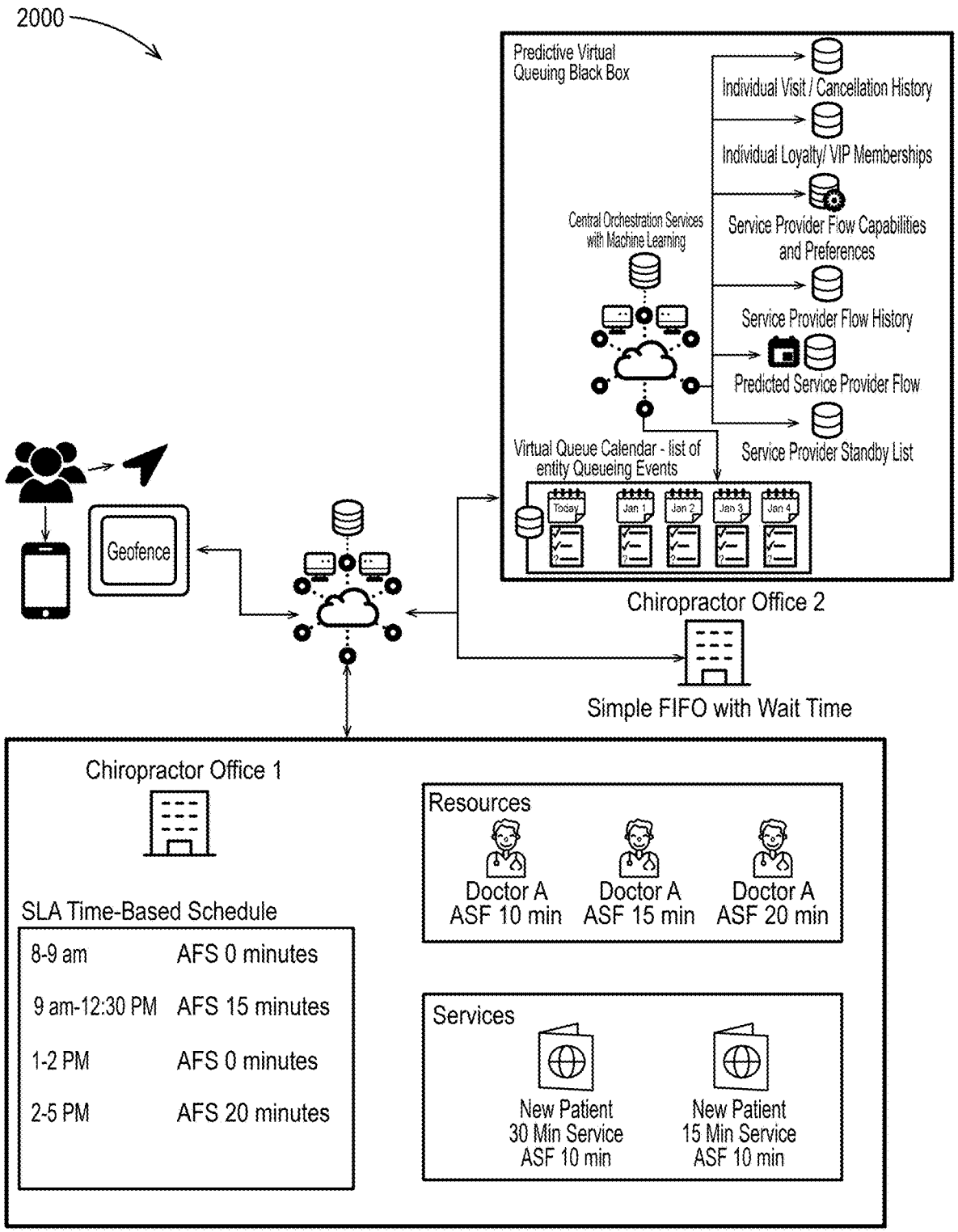
FIG. 20 depicts an exemplary DPQS in an illustrative use-case scenario.

FIG. 20 depicts an exemplary DPQS 2000 in an illustrative use-case scenario. In some embodiments, when configuring a PVQ service provider queue, SPs may specify one or more predetermined service levels for the services they provide. A mobile app can be used (e.g., by SSEs) to search for SPs meeting SSE criteria of availability and wait tolerance.

As depicted in FIG. 20, as an illustrative example, an SSE enters 4 parameters to identify what service(s) is being requested and a corresponding time interval(s). The DPQS generates, based on the inputs, a list of corresponding SPs. For example, the list of SPs may include providers using PVQ based upon finding a time slot that meets the service level (Chiropractor Office 1). If the SSE is looking for availability now, the DPQS may include on the list SPs using a simple FIFO waitlist who have a current (advertised) service level (e.g., determined as a function of wait time) at or less than what the SSE's requested wait tolerance (e.g., Chiropractor Office 2).

Various embodiments may, for example, not show a wait time for each selected SP on a map display. Such embodiments may, for example, generate and present to an SSE a display with a list of providers who currently have a wait time that matches a (predetermined) wait tolerance of the SSE.

Various embodiments may advantageously solve a problem of scheduling systems requiring a user to choose a service before seeing available times (e.g., due to service mapped to a block of time and staff member who is needed to process a requested service). For example, a predetermined set of services may be stored. SPs may select one or more predetermined services they choose to accept at their location. The SP may map predetermined service(s) to their services. As an illustrative example, a predetermined service may be a "New Patient." Chiropractor A may set "New Patient" to be a 60-minute interval. Chiropractor B may set a "New Patient" service to be a 45-minute interval. A veterinarian may set a "New Patient" service to 45 minutes. In some embodiments, for example, a single mobile app system may advantageously search for SPs in multiple categories (e.g., chiropractor, veterinarian) and find an appropriate next available spot across data (e.g., from multiple booking systems).

In various embodiments, a DPQS may, for example, automatically determine a "next available" service queue based on a SSE's request parameters. A dynamic UI may, for example, be generated and displayed based on input from the customer and corresponding signal(s) from the DPQS (e.g., by a queue selection engine of the DPQS's COS). The DPQS may, for example, generate the signal(s) based on the SSE request input(s) and SP inputs.

FIG. 21 depicts an exemplary 'next available' UI 2100. In the depicted illustrative example, an SSE chooses to find, within a geographic area 2105, a Next Available chiropractor 2110. As depicted, a wait tolerance control 177 prompts the SSE for input corresponding to wait tolerance. When the SSE moves the wait tolerance control 177 to the right, the next available appointment time on pushpins (displayed in a map 2115) may change (e.g., to an earlier date/time). Such embodiments may, for example, provide an amazing way for an SSE to search their (desired) geographic area for the first provider who can get them in for a requested service, even if they had to be squeezed in with some wait time within their inputted wait tolerance. In some embodiments, it may be possible to click "Change" and see a list of options for choosing other future dates.

FIG. 22 depicts an exemplary change user interface 2200. The SSE may, for example, choose M W F Morning and a DPQS may provide a corresponding map of available providers and their next available appointment in that range. In some embodiments, the exemplary change interface 2200 may include at least one start date and an end date (e.g., defining a multi-day time interval). In some embodiments, a non-sequential time range may be inputted.

Selecting "confirm" may return the SSE to a map page (e.g., as disclosed at least with reference to FIG. 21) with updated push pins and corresponding appointment times with the wait tolerance control 177 that is updated to match parameters selected by the SSE in the exemplary change interface 2200.

FIG. 23 depicts at least partial portion of an exemplary updated UI 2300. In this example, another type of service "existing patient availability" is requested. Based on the requested service type, the UI 2300, for example, may display information 2305 about the available time for check-in is only Monday, Wednesday, and Friday, 8:00 am-11:30 am.

FIG. 24 depicts an exemplary provider detail UI 2400 displayed to the SSE once the SSE inputs a selection of an SP (e.g., from a push pin, from a name in the list of providers). In the depicted example, a list of appointment times 2405 that match the requested wait tolerance are shown to the customer. Adjusting the slider to the right while on this screen may, for example, show more appointment time slots corresponding to the updated wait tolerance in the wait tolerance control 177 (e.g., slider, as depicted).

Figure 25:
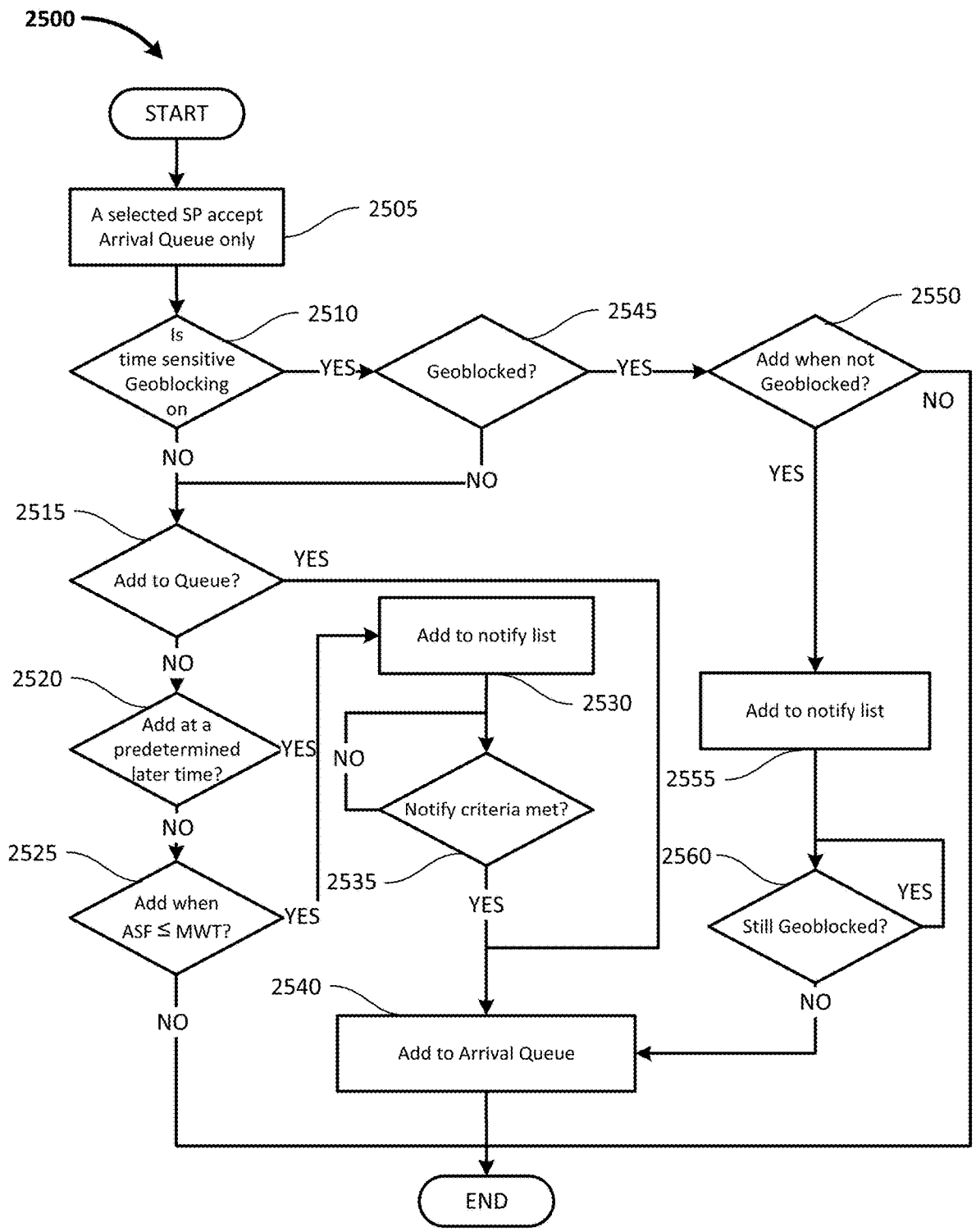
FIG. 25 depicts an exemplary method for an Arrival Queue of a DPQS augmenting an existing FIFO waitlist of a SP.

FIG. 25 depicts an exemplary method 2500 for an Arrival Queue of a DPQS augmenting an existing FIFO waitlist of a SP. FIFO waitlists may, for example, not be timed on arrival. Waitlisting systems that don't account for the proximity of the customer may suffer with many problems.

Various embodiments disclosed herein may advantageously solve problems including:

Ambiguous wait times—People seeing a map of service provider locations with wait times being displayed in push pins may not consider the travel time for the customer to arrive at that location. An SSE looking at 4 different haircut salons on a map, each with different wait times, may choose one with the lowest wait . . . but it may be across town.

When do I join? Does the wait time include my drive time? Is current technology making people think/work too much?

Conscientious people might ask themselves "Should I join now or wait until I'm closer?" knowing they are driving across town. But then they may get a longer wait time if other people join the waitlist while they are on their way.

Inaccurate wait times—Wait lists may not be able to account for people on their way. The only thing many waitlisting systems can do is estimate the amount of time needed to serve customers currently on the waitlist. If two people join a haircut waitlist, one from the parking lot and one from 30 minutes away, the waitlist is going to advertise a new wait time, based upon the number of people checked in. No geofencing may be done to determine if the customer is approaching the provider.

If I'm 20 minutes away and the wait time says 5 minutes, what does this mean if I join the waitlist now, wait 10 minutes to leave my house, then navigate to the provider? The provider may update their location's wait time the moment an SSE joins the list, so other people may see a longer wait time and choose not to go there.

In the case of the above, a customer may benefit (by attracting someone from a low wait time) at the potential risk of reduced customer flow because other customers may not come because of the arbitrarily high wait time.

Such systems showing wait times at multiple locations may display wait times that bounce all over the place. Adding a person to the waitlist may artificially affect the wait time shown to everyone else.

Current "Live" wait times displayed may not be guaranteed.

Waitlists may be able to be joined across the country/world. Such waitlists do not enforce a geofence before allowing a customer to join.

When a waitlist is empty, waitlisting systems may display something like "come on in, there's no wait." Such waitlists may not let people join a waitlist under this condition, even if they have a non-trivial (e.g., 30-minute) drive from their house. When the customer arrives, they may be subject to the current waitlist times (e.g., no priority was held) unless they kept looking at the waitlist while driving to see if the provider started accepting waitlisting entries during their travel.

Waitlists may not allow people to identify when they will arrive. Waitlists that allow specifying an estimated arrival time may work completely on the honor system and/or may not update based on real-life conditions/changes after the customer joins the waitlist. People who do join before a non-trivial commute may clog up a FIFO waitlist, forcing the provider to call people's names over and over again until they (hopefully) arrive. Sometimes the provider may be forced to make a phone call before removing the party from the list.

Lack of automated or remote check-in process after a customer joins. Many waitlists may only provide a single operation (e.g., join the waitlist) with no confirmation when the customer arrives. Such waitlists operate as if the customer is on a tentative waitlist until the customer actually goes to the host(ess) stand to then be prioritized in the queue. The customer still may not be able to avoid the (crowded) host(ess) stand.

Lack of two-way communication—e.g., stuck in traffic, theme park ride breaks down, barber running late from previous customer. So many things can happen on both sides of this customer-provider relationship.

The customer may have to wait for a business to open before joining the waitlist.

No commitment from customer—many waitlists may cause a customer showing up to be a question of when AND even if for the provider. Many waitlists may allow customers to join multiple waitlists without any verification/penalty.

Waitlists may show a list of names but may not show who is checked in (at the location). Some people might still be very far away.

Waitlists may let a customer join them even if they are on another waitlist. In some embodiments disclosed herein a COS may, for example, advantageously detect duplicate queueing requests and offer to remove the SSE from one queue automatically and/or re-prioritize the SSE in one queue when the SSE requests to join a duplicate queue.

Waitlists may be not updated and so display "no current wait" regardless of actual wait status, without implications for the provider.

Waitlists can be hard to find for various providers.

There is no "Birdseye view" of waitlists near an SSE.

An SSE may have to run multiple apps for each individual waitlist.

An SSE using a map app may have to click on each service provider, then try to join a waitlist to see the wait time and repeat as necessary.

Service providers who invest in waitlisting appointment and reservation Systems may not be easily discoverable on a map.

A group of people may not be able to join a waitlist when they collectively arrive. Plus, a lack of social sharing of a wait list can lead to people going to the wrong location.

Various embodiments may provide an "intent-based" advanced queue for a group in advance of a planned event. The corresponding SP may, for example, be prompted and/or may automatically (e.g., in response to a signal from a system as disclosed at least with reference to FIGS. 1A-4) schedule staff accordingly based on demand. The COS may prompt members of the group to go to the corresponding SP address.

Various SPs may, for example, want to stick with a FIFO service queue. An Arrival Queue may, for example, advantageously enable a SP to continue using a FIFO service queue while addressing one or more of the above problems are addressed with this new type of queue. A DPQS such as disclosed at least with reference to FIG. 11, for example, may interact with existing (FIFO) scheduling systems to augment the FIFO queues with enhanced Arrival Queues. FIG. 11, for example, depicts two types of Arrival Queues being established in front of a service provider and/or service provider booking system.

Such embodiments may, for example, provide a mobile app user interface coupled with PVQ black box technology (e.g., implemented such as disclosed at least with reference to FIG. 5) and/or UI(s) showing two-way communication/coordination. Embodiments implementing a Service Ready engine and UI(s) (e.g., as disclosed at least with reference to FIGS. 18-19) may advantageously provide a "claim" and "check-in" process through the app for automatic placement on the FIFO waitlist (e.g., with less work, with better prioritization).

The method 2500 begins when a SP accept Arrival Queue only is selected in step 2505. Next, in decision point 2510, it is determined whether time sensitive geo-blocking is turned on for the SP. For example, the SP may select in the central orchestration system 125 that customer must be within a 15-minute arrival time radius to be permitted to added to an arrival queue. If it is determined that time sensitive geo-blocking is turned off, in decision point 2515, it is determined whether a signal is received from a user interface that a request should be added to the arrival queue.

If it is determined that the user request should not be added to the arrival queue, it is determined whether the request should be added at a predetermined later time in decision point 2520. For example, a user may select using the UI to select to be added to the arrival queue at, for example, 7:00 pm. Next, if it is determined that the request should not be added at a predetermined later time, it is determined whether the request should be added when EWT≤MWT in decision point 2525. If it is determined that the request should not be added when EWT≤MWT, the method 2500 ends. For example, the user may not be interested in the selected SP.

If, in decision point 2525, it is determined that the request should not be added when EWT≤MWT, the SSE is added to a notify list in step 2530. Next, in decision point 2535, it is determined whether notify criteria are met. For example, the central orchestration system 125 may check whether EWT≤MWT. If it is determined that the notify criteria are not met, the user request is added to the arrival queue, and the decision point 2535 is repeated. If it is determined that the notify criteria are met, in step 2540, the user request is added to the arrival queue, and the method 2500 ends.

In decision point 2520, if it is determined that the request should be added at a predetermined later time, the step 2530 is performed. If, in decision point 2515, it is determined that the user request should be added to the arrival queue, the step 2540 is performed. In decision point 2510, if it is determined that time sensitive geo-blocking is turned on, it is determined whether the SSE's device is currently geo-blocked in decision point 2545. If it is not geo-blocked, then the decision point 2515 is performed. If it is geo-blocked, it is determined whether the user request is added when the SSE's device is not geo-blocked in decision point 2550.

If it is determined that the user request is not added when the SSE's device is not geo-blocked, the method 2500 ends. If it is determined that the user request is added when the SSE's device is not geo-blocked, the SSE is added to a notify list in step 2555. For example, a notification may be sent to the SSE's device when the device is within a geofence. Next, it is determined, in decision point 2560, whether the SSE's device is still geo-blocked. If it is determined that the SSE's device is still geo-blocked, the decision point 2560 is repeated. If it is determined that the SSE's device is not geo-blocked, the step 2540 is performed and the method 2500 ends.

FIG. 26, FIG. 27, and FIG. 28 depict an exemplary dynamic UI corresponding to an Arrival Queue augmenting a FIFO queue. In the depicted example, in a UI 2600, a Restaurant B is using a Geofence-Blocked FIFO Arrival Queue. The Arrival Queue may prevent an SSE from being added to an existing FIFO queue unless a geolocation signal indicates the SSE has crossed a (predetermined) provider geofence. In various embodiments disclosed herein, a geofence may, for example, be dynamic (e.g., based on HBPs of the SSE and/or SP). As an illustrative example, dynamic geofences may, by way of example and not limitation, be dynamically generated corresponding to driving habits of the SSE. As an illustrative example, dynamic geofences may, by way of example and not limitation, be dynamically generated corresponding to parking conditions of the SP.

An Arrival Queueing engine (e.g., of a DPQS) may advantageously place an SSE in a PVQ standby queue (e.g., a 'holding place') when the SSE requests to join the FIFO queue. The Arrival Queueing engine may automatically add the SSE to the main queue once they meet a predetermined (e.g., provider-specified geofence requirement). Such embodiments may, for example, advantageously solve a problem of requiring a user to pick up their phone when driving and add themselves to a main queue.

In some implementations, when the SSE is moved from the standby queue, the SSE is added to the end of the main (e.g., FIFO) queue. This queueing entry for the SSE may then be subject to the then-current waitlist time (the PVQ queue could have grown while they were on their way to the provider), as may be true of any basic waitlisting system.

In the Restaurant B example depicted in FIG. 26, the SP includes a proximity queuing 2605 that has defined a geofence for joining a FIFO waitlist to be within a 2-mile radius. When joining the arrival queue by selecting a join arrival queue now button 2610, a UI 2700 (FIG. 27) is displayed. In this example, the SSE is informed by a message 2705 about the SP's geolocation requirements and is offered (via a selection control 2710) to join the queue automatically when the customer crosses this geofence. In the depicted example, the UI 3000 (FIG. 30) also indicates to the SSE that their queue request will automatically be cancelled after 45-minutes (e.g., a function of a (predetermined) provider setting) in a message 3005.

In some embodiments, when the SSE is choosing to navigate through Get Directions, as shown in UI 2800 (FIG. 28), a control 2805 (e.g., toggle button, as depicted) to join an Arrival Queue when the SSE leaves current location can cause the DPQS to operate to put the SSE on the list automatically in response to geolocation indicating the SSE is in transit (e.g., corresponding to a predetermined time window).

Figures 29, 30, 31:
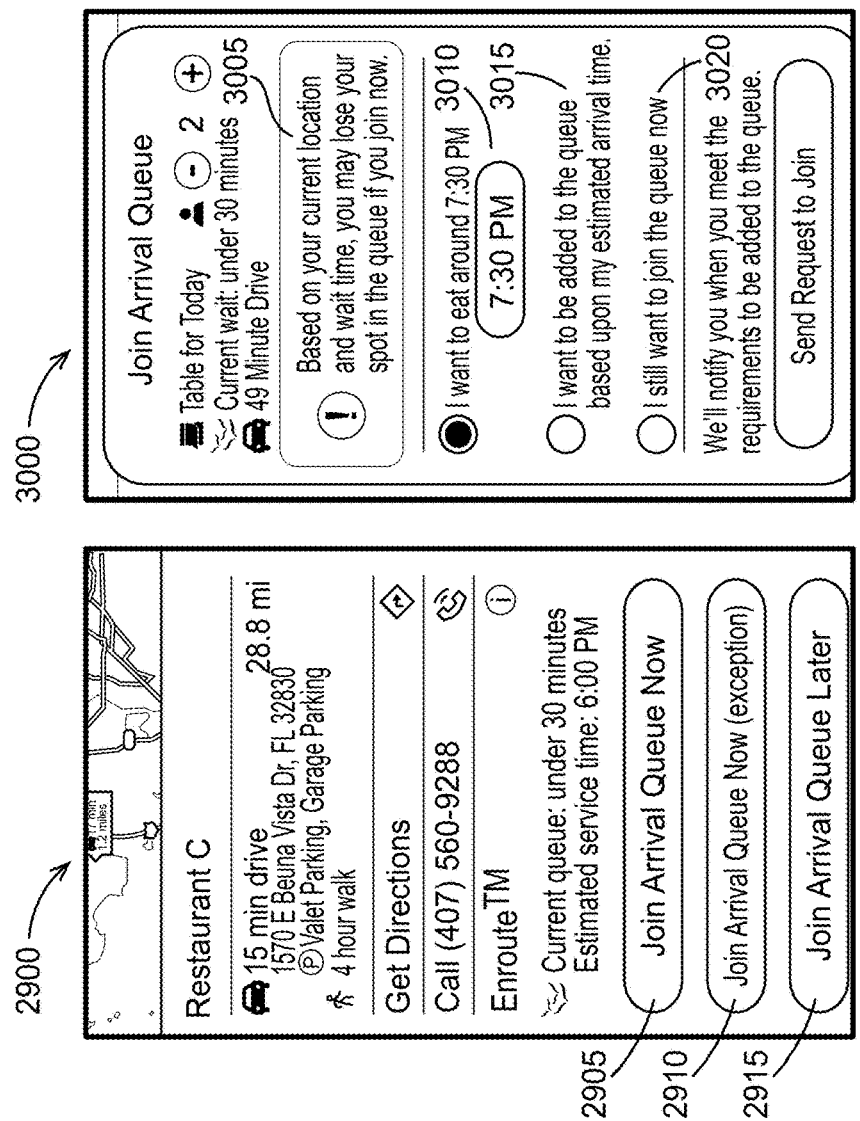
FIG. 29, FIG. 30, and FIG. 31 depict a dynamic UI for adding an SSE to an Arrival Queue at a specific time.

FIG. 29, FIG. 30, and FIG. 31 depict a dynamic UI for adding an SSE to an Arrival Queue at a specific time. As depicted in UI 2900 of FIG. 29, a Restaurant C demonstrates two Arrival Queue cases. If the SSE is within a geofence, they will be able to join the Arrival Queue now 2905. In the depicted example, they can also select to join the Arrival Queue based on an exception 2910, or join an Arrival Queue later 2915 (e.g., when within a predetermined geofence). If they are not within the geofence, instead of being blocked (e.g., as disclosed at least with reference to FIGS. 26-38), they are presented with additional options as shown by UI 3000 of FIG. 30. In a first case, the SSE chooses an approximate time 3010 in which they want to be served. The DPQS will monitor live wait times for the SP and let the main (e.g., FIFO) queue build up to a predetermined criterion(s) (e.g., expected wait, estimated service time corresponding to estimated arrival time) before the DPQS (automatically) adds the SSE to the main queue at the DPQS's predicted confluence position targeting the SSE to achieve a priority in the FIFO queue at the time the SSE requested. In a second case, the DPQS will monitor the live wait times 3015 of the SP and the customer's proximity to the provider location for adding the customer to the main queue. In a third case, the SSE may insist to join the main queue now 3020. However, as display in the message 3005, the SSE may be likely to be canceled due to lateness.

As shown in UI 3100 of FIG. 31, the DPQS may notify the SSE to join (manually) and/or may join the SSE into the main queue automatically using a sliding control 3110. In this example, the SSE may select a notification button 3115 to request the central orchestration engine to notify when the user selected criteria are met.

In some embodiments, an Arrival Queueing engine may time an SSE's queue entry onto the main queue (e.g., FIFO queue) based on a DPQS's predicted confluence of the SSE's arrival and the main queue's wait time. For example, the DPQS may (automatically) manage the SSE's position in the main queue based upon the SSE's arrival to the SP location to target increasing the SSE's chance of receiving service when they arrive. The DPQS may, for example, use live location (e.g., geo-tracking) to prioritize SSEs based upon arrival. Such embodiments may, for example, advantageously solve a problem of customers sticking at the top of a waitlist and the SP calling names at the top of the list who haven't arrived. A check-in process may, for example, be required in some embodiments to lock in a customer's priority. Such embodiments may, for example, prevent queue entries from being skipped even after they arrive because they've already been called.

Figure 32:
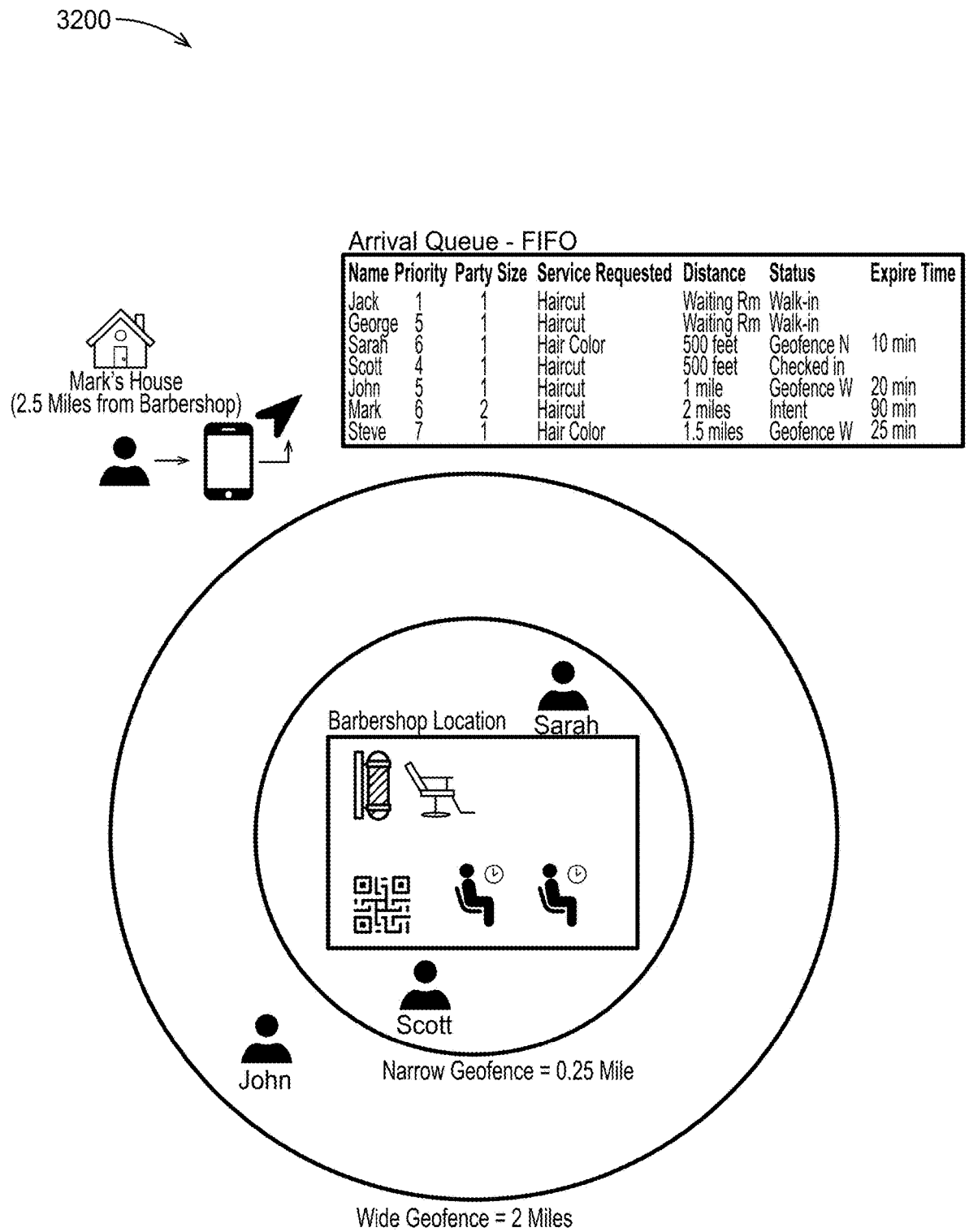
FIG. 32 depicts an exemplary illustrative use-case scenario in which a DPQS(s) (not shown) operates an Arrival Queueing engine implementing geofencing and queue status/priority.

FIG. 32 depicts an exemplary illustrative use-case scenario 3200 in which a DPQS(s) (not shown) operates an Arrival Queueing engine implementing geofencing and queue status/priority. The following diagram illustrates, in the illustrative use-case scenario, an exemplary operation of an Arrival Queue operated by a DPQS. A mobile app front end of the DPQS communicates with a geolocation engine to provide the DPQS geolocation data related to an SSE (e.g., "Mark" as shown). The DPQS implements an Arrival Queue and joins an SSE to it when the SSE requests service corresponding to a main (e.g., FIFO, as depicted) waitlist. The DPQS implements geofencing to join the SSE to the main waitlist of an SP's basic queueing system. In the depicted example, there is a Wide Geofence in which the SSE can join the waitlist. If they are outside the Wide Geofence, they can still express interest/intent in joining the waitlist (e.g., they can join the Arrival Queue). Once the customer uses the mobile app to express intent in the Arrival Queue, they can automatically be joined to the main waitlist once the DPQS (e.g., via the mobile app) determines that they have crossed the Wide Geofence, thereby locking in their priority. As depicted, there is also a Narrow Geofence in which the user can Check-In through the Service Ready engine of the DPQS (e.g., via the mobile app), such as disclosed at least with reference to FIG. 25, thereby further locking in the SSE's priority in the main waitlist. The DPQS may, for example, implement a time criterion (e.g., a 'watchdog timer'). For example, the SSE's position in the main waitlist and/or Arrival Queue may have an expiration timer which is extended whenever the SSE communicates through the Service Ready engine and/or demonstrates intent by crossing the next geofence.

In the depicted example, walk-ins can join the main waitlist using a QR code at the physical location. A priority in the FIFO waitlist is based upon the order in which people join the waitlist, however the basic waitlisting system benefits from knowing when the customer has crossed the Narrow Geofence and optionally has checked in. It also benefits when their queue entry timer expires. Geofencing and/or timer parameters may, for example, be specified by the SP when linking their waitlisting system to a COS.

Figures 33, 34:
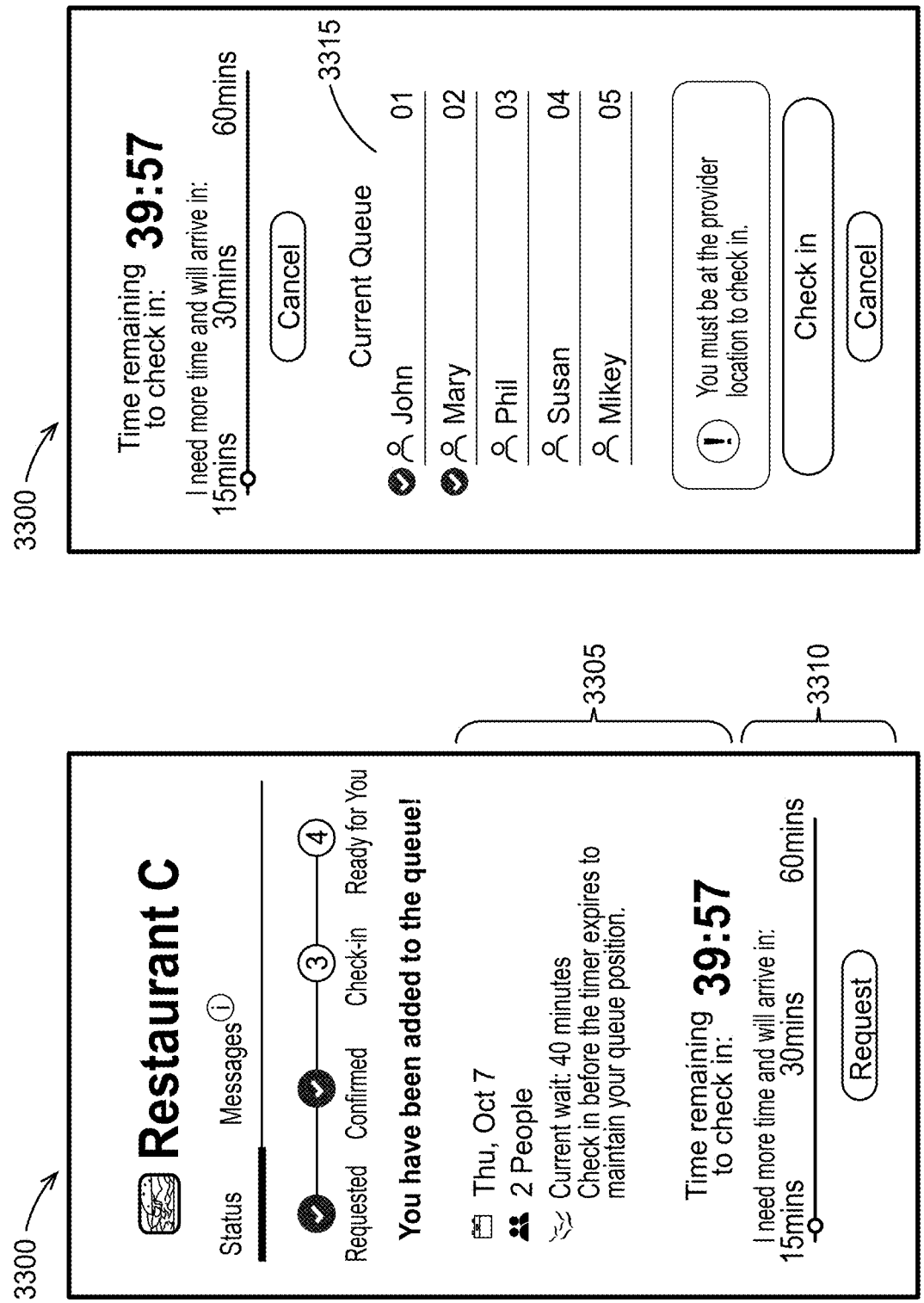
FIG. 33 and FIG. 34 depict an exemplary dynamic UI of a Service Ready engine which may, for example, be used for a FIFO Arrival Queue such as disclosed at least with reference to FIG. 32.

FIG. 33 and FIG. 34 depict an exemplary dynamic UI 3300 of a Service Ready engine which may, for example, be used for a FIFO Arrival Queue such as disclosed at least with reference to FIG. 32. In an exemplary UI 3300 (a first portion shown in FIG. 33 and a second portion shown in FIG. 34), an SSE is presented with a display of the timing criterion 3305, such that they can see how long their spot is being held before timing out. The UI 3300 also displays a control 3310 which the SSE may operate to request to extend their time in the queue (e.g., which may require payment to extend). In the depicted example as shown in FIG. 34, the UI 3300 displays, from the DPQS, a list of SSEs (e.g., all) in the queue, as well as which of the SSEs in the queue are checked in within an information area 3315. This may advantageously give a visual indication of the particular SSE's priority in the queue, especially when seeing the people checked in (the checked in people are most likely there and waiting for service, the others may or may not actually make it to check in). As shown, the SP disable a remote check-in for the queue so that all SSE must check-in at the provider location.

Figure 35:
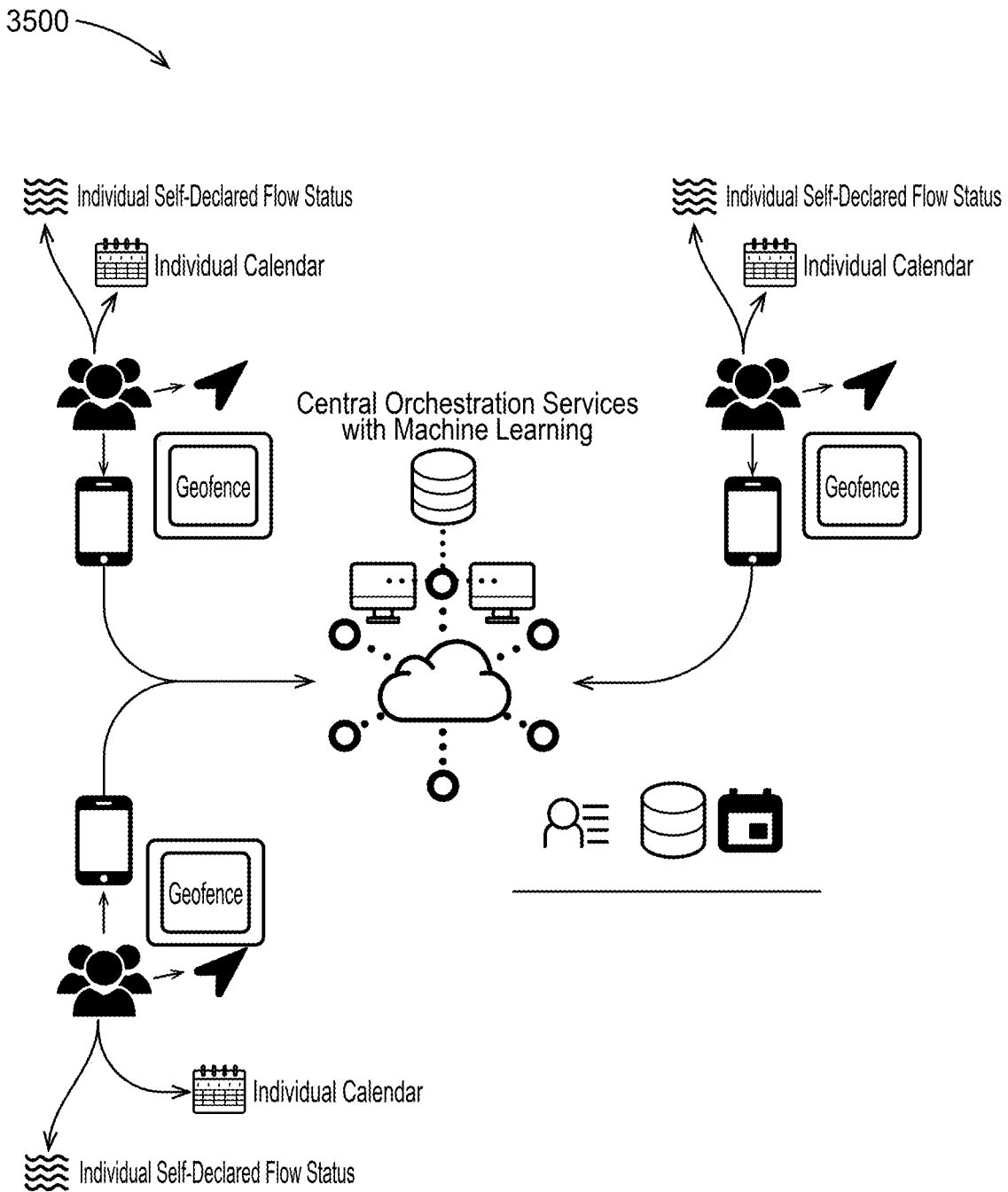
FIG. 35 depicts an exemplary DPQS providing dynamic coordination between entities in an illustrative use-case scenario.

FIG. 35 depicts an exemplary DPQS 3500 providing dynamic coordination between entities in an illustrative use-case scenario. Various embodiments may, for example, generate a dynamic queueing event profile (DQEP) and associate it with an SSE. The DPQS may, for example, associate the DQEP with a (dynamic priority) in a dynamic predicted queueing profile (PQP) of one or more SPs. Social networking aspects of queueing may, for example, form long before the SSE gets into the queue schedule of the provider.

In the depicted example, the DPQS 3500 may, for example, coordinate multiple entities (e.g., 'coordinating entities' (CEs)). The exemplary DPQS 3500 may, for example, implement multi-entity coordination as disclosed at least with reference to FIGS. 69-70. As an illustrative example, two or more friends may coordinate a 1:00 PM meeting at a local park (e.g., not seeking service at an SP). The friends may, for example, be 'peer queueing' with each other. A COS may, for example, generate a DQEP associated with the CEs (e.g., the friends). The COS may generate a PQP for each CE (e.g., as a SP). The COS may associate the DQEP with each PQP.

Figure 36:
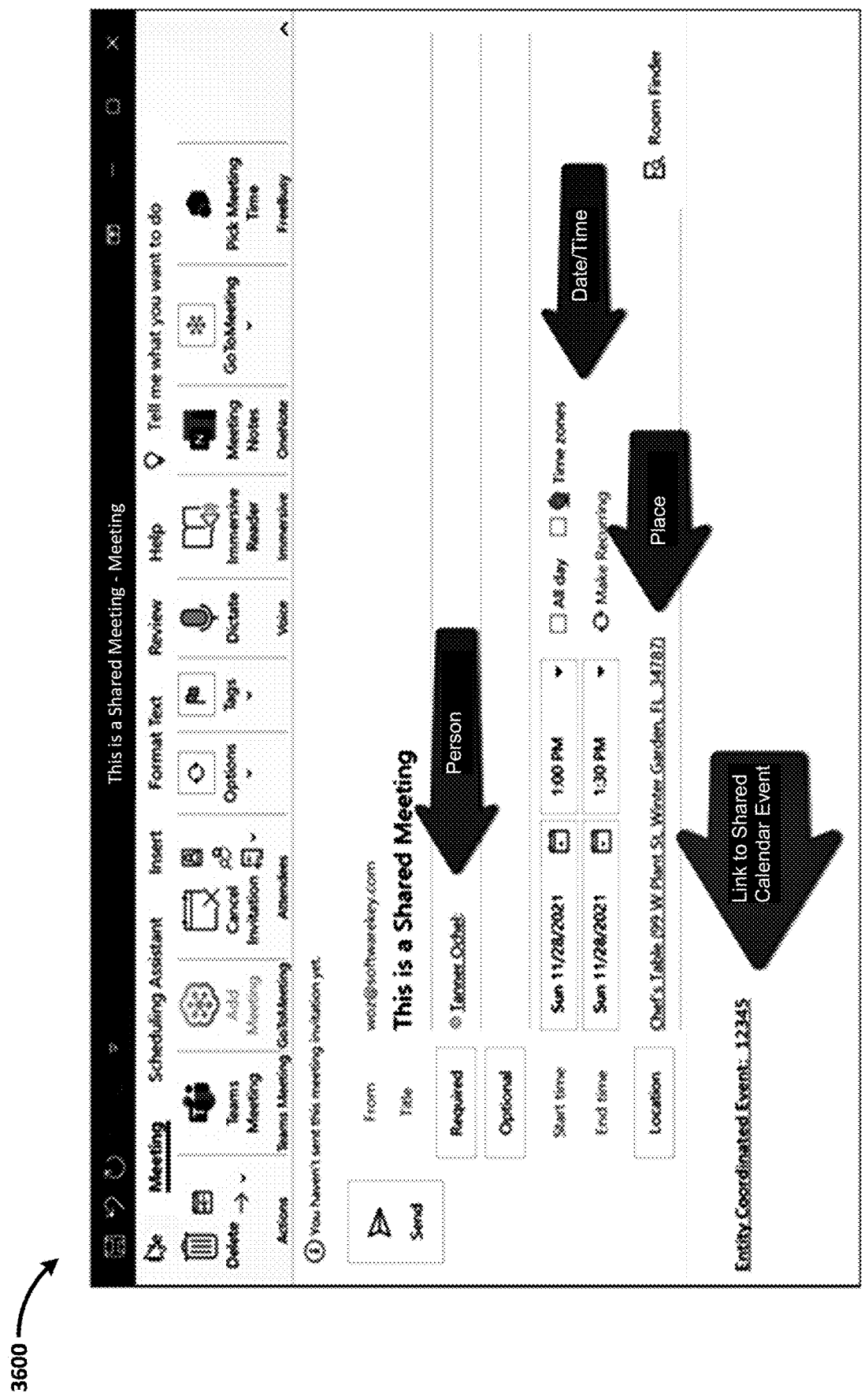
FIG. 36 depicts an exemplary UI of a multi-SE meeting coordinated by a DPQS.

FIG. 36 depicts an exemplary UI 3600 of a multi-SE meeting coordinated by a DPQS. Various embodiments may, for example, advantageously solve a problem of providing small updates to a shared calendar event (e.g., when one user invites another user to the calendar invite through email). A copy of the calendar event may be shared with one or more other CEs. Such embodiments may, for example, advantageously solve a problem of no connection between users after an invitation is sent and/or the only operation after sending an invite is "Propose New Time" or "Cancel," which may only be suitable for big changes to the event, not minor adjustments.

Various embodiments, such as depicted in the UI 3600 may, for example, advantageously enable CEs to coordinate small adjustments such as, by way of example and not limitation, "I'm running early" and/or "I'll be about 10 minutes late." In the depicted example, a Notes field at the bottom of a shared invite is included in an emailed calendar event, attaching an access link (e.g., hyperlink, URL) in the shared calendar event. Accessing the link may provide a further UI(s) to allow CEs to coordinate small changes through the DPQS (e.g., through the COS).

In various embodiments, an app may read the device's calendar and detect the shared calendar event (e.g., when the CE accesses the link in the UI 3600). The app may begin a dynamic coordination process inside the user interface. Calendar events may be displayed to show rich data coordinating between the CEs (and/or with a service provider the CEs may seek service from). Operations may, for example, include operations and/or interfaces such as disclosed at least with reference to FIGS. 8-35. For example, operations may include operations from the Service Ready engine and associated UIs.

Figure 37:
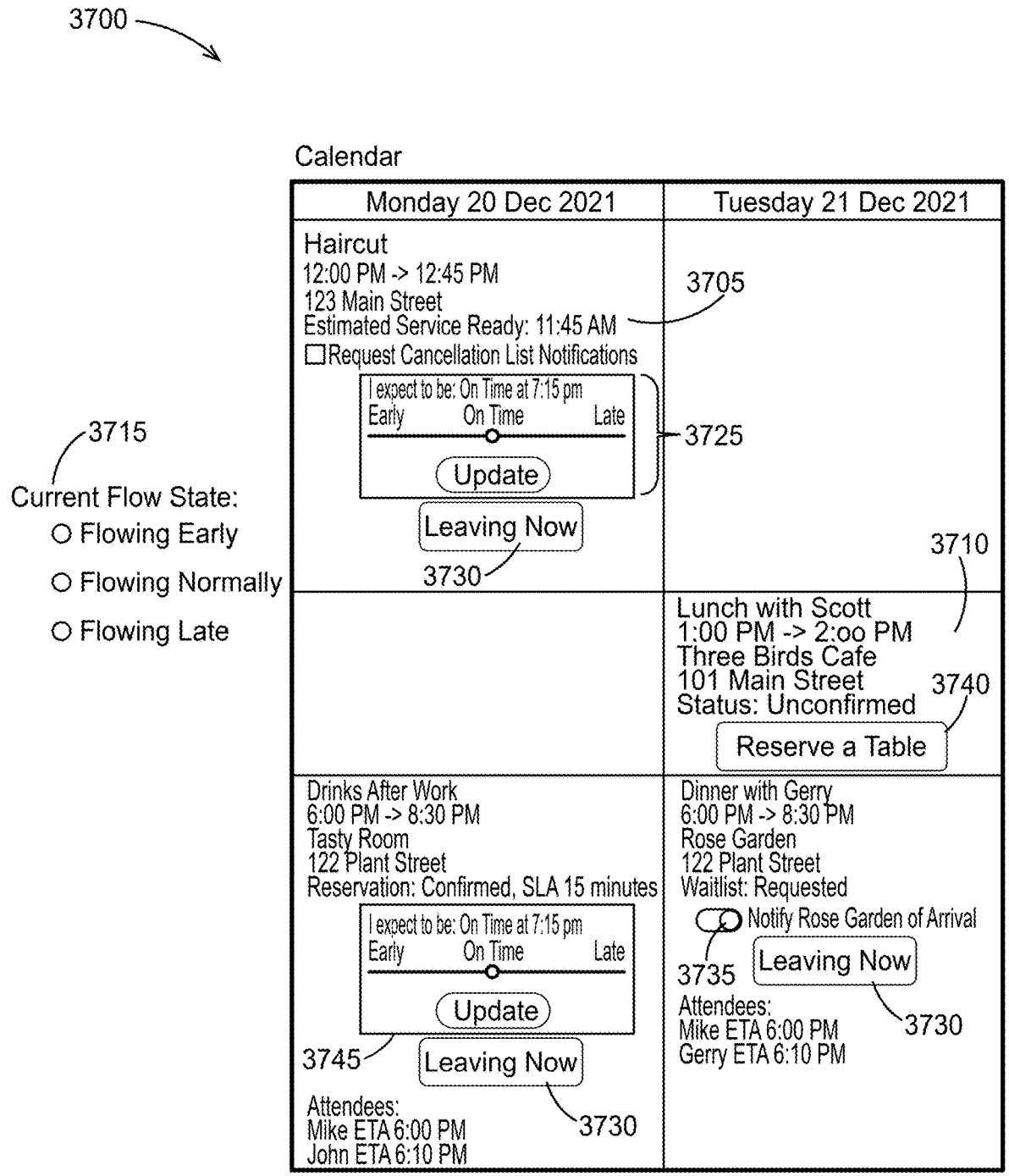
FIG. 37 depicts an exemplary UI showing exemplary rich scheduling data and associated operation controls in a calendar view.

FIG. 37 depicts an exemplary UI 3700 showing exemplary rich scheduling data and associated operation controls in a calendar view. As depicted, a CE can see the live status of both Provider Events 3705 and Social Events 3710. The CE can make small adjustments to the shared calendar event through the UI 3700. For example, the CE may interact with the UI 3700 to adjust a general current flow state using radio buttons 3715. A DPQS may update associated and/or PQPs accordingly based on the CEs announced current flow state.

In some embodiments, an "I expect to be" input 3725 (e.g., slider) may be provided inside a shared calendar item (e.g., UI 3600), such as disclosed at least with reference to the SSE expectation adjustment UI 400 of FIG. 4. The CE may, for example, interact with the UI 3700 to operate event-specific input controls (e.g., "Leaving Now" button 3730, "Notify [SP] of Arrival" button 3735, "Reserve a Table" button 3740, "Request Cancellation List Notifications" as shown in 3705, "I expect to be . . . " input 3745). The DPQS may update associated and/or PQPs accordingly based on the specific input. The "I expect to be" input 3745 may send a signal to the DPQS. The COS may accordingly send a broadcast message to the other CEs connected to the Shared Social Event/Shared Meeting Instance. The COS may send an update message to an associated SP and/or may update a queueing event (e.g., a priority and/or association of a DQEP of the CE with a PQP).

In some implementations, the CE may use the UI 3700 to control notification to providers. In this example, the CE may select notification toggle button 3735 to enable the leave now button 3730 to notify the providers or other event attendees that the CE is beginning to travel to the event.

Figure 38:
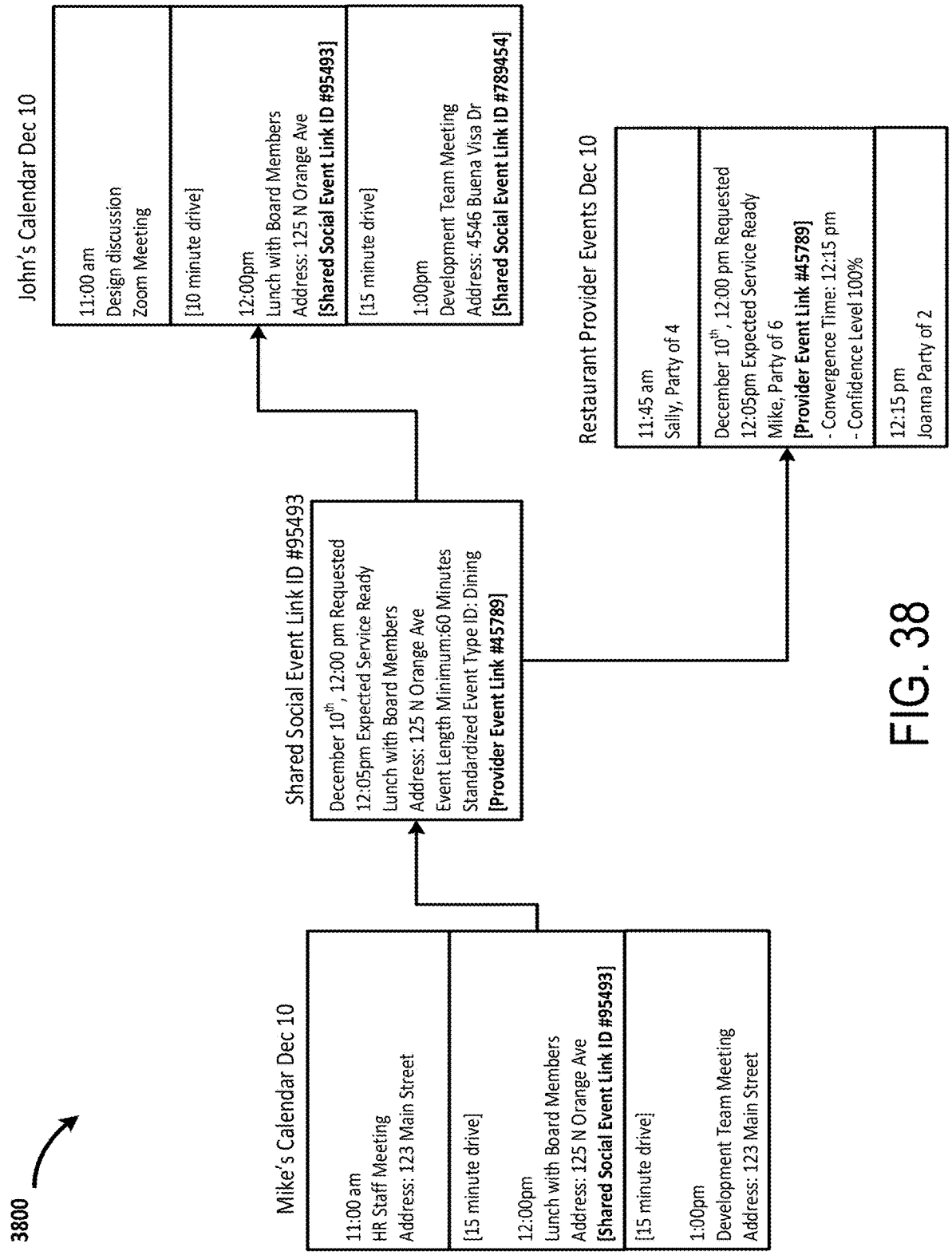
FIG. 38 depicts a sequence of exemplary messages received, generated, and/or transmitted by a DPQS in an illustrative use-case scenario. As shown in this example, a Shared Social Event Link ID (e.g., the ID #95493) may be shared with more than one SSE.
Figure 40:
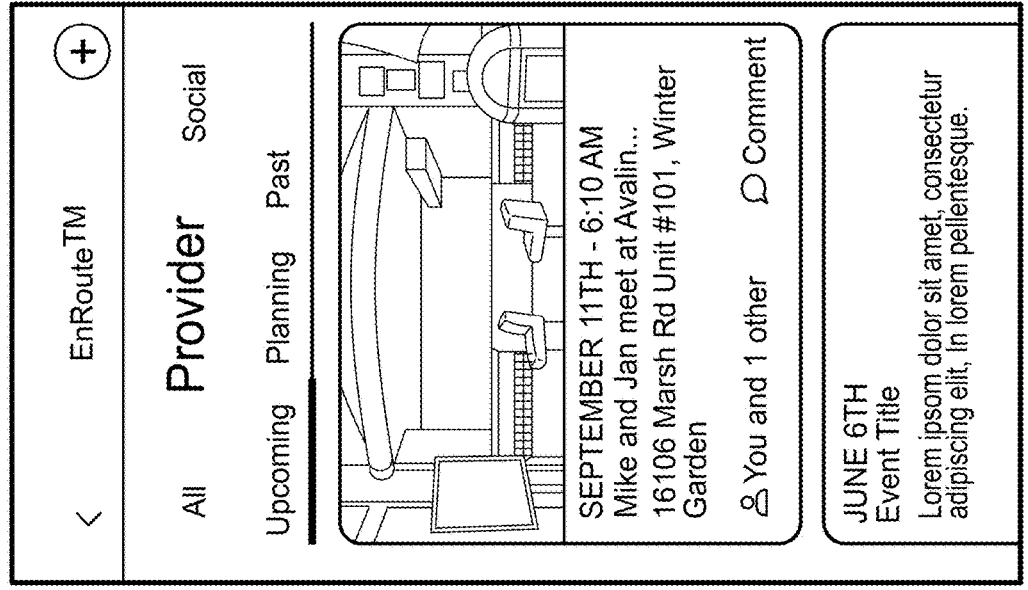

FIG. 38 depicts a sequence 3800 of exemplary messages received, generated, and/or transmitted by a DPQS in an illustrative use-case scenario. The sequence 3800 shows how two people's calendar may, by way of example and not limitation, be linked through a Shared Social Event, which is also linked, in the depicted example, to a Restaurant Provider Event.

As an illustrative example, suppose that the Board Member Lunch has a required meeting time of 60 minutes after the event is started, and the event is started 15 minutes late (12:15 pm). By linking these events through a COS of a DPQS, all the linked calendar events can dynamically update. For example, John's 1 pm Development meeting can automatically be predicted to be late, and any people linked to [[Shared Social Event Link ID #789454]] can be updated with a more realistic start time by the DPQS, including the delay in Board Member Lunch plus John's drive time to the office. In fact, if Mike's 11 am HR staff meeting is running late, the chain of events further down the calendar for various 'domino effects' can be calculated for connected parties (e.g., all connected parties) by the DPQS. Accordingly, associated queues (e.g., prioritizations) may be dynamically updated.

In the depicted example, the expected Provider Service Ready time of 12:05 pm is brought back into the shared calendar event for the Entity members to see (e.g., via messaging between the front-end app and the DPQS). When the SP is running late, through the Provider Event Link (e.g., associating the calendar event with a DQEP and/or PQP in a DPQS) the resulting "domino effects" caused by this can also be distributed throughout the shared calendar events.

In various embodiments disclosed at least with reference to the figures herein, operations described with reference to "SSEs" and/or "SPs" may, for example, be implemented for CEs and/or Shared/Social Events. For example, an SSE may include a CE. A SP may include one or more CEs. As an illustrative example, a DPQS may be configured to treat, in one or more scenarios, each member of a party, for example, as an SP (e.g., each CE may be treated by the system as providing a 'service'— such as an allotment of time—to each of the other entities. As an illustrative example, a DPQS may, by way of example and not limitation, be configured, in one or more scenarios, to treat a coordinating/leading member of a social event as an SP (e.g., the coordinating/leading member is providing a 'service' of coordinating an event and other members of the social event may be treated, for example, as SSEs).

In various embodiments, a DPQS may be provided with predetermined SP Types (e.g., restaurants, veterinarians, chiropractors) and/or predetermined Service Types (e.g., New Patient, Existing Patient, Restaurant Meal, New Client Consultation, Annual Tax Records Gathering Meeting). In various embodiments, a DPQS configured to dynamically coordinate and/or prioritize shared Social Events may be provided with predetermined Event Types (e.g., Restaurant, Theater, Evening Visit). The Social Event may be associated with a Time and a Place. A predetermined Event Type ID may, for example, allow a DPQS (interacting with a mobile app operated by an SSE/SE) to find complimentary services from nearby SPs. As an illustrative example, some embodiments may enable an SSE who has a Social Event for a Theater event this Saturday at 7:30 μm to automatically search for and advertise available Restaurants in the area before the showtime.

FIG. 39, FIG. 40, FIG. 41, and FIG. 42 depict exemplary social event coordination UIs. As a motivating example without a DPQS providing social event coordination:

A user (Mike) may have plans to meet a friend Jan at Avalin Diner at 6:10 am, for carpooling purposes. Mike is closer to Avalin Diner than Jan is, and Mike needed to leave his house by 6:02 in order to make it by 6:10. Mike had no idea if Jan was going to be there on time unless he sent a text.

Mike and Jan then had plans to drive by their friend Raquel's house to pick her up. Raquel didn't know when Mike and Jan would be there, unless they sent her a text. Raquel knew they were meeting at 6:10 am, but she didn't know if Jenny and Jan were collectively on schedule.

The three friends rode to Altamonte Springs, FL to attend a 5K race. No texting was needed, as they were all together. After the race, they had tentative plans to meet a friend Gavin back at Avalin Diner for breakfast. They had no idea when they would be leaving the 5K event. The 5K event was about 35 minutes from Avalin Diner. Gavin was only 8 minutes away from Avalin Diner. Mike, Jan, and Raquel had no idea how busy Avalin Diner would be that morning. They sent a text to Gavin when they were on their way, but the ETA had to manually be sent to him after they got on the road. Additionally, there were no live updates of their ETA if there was a traffic jam after they determined the initial ETA.

Various embodiments disclosed herein may be configured to provide one or more of, as an illustrative example (in the context of the example above): A Social Event to plan the 6:10 am meeting.

A Social Event to plan the meeting at Raquel's house.
A social event for the 5K (especially if our group was meeting up with another group there).
A Social Event to meet Gavin back at Avalin Diner. This Social Event may, for example, have a tentative Provider Event at Avalin Diner. When Mike, Jan, and/or Raquel provide data to the DPQS, in association with the Social Event, that they are on their way (e.g., a Leaving Now button in UI 4100 of FIG. 41), they may, for example, also operate a command input to cause the DPQS to update a PQP associated with the SSEs (e.g., via the Social Event) and the SP (Avalin Diner) and/or to (directly) notify Avalin Diner of their confirmed intent to visit their business.

Figure 39:
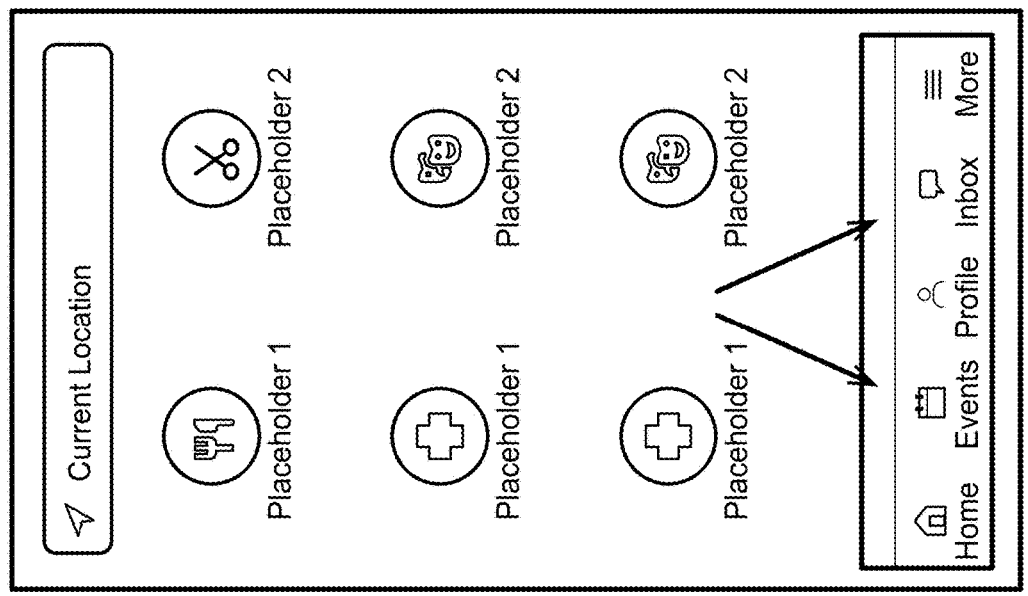

The UI 3900 depicted in FIG. 39 depicts an exemplary Social Event UI. In the depicted example, at the bottom of Events UIs (e.g., FIGS. 39-42) of an Events app (e.g., a front-end to a DPQS), a CE is presented with a display including 5 visual indicia in a bottom row. As depicted in the UI 4000 (FIG. 40), the Events tab has both Social Events (Dynamic Queueing Event involving people meeting up at a time and place, even without a provider being involved) and Provider Events (Dynamic Queueing Event that is confirmed/placed in the queue of an associated SP(s)). In the depicted example, selecting a provider event which also involves a social network of people causes a UI 4100 (FIG. 41) to be generated.

As depicted, the UI 4100 includes a command input (depicted as a toggle) to "Notify Avalin Diner of arrival." Operation of this input may generate a signal(s) to a DPQS. The DPQS may update an Arrival Queue. In the depicted example, a social network meetup Event to go to Avalin Diner may be created and associated with Mike and Jan, for example. Avalin may, for example, not see an Arrival Queue join request until the DPQS determines that Mike and Jan are actually on their way (e.g., in response to at least one of them activating the Leaving Now button). By way of example and not limitation, an input "Update My Status of Early/Late" may be operated by one or more SEs (e.g., members of the Social Event) to communicating exceptions, through the DPQS, to the social network and/or with a pre-arranged queue entry with the SP.

In this depicted example, when an CE tells the social network (and the SP) that they are "Leaving Now," they are presented with a UI 4200 (FIG. 42) displaying a status of the other SEs in the Social Event. Some embodiments may, by way of example and not limitation, display a map view showing one or more SE/SSE's approaches to a (predetermined) location. A map display may, for example, be generated based on data from the DPQS (e.g., location, time, entity members, current locations, device IDs) and from a geolocation engine (e.g., via the DPQS, a separate geolocation engine). The map display may, by way of example and not limitation, include visual indicia of projected routes for one or more of the SEs associated with the Event.

FIG. 43 depicts a swim lane flowchart of an exemplary method 4300 of configuring and/or operating SP Arrival Queueing. The method 4300 may, for example, be implemented by at least a portion of a DPQS. As depicted, an SP creates their account with a DPQS (e.g., via a COS). The SP may, for example, link their account with a scheduling provider system that they use. Through this link, the provider scheduling system may, for example, receive approval to accept bookings and/or manage inventory presented to potential customers.

Figure 44B:
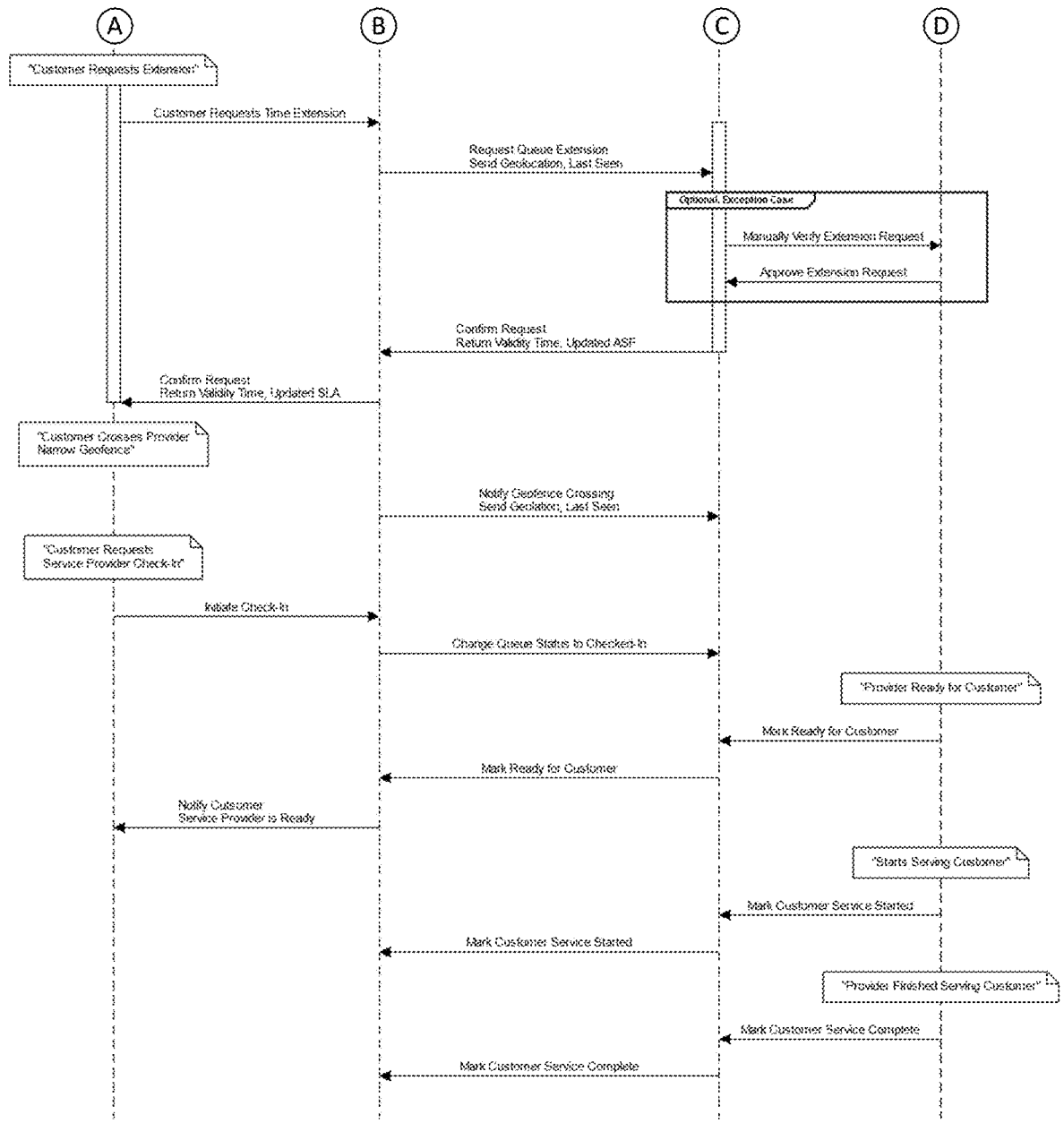

FIG. 44A and FIG. 44B depict a swim lane flowchart of an exemplary method 4400 of establishing an Arrival Queue for "service available now." The method 4400 may, for example, be implemented by at least a portion of a DPQS. As depicted, a FIFO-Based Arrival Queue is provisioned by a SP scheduling system. An SSE may find (e.g., through a DPQS) available nearby queues. The SSE may join a queue. The SSE may check in for service.

Figure 45A:
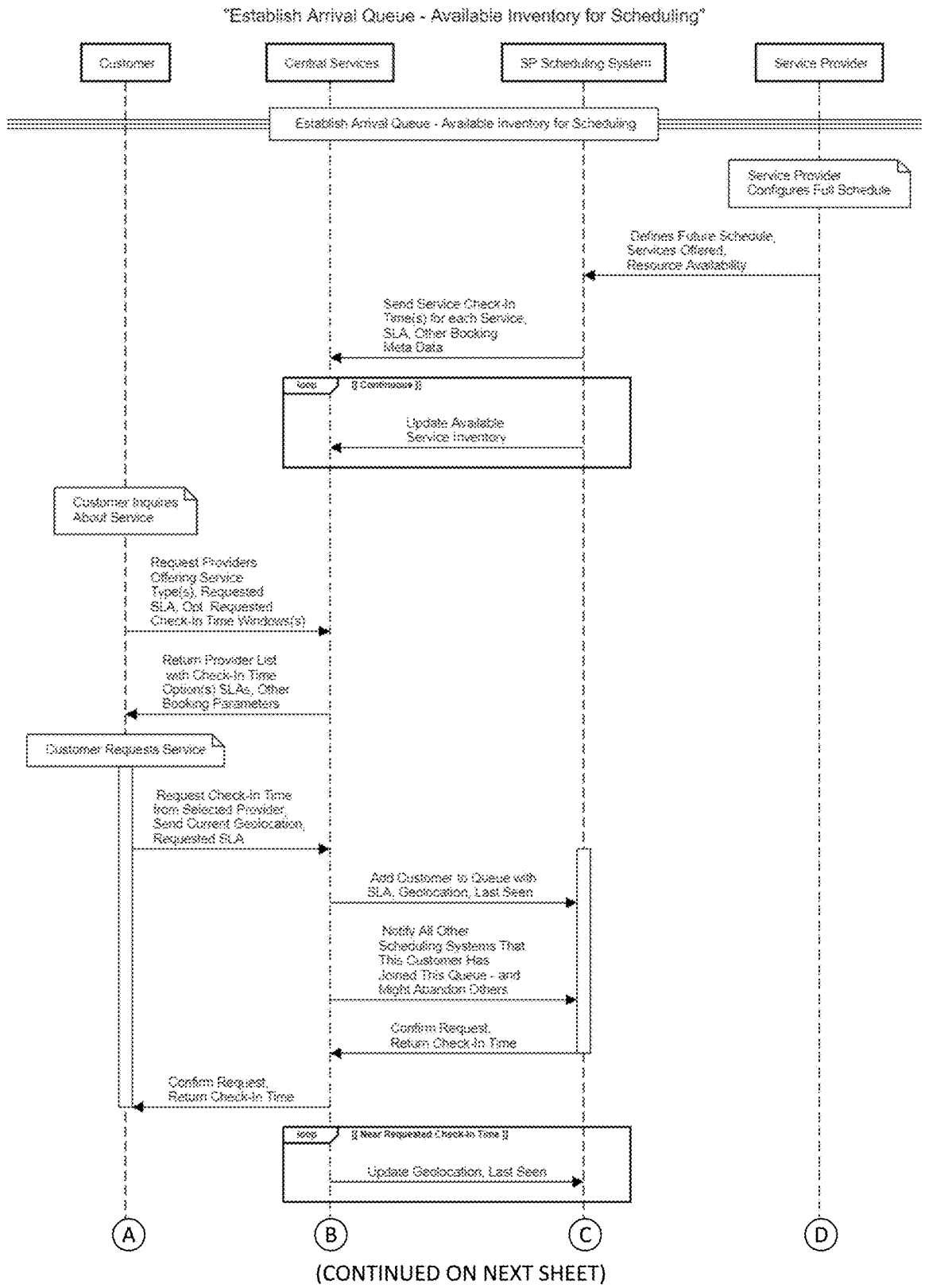
FIG. 45A and FIG. 45B depict a swim lane flowchart of an exemplary method 4500 of advertising available service and/or booking service for an SSE.
Figure 45B:
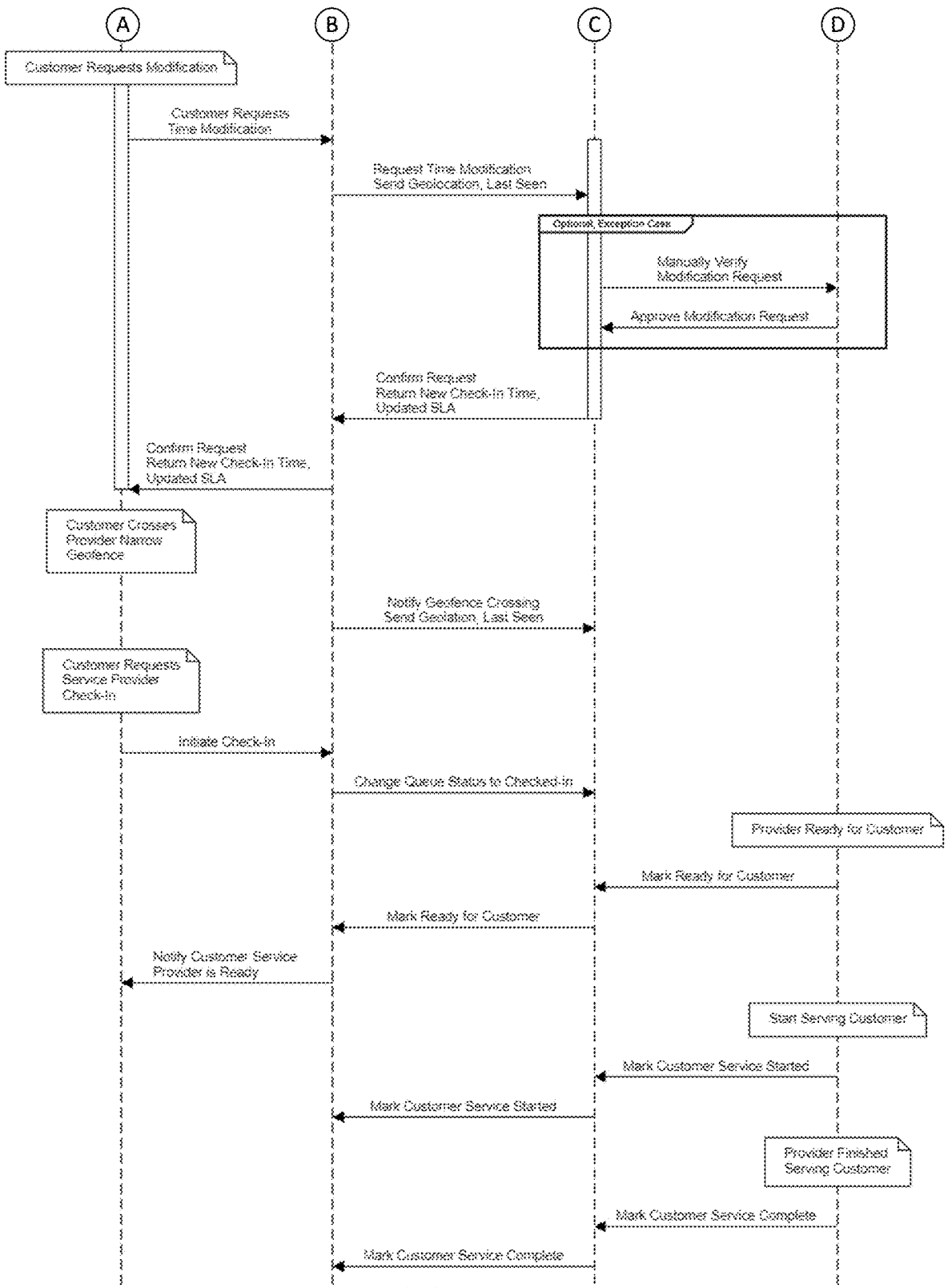

FIG. 45A and FIG. 45B depict a swim lane flowchart of an exemplary method 4500 of advertising available service and/or booking service for an SSE. The method 4500 may, for example, be implemented by at least a portion of a DPQS.

Figure 46:
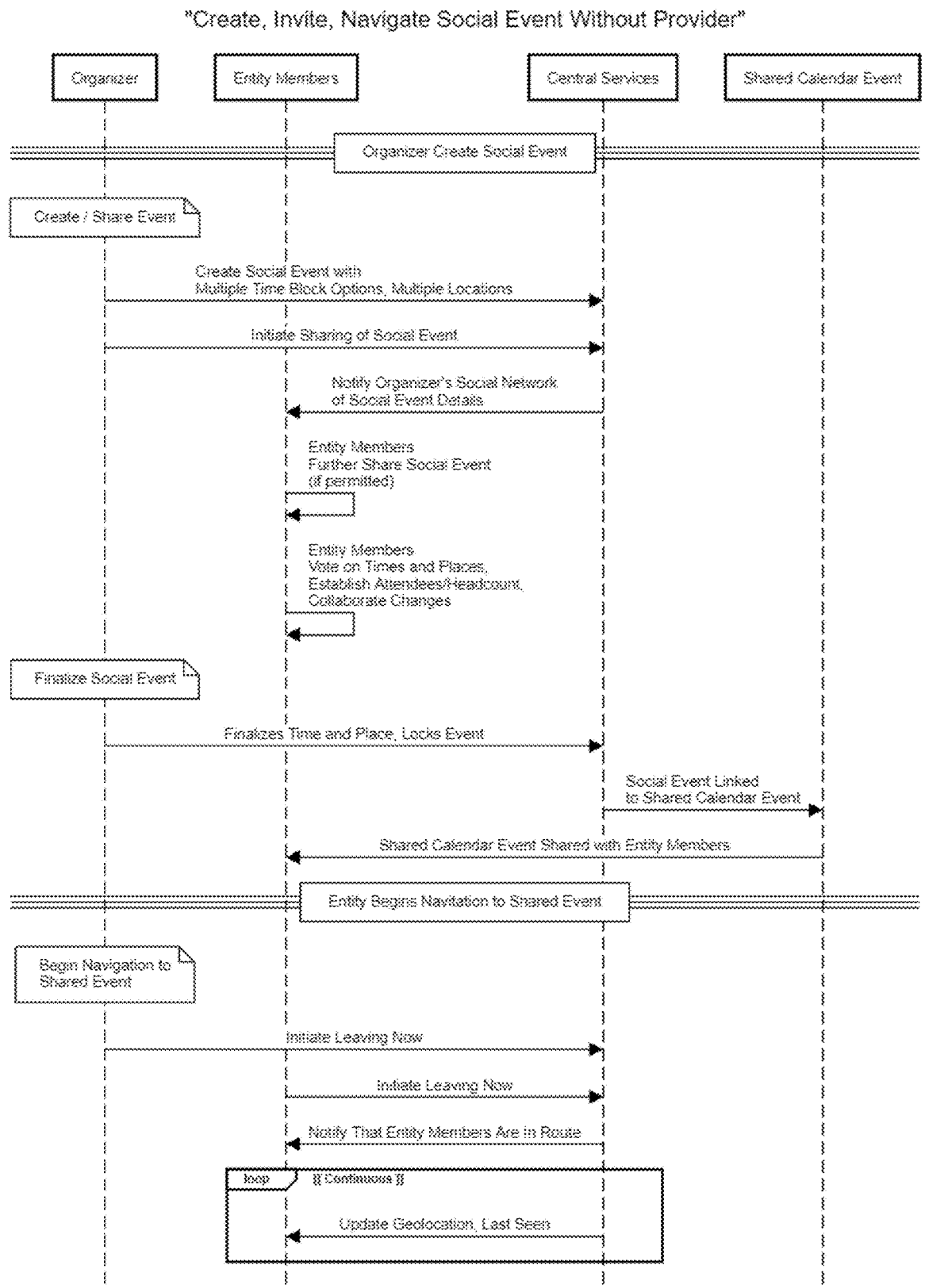
FIG. 46 depicts a swim lane flowchart of an exemplary method of creating, sharing, and/or navigating to a social event.

FIG. 46 depicts a swim lane flowchart of an exemplary method 4600 of creating, sharing, and/or navigating to a social event. The social event may, for example, not be associated with a SP. The method 4500 may, for example, be implemented by at least a portion of a DPQS.

Figure 47A:
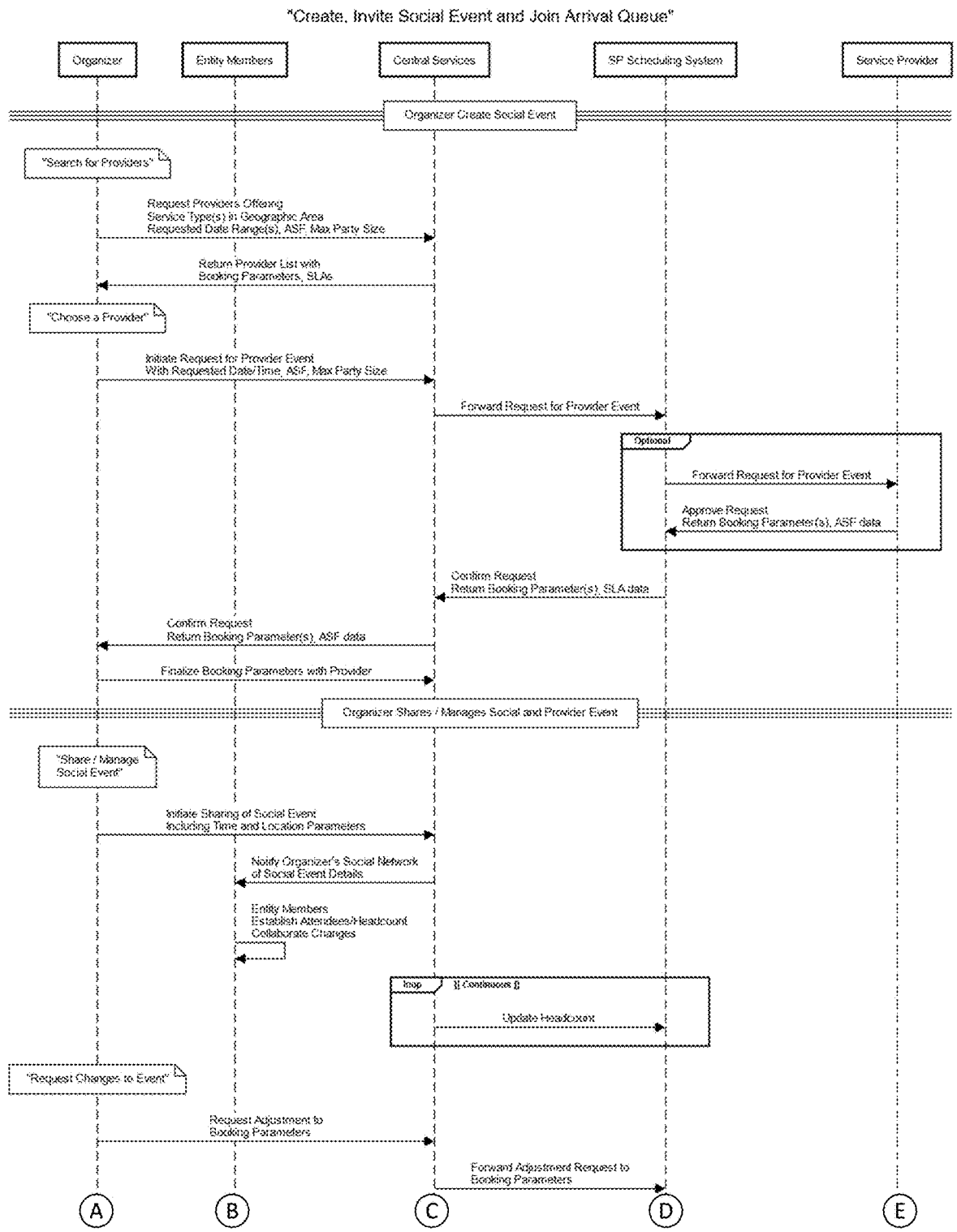
FIG. 47A and FIG. 47B depict a swim lane flowchart of an exemplary method of creating, inviting, and/or joining a social event
Figure 47B:
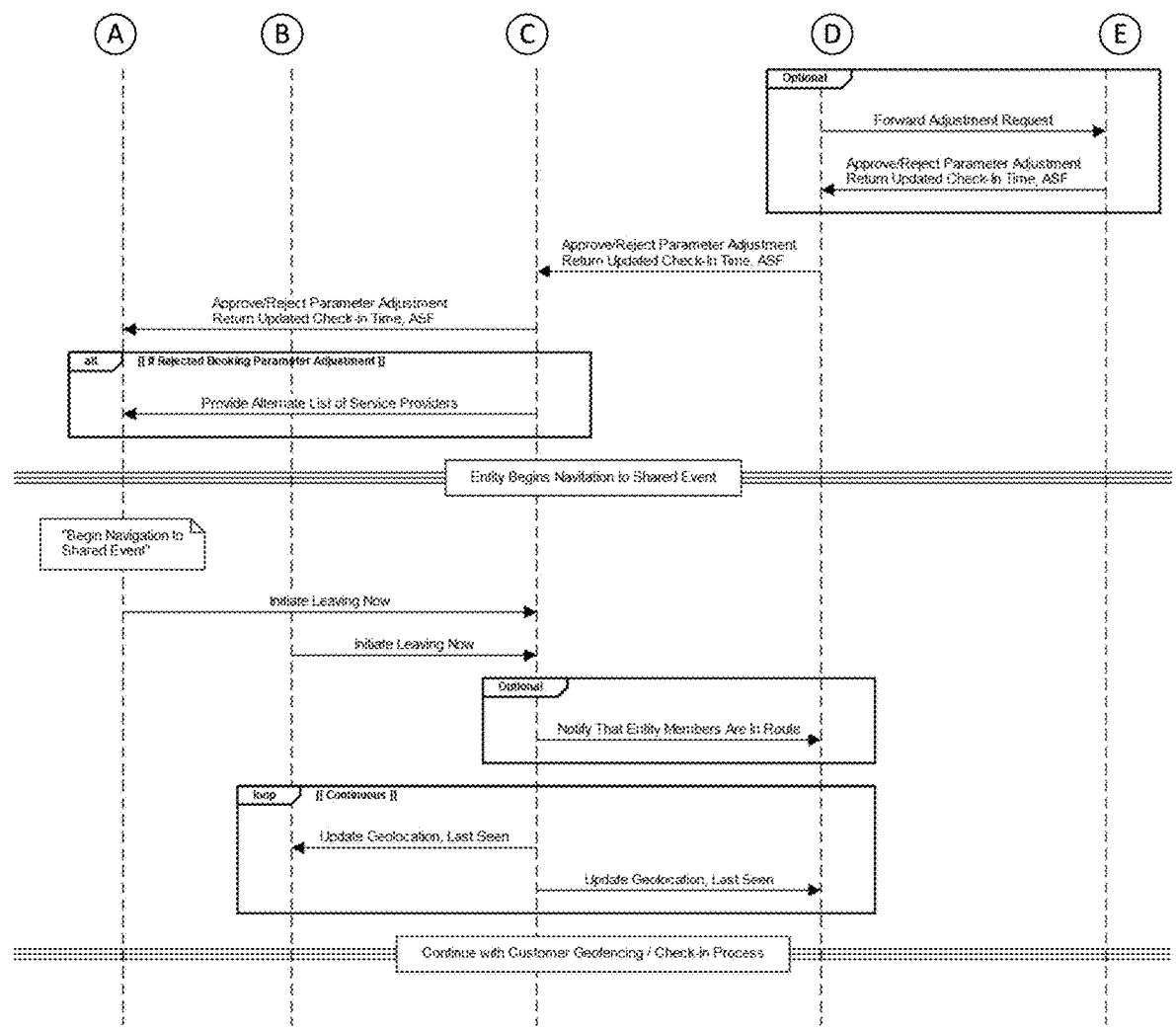

FIG. 47A and FIG. 47B depict a swim lane flowchart of an exemplary method 4700 of creating, inviting, and/or joining a social event which may, for example, include joining an Arrival Queue of an SP. FIGS. 47A-47B depict, for example, how an organizer creates a social event, and how entity members share location with each other and join the Arrival Queue of the SP(s) when they are on their way. The DPQS may, for example, receive GPS updates.

Figure 48:
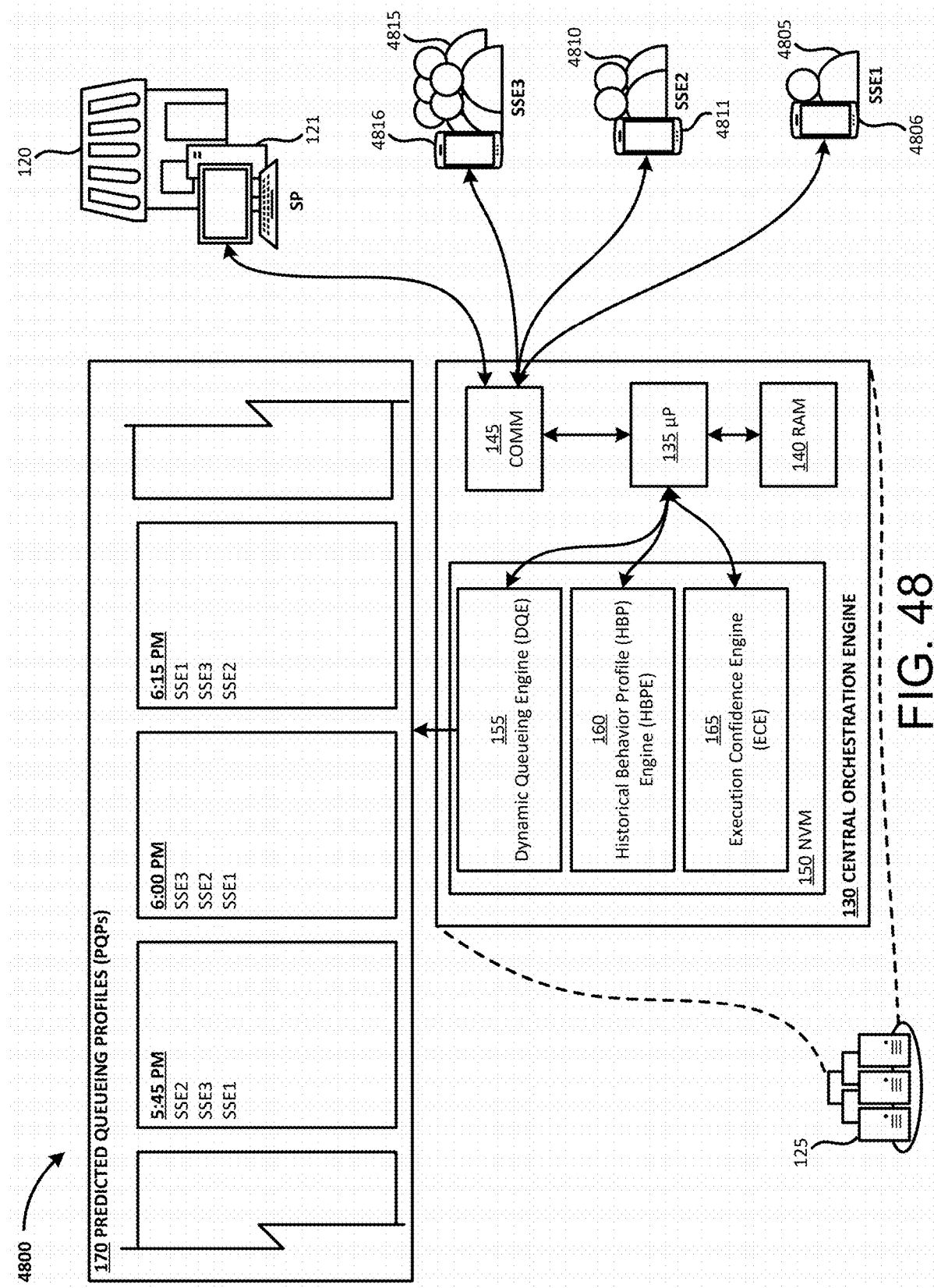
FIG. 48 depicts an exemplary central orchestration engine (COE) employed in an illustrative use-case scenario to generate predicted queuing profiles (PQPs) for an exemplary service provider (SP) for dynamic queuing events (DQEs) for exemplary service seeking (S SEs).

FIG. 48 depicts an exemplary central orchestration engine (COE) employed in an illustrative use-case scenario to generate predicted queuing profiles (PQPs) for an exemplary service provider (SP) for dynamic queuing events (DQEs) for exemplary service seeking entities (SSEs). In the depicted scenario 4800, a first service seeking entity 4805, a second service seeking entity 4810, and a third service seeking entity 4815 are dynamically prioritized to (potentially) receive service by a service provider 120. The service seeking entities 4805, 4810, and 4815 interact with mobile devices 4806, 4811, and 4816, respectively, to connect to a central orchestration system 125 (e.g., networked computing system, cloud service). The service provider (e.g., a restaurant) is connected to the central orchestration system 125 by a computing system 121.

The central orchestration system 125 includes at least one COE 130. As depicted, the COE 130 includes a microprocessor (g) 135, a random-access memory (RAM) module 140, and a communication module 145. The devices 4806, 4811, and 4816 of the service seeking entities and the device(s) (e.g., computing system 121) of the service provider communicate with the COE 130 via the communication module 145. For example, devices may communicate with the communication module 145 via wired and/or wirelessly carried electromagnetic signals.

The COE 130 includes at least one non-volatile memory (NVM) module 150. The nonvolatile memory module(s) 150 includes a dynamic queuing engine (DQE) 155, a historical behavior profiles (HBP) engine (HBPE) 160, and an execution confidence engine (ECE) 165. Engines 155, 160, and 165 may, by way of example and not limitation, be implemented as respective programs of instructions configured to be executed by the processor 135, (integrated) circuits, or some combination thereof.

In response to a request for service (e.g., a dynamic queueing event) from one of the service seeking entities, the DQE 155 may generate a corresponding dynamic queuing event profile (DQEP). For example, the dynamic queuing event profile may be stored in a memory module (e.g., nonvolatile, random access). The dynamic queuing event profile may, for example, include a requested time of service, an identifier corresponding to the service seeking entity requesting service, and an identifier corresponding to at least one service provider from whom service is sought.

The DQE 155 may retrieve, through microprocessor 135 by the HBPE 160, at least one historical behavior profile corresponding to the service seeking entity, the service provider, or some combination thereof. For example, a historical behavior profile may correspond to past dynamic queuing event profiles associated with the entity (e.g., service seeking entity, service provider), results of the queuing event (e.g., successfully executed, early, late, canceled, no-show), or some combination thereof. The DQE 155 may communicate with the ECE 165 via the microprocessor 135 to generate a confidence level of execution (CLE) for the dynamic queuing event profile. The ECE 165 may, for example, generated confidence level of execution based at least in part on the corresponding historical behavior profile(s).

The DQE 155 generates at least one predicted queuing profile (PQP) corresponding to the requested time of service for the dynamic queuing event. As depicted, a predicted queuing profile may include a prioritized list of service seeking entities associated with the specific time for the associated service provider. For example, the service seeking entity 4805 may request a reservation for service by the service provider 120 at 6:00 PM. Accordingly, the DQE 155 may generate a first dynamic queuing event profile associating the service seeking entity 4805, the service provider 120, and the time 6:00 PM. The service seeking entity 4810 may request a reservation for service by the service provider 120 at 6:00 PM. Accordingly, the DQE 155 may generate a second dynamic queuing event profile associated with the service seeking entity 4810 for the service provider 120 at 6:00 PM. The service seeking entity 4815 may request a reservation for service by the service provider 120 at 6:00 PM. Accordingly, the DQE 155 may generate a third dynamic queuing event profile associated with the service seeking entity 4815 for the service provider 120 at 6:00 PM. The DQE 155 may generate a predicted queuing profile 170 associated with the first, second, and third dynamic queuing event profiles.

The HBPE 160 may provide historical behavior profiles associated with each of the service seeking entities and the service provider 122 to the DQE 155. By way of example and not limitation, a first historical behavior profile associated with the service seeking entity 4805 may indicate that the service seeking entity 4805 is historically (e.g., on average, for the current time range in the day, for this type of event, for this day in the week, based on surrounding events, according to weather, for this service provider) approximately 15 minutes late. A second historical behavior profile associated with the service seeking entity 4810 may indicate, for example, that the service seeking entity 4810 is historically approximate 15 minutes early. A third behavior profile associated with the service seeking entity 4815 may indicate, for example, that the service seeking entity 4815 is historically approximately on time. The service provider 120 may, way of example and not limitation, not have historical behavior profile, or may have a historical behavior profile associated with serving on time (e.g., these patrons, at this time of day, on this day of the week, for this type of event). In various embodiments the DQE 155 and/or the HBPE 160 may associate, for example, each historical behavior profile with the corresponding dynamic queuing event profile.

The ECE 165 may operate on the first, second, and third dynamic queuing event profiles and associated historical behavior profiles to determine a corresponding first, second, and third confidence level of execution, respectively, for each dynamic queuing event profile at the requested service time (e.g., 6:00 PM). For example, the first dynamic queuing event profile may be associated with a low confidence level of execution. The second dynamic queuing event profile may be associated with a high confidence level of execution. The third dynamic queuing event profile may be associated with a moderate confidence level of execution. The third confidence level of execution may, for example, be greater than the second confidence level of execution which may be greater than the first confidence level of execution.

The DQE 155 may prioritize, for example, the dynamic queuing event profiles in the predicted queuing profile associated with 6:00 PM according to the generated confidence levels of execution. As depicted, the predicted queuing profile associates the third dynamic queuing event profile with the highest priority (e.g., due to being associated with the highest confidence level of execution at the associated time of 6:00 PM), the second dynamic queuing event profile with middle priority, and the first dynamic queuing event profile with the lowest priority (e.g., due to being associated with the lowest confidence level of execution of the associated time). Accordingly, the service provider may advantageously determine a priority of service, an expected demand for service at a specific time, or some combination thereof.

The DQE 155 may further, by way of example and not limitation, determine a time corresponding to a maximum confidence level of execution for each dynamic queuing event profile. The DQE 155 may associate the dynamic queuing event profile with predicted queuing profiles corresponding to times other than the requested time of service. For example, the DQE 155 may associate a dynamic queuing event profile with predicted queuing profiles associated with time intervals adjacent to the requested time. The DQE 155 may associate, for example, a dynamic queuing event profile with a predicted queuing profile associated with a time corresponding to a maximum confidence level of execution for the dynamic queuing event profile (e.g., based on at least one historical behavior profile).

In the depicted example, the maximum confidence level of execution for the first dynamic queuing event profile may, for example, correspond to 6:15 PM. Accordingly, the DQE 155 may associate the first dynamic queuing event profile with a predicted queuing profile associated with 6:15 PM. At 6:15 PM, for example, a confidence level of execution for the first dynamic queuing event profile may be greater than a confidence level of execution for the third dynamic queuing event profile which may be greater than a confidence level execution for the second dynamic queuing event profile. Accordingly, the predicted queuing profile for the service provider 120 at 6:15 PM may prioritize the first dynamic queuing event profile, followed by the third dynamic queuing event profile, followed by the second dynamic queuing event profile.

In the depicted example, the maximum confidence level of execution for the second dynamic queuing event profile may, for example, correspond to 5:45 PM. Accordingly, the DQE 155 may associate the second dynamic queuing event profile with a predicted queuing profile associated with 5:45 PM. At 5:45 PM, for example, a confidence level of execution for the second dynamic queuing event profile may be greater than a confidence level of execution for the third dynamic queuing event profile, which may be greater than a confidence level of execution for the first dynamic queuing event profile.

Accordingly, the COE 130 may dynamically prioritize service seeking entities in predicted queuing profiles according to their historical behavior. The service provider 120 may be, by way of example and not limitation, the restaurant. The service provider 120 (e.g., restaurant, as depicted) may, for example, reserve service capacity (e.g., tables) for each service seeking entity in order of priority. For example, the service seeking entity 4815 may be rewarded for historic timeliness by receiving highest priority at the requested time. The service seeking entity 4810 may, for example, advantageously receive highest priority upon arrival 15 minutes earlier than requested. The service seeking entity 4805 may, for example, advantageously receive highest priority upon arrival 15 minutes later than requested. The service seeking entity 4805 may, for example, advantageously avoid penalization and/or longer wait despite being late to a reservation. The service provider 120 may advantageously allot resources (e.g., wait staff, cooking staff, food, tables) as needed and minimize resources allotted too late and/or too early.

In various embodiments a predicted queuing profile 170 may be regenerated dynamically according to further inputs. For example, a predicted queuing profile 170 may be regenerated in response to a request for service from an additional service seeking entity; a termination of a request for service by at least one of service seeking entities 4805, 4810, and 4815; a change in conditions (e.g., walk-in service requests, accident, traffic, delay of a service seeking entity, weather); or some combination thereof.

As depicted, a single service seeking entity may correspond to one or more individual persons. For example, service seeking entity 4805 corresponds to a single individual; service seeking entity 4810 corresponds to 2 individuals (e.g., spouses, friends, business associates); and service seeking entity 4815 corresponds to 5 individuals (e.g., a party, a church group, a business gathering, a family). Accordingly, a single dynamic queuing event profile may correspond to one or more individuals.

In various embodiments, a service provider may, by way of example and not limitation, include a hospitality service provider (e.g., restaurant, hotel); entertainment services provider (e.g., amusement park, theater); healthcare provider (e.g., medical office, hospital, clinic); professional services provider (e.g., accountant, lawyer, engineer, consultant), industrial, commercial, and/or residential service provider (e.g., manufacturer, transporter, contractor, house inspector, pest control service), or some combination thereof.

Figure 49:
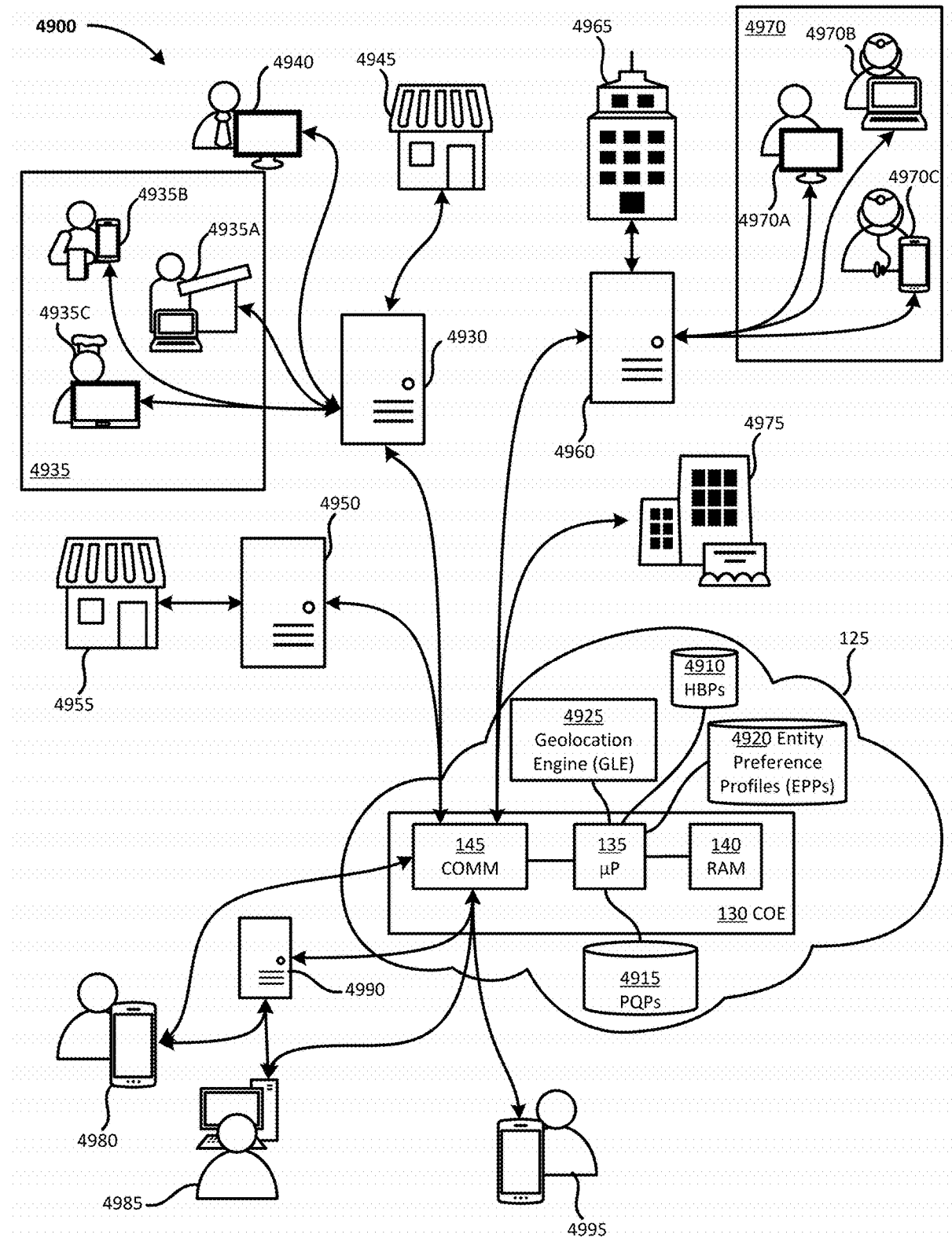
FIG. 49 is a block diagram depicting an exemplary central orchestration engine connecting healthcare and hospitality service providers to service seeking entities.

FIG. 49 is a block diagram depicting an exemplary central orchestration engine connecting healthcare and hospitality service providers to service seeking entities. In the depicted exemplary system 4900, the central orchestration system 125 is implemented as a networked (e.g., remote, cloud) system. In addition to the COE 130, the central orchestration system 125 is further provided with at least one data store of historical behavior profiles (HBPs 4910) and at least one data store of predicted queuing profiles (PQPs 4915). The central orchestration system 125 is further provided with at least one data store of entity preference profiles (EPPs 4920). The entity preference profiles may, for example, correspond to preferences expressed (e.g., directly expressed and/or stored, determined by machine learning) and/or predetermined by service seeking entities and/or service providers. An entity preference profile may include, by way of example and not limitation, special pricing (e.g., for specific customers, specific times, specific days of the week, specific times of the year, specific confidence levels, specific customer attributes, specific locations, specific products), booking levels (e.g., accept bookings up to a predetermined capacity), confidence interval level preferences (e.g., assign dynamic queuing event profiles a 'guaranteed' status once an associated confidence level reaches a predetermined threshold), geofence zones (e.g., distances, geofence profiles, location preferences), service provider preferences (e.g., types, locations, specific providers), service seeking entity preferences (e.g., historical behavior attributes) or some combination thereof.

As depicted, the central orchestration system 125 is further provided with a geolocation engine (GLE 4925). The GLE 4925 may, for example, include circuits (e.g., processor module, RAM module, NVM module, dedicated/integrated circuit module) configured to communicate with geo-positioning devices (e.g., client devices, central devices). The GLE 4925 may, for example, be configured to communicate with (remote) geolocating services and/or systems, provide an integrated geolocation system, or some combination thereof. In various embodiments the GLE 4925 may retrieve, generate, and/or operate on positions determined by global navigation satellite systems (GNSS) such as, by way of example and not limitation, GPS (USA), GLONASS (Russia), Galileo (European Union), BeiDou (People's Republic of China), QZ SS (Japan), IRNSS-NAVIC (India), or some combination thereof. Various embodiments may provide geolocation (GL) data (e.g., associated with a service seeking entity and/or service provider, such as corresponding to at least one dynamic queuing event profile) to the DQE 155 and/or the ECE 165.

As depicted, the central orchestration engine communicates, via the communication module 145, with a hospitality management system 4930. The hospitality management system 4930 may, by way of example and not limitation, be a (third-party) table management system, hotel management system, or some combination thereof. The hospitality management system 4930 communicates with a hospitality provider 4935, a (remote) manager 4940, and a restaurant 4945.

The hospitality provider 4935 includes front staff 4935A (e.g., hostess communicating through a laptop, front reservation staff at a hotel/restaurant), wait staff 4935B (e.g., waiter communicating through a smartphone), and cook staff 4935C (e.g., chef communicating through a tablet). Each may communicate directly and/or indirectly (e.g., through a local management system for hospitality provider 4935) with the hospitality management system 4930. The hospitality management system 4930 may, for example, receive reservations (e.g., walk-in reservations and/or phone reservations taken by the front staff 4935A), information on current resource levels (e.g., staff, tables, food, table status from wait staff 4935B, order status from cook staff 4935C), service provider preferences, or some combination thereof. For example, the hospitality provider 4935 may manage available tables and/or rooms using at least one display generated by the hospitality management system 4930. The hospitality provider 4935 may, for example, input substantially all reservations and/or resource updates into the hospitality management system 4930. Accordingly, the hospitality management system 4930 may communicate a substantially accurate status (e.g., table inventory, hotel room inventory, conference room inventory, service availability) of the hospitality provider 4935 to the central orchestration system 125.

In various embodiments the hospitality provider 4935 (e.g., restaurant, as depicted) may, by way of example and not limitation, be a standalone entity, or be operated as part of a larger entity (e.g., a hotel, amusement park, hospital, car dealership, event center). The manager 4940 may, for example, be a (remote) manager of the hospitality provider 4935 (e.g., a consultant, an administrative manager at a corporate office). The manager 4940 may, for example, monitor performance and/or operations of the hospitality provider 4935 via the hospitality management system 4930.

The restaurant 4945 may, for example, be a small local café informally using the hospitality management system 4930. For example, the restaurant 4945 may take reservations through the hospitality management system 4930 (e.g., through a third-party app and/or website on a mobile device and/or other computing device, not shown), but may provide limited, irregular, or no updates on reservations received via other modes (e.g., walk-in, phone). Accordingly, updates (e.g., of table inventory, service availability) communicated to the central orchestration system 125 by the hospitality management system 4930 for the restaurant 4945 may be of limited accuracy.

The central orchestration system 125 further communicates with a table reservation system 4950. The table reservation system 4950 communicates with a restaurant 4955 (e.g., via a computing device, not shown). The table reservation system 4950 may, for example, be a third-party system and/or service, be dedicated (e.g., proprietary) to the restaurant 4955, or some combination thereof.

The central orchestration system 125 further communicates with a healthcare management system 4960 (e.g., third-party service/system, remote computing system). The healthcare management system 4960 communicates with a hospital 4965 (e.g., via a computing network(s), not shown) and a clinic 4970. The hospital 4965 may, for example, at least partially manage healthcare resources (e.g., beds, appointments, staff, inventory) via the healthcare management system 4960. The healthcare management system 4960 may communicate updates at least related to relevant resources (e.g., beds, appointments) to the central orchestration system 125.

The clinic 4970 includes administrative staff (e.g., receptionist, bookkeeper, office manager) 4970A communicating with the healthcare management system 4960 via a (desktop, networked) computer. The clinic 4970 further includes healthcare professionals (e.g., physicians, nurses, chiropractors, dentists, pharmacists) 4970B and 4970C communicating with the healthcare management system 4960 (e.g., directly, indirectly via a local management system) via computing devices (e.g., smartphone, laptop, mobile device, computing station in a specific room such as lab, office, exam room). The healthcare management system 4960 may, for example, manage appointments, staff schedules, and/or other resources for the clinic 4970. The healthcare management system 4960 may communicate updates related to relevant resources (e.g., appointments) to the central orchestration system 125.

The central orchestration system 125 further communicates directly with a professional services provider 4975 (e.g., a law office) via one or more computing devices (not shown). The law office may, for example, provide appointment availability (e.g., by professional service providers, administrative staff, or some combination thereof) to the central orchestration system 125.

The central orchestration system 125 receives requests for service from service seeking entities 4980 and 4985. The service seeking entities 4980 and 4985 additionally communicate with a networking system 4990. For example, the service seeking entity 4980 communicates with the networking system 4990 and the central orchestration system 125 via a smartphone. The service seeking entity 4985 communicates with the systems via a desktop computer.

The service seeking entities 4980 and 4985 may, for example, the view availability and/or request service individually and/or as a party with the service providers 4935, 4945, 4955, 4965, 4970, and/or 4975 directly using the central orchestration system 125, the networking system 4990, or some combination thereof. For example, the service seeking entity 4985 may reserve a table with the restaurant 4955 using the central orchestration system 125. The central orchestration system 125 may communicate with the hospitality management system 4930 to determine service availability at the requested time, book a reservation, and provide prioritization of the request (e.g., as a dynamic queuing event profile) to the hospitality provider 4935.

The service seeking entities 4980 and 4985 may, for example, communicate with the networking system 4990 to form a 'social network' acting as a single service seeking entity. The combined party may, for example, seek to book a table at the restaurant 4945. The networking system 4990 may communicate with the central orchestration system 125 to provide service availability and/or book a table (e.g., via the hospitality management system 4930) for the combined services seeking entity.

The central orchestration system 125 further communicates with a service seeking entity 4995 via a mobile device. The service seeking entity 4995 may, for example, request an appointment with a physician 4970B at the clinic 4970. The central orchestration system 125 may communicate with the healthcare management system 4960 to determine appointment availability and/or reserve an appointment time. The service seeking entity 4995 may, for example, request a video conference with a professional at the professional services provider 4975.

The service seeking entity 4995 may, for example, communicate directly with the professional services provider 4975 via the central orchestration system 125. For example, the central orchestration system 125 may retrieve a schedule from the professional services provider 4975 (e.g., already preloaded into an EPP 4920 for the service provider, dynamically retrieved from a scheduling system into a random-access memory module of the central orchestration system 125) at and/or around a requested time.

The system 125 may, for example, generate a dynamic queuing event profile. The dynamic queuing event profile may be associated with a predicted queuing profile of the professional services provider 4975. The orchestration service may, for example, determine a recommended predicted queuing profile and/or generate a confidence level of execution of the dynamic queuing event profile in response to the request for service from the service seeking entity 4995 based on a current location of the service seeking entity 4995 and/or professional services provider 4975. Accordingly, a service seeking entity and service provider may advantageously coordinate an event in at least one dynamically prioritized queue.

Figure 50:
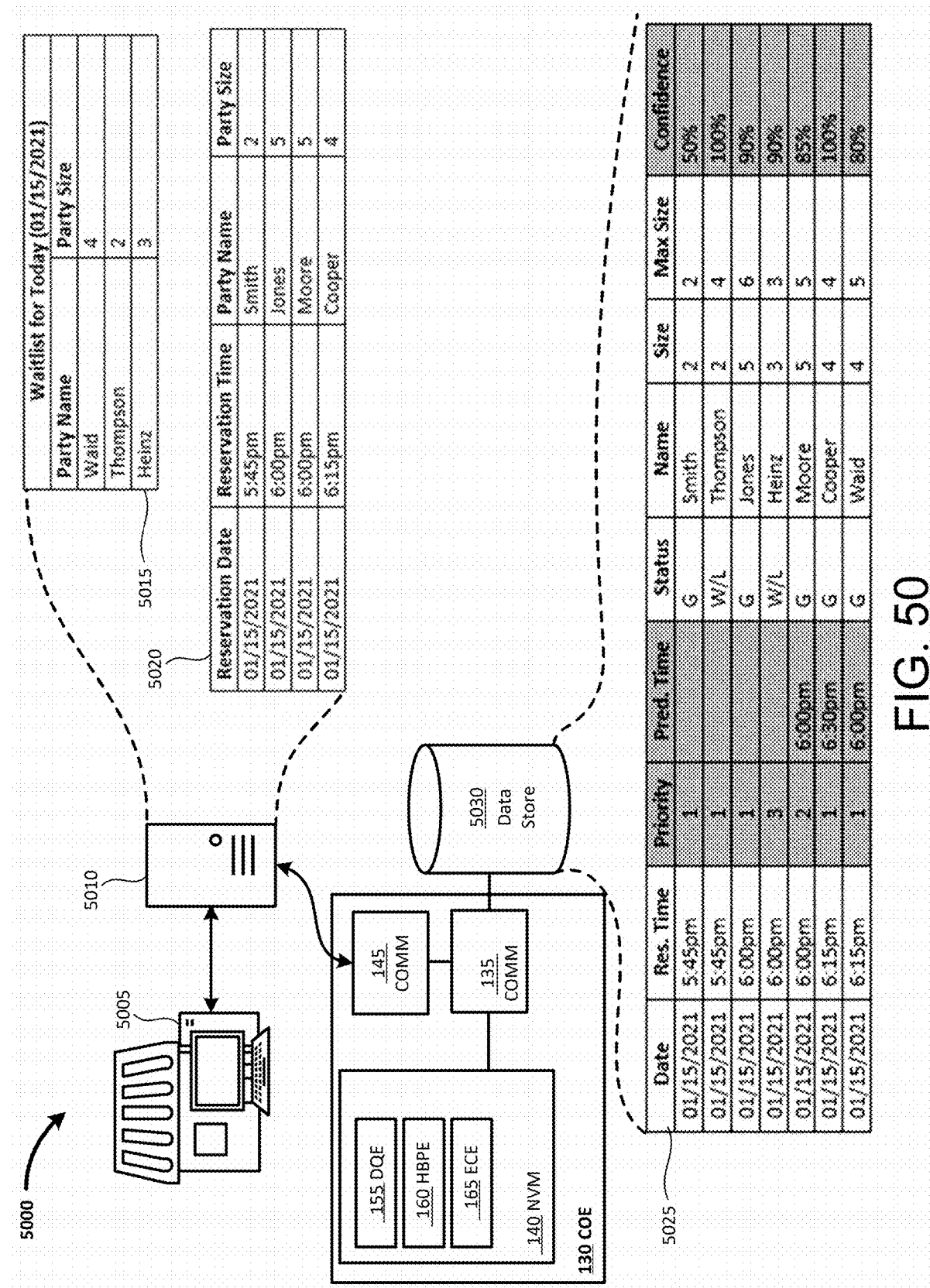
FIG. 50 depicts a combined waitlist and reservation list generated by the exemplary central orchestration engine for an exemplary service provider.

FIG. 50 depicts a combined waitlist and reservation list generated by the exemplary central orchestration engine for an exemplary service provider. In the depicted scenario 5000, a service provider (e.g., a restaurant) 5005 communicates via a computing system with a management system 5010 (e.g., a third-party table management service hosted on at least one remote server). The service provider 5005 may, for example, input available service times, service resources (e.g., tables, menus), or some combination thereof into the management system 5010. The management system 5010 may receive, for example, requests for and/or reservations of service (e.g., from a third-party service, from the service provider 5005, directly from patrons). The management system 5010 may generate reservations and waitlist requests in response to the requests for and/or reservations of service. In the depicted example, the management system 5010 generates a waitlist table 5015 for the service provider 5005 corresponding to requests for service for a particular day. The waitlist table 5015 includes a party identification (e.g., requestor last name) and a party size. In the depicted example, the management system 5010 further generates a reservation list table 5020 corresponding a reservation date, reservation time, entity identifier (e.g., requestor last name) and party size. The reservation list may, for example, correspond to requests for service which are guaranteed to receive service at the reserved date and time. The waitlist may, for example, correspond to requests for service which have not (yet) been guaranteed service at the requested date.

The management system 5010 communicates with the COE 130 via the communication module 145. The COE 130 may, for example, receive from and/or transmit to the management system 5010 information corresponding to the reservations (e.g., depicted in the reservation list table 5020) and waitlisted requests for service (e.g., depicted in the waitlist table 5015). The COE 130 generates an integrated service request list table 5025 in response to requests for service depicted in tables 5015 and 5020. As depicted, the service request list table 5025 includes the requested date, time, entity identifier, and party (service seeking entity) size. The request list table 5025 is stored by the COE 130 (e.g., via the microprocessor 135) in a data store 5030. The data store 5030 may, for example, be integrated into the central orchestration system 125, be a remote data store, or some combination thereof.

Each request list table 5025 may, for example, correspond to a dynamic queuing event profile generated by the COE 130 in response to the associated request for service (e.g., received via the management system 5010). The COE 130 may retrieve and/or generate a historical behavior profile for each service seeking entity the service provider 5005 via the HBPE 160. The COE 130 enriches each dynamic queuing event profile in the request list table 5025 with a confidence level of execution ("Confidence"), which may be generated by the ECE 165 based at least partially on at least one corresponding historical behavior profile. The DQE 155 may, for example, generate an expected maximum size ("Max Size") of the service seeking entity. As depicted, the table 5025 is enriched with the expected maximum size by the COE 130. In some embodiments the expected maximum size may be received from a representative of the service seeking entity (e.g., via the management system 5010).

The DQE 155 may generate predicted queuing profiles associated with each time interval (e.g., predetermined as 15-minute intervals) for the service provider 5005. The DQE 155 may dynamically prioritize the service seeking entities associated with each predicted queuing profile. For example, each predicted queuing profile may be prioritized according to the associated confidence level of execution. As depicted, the COE 130 enriches the table 5025 with the priority level associated with each dynamic queuing event profile. For example, a priority level of "1" may be associated with highest priority. A priority level above 3 may, for example, correspond to guaranteed service.

The COE 130 further enriches the table 5025 with a status of each dynamic queuing event profile. The status may, for example, correspond to "G" (e.g., for guaranteed) and/or "W/L" (e.g., for waitlist). The status may, for example, be determined based on whether the dynamic queuing event profile list generated in response to an entry in the waitlist table 5015 or the reservation list table 5020, based on the priority level in the associated predicted queuing profile, or some combination thereof. For example, the COE 130 may receive requests for service via the management system 5010, generate and prioritize dynamic queuing event profiles in response, and provide data to the management system 5010 corresponding to predicted queuing profiles. The management system 5010 may, for example, populate the tables 5015 and 5020 according to a priority and/or status determined by the COE 130 (e.g., depicted in the table 5025).

Accordingly, the central orchestration engine advantageously dynamically coordinated and prioritized request for service by service seeking entities for a service provider 5005. The COE 130 may, for example, be advantageously integrated with existing services, systems, and/or infrastructure. In various embodiments the COE 130 may, for example, replace the management system 5010.

Figure 51:
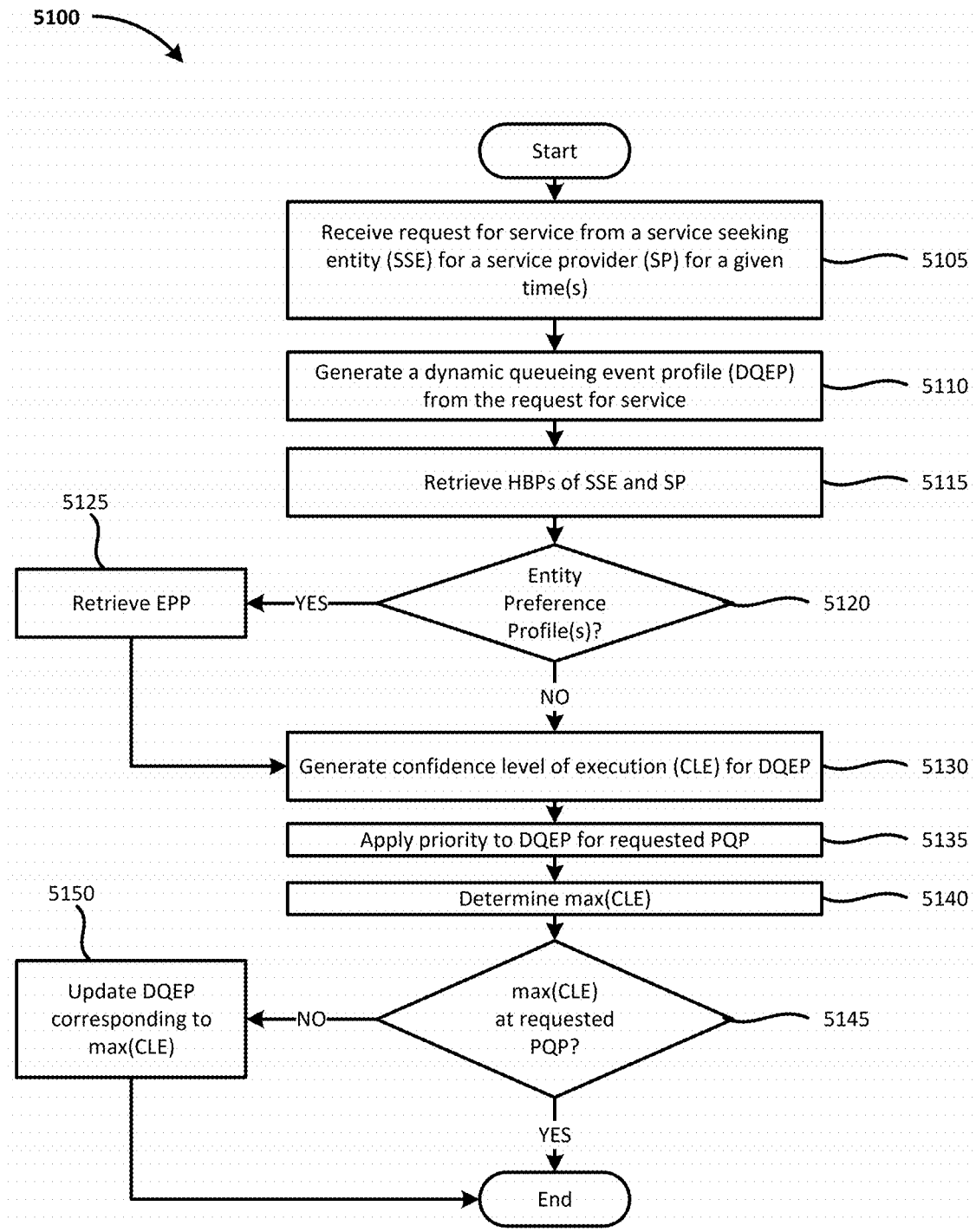
FIG. 51 depicts an exemplary method of dynamic prioritization.

FIG. 51 depicts an exemplary method of dynamic prioritization. In the depicted method 5100, a request for service is received 5105 from a service seeking entity requesting service from a service provider at a given time. The request for service may, for example, be received by the COE 130. The request for service may be received from the service seeking entity, may be received via the service provider, or some combination thereof. The request may, for example, be communicated via at least one user device (e.g., mobile device, laptop computer, web interface). The request for service may, for example, be transmitted to the COE 130 directly from the user's device, through a third-party (e.g., a management system, a reservation service).

In response to the request for service, a dynamic queuing event profile is generated 5110. At least one historical behavior profile corresponding to at least one of the service seeking entity and the service provider is retrieved 5115. The historical behavior profile may, for example, be retrieved from the data store of HBPs 4910 via the HBPE 160. If at least one entity preference profile is associated 5120 with at least one of the entities (e.g., the service provider, the service seeking entity), then the associated entity preference profile(s) is retrieved 5125 (e.g., from the EPPs 4920 data store).

A confidence level of execution is then generated 5130 for the dynamic queuing event profile based on the historical behavior profile(s) and the entity preference profile(s). If no entity preference profile exists, then the confidence level of execution is generated 5130 based at least on the historical behavior profile(s). In some embodiments if no historical behavior profile exists for the service provider and/or the service seeking entity, then a historical behavior profile(s) may be generated. For example, the historical behavior profile may be generated and contain at least an identifier of the entity and an association with the dynamic queuing event profile. In various embodiments the HBPE 160 may, for example, update the historical behavior profile(s) with an outcome of the dynamic queuing event (e.g., cancellation, successfully execution, time of execution, wait time until execution, no show).

Once the confidence level of execution is generated 5130 for the dynamic queuing event profile, a priority is applied 5135 to the dynamic queuing event profile for a predicted queuing profile for the service provider at the time requested by the service seeking entity. For example, the priority may be determined as a function of the confidence level of execution. In various embodiments a higher confidence level of execution (e.g., relative to other dynamic queuing event profiles associated with the predicted queuing profile) may correspond to a higher priority in the queue. Accordingly, the service provider may advantageously allocate service and/or other resources to those most likely to benefit from it.

A maximum possible confidence level of execution is determined 5140 for the dynamic queuing event profile. For example, the historical behavior profile of the service provider may correlate to a tendency of the service provider to have a wait time of approximately five minutes. The historical behavior profile of the service seeking entity may correlate to a tendency of the service seeking entity to be approximately ten minutes late. Accordingly, a maximum confidence level of execution of the requested service represented by the dynamic queuing event profile may correspond to a predicted queuing profile for a time ten minutes after the time requested by the service seeking entity.

If the maximum confidence level of execution corresponds 5145 to a time other than the predicted queuing profile associated with the requested time, then the dynamic queuing event profile is updated 5150 to (additionally) correspond to a second predicted queuing profile for the time associated with the maximum confidence level of execution and the process ends. If the maximum confidence level of execution corresponds 5145 to the predicted queuing profile associated with the requested time, then the process ends.

In various embodiments further steps may update the historical behavior profile based on the behavior of the service seeking entity and/or the service provider associated with the dynamic queuing event profile. For example, attributes of the dynamic queuing event profile (wait time, time of day requested, date requested, how far in the future the request was made, outcome of the dynamic queuing event, party size requested, party size which arrived for service, time of arrival for service, wait time, customer satisfaction) may be extracted by the HBPE 160. The HBPE 160 may, for example, update the corresponding historical behavior profile(s) as a function of the extracted attributes.

For example, various embodiments the HBPE 160 may apply machine learning algorithms (e.g., classifiers, neural networks) to the dynamic queuing event profile, predicted queuing profile(s), the historical behavior profile(s), or some combination thereof, to update the historical behavior profile(s). Accordingly, the historical behavior profile of an entity may be advantageously updated to accurately reflect behavior of the entity. Accordingly, the DQE 155 and/or the ECE 165 may advantageously increase in accuracy of predicting confidence level of execution and/or prioritizing a queue.

In various embodiments the DQE 155 and/or the ECE 165 may include machine learning algorithms including, by way of example and not limitation, classifiers, neural networks, supervised learning, unsupervised learning, or some combination thereof. For example, historical dynamic queuing event profiles may be used in a training mode to generate a set of training requests for service corresponding to known outcomes of the request. At least one machine learning algorithm may be applied to the set(s) of training requests to generate a dynamic queue prioritization model (e.g., by and/or for application by the DQE 155) and/or an execution confidence model (e.g., by and/or for application by the ECE 165). Historical dynamic queuing event profiles may, for example, be used to generate at least one set of test requests for service.

A generated model(s) may be applied to the set(s) of test requests for service. The corresponding historical dynamic queuing event profiles may further be used to generate known test outcomes of the request for service. Outputs (e.g., prioritization, confidence level of execution) generated by the model(s) when applied to the set(s) of test requests for service may be compared to the corresponding set(s) of test outcomes. If the difference between the output and the set(s) of test outcome is below at least one (predetermined) training accuracy threshold, then the model may be considered trained and may, for example, be applied in production. If the difference is above the training accuracy threshold(s), then training steps may be repeated until the model may be considered trained. Accordingly, the COE 130 may advantageously predict execution and/or prioritize queues based on historical behavior profiles.

Figure 52:
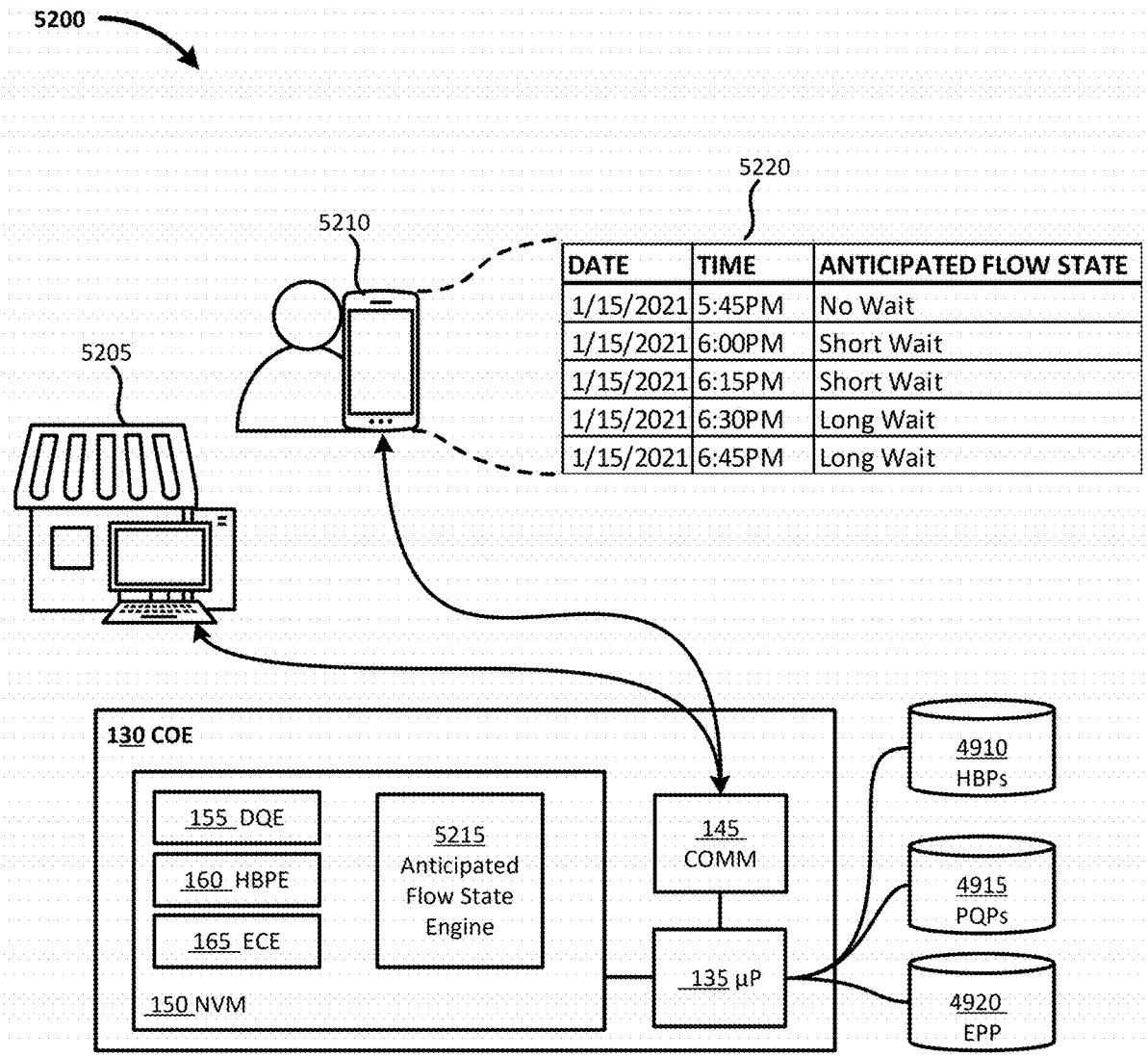
FIG. 52 depicts an exemplary anticipated flow state (AFS) provided to a user depicting an exemplary AFS profile generated by an exemplary AFS engine for an exemplary service provider.

FIG. 52 depicts an exemplary anticipated flow state (AFS) provided to a user depicting an exemplary AFS profile generated by an exemplary AFS engine for an exemplary service provider. In the depicted scenario 5200, a service provider 5205 communicates with the COE 130 via the communication module 145 using at least one computing device. A service seeking entity 5210 corresponds with the COE 130 via a smartphone. The service seeking entity 5210 may, for example, inquire about service from the service provider 5205 at a time of 6:15 PM on Jan. 15, 2021. For example, the service seeking entity 5210 may, for example, not actually want to request service (yet), but may want to determine if an expected (e.g., predicted) wait time is acceptable at a desired time. The entity 5210 may, for example, wish to choose another time and/or other service provider if the wait time is unacceptable.

Accordingly, the COE 130 receives the inquiry (e.g., as a 'tentative' request for service). The processor 135 operates an anticipated flow state engine (AFSE) 5215 (e.g., embodied as a program of instructions on at least one memory module) to determine an anticipated flow state (AFS) of the service provider at the requested time and surrounding times. The COE 130 may generate a display and/or provide data used in generating a display for the user corresponding to an anticipated flow state of the service provider at multiple times corresponding to the time of service requested in the inquiry from the entity 5210. In the depicted example, the requesting entity 5210 is provided with a display 5220 of anticipated flow state at the requested time (6:15 PM) and times (e.g., determined by queue intervals, such as in an entity preference profile for the service provider 5205) before and after the requested time. Accordingly, the entity 5210 may advantageously determine whether to request service at the requested time based on a predicted wait time. For example, the entity 5210 may choose to request service at 5:45 PM (30 minutes earlier than originally considered) to have no expected wait for service (e.g., which may provide a 'guaranteed' reservation).

The anticipated flow state engine 5215 may interact with the DQE 155, the HBPE 160, the ECE 165, or some combination thereof. For example, the anticipated flow state engine may determine an anticipated flow state at a particular time as a function of historical behavior profile(s) (HBPs 4910) of the service provider 5205 and/or the entity 5210, PQPs 4915 corresponding to the particular time, EPPs 4920 of the service provider 5205 and/or the entity 5210, or some combination thereof.

The anticipated flow state engine 5215 may, for example, determine an anticipated flow state as a function of predicted queuing profile(s) associated with and/or surrounding the requested time. The predicted queuing profile(s) may be determined by the DQE 155 based at least on a confidence level(s) of execution determined by the ECE 165 for dynamic queuing event profile(s) associated with the predicted queuing profile(s). The confidence level(s) of execution may be a function at least of historical behavior profiles for the corresponding service seeking entities and the service provider 5205. Accordingly, the anticipated flow state engine 5215 may advantageously predict an expected experience of the entity 5210 as a function of historical behavior and/or preferences of the service provider 5205, entity 5210, other service seeking entities, or some combination thereof.

Figure 53:
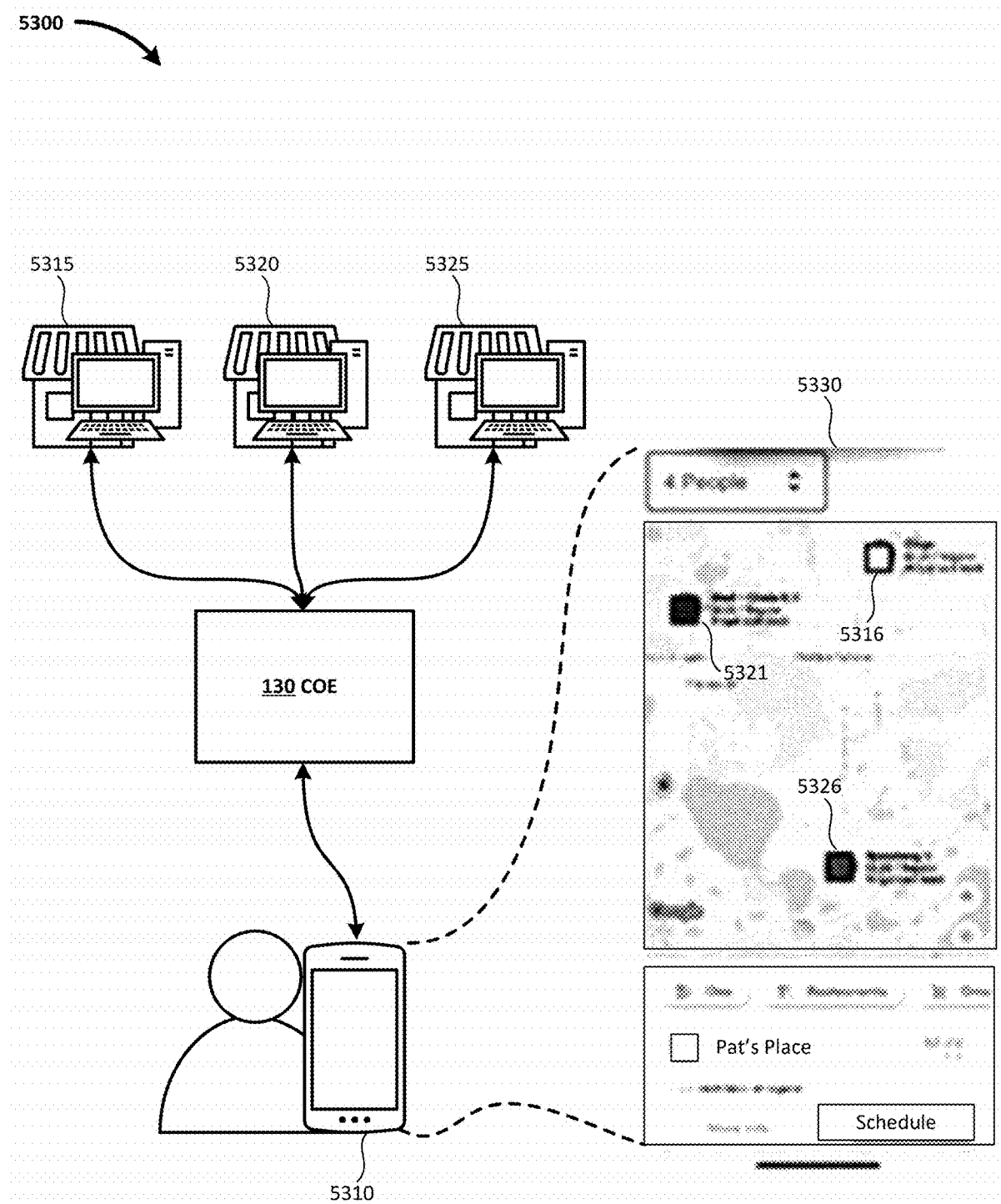
FIG. 53 depicts an exemplary display generated by the central orchestration engine depicting AFSs for exemplary service providers.

FIG. 53 depicts an exemplary display generated by the central orchestration engine depicting AFSs for exemplary service providers. In the depicted example 5300, a service seeking entity 5310 communicates with the COE 130 via a mobile device. Service providers 5315, 5320, and 5325 communicate with the central orchestration engine using respective (networked) computing devices. The entity 5310 may, for example, request a geographically distributed list of service providers matching certain attributes. The entity 5310 may, for example, further request an anticipated flow state of the service providers. For example, the entity 5310 may search (e.g., via a map interface) for fast-food restaurants within 5 miles of a given location (e.g., a current location, a planned location) for a given party size (e.g., 4 people, as depicted). The entity 5310 may, for example, request an anticipated flow state of thresholded restaurants at a given time (e.g., immediately in the future, at a given date/time in the future).

The COE 130 may determine (e.g., using the anticipated flow state engine 5215) an anticipated flow state of each service provider 5315, 5320, and 5325, respectively at the requested time based at least on a historical behavior profile(s) of each service provider and/or the entity 5310, and data corresponding to the requested time (e.g., table availability, reservations, requests for service, current predicted queuing profiles and/or dynamic queuing event profiles). A geographical (e.g., map) display 5330 may then be generated containing visual indicia of the anticipated flow state of each service provider at the requested time.

As depicted, the display 5330 includes a visual indicium 5316 indicating a first anticipated flow state corresponding to the service provider 5315, a visual indicium 5321 indicating a second anticipated flow state corresponding to the service provider 5320, and a visual indicium 5326 indicating a third anticipated flow state corresponding to the service provider 5325. By way of example and not limitation, the visual indicum 5316 may correspond to a 'no wait' (e.g., service in 0-5 minutes) flow state, the visual indicium 5321 may correspond to a 'short wait' (e.g., service in 6-15 minutes) flow state, and the visual indicum 5326 may correspond to a 'long wait (e.g., service in 16+ minutes) flow state. In various embodiments flow state may, by way of example and not limitation, be given in expected wait time (e.g., minutes), in predetermined ranges (e.g., no wait, short wait, long wait), or some combination thereof.

The user may, for example, provide input (e.g., touch, tap, click) selecting the visual indicia 5316. The COE 130 and/or a program of instructions (e.g., an app) being executed on the mobile device of the entity 5310 may generate a (further) display depicting details of the service provider 5315 (e.g., name, address, phone, email, website, menu, prices, reviews, nearby locations). As depicted, the display generated may include a visual indicia (depicted as "Schedule") prompting the entity 5310 to submit a request for service (e.g., a scheduling request). Accordingly, the user may advantageously select a desired service provider with a desired and/or acceptable anticipated flow state and submit a request for service. The COE 130 may receive the request for service and generate a dynamic queuing event profile. The COE 130 may further dynamically prioritize the dynamic queuing event profile in at least one predicted queuing profile. The COE 130 may, for example, provide a reservation status (e.g., waitlist, guaranteed) to the user. In various embodiments the display 5330 may further include at least one visual indicium prompting the entity 5310 to change a time and/or location of inquiry, a party size, or some combination thereof, if desired.

Figure 54:
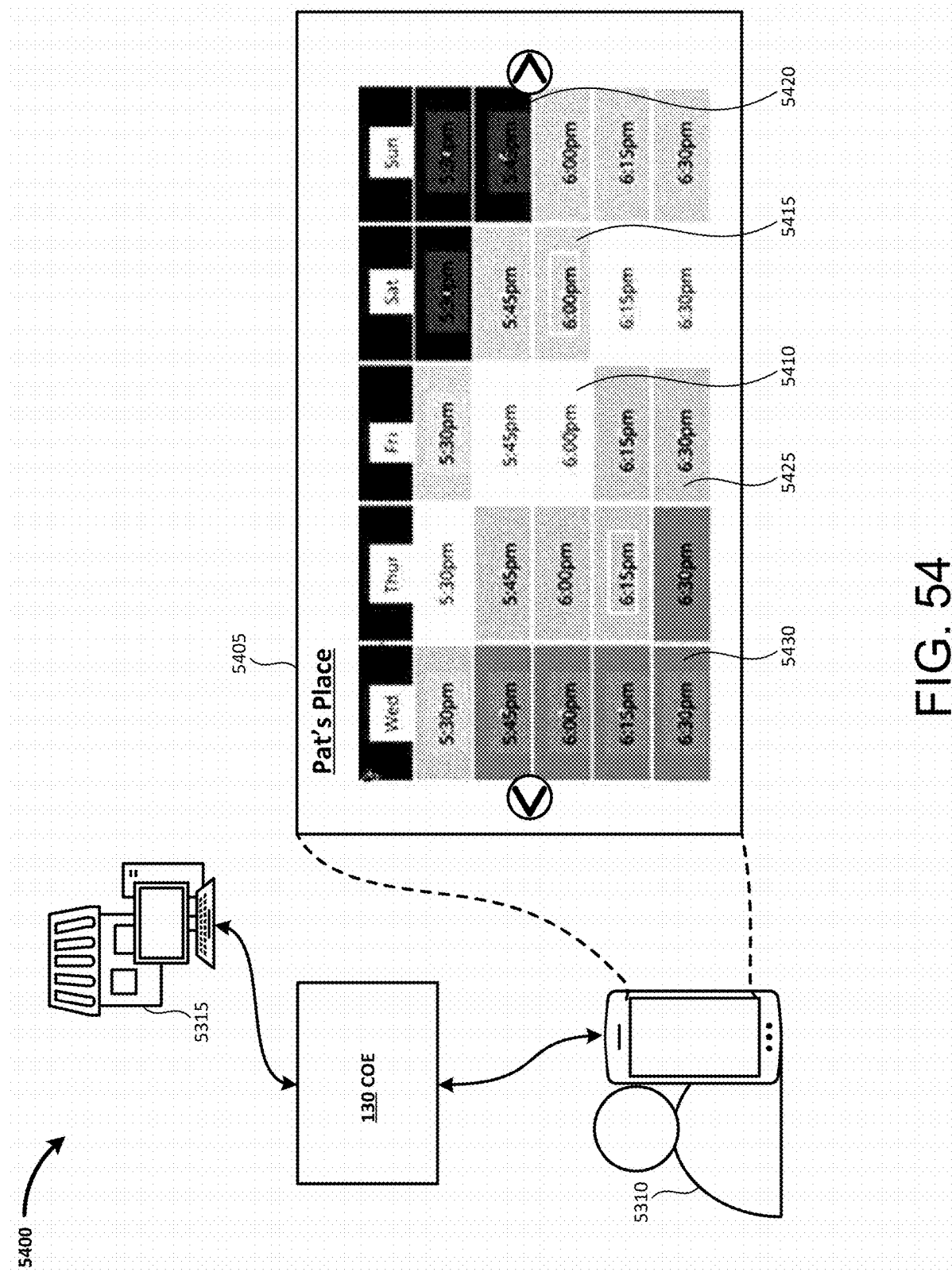
FIG. 54 depicts an exemplary display generated by the central orchestration engine depicting exemplary AFSs corresponding to future predicted queuing profiles of an exemplary service provider.

FIG. 54 depicts an exemplary display generated by the central orchestration engine depicting exemplary AFSs corresponding to future predicted queuing profiles of an exemplary service provider. In the depicted scenario 5400, the service seeking entity 5310 may inquire, through the COE 130 via the mobile device, about service from the service provider 5315 at a future time (e.g., later in the day, another day). The entity 5310 may, for example, on a Wednesday, desire to reserve guaranteed service with the service provider 5315 for 6:00 PM on the following Friday.

The COE 130 may, for example, generate a profile of anticipated flow states across multiple predicted queuing profiles. As depicted, the COE 130 generates a profile of anticipated flow states across predicted queuing profiles spanning from 30 minutes before to 30 minutes after the requested time across two days before the requested day to two days after the requested day. The COE 130, the mobile device of the entity 5310, and/or another computing device generates a display 5405 of the anticipated flow state profile for the service provider 5315. The display 5405 includes visual indicia of anticipated flow state at predicted queuing profiles included in the anticipated flow state profile. Accordingly, the entity 5310 may advantageously (e.g., at a glance) select a desired intersection of anticipated flow state (e.g., corresponding to expected wait time to service) and time/date.

For example, in the depicted example, the display 5405 indicates that 5:45 PM and 6:00 PM on Friday (as well as 5:30 PM Thursday and 6:15-6:30 PM Saturday) correspond to a first anticipated flow state 5410 (e.g., a wait of approximately 30 minutes which may, for example, be indicated by a yellow color). The display 5405 further indicates that 5:30 PM Friday, 5:45-6:00 PM Saturday, and 6:00-6:30 PM Sunday correspond to a second anticipated flow state 5415 (e.g., a wait of approximately 45 minutes which may, for example, be indicated by a darker yellow/mustard color). The display 5405 further indicates that 5:30 PM Saturday and 5:30-5:45 PM Sunday correspond to a third anticipated flow state 5420 (e.g., a wait of approximately 60 minutes which may, for example, be indicated by a red color). The display 5405 further indicates that 5:30 PM Wednesday and 5:45-6:15 PM Thursday correspond to a fourth anticipated flow state 5425 (e.g., a wait of approximately 15 minutes which may, for example, be indicated by a yellow-green color). The display 5405 further indicates that 5:45-6:30 PM Wednesday corresponds to a fifth anticipated flow state 5430 (e.g., a wait of approximately less than 5 minutes which may, for example, be indicated by a green color). As depicted, the display 5405 further includes left and right arrows which may serve as input prompts for the entity 5310 to browse other times and/or dates. Accordingly, the entity 5310 may advantageously quickly visually identify a desired time to request service.

For example, the entity 5310 may send a request for service (e.g., by tapping the corresponding time on an interface showing the display 5405) for 6:00 PM Wednesday. The COE 130 may generate a dynamic queuing event profile associated with the request and prioritize the dynamic queuing event profile into a guaranteed position in the corresponding predicted queuing profile for the service provider 5315. The entity 5310 may, for example, further send an indication in the request for service of a preferred time of 6:00 PM on Friday. The COE 130 may further associate the dynamic queuing event profile with a predicted queuing profile associated with the preferred time. The dynamic queuing event profile may, for example, be associated with a waitlist status in the predicted queuing profile for the preferred time.

As the predicted queuing profile is dynamically updated by the COE 130, if the dynamic queuing event profile is raised to a confidence level of execution corresponding to a guaranteed status, the COE 130 may provide the entity 5310 with the option of canceling from the queue for 6:00 PM Wednesday and confirming a reservation for 6:00 PM Friday. In response to a confirmation from the entity 5310, the COE 130 may disassociate the dynamic queuing event profile from the predicted queuing profile for 6:00 PM Wednesday and associate the dynamic queuing event profile with a guaranteed status for the predicted queuing profile of 6:00 PM Friday. Accordingly, the entity 5310 may advantageously join a waitlist for a desired time and secure a guaranteed time based on an anticipated flow state.

Figure 55:
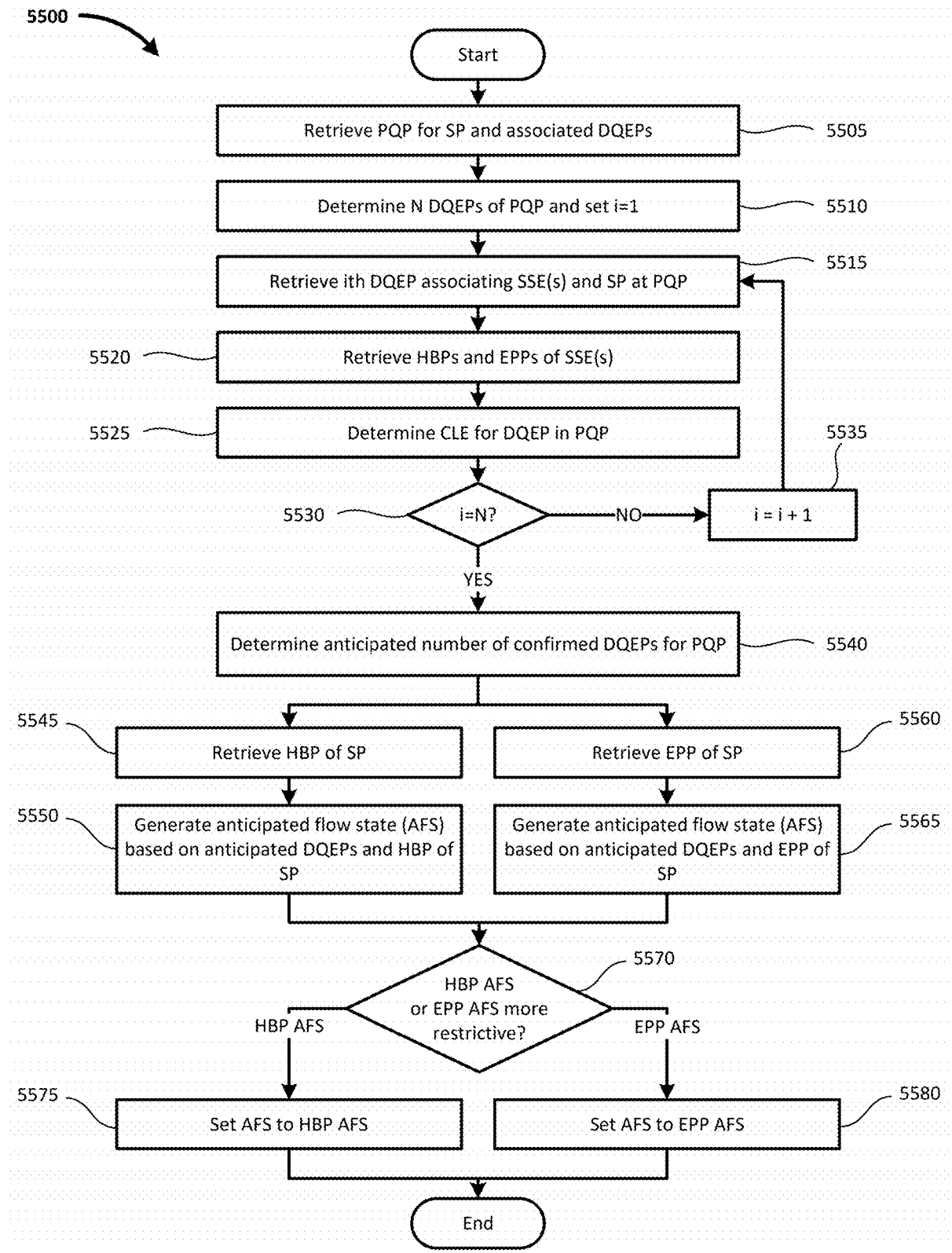
FIG. 55 depicts an exemplary method of generating an AFS.

FIG. 55 depicts an exemplary method of generating an AFS. In the depicted method 5500 a predicted queuing profile, and dynamic queuing event profiles associated therewith, are retrieved 5505 (e.g., from PQPs 4915 data store by the DQE 155 and/or the anticipated flow state engine 5215) for a service provider. A number (N) of the dynamic queuing event profiles associated with the predicted queuing profile is determined 5510, and a counting variable (i) is initiated (set to 1 in the depicted example).

The dynamic queuing event profile associated with the current value of the counting variable is retrieved 5515 and at least one corresponding service seeking entity is determined. At least one historical behavior profile and/or entity preference profile associated with the at least one service seeking entity is retrieved 5520 (e.g., by the HBPE 160, from the data store of HBPs 4910, from data store of EPPs 4920). A confidence level of execution is determined 5525 (e.g., by the ECE 165) for the currently selected dynamic queuing event profile based on the retrieved historical behavior profile(s) and/or entity preference profile(s). Each determined confidence level of execution may, for example, be associated with the corresponding dynamic queueing event profile.

If the counting variable does not equal N 5530 (e.g., all dynamic queuing event profiles associated with the predicted queuing profile have not been considered), then the counting variable is incremented 5535 and the steps 5515 through 5530 are repeated. Once the counting variable equals N 5530 (e.g., all the dynamic queuing event profiles associated predicted queuing profile the been considered), then an anticipated number of confirmed dynamic queuing event profiles are determined 5540. In various embodiments the anticipated number of confirmed dynamic queuing event profiles may correspond, by way of example and not limitation, to a number of dynamic queuing event profiles having a confidence level of execution above a (predetermined) confidence threshold. Accordingly, an expected actual demand for service at the time represented by the predicted queuing profile may be advantageously predicted.

In the depicted example, at least one historic behavior profile associated with the service provider is retrieved 5545. An anticipated flow state is then generated 5550 based on the anticipated confirmed dynamic queueing event profiles (e.g., at least as a function of the corresponding confidence levels of execution) and the historic behavior profile of the service provider. Further, at least one entity preference profile of the service provider is retrieved 5560, and an anticipated dynamic queueing event profile is generated 5565 based on the anticipated confirmed dynamic queueing event profiles and the entity preference profile (e.g., maximum allowed wait time preference, inventory denoted as available).

If the anticipated flow state generated as a function of the historic behavior profile of the service provider is more restrictive 5570 (e.g., indicating a busier flow state/lower inventory of available service resources) than the anticipated flow state generated as a function of the entity preference profile of the service provider, then the anticipated flow state generated as a function of the historic behavior profile is used to set 5575 the anticipated flow state of the service provider for the predicted queuing profile. If the reverse is true (the entity preference profile based anticipated flow state is more restrictive then the historic behavior profile based anticipated flow state), then the anticipated flow state generated as a function of the entity preference profile is used to set 5580 the anticipated flow state of the service provider for the predicted queuing profile. Accordingly, an anticipated flow state may be advantageously dynamically determined for a service provider for a predicted queuing profile (e.g., corresponding to a future time). In some embodiments the anticipated flow state may be directly set as a function of the both the entity preference profile(s) and the historic behavior profile(s) of the service provider.

In various embodiments the method 5500 may be repeated for other predicted queuing profiles. The display 5405 may, by way of example and not limitation, be generated using results of the method 5500 for a predicted queuing profile associated with each displayed time (queue). In various embodiments the method 5500 may be subsequently repeated for a predicted queuing profile to dynamically update the associated anticipated flow state.

Figure 56:
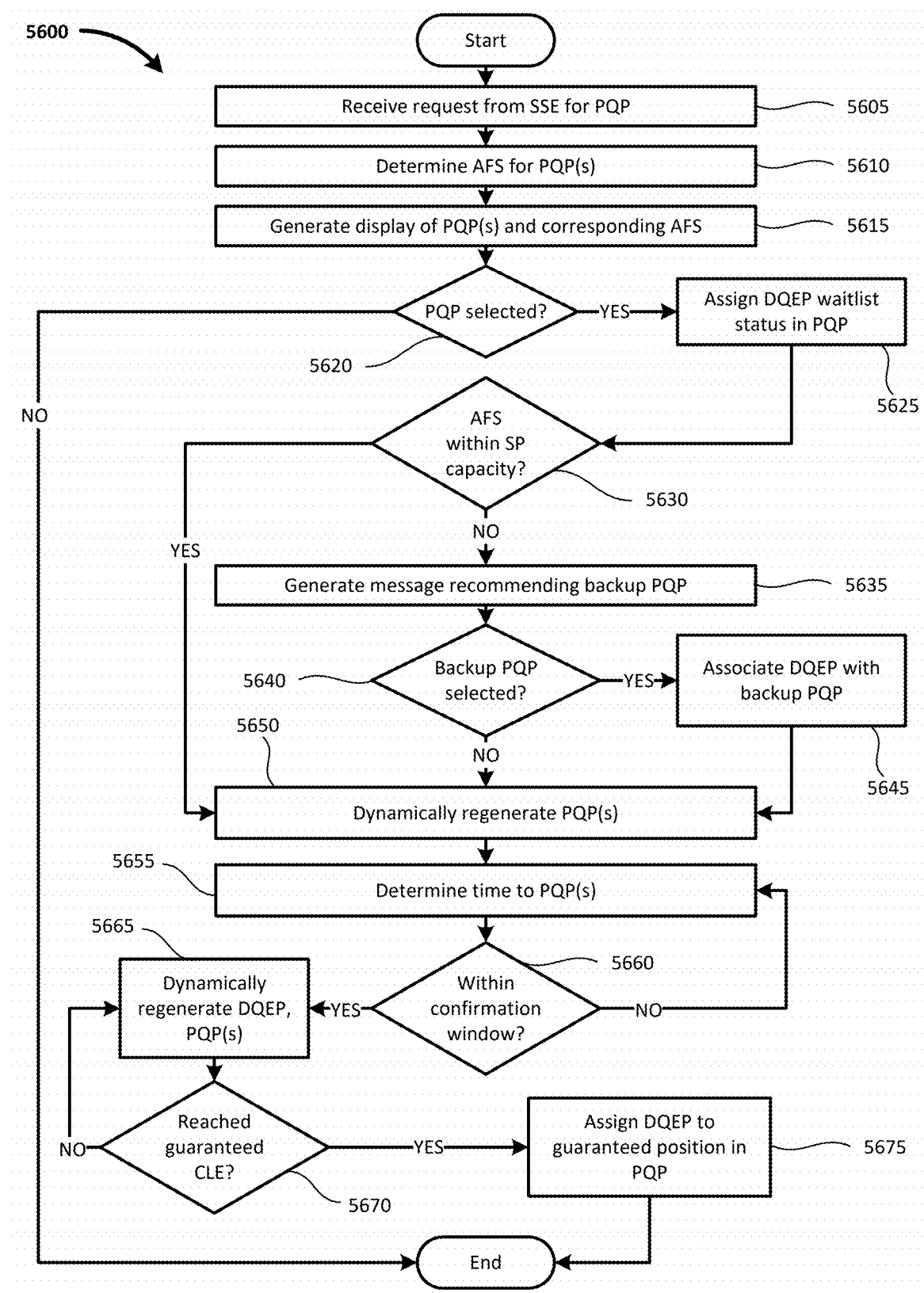
FIG. 56 depicts an exemplary method of dynamic prioritization and queue recommendations based on AFSs.

FIG. 56 depicts an exemplary method of dynamic prioritization and queue recommendations based on AFSs. In the depicted method 5600, a request is received 5605 from a service seeking entity for at least one particular predicted queuing profile (e.g., a specific time with at least one specific service provider). In various embodiments a dynamic queueing event profile may, for example, be generated in response to the request for service. An anticipated flow state is determined 5610 for the predicted queuing profile(s) (e.g., using method 5500). A display is generated 5615 of available predicted queuing profile(s) and a corresponding anticipated flow state of the service provider(s).

If no input signal is received 5620 indicating that the service seeking entity has selected at least one predicted queuing profile, then the method ends. If an input signal(s) is received 5620 indicating that the service seeking entity has selected at least one predicted queuing profile (e.g., corresponding to an anticipated flow state more restrictive than a predetermined 'guaranteed' status threshold), then a waitlist status is assigned 5625 to the dynamic queueing event profile in the predicted queuing profile. If the anticipated flow state is not within a capacity of the service provider (decision point 5630) (e.g., as determined by an entity preference profile and/or historic behavior profile of the service provider), then a message (e.g., audio, text, video, popup) is generated 5635 for the service seeking entity recommending selection of a backup predicted queuing profile. In various embodiments, for example, the service seeking entity may be presented with one or more predicted queuing profiles which may be available (e.g., by proactively performing prioritization of a hypothetical request for service, by identifying unfilled predicted queuing profiles) for reservation (e.g., receiving a 'guaranteed' status).

If a signal(s) is received 5640 corresponding to a selection by the service seeking entity of a backup predicted queuing profile, then the dynamic queueing event profile is associated 5645 with the backup predicted queuing profile (e.g., with a 'guaranteed' status). Once the dynamic queueing event profile is associated with the backup predicted queuing profile(s) 5645, or no backup predicted queuing profile(s) is selected 5640, or if the anticipated flow state is within the service provider capacity (decision point 5630), then the selected predicted queuing profile(s) is dynamically regenerated 5650. In various embodiments each predicted queuing profile associated with the dynamic queueing event profile may, by way of example and not limitation, be regenerated in response to a change in priority, a cancelled request for service, a new request for service, a change in environment, a change in schedule of a service seeking entity, a change in historic behavior profile and/or entity preference profile of a service seeking entity and/or service provider associated with the predicted queuing profile(s), a change in confidence level of execution of a service seeking entity and/or service provider associated with the predicted queuing profile(s), or some combination thereof.

A time difference between the predicted queuing profile and a current time is (repeatedly) determined 5655 until the time difference is within a (predetermined) confirmation window 5660 (e.g., as determined by an entity preference profile(s) of the service provider and/or service seeking entity). In various embodiments the confirmation window may, for example, correspond to a (predetermined) window of time before the predicted queuing profile in which the service seeking entity may 'confirm' their reservation to achieve a higher confidence level of execution (e.g., which may correspond to a higher priority in the predicted queuing profile). Once the time until the predicted queuing profile is within the confirmation window 5660, then the dynamic queueing event profile and associated predicted queuing profiles are dynamically regenerated 5665. For example, the dynamic queueing event profile may be updated based on whether a signal(s) from the service seeking entity has been received confirming intent to appear at the requested time for service.

In various embodiments, by way of example and not limitation, dynamically regenerating predicted queuing profile(s) in step 5665 may include generating an updated confidence level of execution in the predicted queuing profile(s) regenerated in 5650, updating other predicted queuing profile(s) associated with the dynamic queueing event profile as a result of a change in confidence level of execution of the dynamic queueing event profile (e.g., if the dynamic queueing event profile is more likely to execute in a first predicted queuing profile, a confidence level of execution in a backup predicted queuing profile may be reduced), or some combination thereof.

If the confidence level of execution of the dynamic queueing event profile in the preferred predicted queuing profile has reached the threshold associated with a guaranteed status (decision point 5670) (e.g., after receiving confirmation from the service seeking entity, after cancellation of higher priority service seeking entities), then the dynamic queueing event profile is assigned 5675 a guaranteed status in the preferred predicted queuing profile, and the method ends. If the dynamic queueing event profile has not reached the threshold (decision point 5670), then steps 5650-5670 are repeated. Accordingly, a service seeking entity may, by way of example and not limitation, advantageously reserve a backup 'guaranteed' service time and join a (automatic) dynamic waitlist for a preferred service time.

In various embodiments a confidence level of execution corresponding to a guaranteed status in a predicted queuing profile may, by way of example and not limitation, be predetermined or dynamic. For example, some embodiments may offer a guaranteed status if certain attributes are present and/or within one or more corresponding predetermined thresholds. In various embodiments attributes may include, by way of example and not limitation, availability of service resources such as relative to resource availability thresholds set in an entity preference profile, confidence level of execution at time of reservation such as based on the service seeking entity's historic behavior profile, loyal customer of the service provider, VIP member status of the service seeking entity with the service provider and/or an orchestration service, or some combination thereof.

In various embodiments (with reference to FIG. 56, as well as embodiments regarding a confidence level of execution and/or dynamic prioritization such as embodiments disclosed at least with reference to FIGS. 48-55 and 57-70) a predicted queuing profile, dynamic queuing event profile, and/or confidence level of execution may, for example, be regenerated in response to receiving new information which may affect execution of a queuing event. For example, input may be provided from a service seeking entity automatically and/or manually regarding factors affecting execution of a planned queuing event represented in a dynamic queuing event profile. In various embodiments input may, by way of example and not limitation, include (continued) intent of the service seeking entity to execute the planned queuing event, scheduling changes of the service seeking entity and/or service provider surrounding the predicted queuing profile(s) associated with the dynamic queuing event profile (e.g., a previous meeting which is predicted to extend into the predicted queuing profile and/or to end without sufficient time for the service seeking entity to travel to a location associated with the requested service), geolocation (e.g., from the GLE 4925) indicating that the service seeking entity is within a geofence (e.g., predetermined in an entity preference profile of the service provider) indicative of ability and/or intent to execute the dynamic queuing event profile at the predicted queuing profile time, or some combination thereof.

Figure 57:
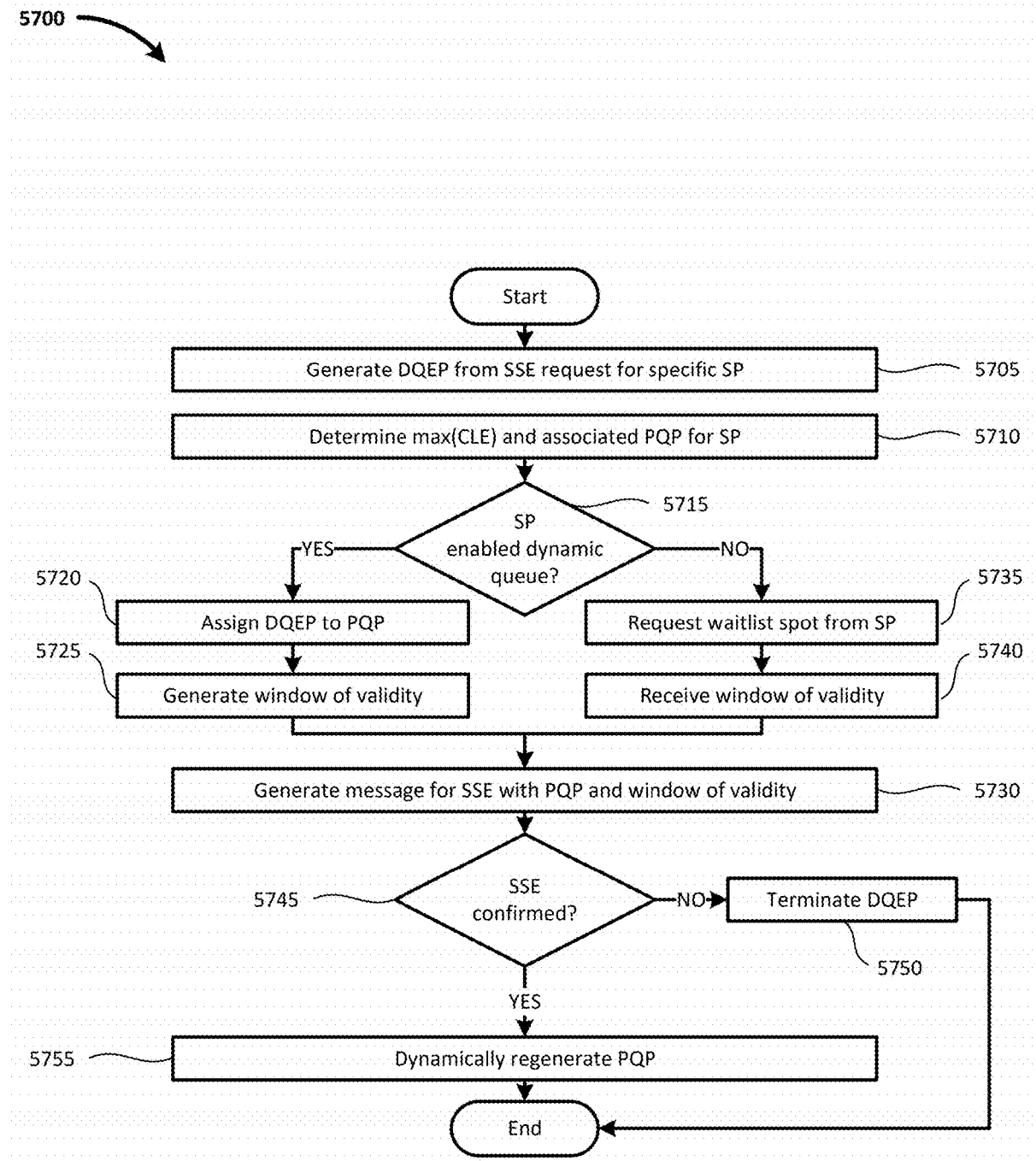
FIG. 57 depicts an exemplary method of generating a recommended soonest available queue for a service provider.

FIG. 57 depicts an exemplary method of generating a recommended soonest available queue for a service provider. In the depicted method 5700, a dynamic queuing event profile is generated 5705 from a request for service from a service seeking entity for a specific service provider. The request for service may, by way of example and not limitation, correspond to a request for soonest service. A maximum confidence level of execution is determined 5710 for the dynamic queuing event profile, and at least one predicted queuing profile of the service provider for the time(s) associated with the maximum confidence level of execution is associated with the dynamic queuing event profile.

In various embodiments the maximum confidence level of execution may be determined 5710 based on at least one historic behavior profile for the service provider and/or service seeking entity, at least one entity preference profile for the service provider and/or service seeking entity, other factors (e.g., geolocation, traffic, weather, service seeking entity loyalty, service seeking entity membership status, service seeking entity payment status), or some combination thereof. In various embodiments the dynamic queuing event profile may be (additionally) associated with predicted queuing profile(s) not associated with the maximum confidence level of execution. For example, in various embodiments (e.g., as disclosed with reference to FIGS. 1A-23), the dynamic queuing event profile may be associated with predicted queuing profile(s) with predicted queuing profile(s) within a specific (e.g., predetermined based on at least one entity preference profile, dynamically determined based on one or more entity preference profile and/or historic behavior profile) range of time surrounding the time corresponding to the maximum confidence level of execution.

If the service provider has enabled a dynamic queue 5715 (e.g., as determined by at least one parameter in an entity preference profile associated with the service provider) such that, for example, the COE 130 may manage the service provider's queues, then the dynamic queuing event profile is assigned 5720 to at least one predicted queuing profile. For example, the predicted queuing profile(s) (e.g., corresponding to the time of maximum confidence level of execution) which was associated with the dynamic queuing event profile in step 5710, may now, for example, be updated with the dynamic queuing event profile such that the dynamic queuing event profile is prioritized within the predicted queuing profile.

In various embodiments the dynamic queuing event profile may, by way of example and not limitation, be added with a predetermined status (e.g., waitlist, guaranteed, 'provisional' such as corresponding to a tentative reservation pending confirmation from the service seeking entity). Once the dynamic queuing event profile has been assigned 5720 to the predicted queuing profile(s), a window of validity is generated in a step 5725. The window of validity (step 5725) may, for example, correspond to a time period (e.g., defined in an entity preference profile of the service provider) in which a position of the service seeking entity in the predicted queuing profile(s) is reserved before removal of the dynamic queuing event profile from the predicted queuing profile(s).

If the service provider has not enabled a dynamic queue 5715, then a waitlist spot is requested 5735 from the service provider. In various embodiments, a waitlist reservation may be requested, by way of example and not limitation, by sending an electronic message (directly) to the service provider (e.g., SMS/MMS message, email, message via an electronic interface, audio/video recording), by communicating with a management system (e.g., 4930, 4950, 4960, 5010) such as, for example, by a predetermined electronic message and/or file, or some combination thereof. A window of validity is received 5740 (e.g., by electronic message) in response to the request sent in step 5735. In various embodiments, by way of example and not limitation, the service provider and/or management system may accept the request and reply with a window in which the service seeking entity must confirm the waitlist request in order to maintain a place in the queue, the service provider and/or management system may accept the request and the COE 130 may generate a window of validity based on an entity preference profile (e.g., of the service provider), or some combination thereof.

Once a window of validity is determined, a message is generated 5730 for the service seeking entity indicating a predicted queuing profile available (e.g., provisionally 'joined') and a window of validity in which the service seeking entity place in the queue (e.g., in a waitlist) may be reserved. If the service seeking entity does not confirm 5745 (e.g., as determined by lack of receipt of an electronic signal and/or message from a device of the service seeking entity), then the dynamic queuing event profile is terminated 5750 and the method ends. If the service seeking entity confirms 5745 (e.g., as determined by receipt of an electronic message from a device of the service seeking entity), then the predicted queuing profile is dynamically regenerated 5755 (e.g., corresponding to an increased confidence level of execution corresponding to confirmation of the request, corresponding to a guaranteed status of the dynamic queuing event profile) and the method ends.

Accordingly, in various embodiments a service seeking entity may advantageously be provided with a soonest available time to join a predicted queuing profile. In various embodiments the service seeking entity may request a specific anticipated flow state (e.g., no wait), maximum predicted wait time (e.g., less than 15 minutes), best available wait time at a specific time (e.g., lowest wait time in 30 minutes), or some combination thereof. Such attributes of the request may, for example, be submitted with the request for service (e.g., through an electronic interface), be determined from entity preference profile of the service seeking entity, or some combination thereof. In various embodiments (additional) steps may, by way of example and not limitation, include determining a confidence level execution from geolocation, subsequent confirmation from the service seeking entity (e.g., within a predetermined time window before the time of the predicted queuing profile), or some combination thereof.

Figure 58:
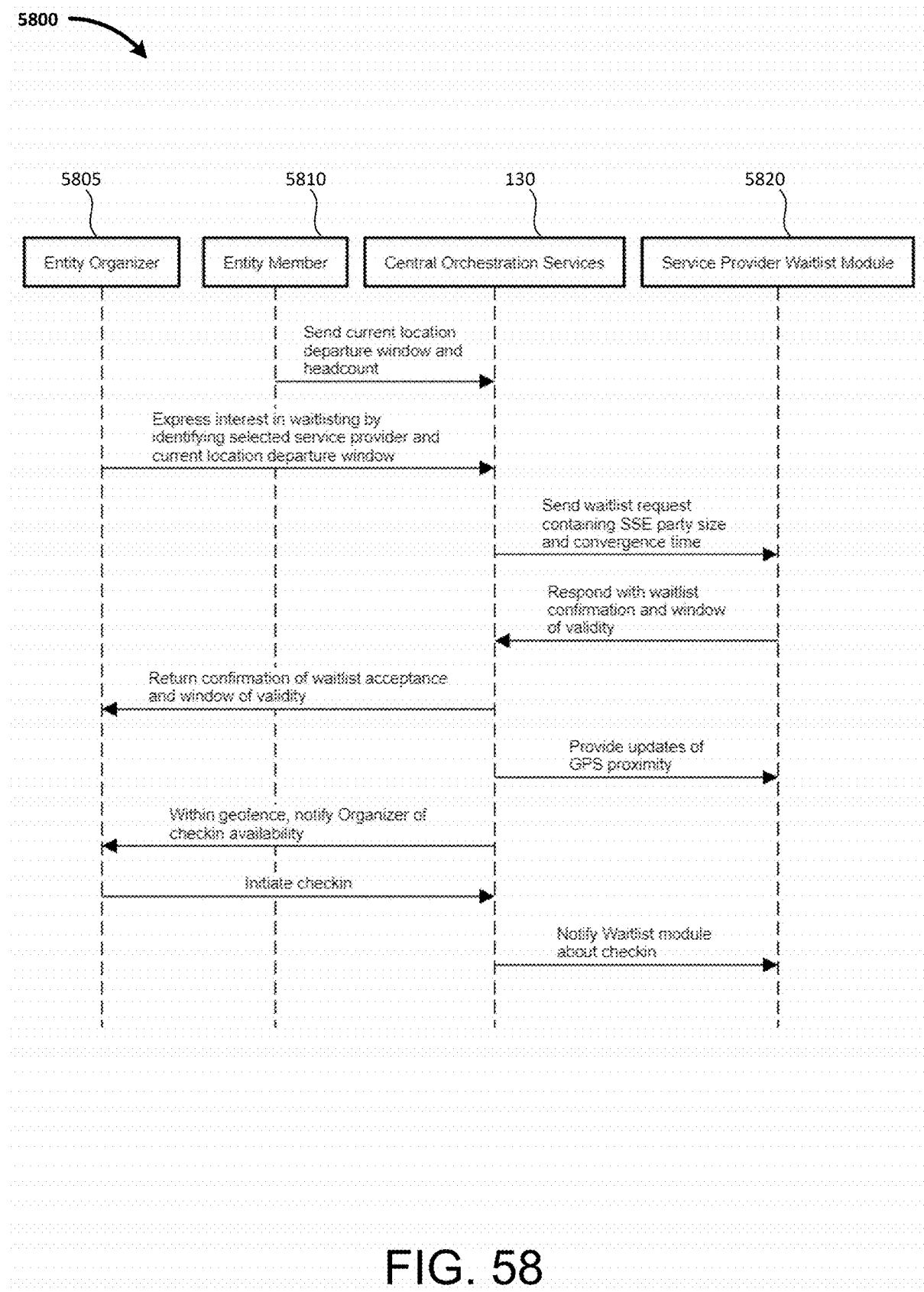
FIG. 58 is a swim lane diagram depicting an exemplary process of dynamically generating and updating a predicted queuing profile for an exemplary service provider.

FIG. 58 is a swim lane diagram depicting an exemplary process of dynamically generating and updating a predicted queuing profile for an exemplary service provider. In the depicted process 5800, a service seeking entity may include multiple members (e.g., a multi-person party). At least one member may serve as the organizer 5805 of the entity. A member 5810 (e.g., a family of 4) of the entity may send (e.g., using a computing device such as a smartphone running an app) their current location (e.g., via geolocation), expected time window for departure to a location at which service is requested, and an expected headcount for the member (e.g., 4 persons). The organizer 5805 may than express an intent to waitlist (e.g., a request for service) to the COE 130 by identifying the selected service provider and an expected departure window from the current location (e.g., manually identified and/or automatically determined by geolocation).

The COE 130 may generate a dynamic queuing event profile and/or determine an associated predicted queuing profile (e.g., as disclosed at least with reference to steps 5705-5715 of method 5700). The COE 130 generates and sends a waitlist request (e.g., via an electronic message and/or file according to a predetermined format) to a waitlist module 5820 of the service provider (e.g., managed by the COE 130, managed by a third-party management system, (locally) managed by the service provider) containing a (expected) party size of the service seeking entity and an expected convergence time. In various embodiments the expected convergence time may be, by way of example and not limitation, determined by geolocation of the service provider and/or entity members, determined based on entity preference profile(s) of the service seeking entity member(s), determined based on historic behavior profile(s) of the service seeking entity member(s), or some combination thereof.

The waitlist module 5820 response to the waitlist confirmation and a window of validity of the confirmation (e.g., as disclosed at least with reference to steps 5725 and 5740 of method 5700). The COE 130 returns a confirmation of the waitlist acceptance and the window of validity to the entity organizer 5805. The COE 130 monitors location of at least one member of the entity (e.g., using the GLE 4925) and provides corresponding updates of the proximity as determined by at least one GPS system to the waitlist module 5820.

When the entity is within a predetermined geo-fence (e.g., set by the service provider in at least one entity preference profile), the COE 130 notifies the entity organizer 5805 of availability of check-in to the queue. For example, the COE 130 may enable check-in (e.g., using mobile device of the organizer 5805) when at least some members of the entity are within a predetermined zone (e.g., 1 mile, 5 miles, 10 miles, in a shopping center, in a parking lot, 10 minutes of expected drive time) around the location of the service provider. The entity organizer 5805 initiates check-in (e.g., by sending an electronic message and/or signal to the COE 130). Accordingly, the COE 130 notifies the waitlist module 5820 that the entity has checked in for the queue.

In various embodiments the COE 130 may, for example, update the predicted queuing profile based on geolocation and/or input (e.g., check-in) from the entity. In various embodiments the process 5800 may advantageously enable a multi-member entity to coordinate service with a desired service provider at a predetermined time.

Figure 59:
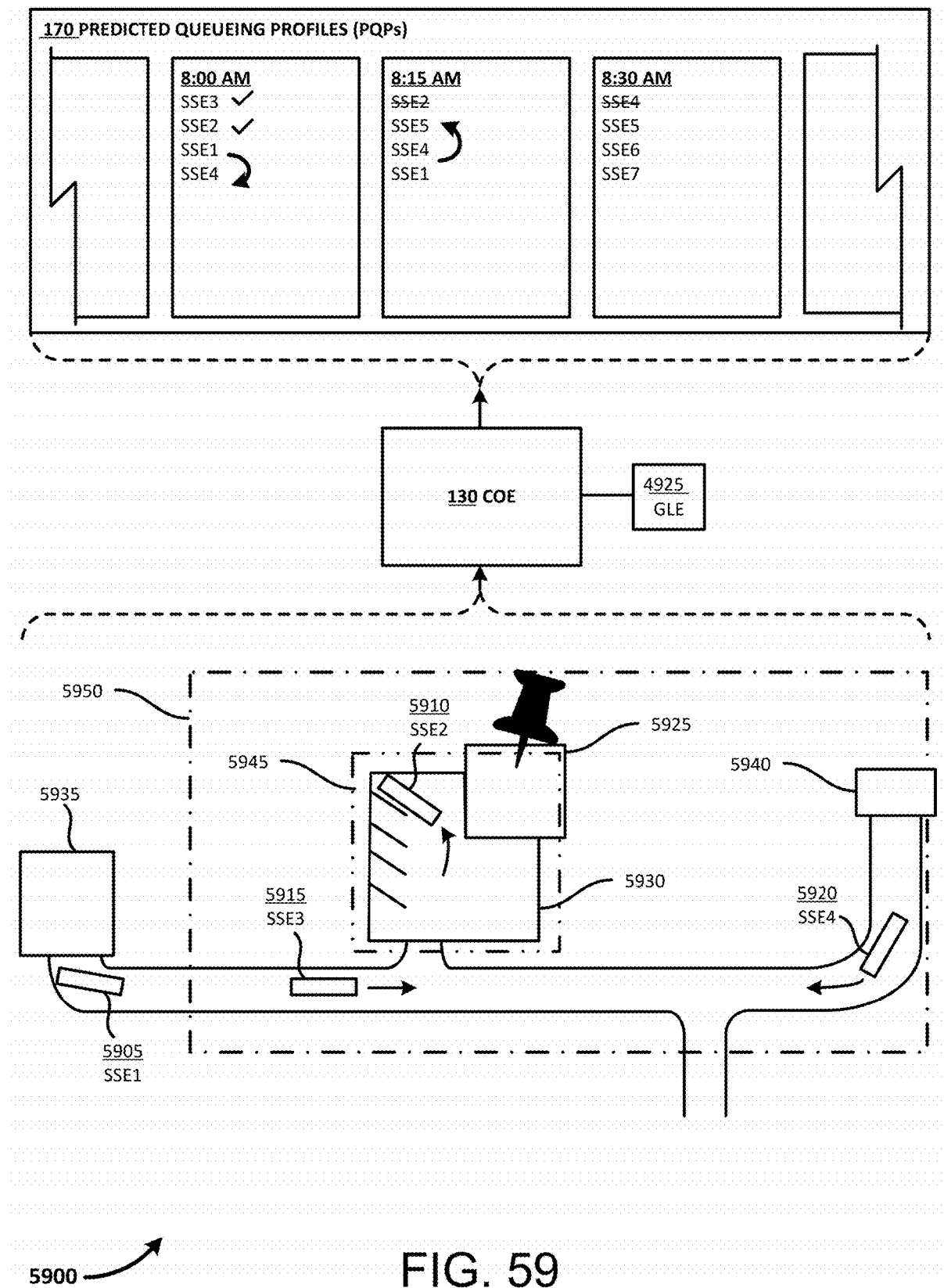
FIG. 59 depicts exemplary predicted queuing profiles generated for an exemplary service provider using an exemplary geolocation engine.

FIG. 59 depicts exemplary predicted queuing profiles generated for an exemplary service provider using an exemplary geolocation engine. In the depicted scenario 5900, a first service seeking entity 5905, a second service seeking entity 5910, a third service seeking entity 5915, and a fourth service seeking entity 5920 may all have requested service at 8:00 AM from a service provider 5925. The COE 130 has generated predicted queuing profiles 170 (e.g., stored in the PQPs 4915 data store) corresponding to the requested time (8:00 AM) and surrounding times (8:15 AM and 8:30 AM). The service provider 5925 may, for example, have enabled dynamic queue prioritization by the COE 130. The scenario 5900 may, for example, represent the locations of the service seeking entities 5905-5920 at approximately 7:55 AM.

As depicted, the second service seeking entity 5910 has just pulled into a parking lot 5930 of the service provider 5925. The first service seeking entity 5905 has not yet left a current location 5935 (e.g., a residence). The GLE 4925 may, for example, determine that a drive time from the location 5940 to the service provider 5925 may take approximately 10 minutes. Because the service seeking entity 5905 is not capable of arriving at the requested time of 8:00 AM, the COE 130 regenerates the predicted queuing profile for 8:00 AM and lowers the service seeking entity 5905 ("SSE1") in priority (e.g., due to a regenerated confidence level of execution which may, for example, be zero). However, the service seeking entity 5905 may have (recently) confirmed the request for service. In the confirmation, the service seeking entity 5905 may, for example, have indicated that the service seeking entity 5905 is running about 10 minutes late.

The COE 130 may, for example, determine based on a historic behavior profile of the service seeking entity 5905 that the service seeking entity 5905 is historically about 15 minutes late, but no later. Accordingly, the COE 130 also regenerates the predicted queuing profile for 8:15 AM to raise the priority of the service seeking entity 5905 (e.g., based on an increased confidence level of execution for the 8:15 AM predicted queuing profile based on confirmation received from the service seeking entity 5905, the historic behavior profile of the service seeking entity 5905, and geolocation of the service seeking entity 5905 as being able to reach the service provider 5925 by 8:15 AM). The historic behavior profile of the service seeking entity 5905 may indicate that the service seeking entity 5905 never shows up beyond 15 minutes after the requested time. Accordingly, the confidence level of execution for 8:30 AM may be so low (e.g., zero, below a (predetermined) threshold) that the dynamic queueing event profile of the service seeking entity 5905 is not associated with the predicted queuing profile for 8:30 AM.

Because the second service seeking entity 5910 is in the parking lot 5930, the COE 130 regenerates the predicted queuing profile for 8:00 AM to indicate that the service seeking entity 5910 is actually keeping the request for service (as indicated by the check mark). The GLE 4925 may, for example, determine that the service seeking entity 5910 is in the parking lot 5930 based on a geofence 5945

(e.g., predetermined in an entity preference profile of the service provider) around the parking lot 5930.

The COE 130 further removes the service seeking entity 5910 from the predicted queuing profile associated with 8:15 AM (as depicted by the strikethrough). For example, the historic behavior profile of the service seeking entity 5910 may have caused a confidence level of execution to be approximately equal at 8:00 AM and 8:15 AM. The geolocation information confirming arrival at 8:00 AM may alter the relative confidence levels of execution. Accordingly, because the service seeking entity 5910 has arrived at 8:00 AM, then the dynamic queueing event profile of the service seeking entity 5910 is removed from the predicted queuing profile for 8:15 AM.

The COE 130 determines by geolocation (e.g., using GLE 4925) that the third service seeking entity 5915 is within an outer geofence 5950 and is approaching the geofence 5945, and is expected to be within the geofence 5945 well before 8:00 AM (e.g., within 1 minute). The COE 130 may also, for example, have received recent confirmation from the service seeking entity 5915 of an intent and/or ability to keep the request for service at 8:00 AM. Accordingly, the COE 130 may regenerate the predicted queuing profile by assigning the dynamic queueing event profile of the service seeking entity 5915 ("SSE3") a status associated with certainty (e.g., indicated by the check mark) for the 8:00 AM predicted queuing profile. For example, the COE 130 may regenerate the predicted queuing profile based on an increased confidence level of execution for the service seeking entity 5915 as a function of being within the outer geofence 5950 and/or having provided confirmation of intent and/or ability to keep the request for service (e.g., when within the outer geofence 5950).

The fourth service seeking entity 5920 has departed from a location 5940 (e.g., another retail location and/or a business office). The COE 130 determines by geolocation that the service seeking entity 5920 could possibly arrive in time for 8:15 AM. However, the service seeking entity 5920 may have not confirmed the request for service within a confirmation window. Furthermore, geolocation indicates that the service seeking entity 5920 may turn left before reaching the geofence 5945. Accordingly, the confidence level of execution remains low at 7:55 AM. For example, the historic behavior profile of the service seeking entity 5920 may indicate that it is highly likely that the service seeking entity 5920 will not keep the request for service (e.g., at all and/or in association with not confirming). The historic behavior profile may, for example, indicate that it is likely for the service seeking entity 5920 to turn left (e.g., to go to another location at the requested time).

Furthermore, the COE 130 may determine based on geolocation (e.g., because the service seeking entity 5920 is in route and within 10 minutes of the service provider 5925) that if the service seeking entity 5920 is going to keep the request for service, the service seeking entity 5920 will arrive by 8:15 AM. The COE 130 may further determine that the confidence level of execution for 8:30 AM is now below a predetermined threshold. For example, if the service seeking entity 5920 proceeds to the service provider 5925, they will arrive by 8:15 AM, but if not, they are not coming to the service provider 5925 (e.g., they turned left and went to another location). Accordingly, the COE 130 regenerates the predicted queuing profile for 8:30 AM and removes the dynamic queueing event profile of the service seeking entity 5920.

Accordingly, various embodiments may advantageously permit a service provider to prioritize service to service seeking entities based on dynamically prioritized queues. Various embodiments may, for example, advantageously allow the service provider to allocate resources (e.g., tables, seats, staff, food, beverages, equipment) based on predetermined confidence level of execution thresholds. Various embodiments may, for example, advantageously allow service seeking entities to have a high probability of receiving service at an actual time of arrival. Accordingly, various embodiments may, by way of example and not limitation, advantageously enable service providers and/or service seeking entities to adjust their behavior such that service seeking entities may receive service tailored specifically to their characteristics (e.g., by historic behavior profiles and/or entity preference profiles).

Figure 60:
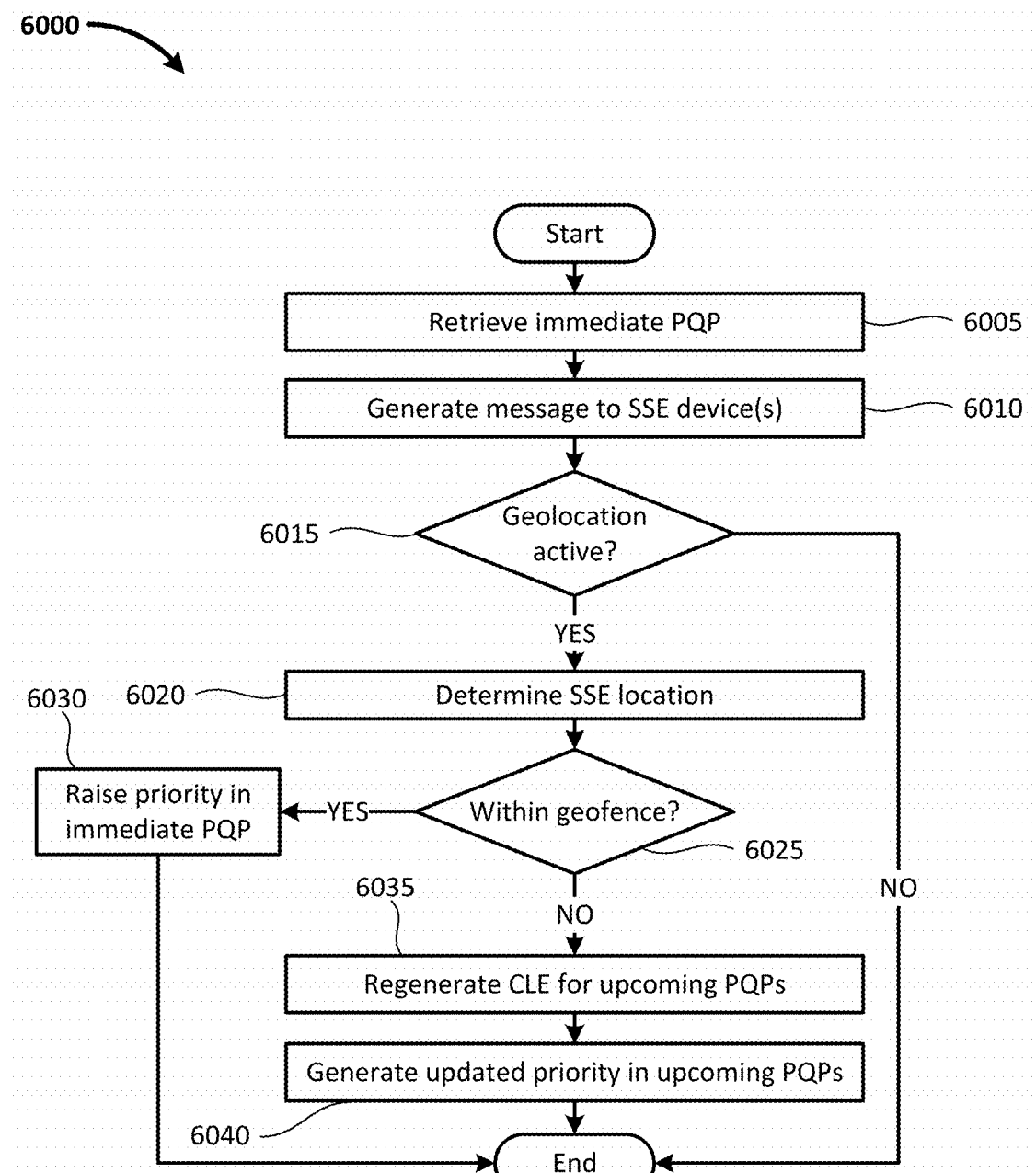
FIG. 60 depicts an exemplary method of regenerating a predicted queuing profile based on geolocation.

FIG. 60 depicts an exemplary method of regenerating a predicted queuing profile based on geolocation. In the depicted method 6000, a predicted queuing profile is retrieved 6005. The predicted queuing profile may, by way of example and not limitation, be an "immediate" predicted queuing profile (e.g., corresponding to a time within a 'now'/confirmation threshold/window such as within 5, 10, 30 minutes). A (electronic) message is generated 6010 and transmitted to a (mobile) device of the service seeking entity. The message may, by way of example and not limitation, include a request for current location (e.g., geographic coordinates), permission to access location (e.g., through a third-party service), an identifier for determining location through a geolocation engine (e.g., a third-party service, GLE 4925), or some combination thereof. The message may, by way of example and not limitation, include a 'wake' and/or status message to determine if service seeking entity device is active (e.g., if an app communicating with the COE 130 is active), to initiate communication with the device of the service seeking entity, to determine if geolocation services are enabled and/or active on the device of the service seeking entity, or some combination thereof.

If geolocation is not active 6015, the method ends. For example, the predicted queuing profile may not be able to be updated based on geolocation. In various embodiments further steps may include sending an electronic message to the service seeking entity (e.g., using an alternative device, seeking confirmation of intent and/or ability to keep the request for service), reducing the confidence level of execution of the dynamic queueing event profile in the predicted queuing profile, or some combination thereof. If geolocation is active 6015, then the location of the service seeking entity is determined 6020 (e.g., using GLE 4925).

If the location of the service seeking entity is within a (predetermined) geofence 6025, then a confidence level of execution of the dynamic queueing event profile for the predicted queuing profile may be increased (e.g., by the ECE 165). The priority of the dynamic queueing event profile is raised 6030 in the predicted queuing profile (e.g., by the DQE 155), and the method ends.

If the location of the service seeking entity is not within the geofence 6025, then a confidence level of execution is (re)generated 6035 for the dynamic queueing event profile for one or more subsequent predicted queuing profiles. For example, the dynamic queueing event profile may be associated with and/or updated in relation to predicted queuing profile(s) for times in which, based on geolocation, the service seeking entity would be able and/or expected to arrive at the location of service. In various embodiments the confidence level of execution of the dynamic queueing event profile in the current (immediate') predicted queuing profile may be reduced and/or the dynamic queueing event profile may be removed from the current predicted queuing profile.

Once the confidence level(s) of execution is regenerated 6035 for the dynamic queueing event profile for subsequent predicted queuing profile(s), an updated priority is generated 6040 for the dynamic queueing event profile in those predicted queuing profile(s) based on the regenerated confidence levels of execution. Accordingly, queues for a service provider(s) may be advantageously dynamically prioritized based on geolocation of a service seeking entity(ies).

Figure 61:
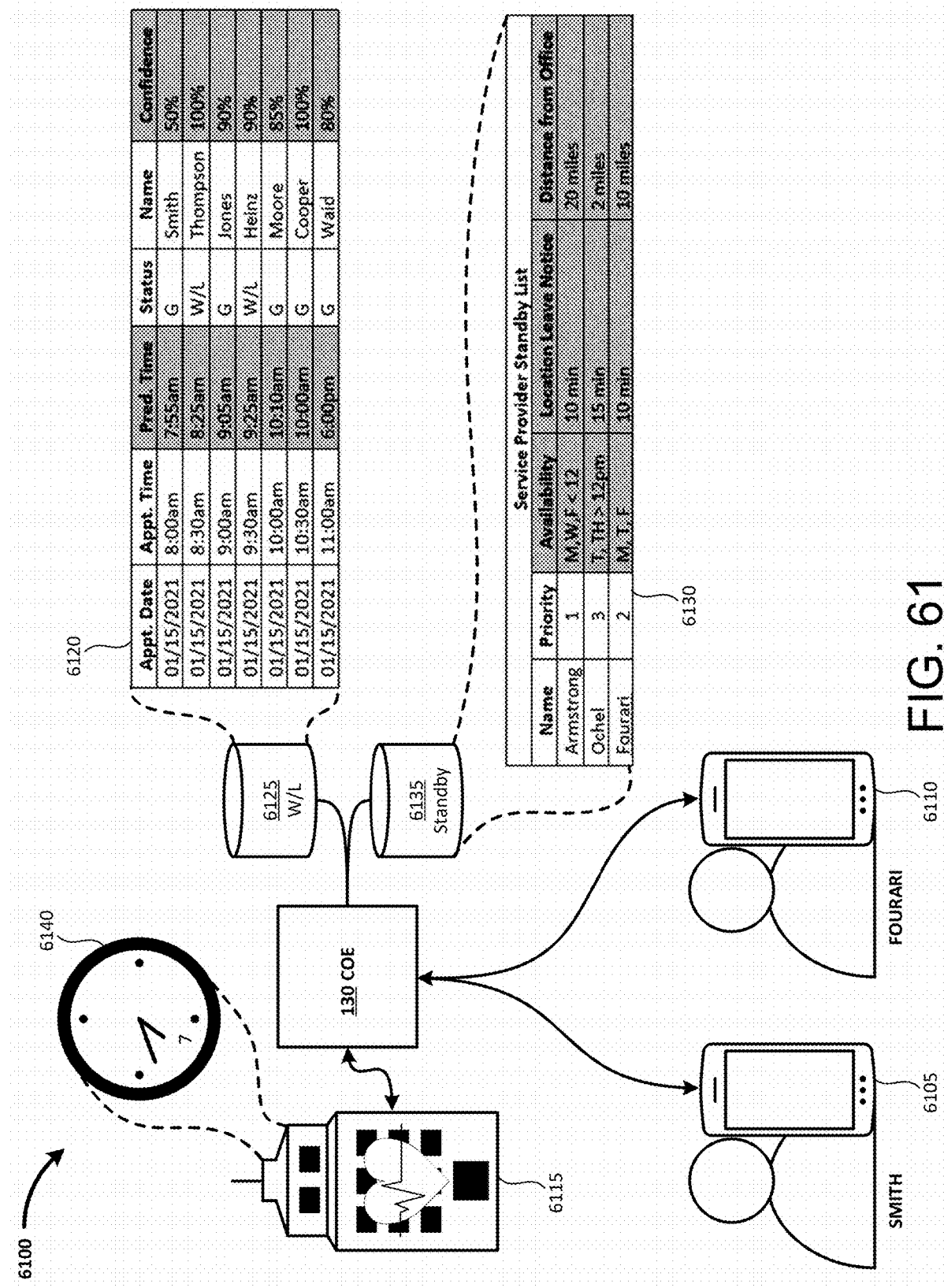
FIG. 61 depicts an exemplary standby list generated by the central orchestration engine.

FIG. 61 depicts an exemplary standby list generated by the central orchestration engine. In the depicted scenario 6100, a first service seeking entity 6105 ("Smith") has reserved service from a service provider 6115 (e.g., a healthcare provider) through the COE 130 (e.g., via a mobile device) 8:00 AM on Jan. 15, 2021. A second service seeking entity ("Fourari") 6110 has also requested service on Jan. 15, 2021. The central orchestration engine is maintaining a waitlist 6120 in at least one data store 6125. The waitlist 6120 may, for example, be configured as disclosed at least with reference to table 5025 of FIG. 50.

The COE 130 may, for example, determine that there is no availability to add service seeking entity 6110 to the waitlist 6120. As depicted, the waitlist 6120 includes dynamic queueing event profiles that fill the capacity of the service provider 6115 (e.g., as determined by at least one entity preference profile of the service provider 6115 which may set one appointment available every 30 minutes from 8:00 AM to 11:00 AM), at least for predicted queuing profiles of times requested by the service seeking entity 6110.

The service seeking entity 6110 may request (e.g., in response to prompt(s) from the COE 130) to be added to a standby list 6130 maintained by the COE 130 in a data store 6135 for the service provider 6115. In the depicted example, the standby list 6130 includes the name of the service seeking entity, their priority in the standby list (e.g., based on a confidence level of execution for a predicted queuing profile to be proposed, based on entity preference profiles of the service seeking entity and/or the service provider, based on order of joining the standby list), an availability profile, a time required for notice before being able to leave a current location, and a distance from the service provider 6115.

In various embodiments the availability profile may include at least one day (e.g., in any given week, specific date ranges) in which the service seeking entity may be available to be added to a predicted queuing profile. The availability profile may include at least one time range in the available day(s) in which the service seeking entity may be available to be added to a predicted queuing profile. In various embodiments the location leave notice may correspond to a time required from notice of availability of a predicted queuing profile until the service seeking entity may leave their current location (e.g., logout, lock a door). The time required for notice may, for example, be manually provided by the service seeking entity, be determined from an entity preference profile (e.g., entered by the user previously, determined by machine learning from a historic behavior profile), be determined from a historical behavior profile (e.g., dynamically based on machine learning), or some combination thereof.

In the depicted example, the service seeking entity 6110 is available on Mondays, Thursdays, and Fridays during business hours of the service provider 6115, requires (approximately) 10 minutes notice before departure, and is typically located about 10 miles away. At a time 6140 of 7:40 AM, an 8:00 AM appointment of the service provider 6115, the service seeking entity 6105 may cancel their appointment for 8:00 AM (e.g., via the COE 130 and/or contacting the service provider 6115). Accordingly, the service provider 6115 now has an opening on Jan. 15, 2021, for 8:00 AM.

Because Jan. 15, 2021, is a Friday and the time is before 12:00 PM, a dynamic queuing event profile for a service seeking entity "Armstrong" has highest priority in the standby list 6130. However, Armstrong is located 20 miles from the office. The COE 130 may, for example, determine (e.g., by applying a standard travel time per mile factor, using a geolocation engine such as 4925 to determine a travel time based on a location associated with the standby list 6130 and/or in an entity preference profile of the service seeking entity Armstrong) an estimated travel time of approximately 20 minutes from Armstrong's location to the service provider 6115. In combination with the location with Armstrong's location leave notice time of 10 minutes, Armstrong may be predicted to arrive at 8:10 AM, after the appointment time of 8:00 AM.

Accordingly, the COE 130 may determine not to contact Armstrong and so may move to the next available service seeking entity in order of priority. The COE 130 may, therefore, determine that the service seeking entity 6110 is available. For example, the COE 130 may determine an estimated travel time of 10 minutes for the service seeking entity 6110. The combined leave notice time and travel time may thereby be estimated at 20 minutes, which would allow the service seeking entity 6110 to arrive on time for the proposed appointment at 8:00 AM.

The COE 130 may, therefore, associate the dynamic queuing event profile of the service seeking entity 6110 with the 8:00 AM predicted queuing profile of the service provider 6115. The COE 130 may generate and transmit an electronic message notifying the service seeking entity 6110 of the availability of the appointment time. The COE 130 may, for example, request confirmation from the service seeking entity 6110 before updating the predicted queuing profile for 8:00 AM of the service provider 6115.

Accordingly, in various embodiments a service provider may advantageously fill a canceled appointment time without losing time and/or opportunity by manually contacting people from a separate standby list. A service seeking entity may advantageously receive an earlier appointment than expected within the parameters of their schedule. A service seeking entity may advantageously not be bothered by offers of canceled appointment times which the service seeking entity is clearly unable to avail themselves of. In some embodiments a canceling service seeking entity may advantageously avoid a late cancellation fee because the service provider is able to fill the canceled appointment.

Figure 62:
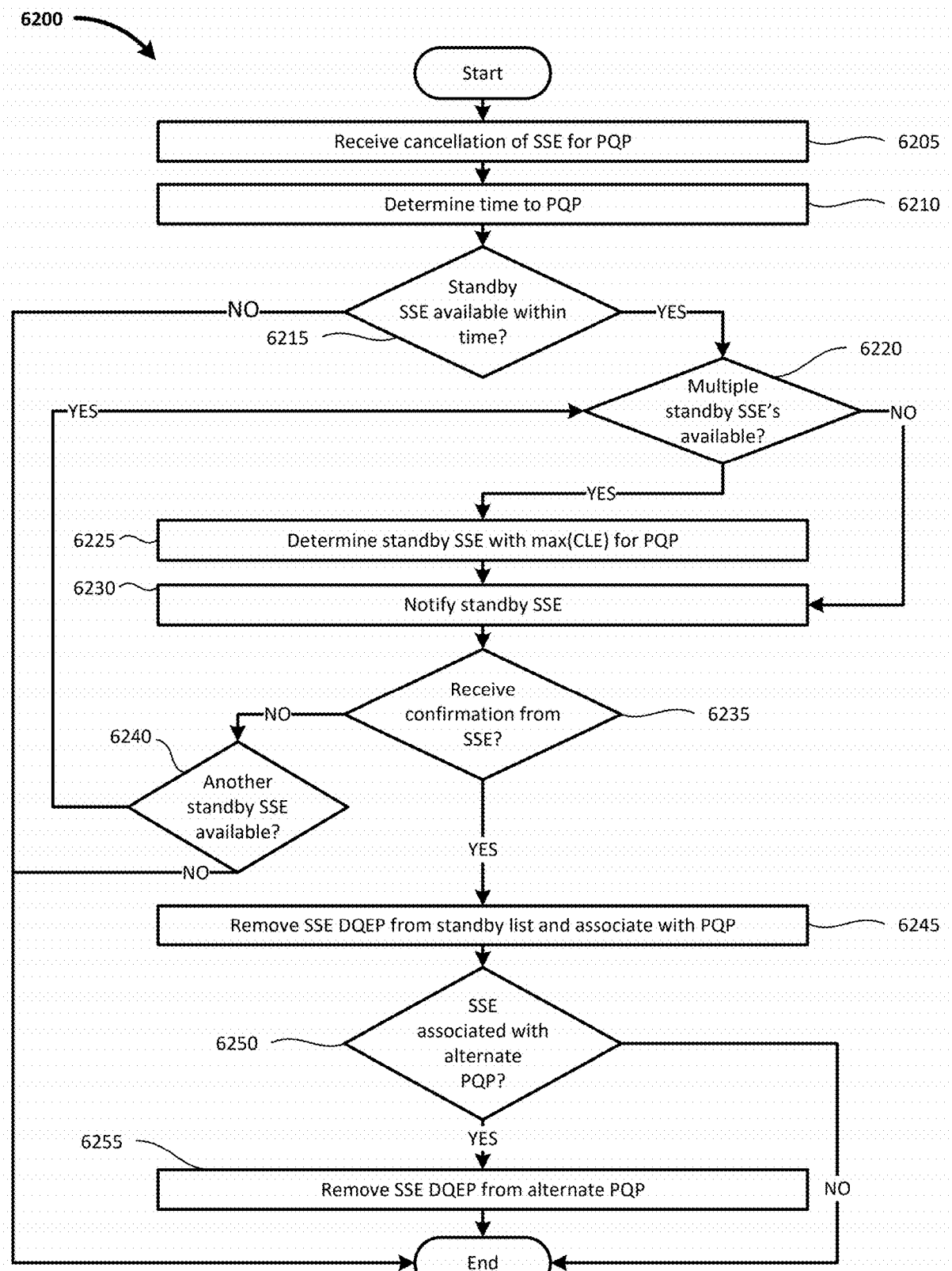
FIG. 62 depicts an exemplary method for dynamically merging a waitlist into available queuing profiles.

FIG. 62 depicts an exemplary method for dynamically merging a waitlist into available queuing profiles. In the depicted method 6200, a cancellation of the request for service for a service seeking entity is received 6205 for at least one predicted queuing profile. For example, a cancellation signal, message, and/or file may be manually generated by the service seeking entity, may be manually and/or automatically generated by the service provider (e.g., in response to contact and/or lack of contact from the service seeking entity), may be automatically generated by the central orchestration engine (e.g., in response to a confidence level of execution below a predetermined threshold), or some combination thereof.

A time remaining to the predicted queuing profile is determined 6210. If no dynamic queuing event profile for a service seeking entity is available 6215 for the service provider (e.g., on a standby list 6130 maintained in the data store 6135) with an availability profile (e.g., time, date, location/estimated travel time, notice time) indicating availability of the standby service seeking entity for the predicted queuing profile associated with the canceled request for service for the predicted queuing profile, then the method ends. If a standby service seeking entity is available 6215, and if multiple standby service seeking entities are available 6220, then a standby service seeking entity having a dynamic queuing event profile with a maximum confidence level of execution for the predicted queuing profile is determined 6225. The confidence level of execution for each of the multiple standby service seeking entities available may, by way of example and not limitation, be determined based on priority in the standby list, historical behavior profile(s), entity preference profile(s), availability profile(s) (e.g., travel time+notice time within a safety factor) or some combination thereof.

Once a service seeking entity having a maximum confidence level of execution for the predicted queuing profile is determined 6225, or if only one standby service seeking entity is available 6220, then the selected standby service seeking entity is notified 6230 (e.g., via electronic message). If confirmation is not received 6235 from the selected service seeking entity and if no other standby service seeking entity is available 6240, then the method ends (e.g., the cancellation is not replaced). If confirmation is not received 6235 from the selected service seeking entity and if another standby service seeking entity is available 6240, then steps 6220 through 6235 are repeated. If confirmation is received 6235 from the service seeking entity, then the dynamic queueing event profile of the service seeking entity is removed 6245 from the standby list and added to the predicted queuing profile.

If the dynamic queueing event profile of the service seeking entity is also associated 6250 with another predicted queuing profile (e.g., as a backup time selected by the service seeking entity when placed on the standby list), then the dynamic queueing event profile of the service seeking entity is removed 6255 from the alternate predicted queuing profile (e.g., because the dynamic queueing event profile is now added to a sooner, preferred predicted queuing profile). Accordingly, in various embodiments a cancellation may advantageously be filled and/or a service seeking entity may advantageously receive a sooner (e.g., more preferred) service time.

Figure 63:
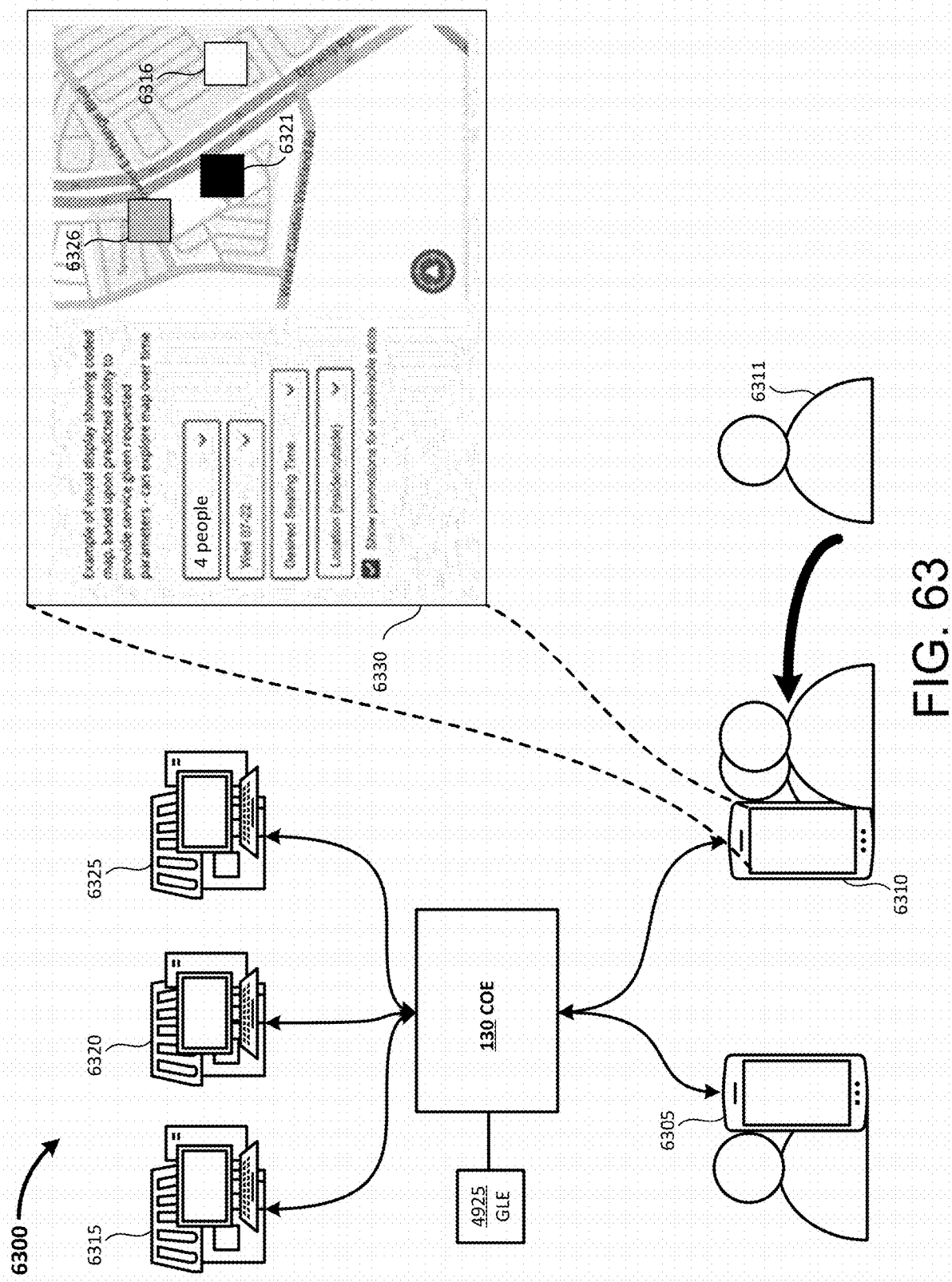
FIG. 63 depicts an exemplary display of available service providers based on AFS and geolocation for an exemplary ad hoc social network formed using the central orchestration engine.

FIG. 63 depicts an exemplary display of available service providers based on AFS and geolocation for an exemplary ad hoc social network formed using the central orchestration engine. In the depicted scenario 6300, a first individual 6305, a couple 6310, (e.g., spouses, friends), and a second individual 6311 (e.g., friend, associate, family member of the couple 6310) may form a single service seeking entity (e.g., a social network group). At least some members of the service seeking entity may, for example, communicate using the COE 130. For example, the social network group (the service seeking entity) may be formed using the COE 130 by communication of the individual 6305 and the couple 6310 with the central orchestration engine. The individual 6311 may communicate directly with the couple 6310. The couple 6310 may, for example, be an entity organizer.

For example, the entity members 6305, 6310, and 6311 may wish to arrange a casual dinner on Wednesday, July 22. The entity organizer 6310 may, for example, request service on behalf of the service seeking entity via the COE 130. The request for service may, by way of example and not limitation, include the specific type of service requested (e.g., casual dining), a requested geographical region (e.g., a specific town, within a specific distance of a given location such as a selected location or a current location of the user 6310), a desired date and/or time, and/or a number of persons in the group (e.g., manually added/update and/or determined automatically by the COE 130) via the COE 130.

In response to the request for service, the COE 130 may, for example, determine that service providers 6315, 6320, and 6325 are potential matches for the request for service. For example, the service providers 6315-6325 may be Italian food restaurants within the requested geographical region. Accordingly, the COE 130 may generate a response to a device of the user 6310 such that a display 6330 is generated on the device of the member 6310. As depicted, the display 6330 includes a map view of the requested region, current parameters of the request for service (e.g., the date, the number of people, a seating time, and a location in a service provider). The display 6330 further includes geographically distributed visual indicia 6316, 6321, and 6326 corresponding to the service providers 6315, 6320, and 6325, respectively. The visual indicia 6316-6326 may, for example, indicate an anticipated flow state of the corresponding service providers at the requested time (e.g., color coded). In some embodiments a display similar to 6330 may be used to generate the input for the request for service (e.g., an interactive map interface with input fields for parameters of the request for service).

The member 6305 may, for example, submit a time range of availability for joining the entity, input requests (e.g., desired service provider, desired menu items) which may, for example, be viewed and/or acted upon by the organizer 6310 and/or directly by the COE 130. In various embodiments the member 6305 and/or member 6311 may also view the display 6330. In various embodiments the COE 130 may, for example, receive inputs of availability and/or location of the members 6305-6311 (e.g., current locations, expected locations prior to the time of requested service) and (automatically) suggest and/or assign a predicted queuing profile for the dynamic queueing event profile generated for the request for service of the multi-party service seeking entity.

In various embodiments the COE 130 may, for example, determine a confidence level of execution for the dynamic queueing event profile in relation to at least one requested, suggested, and/or expected predicted queuing profile (e.g., as disclosed at least with reference to methods 5100, 5500, 5600, 5700, 6000, 6200). In various embodiments the COE 130 may, for example, determine an expected convergence time of the members 6305-6311 of the service seeking entity. The COE 130 may, for example, determine an expected convergence time based on geolocation using at least the GLE 4925. In various embodiments the COE 130 may, by way of example and not limitation, determine a confidence level of execution for each entity member (6305, 6310, and/or 6311) and/or a combined confidence level of execution for the entity based on historic behavior profiles and/or entity preference profiles of the service provider, member(s) of the service seeking entity, and/or of the multi-member service seeking entity itself.

In various embodiments the COE 130 may, for example, determine a confidence level of execution of the entity and/or members thereof based on geolocation (e.g., expected travel time). The COE 130 may, by way of example and not limitation, request confirmation of each member in at least one predetermined window before the time of a predicted queuing profile associated with the dynamic queueing event profile, request confirmation of size of the party in at least one predetermined window before the time of a predicted queuing profile associated with the dynamic queueing event profile, (re)generate a confidence level of execution of each member and/or of the service seeking entity as a whole based on geolocation of one or more members of the service seeking entity, or some combination thereof.

Various embodiments may advantageously allow creation and/or management of a social network between multiple users. Various embodiments may advantageously dynamically coordinate service for a multi-party service seeking entity. Various embodiments may advantageously dynamically prioritize a multi-party service seeking entity in a queue. In various embodiments a size of the party may be dynamically determined.

Figure 64:
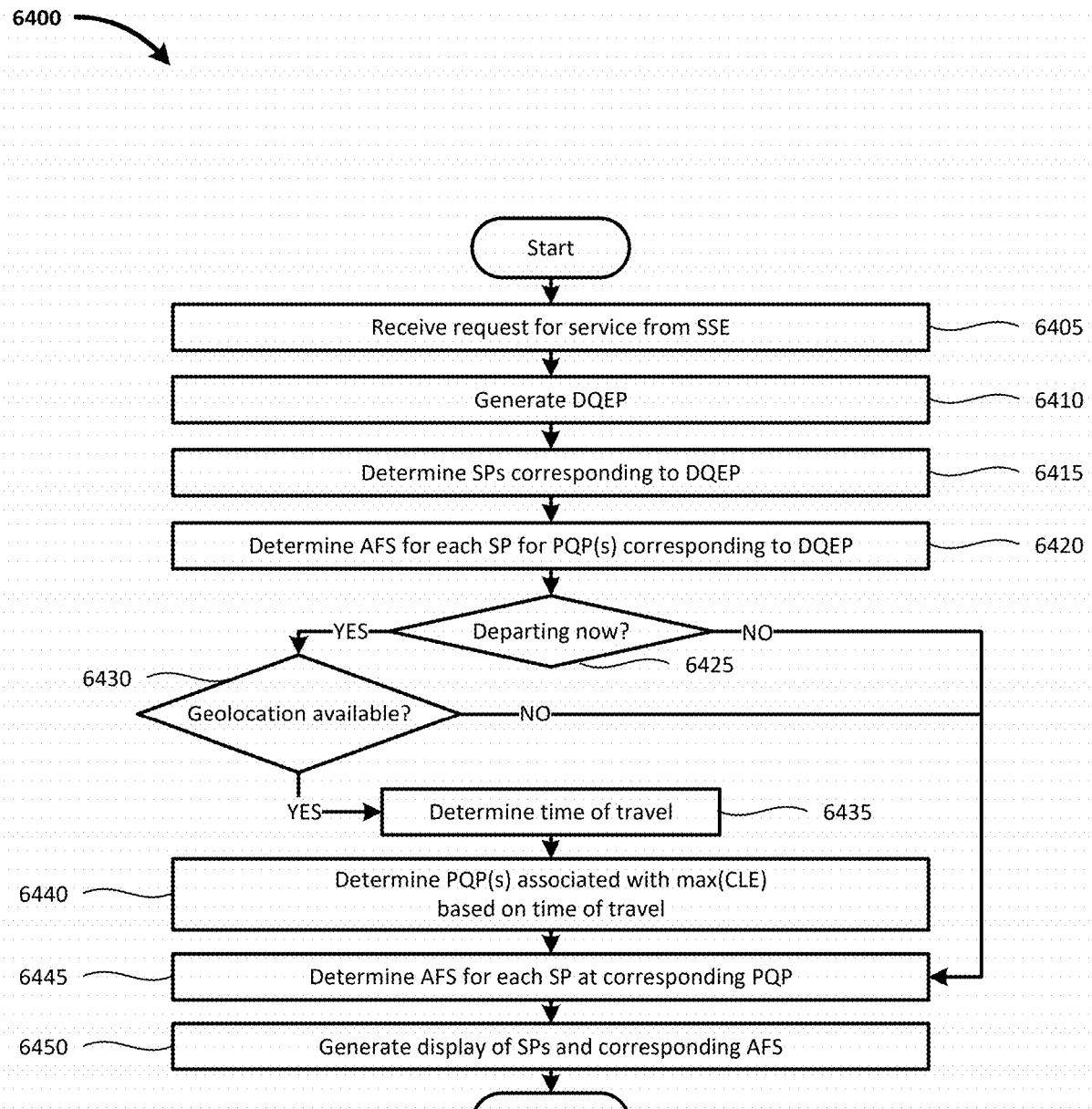
FIG. 64 depicts an exemplary method for generating a display of available service providers for a service seeking entity based on AFS and geolocation.

FIG. 64 depicts an exemplary method for generating a display of available service providers for a service seeking entity based on AFS and geolocation. In the depicted method 6400, a request for service is received 6405 from a (multi-member) service seeking entity. In response to the request for service, a dynamic queueing event profile is generated 6410. At least one service provider matching parameter(s) of the dynamic queueing event profile is determined 6415. At least one identified service provider (e.g., via at least one predicted queuing profile thereof) may, for example, be (tentatively) associated with the dynamic queueing event profile.

An anticipated flow state is determined 6420 for each service provider for at least one predicted queuing profile of the service provider corresponding to the dynamic queueing event profile. If the service seeking entity is departing now 6425 (e.g., at least one member of the service seeking entity is leaving from a current location), and if geolocation is available 6430 for at least one member of the service seeking entity, then a time of travel is determined 6435. At least one predicted queuing profile for each identified service provider is determined 6440 corresponding to a maximum confidence level of execution (e.g., for that service provider) based at least partially on the time of travel determined in 6435 (e.g., of one or more members of the service seeking entity and/or of the service seeking entity as a whole). In some embodiments, the maximum confidence level of execution may also, by way of example and not limitation, be based on one or more historic behavior profile(s) and/or entity preference profile(s) of the service provider, service seeking entity, and/or member(s) of the service seeking entity.

If the service seeking entity is not departing now 6425 (e.g., all members, an organizer of the service seeking entity, some members), or if geolocation is not available 6430 (e.g., for some members of the service seeking entity, for an organizer of the service seeking entity, for all members of the service seeking entity), or once the maximum confidence level of execution is determined 6440, then an anticipated flow state of each service provider at the selected predicted queuing profile(s) for that service provider is determined 6445. In some embodiments, if step 6440 was not completed, then a maximum confidence level of execution may be determined based on, for example, historic behavior profile(s) and/or entity preference profile(s) corresponding to a predicted queuing profile(s) at a requested time of service. In some embodiments a time of travel may, for example, be received as an estimate from at least one third-party (e.g., a map service) and/or at least one member of the service seeking entity.

Once an anticipated flow state is determined 6445 for at least one predicted queuing profile for each selected service provider, a display is generated 6450 with visual indicia corresponding to the selected service provider(s) and the corresponding anticipated flow state(s). In various embodiments the display may, by way of example and not limitation, be configured such as is depicted by the display 6330 of FIG. 63. Accordingly, various embodiments may advantageously coordinate service for a multi-party service seeking entity. In some embodiments, the display may, by way of example and not limitation, include a window of validity for the anticipated flow state and/or for joining a queue (e.g., having the service seeking entity's dynamic queueing event profile be assigned to a specific predicted queuing profile based on capacity of the service provider and previously assigned dynamic queueing event profile(s)).

Figure 65:
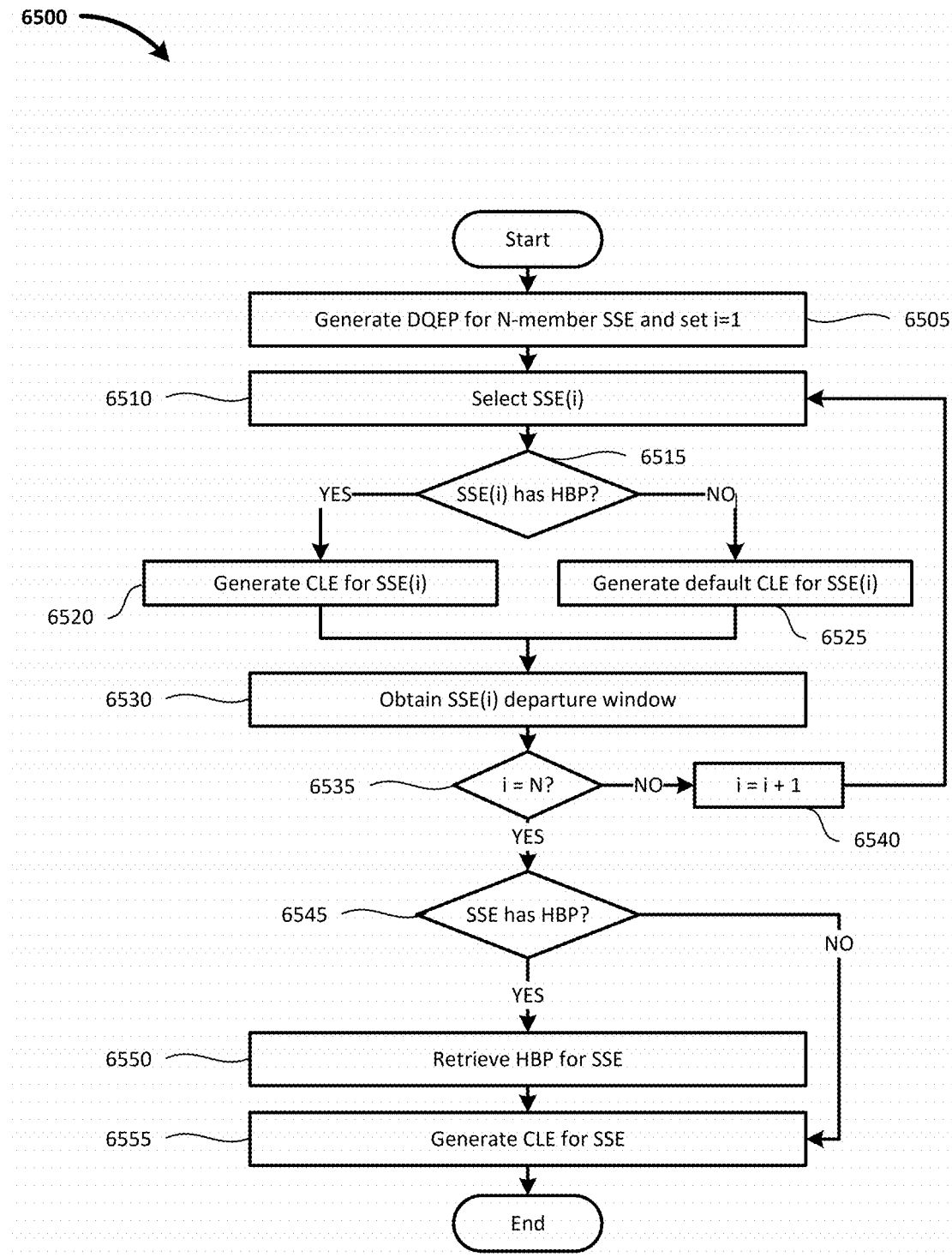
FIG. 65 depicts an exemplary method of prioritizing a service seeking entity made up of multiple members.

FIG. 65 depicts an exemplary method of prioritizing a service seeking entity made up of multiple members. In the depicted method 6500, the dynamic queueing event profile is generated 6505 for a multi-member service seeking entity having N members (e.g., by the COE 130 in response to a request for service from at least one member of the service seeking entity), and accounting variable (i) is initialized (e.g., set to 1). A member of the service seeking entity corresponding to the current accounting variable value (e.g., a first member of the service seeking entity) is selected 6510. If the current member (SSE(i)) has a historical behavior profile 6515, then a confidence level of execution is generated 6520 for the current member. For example, the confidence level of execution may be generated for at least one predicted queuing profile associated with a requested time, requested service provider, suggested time, suggested service provider, or some combination thereof.

If the current member does not have a historic behavior profile 6515, then a default confidence level of execution is generated 6525 for the current member. In various embodiments a default confidence level of execution may, by way of example and not limitation, be generated based on other members of the service seeking entity, based on one or more profiles associated with the service provider(s), an entity preference profile of the member, or some combination thereof. Once a confidence level of execution has been generated, a departure window is obtained 6530 for the current member. In various embodiments the departure window may be obtained, by way of example and not limitation, using geolocation, using a prediction based on at least one historic behavior profile, using input received from at least one member of the service seeking entity, or some combination thereof.

If the counting variable i does not correspond 6535 to the total number of members N of the service seeking entity, the counting variable is incremented 6540 and the method returns to step 6510. Once all members have been considered 6535, if the service seeking entity has a historic behavior profile 6515, then the historic behavior profile for the multi-member service seeking entity is retrieved 6550. Once the historical behavior profile for the service seeking entity is retrieved 6550, or if the service seeking entity does not have a historical behavior profile 6545, then a confidence level of execution is generated 6555 for the service seeking entity and the method ends. In various embodiments the confidence level of execution for the service seeking entity may be generated as a function of at least one historical behavior profile for the service seeking entity as a whole, at least one entity preference profile for the service seeking entity as a whole, of confidence levels of execution for individual members (e.g., average; weighted average based on at least one parameter such as accuracy, leadership, and/or number of people represented by the member), at least one profile (e.g., entity preference profile, historic behavior profile) for a service provider, or some combination thereof. In various embodiments the method 6500 may advantageously provide for generation of a confidence level of execution to assist in dynamic prioritization and/or coordination of a multi-member service seeking entity.

Figure 66:
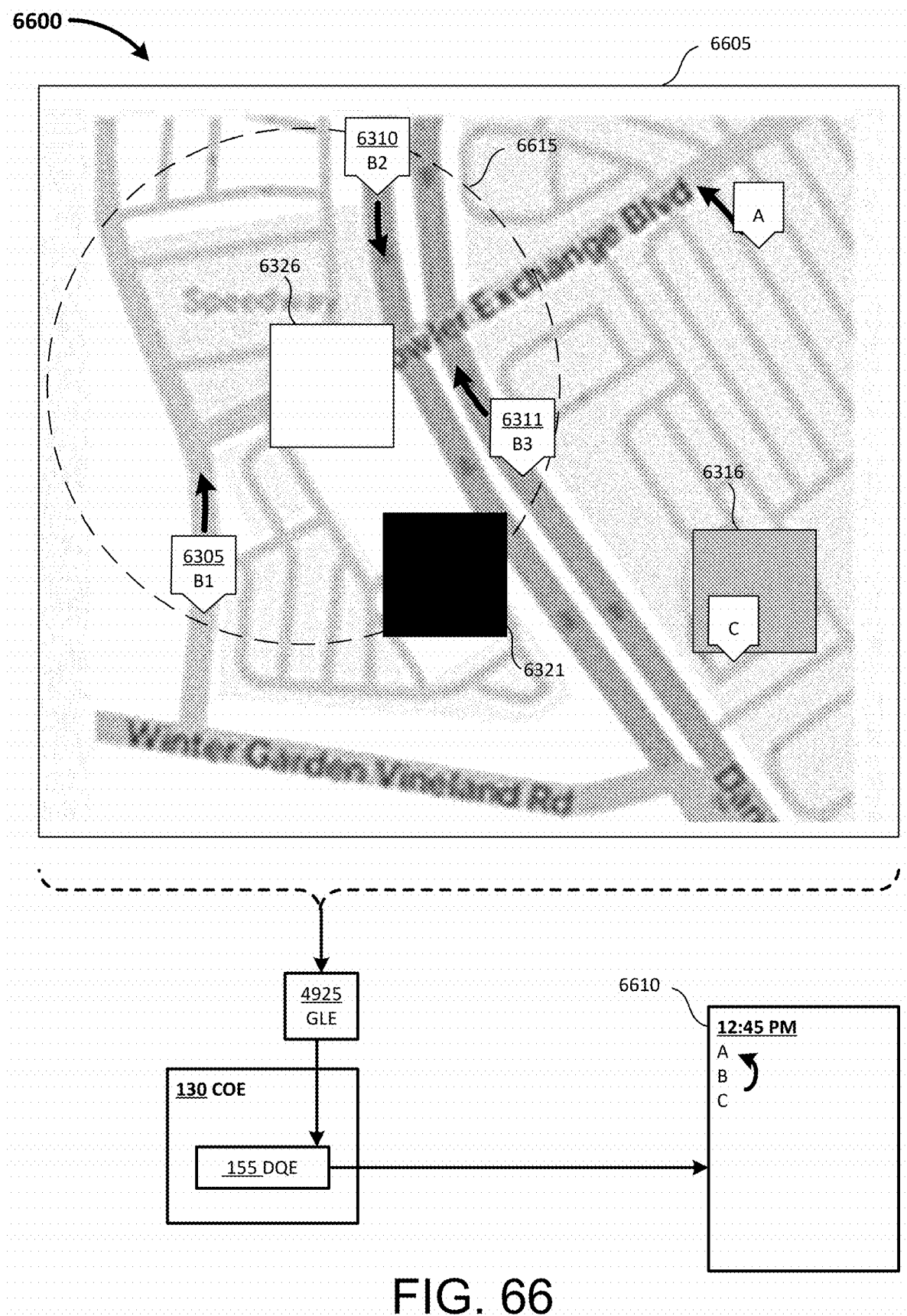
FIG. 66 depicts an exemplary dynamically prioritized queuing profile generated in response to convergence of members of an exemplary service seeking entity within a geo-fence.

FIG. 66 depicts an exemplary dynamically prioritized queuing profile generated in response to convergence of members of an exemplary service seeking entity within a geo-fence. In the depicted scenario 6600, the multi-member service seeking entity disclosed at least with reference to FIG. 63 has selected the service provider 6325 and are in the process of converging at the service provider 6325. As depicted, all three members (6305, 6310, and 6311) have geolocation enabled such that the COE 130 may track the location of each member of the entity. The COE 130 may, for example, generate a display 6605 and/or provide data to another service and/or device to generate the display 6605 depicting convergence of the members at the service provider 6325 (indicated on the display by visual indicium 6326).

The corresponding dynamic queuing event profile of the multi-member service seeking entity (denoted as "B") has been assigned to a 12:45 PM predicted queuing profile 6610 of the service provider 6325 by the DQE 155 of the COE 130. Two other service seeking entities ("A" and "C") are also represented by corresponding dynamic queuing event profiles associated with the predicted queuing profile 6610. As depicted in the representation of the predicted queuing profile 6610, service seeking entity A has highest priority, followed by service seeking entity B and then service seeking entity C. As depicted in the display 6605, all three members 6305, 6310, and 6311 are converging at the location of the service provider 6325 and are already within a geo-fence 6615. Accordingly, based on the current location (e.g., also based on the historic location such as used to determine direction and/or speed of travel) the confidence level of execution of the dynamic queuing event profile of the service seeking entity B may be increased.

As depicted in the display 6605, the service seeking entity A is currently in route but is not within the geo-fence 6615. For example, a historical behavior profile of the service seeking entity A may have caused a confidence level of execution to be generated corresponding to a high likelihood of execution for the predicted queuing profile 6610. The service seeking entity A may, for example, have been uncharacteristically delayed (e.g., by traffic). Based on the current geolocation of the service seeking entity A, the COE 130 may (re)generate a confidence level of execution for service seeking entity A for the predicted queuing profile 6610. The confidence level of execution for service seeking entity A may, for example, be lower (e.g., less confident of execution) than the confidence level of execution for service seeking entity B.

In the depicted example the service seeking entity C is not in route based on geolocation. Furthermore, the location of service seeking entity C is associated (e.g., within a geofence) of the service provider 6315 (indicated by visual indicium 6316). The COE 130 may determine that service provider 6315 has a high probability of being mutually exclusive with service provider 6320 (e.g., both may be casual dining restaurants). The COE 130 may, therefore, regenerate the confidence level of execution for service seeking entity C for the predicted queuing profile 6610. For example, the confidence level of execution for service seeking entity C may be (significantly) lower than for service seeking entity A and service seeking entity B. The confidence level of execution for service seeking entity C may, however, not be below a (predetermined) threshold for removal from the predicted queuing profile because there may still be time for service seeking entity C to travel from the current location to the service provider 6325.

The COE 130 (e.g., by the DQE 155) updates the predicted queuing profile 6610. As depicted, service seeking entity C remains at lowest priority. However, service seeking entity B is reprioritized from middle place to have highest priority (e.g., due to an increased confidence level of execution vs service seeking entity A). Accordingly, service seeking entity B may receive highest priority (e.g., for seating at a table). In various embodiments the service seeking entity A may, for example, be reprioritized in a subsequent predicted queuing profile (e.g., 12:50 PM) based on an expected time of travel to reach the service provider 6325.

In various embodiments convergence may, for example, be determined by geolocation (e.g., by GPS) of at least one member of a service seeking entity, by status updates (e.g., 5 miles out) from at least one member of a multi-member service seeking entity, or some combination thereof. Various embodiments may advantageously dynamically prioritize a queue and/or coordinate service between a service provider(s) and a service seeking entity(ies) according to convergence of a (multi-member) service seeking entity at the service provider based on geolocation.

Figure 67:
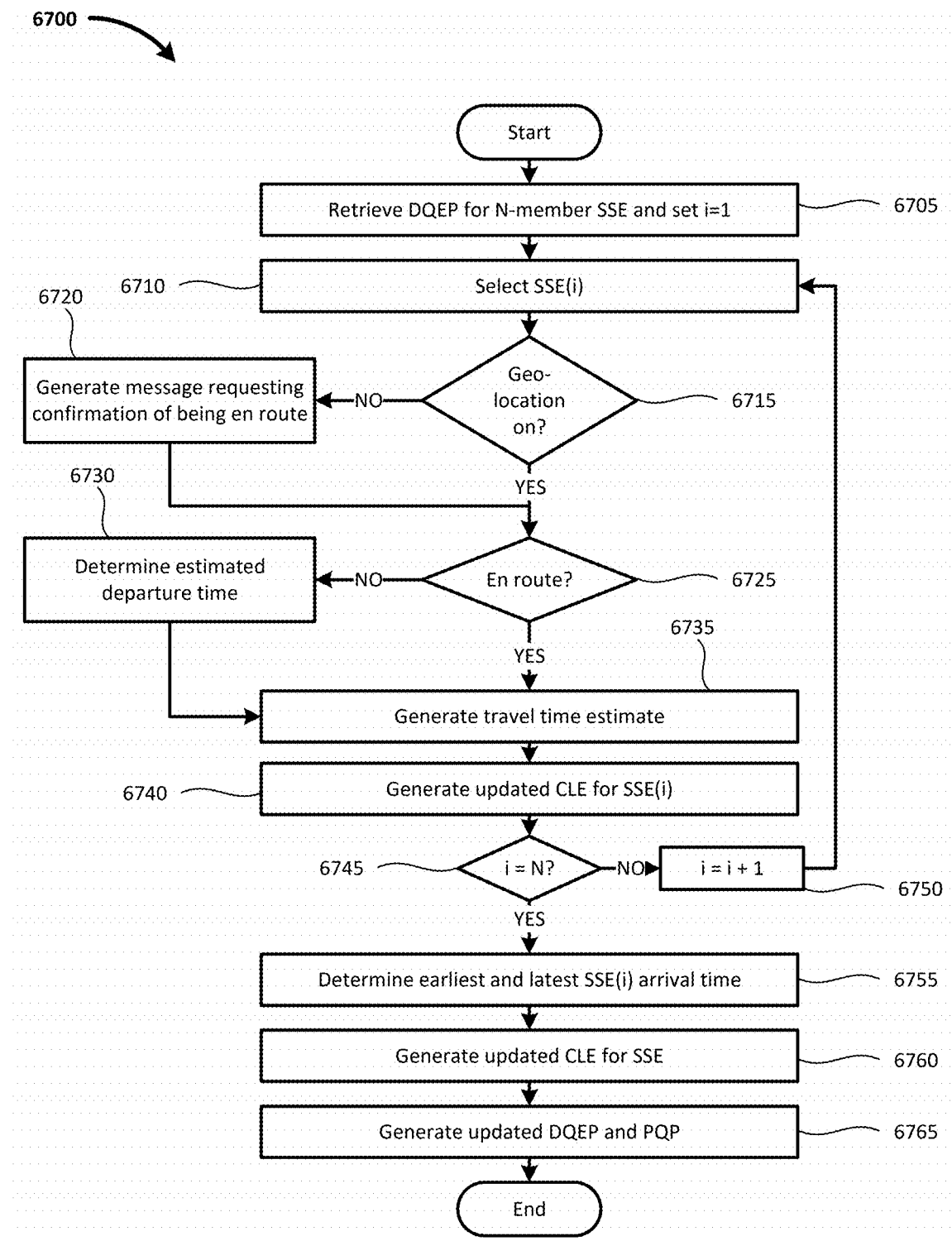
FIG. 67 depicts an exemplary method of dynamically reprioritizing a predicted queuing profile according to geographical convergence of members of an exemplary service seeking entity.

FIG. 67 depicts an exemplary method of dynamically reprioritizing a predicted queuing profile according to geographical convergence of members of an exemplary service seeking entity. In the depicted method 6700, a dynamic queueing event profile is retrieved 6705 (e.g., by the COE 130) for a multi-member service seeking entity having a number of members ("N"), and a counting variable ("i") is initialized (e.g., set to 1, as depicted). A member of the service seeking entity corresponding to the counting variable i (e.g., a first member when i=0) is selected 6710. If geolocation is not enabled 6715 for the currently selected member, then a message is generated 6720 prompting the currently selected member for confirmation of being en route.

If the member is not en route 6725, then an estimated departure time is determined 6730. In various embodiments the estimated departure time may, for example, be determined by input from the currently selected member, input from another member of the service seeking entity, historic behavior profile(s) and/or entity preference profile(s) for the member, current location of the user (e.g., by geolocation), current event(s) of the user (e.g., another dynamic queueing event profile which may be indicated as not being completed), or some combination thereof. If the member is en route, or once an estimated departure time is determined 6730, then a travel time estimate is generated 6735. In various embodiments travel time may be estimated based on input from at least one member of the service seeking entity, based on input from the service provider, based on geolocation (e.g., an estimated route time using a geolocation engine and/or third-party mapping service), based on one or more historic behavior profile and/or entity preference profile, or some combination thereof.

A confidence level of execution for the predicted queuing profile for the currently selected member of the service seeking entity is (re)generated 6740. For example, the confidence level of execution may be generated and/or updated based on the travel time estimate generated in step 6735. If not all members of the service seeking entity have been considered 6745 (e.g., i±N), then the counting variable is incremented 6750, and the method returns to step 6710. Once all members of the service seeking entity have been considered, then the earliest and latest arrival time(s) of the various members of the service seeking entity are determined 6755.

Based on the earliest and/or latest arrival times and/or individual confidence level(s) of execution for the members of the service seeking entity, an updated confidence level of execution is generated 6760 for the service seeking entity as a whole. An updated dynamic queueing event profile and/or predicted queuing profile(s) for the service seeking entity are then generated 6765 based on the updated confidence level of execution, and the method ends. Various embodiments may, for example, advantageously dynamically re-prioritize a predicted queuing profile based on convergence of at least one multi-member service seeking entity on the location of service.

Figure 68:
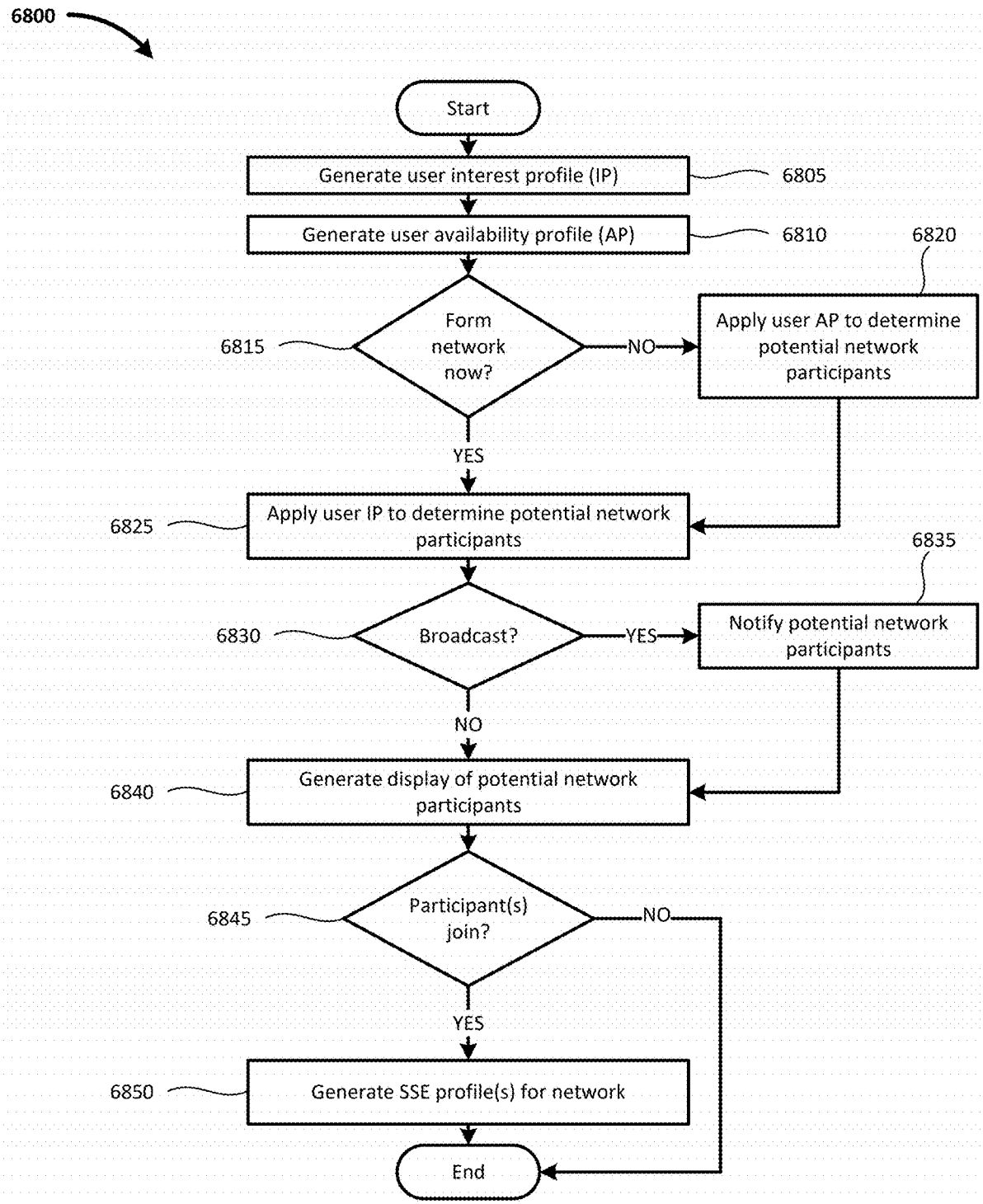
FIG. 68 depicts an exemplary method of forming an ad hoc social network using the central orchestration engine.

FIG. 68 depicts an exemplary method of forming an ad hoc social network using the central orchestration engine. In the depicted method 6800, a user interest profile (IP) is generated 6805 for a user (e.g., a service seeking entity, a member of a service seeking entity). The interest profile may, by way of example and not limitation, be generated based on manual input from a user, a user historic behavior profile (e.g., service providers visited and/or inquired about) and/or entity preference profile (e.g., indications of interest), third-party sources of interests (e.g., a social media networking service which the user has (publicly) posted to, a media publishing service on which the user has published content), or some combination thereof. In various embodiments, for example, at least one machine learning algorithm may process various sources to determine and/or suggest interests for an interest profile. Some embodiments may, for example, integrate an interest profile into a historic behavior profile and/or entity preference profile for the user.

A user availability profile is further generated 6810 for the user. The availability profile may, by way of example and not limitation, be generated based on manual input from a user (e.g., "I am normally available for social events between 6-10 PM on Fridays"), user and/or third-party scheduling services (e.g., a calendar accessible by the COE 130), at least one historic behavior profile (e.g., determining that the user typically has joined multi-party service seeking entities at specific time(s) and/or date(s)) and/or entity preference profile of the user, or some combination thereof.

If the user does not request to form a (social) network with other users now 6815 (e.g., the user is not currently available to join a social event), then the user availability profile is applied 6820 to determine potential (future) participants (e.g., other users) in a social network with the user. For example, other social networks which are broadcasting for potential members may be selected based on the availability profile of the user. Once potential networks are selected 6820 based on the availability profile of the user, or if the user requests to form a network now 6815 (e.g., the user wishes to find and/or form a social event this afternoon), then the user's interest profile is applied 6825 to (further) determine potential network participants. For example, other users and/or social networks (e.g., currently broadcasting for members and/or to join a network) sharing at least one interest characteristic may be selected (e.g., enjoying formal dining, enjoying British history, enjoys dining downtown).

If the user permits and/or requests broadcasting to other users 6830 (e.g., of their interest profile and/or availability profile), then the selected potential network participants are notified 6835. Subsequently, or if the user chooses not to broadcast 6830, then a display is generated 6840 of potential network participants. If at least one participant joins 6845 a network with the user, then a service seeking entity profile(s) (e.g., an historic behavior profile, entity preference profile) is generated 6850 for the multi-party network (e.g., by the COE 130). Accordingly, various embodiments may advantageously enable an ad hoc social network to form and to dynamically coordinate service with one or more service providers (e.g., as disclosed at least with reference to FIGS. 63-67).

Figure 69:
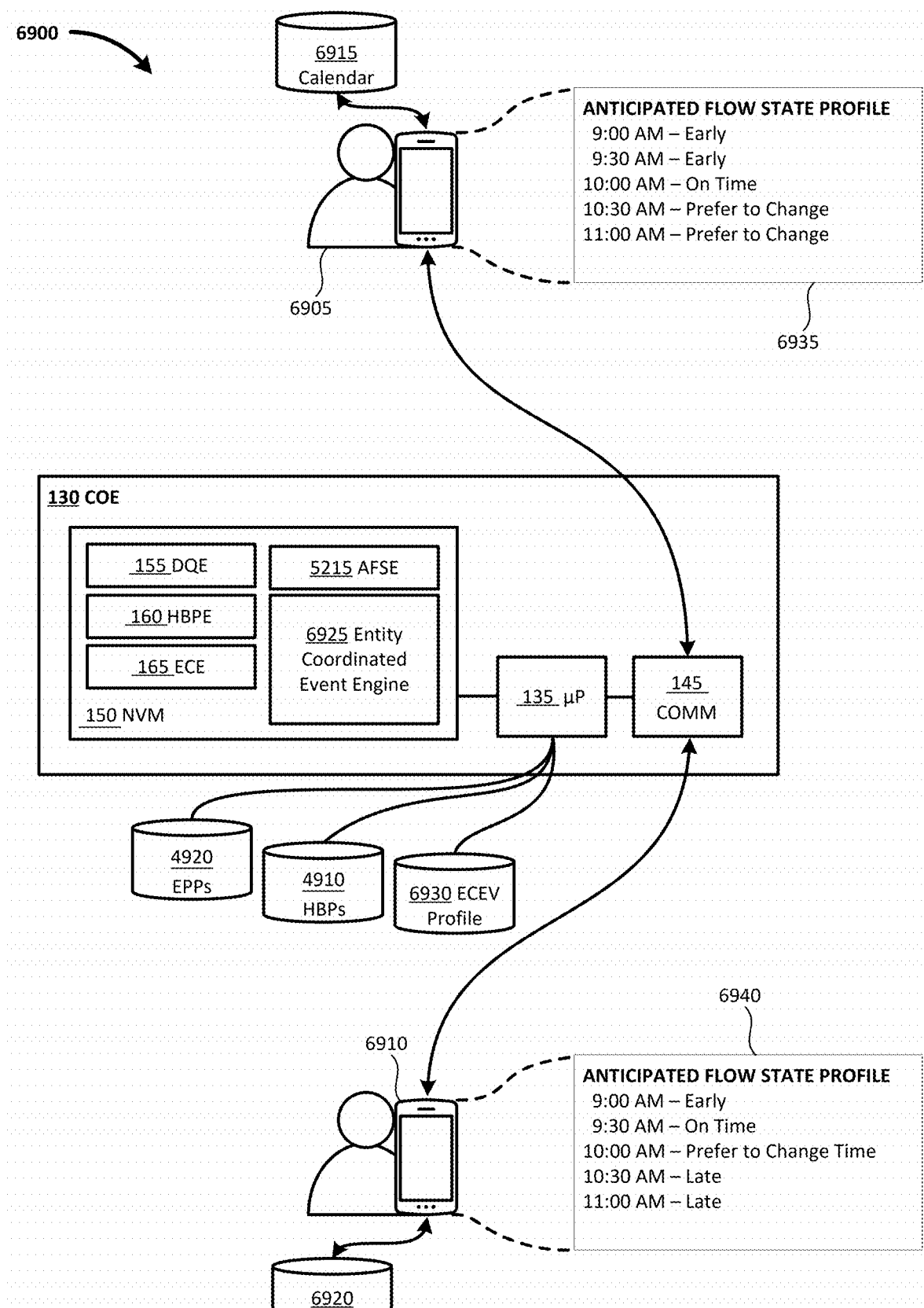
FIG. 69 depicts exemplary anticipated flow state profiles generated by the central orchestration engine for exemplary coordinating entities seeking to arrange an entity coordinated event.

FIG. 69 depicts exemplary anticipated flow state profiles generated by the central orchestration engine for exemplary coordinating entities seeking to arrange an entity coordinated event. In the depicted scenario 6900, a first coordinating entity 6905 and a second coordinating entity 6910 are seeking to coordinate an entity coordinated event. The coordinated event may, by way of example and not limitation, be a business meeting, social meeting, family get-together, or some combination thereof. The coordinating entities 6905 and 6910 communicate (e.g., via respective computing devices) with the COE 130 via the communication module 145. The coordinating entities 6905-6910 may, for example, provide access to their calendars (as depicted, stored in corresponding data stores) 6915 and 6920, respectively.

As depicted, the microprocessor 135 executes code stored on various non-volatile memory modules 140 including DQE 155, HBPE 160, ECE 165, anticipated flow state engine 5215, an entity coordinated event engine 6925, or some combination thereof. The microprocessor may, for example, retrieve data from and/or store data to data store of EPPs 4920, data store of HBPs 4910, and an entity coordinated event (ECEV) profile (ECEVP) data store 6930.

In the depicted example, the coordinating entities 6905 and 6910 may be seeking to coordinate an event before noon on a given day. The COE 130 may, for example, in response to a request for event coordination between the entities 6905-6910, generated a first anticipated flow state profile (AFSP) 6935 for the entity 6905. The anticipated flow state profile may, for example, be generated according to the entity coordinated event engine 6925. The entity coordinated event engine 6925 may, for example, use the anticipated flow state engine 5215 to generate the anticipated flow state profile. The anticipated flow state profile may, for example, be based on (e.g., using the HBPE 160) at least one historic behavior profile and/or entity preference profile of the entity 6905, confidence level(s) of execution for time intervals (e.g., generated using the ECE 165), prioritization of other events (e.g., using the DQE 155, generated according to events in the calendar 6915), or some combination thereof. In various embodiments an entity preference profile may, by way of example and not limitation, be generated and/or updated in response to an input (e.g., operating a (virtual) toggle, radio button, selecting at least one of a list of (predetermined) anticipated flow state options) from a user (e.g., a coordinating entity) via an interface (e.g., of a mobile app).

In the depicted example, the anticipated flow state profile 6935 for the requested time (range) indicates that the entity 6905 will have an anticipated flow state associated with being "early" to a proposed event from 9:00-9:30 AM, an anticipated flow state associated with being "on time" at 10:00 AM, and an anticipated flow state associated with preferring to change the time of the proposed event from 10:30-11:00 AM. An anticipated flow state profile 6940 is likewise generated for the entity 6910. The anticipated flow state profile 6940 indicates that the entity 6910 will have an anticipated flow state associated with being early at 9:00 AM, an anticipated flow state associated with being on time at 9:30 AM, an anticipated flow state associated with preferring to change time of the proposed event at 10:00 AM, and an anticipated flow state associated with being late from 10:30-11:00 AM.

The entities 6905-6910 may, for example, selected to meet at 9:00 AM. In various embodiments the anticipated flow state profile(s) of the entities may be dynamically regenerated (e.g., in response to geolocation, changes in schedule, status updates from the entities). Accordingly, the entities may, for example, choose to reschedule their meeting based on updated anticipated flow state profiles. For example, if a later meeting is cancelled for entity 6905 and an unexpected 8:30 AM meeting is likely to run over time for entity 6910, the anticipated flow state profiles 6935 and 6940 may be updated accordingly, and the entities 6905 and 6910 may choose to reschedule to 10:00 AM. In various embodiments rescheduling may, by way of example and not limitation, be performed manually (e.g., at the user's instigation, in response to a suggestion(s) from the COE 130), be performed automatically by the COE 130, or some combination thereof. Various embodiments may advantageously enable coordinating entities to dynamically coordinate proposed and/or planned events.

Figure 70:
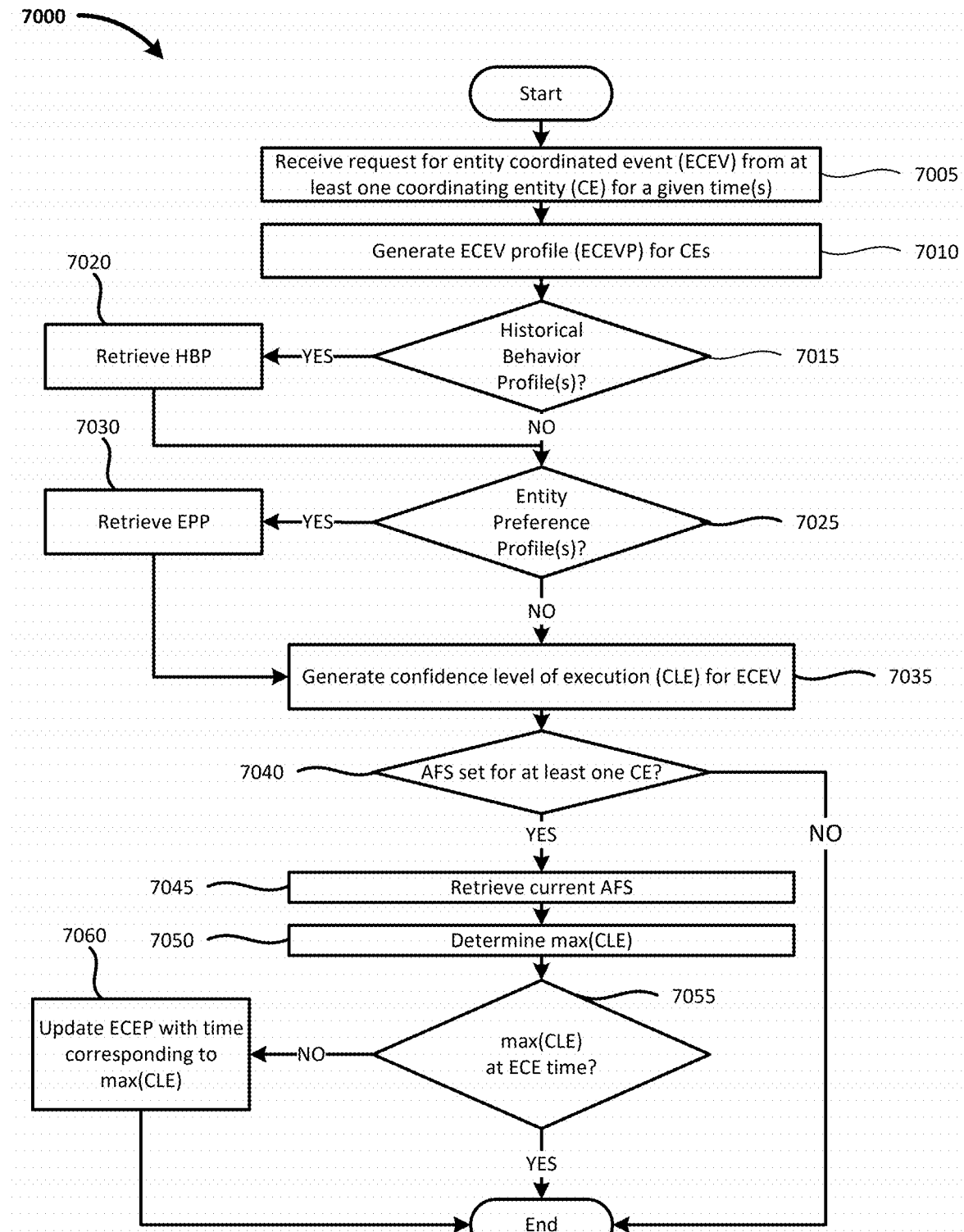
FIG. 70 depicts an exemplary method of generating an entity coordinated event profile for coordinating entities.

FIG. 70 depicts an exemplary method of generating an entity coordinated event profile for coordinating entities. In the depicted method 7000, a request is received 7005 for an entity coordinated event from at least one coordinating entity for at least one given time. An entity coordinated event profile is generated 7010 for the coordinating entities in response to the request (e.g., by the entity coordinated event engine 6925 of the COE 130).

If a historic behavior profile is available 7015 for at least one of the coordinating entities, then the historic behavior profile(s) is retrieved 7020. If an entity preference profile is available 7025 for at least one of the coordinating entities, then the entity preference profile(s) is retrieved 7030. A confidence level of execution is generated 7035 for the entity coordinated event at one or more times (e.g., defined in the request and/or at least one entity preference profile). The confidence level of execution may be generated, by way of example and not limitation, based on the historic behavior profile(s) and/or entity preference profile(s) of the coordinating entities, if available; from scheduling data received from at least one coordinating entity; from historic behavior profile(s) and/or entity preference profile(s) of related entities (e.g., entities having events with at least one of the coordinating entities near, such as before, a proposed coordinated event time(s)).

If no anticipated flow state is set 7040 for any of the coordinating entities, the method ends. If an anticipated flow state is set 7040 (e.g., manually, automatically) for at least one of the coordinating entities, then the current anticipated flow state(s) is retrieved 7045 and a maximum confidence level of execution is determined 7050 for the entity coordinated event profile (e.g., corresponding to each of one or more times). If the maximum confidence level of execution corresponds to a proposed time for the coordinated event 7055, then the method ends. If a time associated with the maximum confidence level of execution does not correspond to the proposed event time, then the entity coordinated event profile is updated 7060 (e.g., automatically, manually, automatically after confirmation from some or all coordinating entities) accordingly and the method ends. In various embodiments an anticipated flow state of a coordinating entity may, by way of example and not limitation, be self-declared and/or automatically generated.

In various embodiments an entity coordinated event may be established (e.g., by an entity coordinated event profile) at an agreed upon meeting time and place. The COE 130 may, for example, dynamically update all the coordinating entities. In some embodiments at least one coordinating entity may provide a (dynamic) personal self-declared flow state. The self-declared flow state may, for example, communicate to the other coordinating entities that the declaring coordinating entity may be running late. Each coordinating entity may, for example, be provided with an interface in which a self-declared flow state may be enabled and/or set.

For example, in an exemplary scenario, if two coordinating entities schedule lunch for Thursday at 12:00 PM and then the Monday before one coordinating entity's boss schedules an intensive meeting for 11:00 AM on Thursday, that coordinating entity can update the system that shares their personal anticipated flow state accordingly, thereby putting the other coordinating entity on notice that the event meeting time may be in jeopardy. The coordinating entities may, for example, reschedule in response (e.g., manually, manually in response to a suggestion from the COE 130, automatically by the COE 130).

In various embodiments the COE 130 may be provided with access to all a coordinating entity's coordinated events, corresponding locations, and the type of each event (e.g., phone call, physical location with address). Accordingly, the COE 130 may, for example, predict whether the coordinating entity is going to make a particular entity coordinated event. The COE 130 may, by way of example and not limitation, predict and/or notify a user if a coordinated event is going to be delayed, if other entities for planned events are actually available to meet early, or some combination thereof.

Various embodiments may, for example, advantageously enable multiple entities (e.g., individuals, parties) to coordinate a time mutually and dynamically for a planned event. In various embodiments the entity coordinated event profile may be updated (e.g., based on updated confidence level(s) of execution) in response, by way of example and not limitation, to updates in schedule(s) and/or environments for at least one of the coordinating entities.

Although various embodiments have been described with reference to the figures, other embodiments are possible. For example, although exemplary systems have been described with reference to the various figures, other implementations may be deployed in other industrial, scientific, medical, commercial, and/or residential applications.

In various embodiments, a service provider may, by way of example and not limitation, include a hospitality service provider (e.g., restaurant, hotel); entertainment services provider (e.g., amusement park, theater); healthcare provider (e.g., medical office, hospital, clinic); professional services provider (e.g., accountant, lawyer, engineer, consultant), industrial, commercial, and/or residential service provider (e.g., manufacturer, transporter, contractor, house inspector, pest control service), or some combination thereof.

Various implementations of the DQPS may include user interface (UI) elements. User interfaces may, for example, assist with a DPQ system. Various embodiments may advantageously provide a dynamic UI that provides a solution to interfacing persons (e.g., SSEs) with multiple (e.g., aggregated) service queues. For example, a slider may prompt a user for input related to wait tolerance for a requested queueing event and/or service at a future time period. A geographic screen depicting multiple available SPs may be dynamically updated based on the wait tolerance. A detail screen for an SP (e.g., a queue request screen) may, for example, dynamically updated available queues based on a selected wait tolerance. A DPQS may, for example, determine and/or prioritize available queues based, for example, on a wait tolerance and a requested queueing interval (e.g., time interval). In some embodiments, a DPQS may provide a requestor (e.g., an SSE) multiple available queue options (e.g., priority, cost, time) for waiting after the requestor checks in with the provider through the app (e.g., within a predetermined geofence corresponding to arrival and/or near-arrival at the queue location) and/or with a staff member.

A "Service Ready" engine may, for example, provide controls (e.g., prompt user input) to provide a DPQS input signals (e.g., wait tolerance, location milestone, multiple commitment affirmations). When utilized by an SSE, for example, the controls may generate input signals to a DPQS such that a confidence level associated of the SSE's position in a queue (e.g., of a dynamic queueing event profile (DQEP) data structure associating a queue for a specific time interval with the SSE) is updated (e.g., increased accordingly). As an illustrative example, an SSE may input wait tolerance, enable geolocation, and respond to (predetermined) prompts for validation (e.g., request entry into queue, join waitlist, confirm reservation, check-in). The prompts for validation may, for example, correspond to time and/or location of the SSE relative to the queue location (e.g., location of a SP). Accordingly, by way of example and not limitation, in some implementations a confidence interval associated with the SSE for a specific queue may be advantageously increased and the user's position in a queue may, for example, rise accordingly.

Some embodiments may, for example, provide a check-in process based upon geofence proximity. Various embodiments may, for example, provide a UI having an "I expect to be" input prompt (e.g., slider). A Service Ready engine may, for example, cause a DPQS to update priority on the queue based on a customer's input to an expected arrival and/or departure (time) window.

Various embodiments may provide a new first-in first-out (FIFO) queueing front end engine, which may, for example, be referred to as an Arrival Queue. The Arrival Queue engine may, for example, interact with the Service Ready engine. The Arrival Queue engine may interface, by way of example and not limitation, with existing waitlisting and/or scheduling systems. Various such embodiments may, for example, provide proximity-based queueing. In various embodiments, for example, an Arrival Queue engine may advantageously enable a single orchestration system to provide SSEs access to available service across predictive queueing engines (e.g., a DPQS) and 'basic' waitlist, reservation, and/or scheduling systems. Various embodiments may, for example, advantageously standardize SP services such that customers may easily search across multiple provider systems for availability. Accordingly, various embodiments may advantageously provide a technical solution to technological problems of interacting with existing resource management systems of multiple providers and/or industries.

Various embodiments may advantageously generate dynamic queueing associations based on wait tolerance associated with one or more resources (e.g., a person, a procedural room, a restaurant table). Various embodiments may advantageously generate dynamic queueing associations based on wait tolerance associated with one or more service types being performed (e.g., massage, haircut, nails). Various embodiments may advantageously generate dynamic queueing associations based on wait tolerance associated with one or more blocks of time (e.g., early morning, prime dinner time). Embodiments specifying such data to a DPQS may, for example, enable a central orchestration system to dynamically generate and transmit SP availability signals to a front-end system where SSEs may select a desired SP, service time, service type, and/or resource, for example, at least partially as a function of an inputted wait tolerance (e.g., a guaranteed maximum amount of time after arrival at a service location associated with a queue). Various embodiments may, for example, be configured to receive from SP device(s) one or more signals corresponding to (predetermined) service levels (e.g., maximum wait time). The (predetermined) service levels may, for example, correspond to resources, time blocks, service types, and/or SSE profiles. A DPQS may, for example, prioritize SSEs in predicted queueing profiles (PQPs) data structures as a function of a wait tolerance criterion(s) associated with the SSE for a requested queueing event(s) and one or more advertised and/or predicted service levels associated with SPs. Some embodiments may, for example, dynamically prioritize queues based on wait tolerance signal(s) as cancellations happen.

Various embodiments may, by way of example and not limitation, advantageously provide a technological solution(s) to a technical problem(s) of predicting, generating, receiving, and/or transmitting digital queues and/or position(s) of service seeking entities (SSEs) in queue across multiple devices, networks, queue management systems, and/or booking systems.

Various embodiments may, for example, advantageously provide one or more central engine for orchestrating resources across multiple service providers (SPs) and SSEs. Such embodiments may, for example, advantageously orchestrate resources across multiple systems and devices having different queueing intervals, different input(s) and/or output(s), different queue types, and/or different queue and/or resource management schemas. Various embodiments may, for example, provide a technical solution to a technological problem of orchestrating resources and/or resource requests (e.g., service requests) across systems implemented for different industries. Such embodiments may, for example, advantageously provide SSEs a single interface for entering current and/or future queues across multiple service industries (e.g., restaurant, healthcare, consulting).

Various embodiments may, for example, provide a dynamic geographical interface (DGI) generated based on one or more wait tolerance(s) of SSEs. The DGI may, for example, be generated based on historical behavior profile(s) (HBP) of the SSE(s) and/or potential SP(s). The DGI may be dynamically updated based on adjustment of wait tolerance. The DGI may be dynamically updated based on adjustment of SP resource levels. The DGI may be dynamically updated based on prioritization of SSEs relative to other SSEs seeking corresponding service in a corresponding geographical area.

Various embodiments may advantageously connect with multiple existing waitlisting systems. Some existing waitlisting systems may be basic waitlisting systems (e.g., requested time and entity name). Such embodiments may advantageously enhance existing waitlisting systems by managing dynamic queueing and dynamically (e.g., periodically, iteratively, in response to predetermined signals) providing results as inputs to update the basic waitlisting systems. Some embodiments may advantageously enhance existing waitlisting systems by dynamically queueing based on historical behavior profiles of an SSE and/or SP. Some embodiments may advantageously enhance existing waitlisting systems by dynamically queueing based on geofences (e.g., predetermined, dynamic) and/or dynamic geo-updating signal(s). Various such embodiments may implement, by way of example and not limitation, an Arrival Queue. An arrival queue may, for example, be dynamically updated based on signals from an existing waitlisting system (e.g., from SPs) and/or from SSEs.

Various embodiments may advantageously provide a front-end user interface (e.g., dynamic, geographical) that allows an SSE and/or SP to interact with the existing waitlisting system(s) via one or more corresponding arrival queue(s). A user-interface may, for example, be dynamically regenerated based on user input corresponding to wait tolerance. Such embodiments may, for example, provide a technical solution(s) to technological problem(s) of dynamically updating SSE requests across multiple existing waitlisting systems such as, for example, based on historical behavior (e.g., of SSE(s), of SP(s)), resource availability, dynamically updated SSE and/or SP commitment, or some combination thereof. For example, some embodiments may display a (interactive) map with multiple service provider locations (e.g., barber shops) and a current wait time on each of the locations (e.g., depicted as 'push-pins'). The wait time may, for example, be determined based on predictive virtual queueing.

In various embodiments, a DPQS may, for example, solve a technical problem of providing a predicted wait time within a predetermined accuracy and/or confidence range. Such embodiments may advantageously increase accuracy of wait time prediction and/or scheduling in service queues. For example, various embodiments may advantageously provide increased accuracy across multiple SPs. Some embodiments may advantageously provide increased accuracy of wait time prediction across multiple industries. Some embodiments may advantageously provide increased accuracy of wait time prediction across multiple (existing) waitlisting systems.

Some embodiments may advantageously enable automatic coordination between people and/or places (e.g., between SSEs and SPs, between individuals in multi-party entities). Such embodiments may, for example, advantageously reduce frustration when CEs have something scheduled with a person and/or a service provider and things don't go as planned.

Various embodiments may advantageously reduce time CEs (e.g., including SSEs) require searching for service providers who have availability when desired based on wait tolerance. Such embodiments may, for example, advantageously reduce an CEs idle time until service is ready.

In various embodiments, DPQSs may, for example, advantageously provide SPs an ability to advertise their availability. Various such embodiments may, for example, advantageously provide SPs an (automatic) process for avoiding and/or filling gaps in service demand (e.g., gaps due to late arrivals, gaps due to last-minute cancellations, gaps due to no-shows).

Various embodiments may, for example, advantageously provide one or more centralized dynamic queueing orchestration systems. Such embodiments may, for example, advantageously increase SSE satisfaction and/or efficiency. Such embodiments may, for example, advantageously increase SP resource usage and/or scheduling and/or SP revenue consistency.

Various embodiments may, for example, implement one or more machine learning algorithms. In various embodiments, for example, an execution confidence engine may implement at least one machine learning algorithm to generate, by way of example and not limitation, a confidence level of execution based on entity profile(s), other events, or some combination thereof. A dynamic queueing engine may implement at least one machine learning algorithm to, by way of example and not limitation, dynamically prioritize predicted queuing profiles, to determine suggested predicted queuing profiles, or some combination thereof. A historic behavior profile engine may implement at least one machine learning algorithm to generate and/or update, by way of example and not limitation, historic behavior profiles based on received data, to identify and/or discover data related to entities for inclusion in a historic behavior profile, determine historic behavior profile parameters based on discovered and/or identified data, or some combination thereof.

In various embodiments an entity preference profile may include booking preferences of a service provider. For example, a service provider may prefer under-capacity booking (e.g., 75% of available capacity) to reserve room for walk-ins. A service provider may, for example, prefer booking substantially at capacity. A service provider may, for example, prefer overbooking (e.g., to mitigate no-shows). In various embodiments a service provider may set one or more booking parameters (such as capacity, confidence level of execution ranges for guaranteed booking, overbooking ratio). In various embodiments the COE 130 may, by way of example and not limitation, auto-generate suggested changes to one or more parameters (e.g., if a historic behavior profile(s) of the service provider indicates long wait times due to overbooking or low capacity utilization due to under booking, at least at certain times), auto-apply auto-generated suggestions (e.g., if permitted by an entity preference profile of the service provider), or some combination thereof. For example, in some embodiments an entity preference profile may include at least one predicted queuing profile preferences profile which may, by way of example and not limitation, include booking preferences (e.g., which may affect prioritization of a predicted queuing profile(s) of the service provider).

In various embodiments service seeking entities may, for example, purchase and/or bid for an increased priority. A confidence level of execution may, for example, be at least partially a function of a loyalty and/or rewards membership with a service provider or other entity (e.g., an organization, a company operating a COE 130), a successful bid for a certain level of priority (e.g., a confidence level of execution corresponding to a guaranteed status), a pre-purchased ticket for service, or some combination thereof. In various embodiments an entity other than a given service provider may, for example, sell a (previously purchased) ticket for service at the given service provider. For example, the COE 130 may receive a listing for the ticket and may promote the ticket to service seeking entities on a waitlist for the corresponding service provider.

In various embodiments a service provider may, by way of example and not limitation, 'bid' for customers. For example, a service provider may provide incentives which may attract service seeking entities to join a predicted queuing profile at a desired time. The service provider may, for example, include in their entity preference profile discounts at times which may correspond to slow times, may include in the entity preference profile discounts for any predicted queuing profile which is below a predetermined percentage of capacity, or some combination thereof. In various embodiments a service provider may, for example, bid for and/or purchase increased priority in presentation to customers who are seeking service providers (e.g., a disclosed at least with reference to FIGS. 63-68).

In various embodiments a historic behavior profile may include, for example, one or more predicted queuing profile fulfillment profiles. A fulfillment profile may, for example, correlate (e.g., by dynamic queueing event profile identifier, predicted queueing profile identifier) associating a fulfilment outcome (e.g., served on time, served late, served early, customer dissatisfied, customer satisfied) of at least some dynamic queueing event profile(s) in the corresponding historic predicted queueing profile(s). In some embodiments, by way of example and not limitation, a fulfillment profile may include corresponding confidence levels of execution and outcomes for (each) dynamic queueing event profile in the historic predicted queueing profile.

In various embodiments a multi-party service seeking entity may be formed (e.g., an ad hoc social network, such as disclosed at least with reference to FIG. 65 and/or FIGS. 69-70). The members may, for example, join an entity coordinated event (e.g., as disclosed at least with reference to FIGS. 69-70) to walk around and enjoy an area of town or other defined meeting point. In various embodiments a COE 130 may generate advertising for nearby service providers. The service providers may, for example, set in an entity preference profile preferred customers, target bid amounts, or some combination thereof. In various embodiments the COE 130 may determine (e.g., by machine learning, based on historic behavior profile(s)) preferences of the service provider and may apply them accordingly (e.g., in combination with bid amounts and/or spend caps in at least one associated entity preference profile).

In various embodiments the COE 130 may, for example, generate advertising based on a historic behavior profile and/or entity preference profile of a service seeking entity and/or coordinating entity. In various embodiments a service seeking entity and/or coordinating entity may, by way of example and not limitation, be prompted to enter preferences (e.g., a preference for Mexican and Italian food). In various such embodiments, the COE 130 may, for example, generated advertised specials to individuals and/or service seeking entities with corresponding entity preference profiles and/or historic behavior profiles who are nearby their location.

In various embodiments an anticipated (e.g., future such as next day, immediate future, such as soonest possible future) flow state may, by way of example and not limitation, be one of at least four values: No wait+Special pricing (e.g., actively advertising specials to attract customers, such as outside of peak times), No wait, Short wait, Long wait.

In various embodiments a service seeking entity may be provided with a wish list profile (e.g., in an entity preference profile, in a separate data store and/or profile). For example, a user may denote a service provider as a 'wish to use' in response to a suggestion from someone (e.g., in person, reading a review). An app may, for example, provide an interface for the user to manage one or more wish lists of service providers.

In various embodiments a wish list may be used by the COE 130 to suggest social networks and/or entity coordinated event related to that service provider. In various embodiments the COE 130 may, for example, notify the service seeking entity of incentives offered by the service provider (e.g., corresponding to a flow state of No wait+Special pricing). The COE 130 may, by way of example and not limitation, offer a suggested dynamic queueing event profile to the service seeking entity when the service seeking entity is geographically near a service provider on a wish list of the service seeking entity (e.g., at a time when the service seeking entity normally would request service at a similar service provider).

In various embodiments the COE 130 may provide an interface in which a (member of a) service seeking entity may (provisionally) request a change in size of the service seeking entity. For example, an organizer of a multi-party service seeking entity may test adding a person to the service seeking entity. The COE 130 may, for example, determine an updated confidence level of execution for the corresponding dynamic queueing event profile in a requested predicted queueing profile and indicate whether the person may be added while maintaining a desired (e.g., guaranteed) status in the predicted queueing profile. In various embodiments a single service seeking entity may, for example, request to convert to a multi-party service seeking entity. Various embodiments may advantageously permit dynamic updating and coordinating of schedules of multiple members of a service seeking entity.

In various embodiments a service provider may require confirmation (e.g., as indicated in an associated entity preference profile) of a request for service by a service seeking entity. For example, a service seeking entity may be prompted to select (or, for example, the COE 130 may automatically select) one or more predicted queueing profiles available (e.g., associated with a confidence level of execution for the service seeking entity above a predetermined threshold). A confirmation message may, for example, be provided to the service provider. The service provider may subsequently select and/or confirm at least one of the time (blocks) requested. A dynamic queueing event profile, predicted queueing profile, and/or confidence level of execution associated with the request for service may then be updated (e.g., to guaranteed status) based on the confirmation.

In various embodiments generating a display may, by way of example and not limitation, include generating a set of data (e.g., transmitted as a file, an electronic message, and/or an electromagnetic signal) which may be transmitted to another device and/or service for actual generation of the display on a user device. For example, in various embodiments the COE 130 may generate at least one display file and/or message (e.g., parameters necessary to generate a custom display) and transmit it to a user device (e.g., running an app configured to receive and act upon the file/message received from the COE 130). The user device may physically generate the display, in response to receiving the file and/or message from the COE 130.

In various embodiments, by way of example and not limitation, an anticipated flow state, a dynamic queueing event profile, a predicted queueing profile, a confidence level of execution, a historic behavior profile, other appropriate profile, or some combination thereof, may be updated (e.g., by operating an appropriate engine(s) and/or applying an appropriate method(s)) in response to, by way of example and not limitation, a new request for service, an altered request for service, an updated service availability from a service provider, updated inventory factors (e.g., tables available, wait staff, food), environmental factors (e.g., traffic conditions, weather conditions), or some combination thereof.

In various embodiments a dynamic queueing event profile may include meta data that allows a COE 130 to predict behaviors to allow a service provider (and/or the COE 130 on behalf of the service provider) to virtually queue people in a prioritized way and/or overbook the queue with confidence.

In various embodiments a profile such as, by way of example and not limitation, a dynamic queueing event profile, predicted queueing profile, historic behavior profile, entity preference profile, availability profile, fulfillment profile, execution profile, or some combination thereof, may be generated, processed, transmitted, and/or stored as a file and/or electronic message. For example, a profile may be stored in a data based on one or more NVMs and/or RAMs. In some embodiments a profile may be represented as a specific file format including, by way of example and not limitation, meta data, pointers, identifiers (e.g., of persons such as name and/or identification number, of other profiles and/or data structures). In various embodiments one or more profiles may, for example, be a unique file format containing predetermined data elements and/or types. In some embodiments a profile may, for example, be stored in and/or retrieved from a database.

In various embodiments a GLE 4925 may, for example, determine when a service seeking entity leaves a service provider (e.g., determined by exiting a geofence). For example, the COE 130 may determine a duration of service. The COE 130 may, for example, update a historic behavior profile of the service seeking entity and/or the service provider (e.g., using the HBPE 160). In various embodiments an algorithm of service seeking entity and/or service provider flow calculations may be advantageously trained. Various embodiments may, for example, advantageously increase accuracy of confidence level of execution based on historical durations of service for service providers and/or service seeking entities. Various embodiments may, for example use duration of service to improve anticipated flow state calculations and/or to update entity preference profiles for booking rates (e.g., overbooking rates) of associated service providers.

In various embodiments a COE 130 may provide a service seeking entity an indication of probability of clearing a waitlist. For example, a service provider may select a threshold confidence level of execution before allowing a service seeking entity to be moved from 'waitlist' status to 'reserved' status (e.g., whether under booking, at capacity booking, and/or over booking). In various embodiments the COE 130 may (additionally) determine, based on at least one historic behavior profile of the service provider, that although the service provider has reserved 20% of capacity for walk-ins (e.g., in an entity preference profile of the service provider), the service provider historically has 15% (e.g., for similar times and/or predicted queuing profile characteristics). Accordingly, the COE 130 may indicate to the service seeking entity a reasonable expectation of being able to be served at the requested time (e.g., corresponding to a confidence level of execution threshold determined by the service seeking entity and/or the COE 130).

Various such embodiments may, for example, advantageously permit a service seeking entity to plan accordingly (e.g., whether to make arrangements related to the requested time, whether to make backup plans assuming the request for service will not be fulfilled). For example, if a service seeking entity injures their back on a Wednesday evening and requests service for Thursday or Friday at the chiropractor (e.g., through the COE 130), but the first available predicted queuing profile with a guaranteed status is a week and a half later, the service seeking entity may join a standby list. The COE 130 may, for example, generate an indication of probability (e.g., corresponding to one or more confidence level of execution for earlier predicted queuing profiles, based on historic behavior profiles and/or entity preference profiles of the service provider and/or service seeking entities associated with the earlier predicted queuing profiles) of availability of being moved from the standby list (e.g., as disclosed at least with reference to FIGS. 14-15) to a predicted queuing profile on Thursday or Friday. If the service seeking entity determines that the indicated probability is too low, for example, the service seeking entity may choose to request service with a different service provider.

In various embodiments the COE 130 may, for example, update a historic behavior profile in response to outcomes of a dynamic queueing event profile. For example, a historic behavior profile may, by way of example and not limitation, include indications of how many times, what dates/times, what service providers, and/or what types of requests for service are kept by a user. A historic behavior profile may, for example, include data regarding whether a service seeking entity has confirmed a request for service. The historic behavior profile may, for example, correlate confirmation from a service seeking entity to outcome of the dynamic queueing event profile. The historic behavior profile may, for example, affect later confidence levels of execution generated for the service seeking entity and/or predicted queuing profiles which the service seeking entity seeks to join.

For example, a service seeking entity with a record of being on time may receive a high confidence level of execution for a requested predicted queuing profile. A service seeking entity with a record of being late may, for example, receive a low confidence level of execution for a requested predicted queuing profile (but may, for example, receive a higher confidence level of execution for a later predicted queuing profile). A service seeking entity with a record of showing up after confirming may, for example, receive a high confidence level of execution for a requested predicted queuing profile after confirmation. A service seeking entity with a history of not showing up after confirmation may, for example, receive a very low confidence level of execution for a requested predicted queuing profile, even or especially after confirmation.

In various embodiments a dynamic queueing event profile of an entity (e.g., service seeking entity, service provider, coordinating entity) may, for example, include a dynamic queueing event profile execution profile. For example, a dynamic queueing event profile execution profile may correlate historical dynamic queueing event profile(s) with at least one corresponding outcome (e.g., cancelled, no-showed, arrived, arrived on-time, arrived 6 minutes early, arrived 15 minutes late, purchased, visited competing service provider, provided service late, provided service on-time, provided service early, provided service satisfying customer). Various embodiments disclosed herein may, by way of example and not limitation, update a historic behavior profile such that the historic behavior profile includes a dynamic queueing event profile execution profile (e.g., using HBPE 160 and/or DQE 155), apply a dynamic queueing event profile execution profile of at least one historic behavior profile (e.g., ECE 165), or some combination thereof.

Service providers may offer various services to service seeking entities. For example, service providers may offer dining, hospitality, professional consultation, healthcare, construction, transportation, or some combination thereof. Service providers may, for example, receive requests for service from service seeking entities. The service providers may, for example, make lists of request for service.

Service providers may maintain lists for request using tables, lists, calendars, or some combination thereof. A service provider may, for example, maintain a reservation list, a wait list, an appointment list, a standby list, or some combination thereof. Service providers may, for example, request confirmation form a service seeking entity that the service seeking entity still intends to keep the appointment. Service providers may, for example, send reminders prior to a planned time of service. Service providers may, for example, overbook to compensate for users who will not arrive at a planned time of service.

As an illustrative example, 'traditional queueing' may take place in person (e.g., walking up to join a physical queue) and/or over the phone. Such queues may, for example, be a first-in-first-out system managed by arrival time and/or presence. A person may, for example, be able to judge a queue length and anticipated wait time in person (e.g., by the length of the queue) and/or over the phone (e.g., by asking a hostess). As networked devices have become nearly ubiquitous, people may, for example, expect to be able to join a queue without being physically present. People may need, for example, to remotely assess an anticipated wait time without physically looking at the service provider's queue and/or without calling each individual possible service provider. Such technological problems may, for example, arise specifically in the context of electronic networks and remote, asynchronous queueing.

Providers and/or third parties may, for example, provide remote queues which may, for example, attempt to allow a user to join a queue once they select a service provider, and then notify the user when it is approximately time to join. Such 'queues' may, for example, still present a technical problem preventing a computer from providing a selection of queues to join in the first place without requiring a user to call each service provider and/or physically being able to view the queue. Furthermore, such systems may, for example, present a technological problem to SPs because they may, for example, not have a way of assessing the queue (e.g., Is the person there? How likely is the person to join? Has the person confirmed intent and location?)

Various implementations described herein may, by way of example and not limitation, provide a technological solution(s) configured to solve such technological problems. For example, some implementations (e.g., as disclosed at least with reference to FIG. 1A) may provide a technological solution(s) by providing a display allowing an SSE to assess queues (e.g., nearly instantly) at multiple SPs simultaneously based on a selected event trigger window (e.g., check-in time), a maximum offset time (e.g., maximum wait time), and a location (e.g., range, travel time). The SPs may, by way of example and not limitation, be selected based on location and based on availability of predetermined service windows (e.g., time slots) having an ASF≤MOT.

Some service providers and/or third parties may, for example, attempt to provide remote queues that allow a FIFO system with predictions of wait time based on resource availability (e.g., 2 servers, 10 people at 15 minutes per person=10×15×2=75 min wait time). Various such attempts present, by way of example and not limitation, a technological problem of accurately assessing wait time based on continuing intent and/or location. Such attempts also, for example, present a technological problem of accurately predicting resource wait times. Accordingly, some implementations disclosed herein (e.g., such as disclosed at least with reference to FIG. 1A) may, by way of example and not limitation, advantageously provide available service times as a function of an anticipated service flow (e.g., ASF (time)~#serviced/time block) of the SP. The ASF may, for example, be based on a historical behavior profile of the SP (e.g., historical ASFs provided and/or estimated by the SP, machine-learning generated ASFs).

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a computer program product (CPP) may include a program of instructions tangibly embodied on a computer readable medium wherein when the instructions are executed on a processor, the processor causes operations to be performed to automatically generate an interactive display for event scheduling based on a maximum expected wait time at a user selected trigger time. The operations may include receive from a service seeking device of a service seeking entity a signal representing selection criteria. The selection criteria may include a target location; a selected service; an event trigger window; and, a maximum offset time corresponding to a maximum permissible time offset between a time within the event trigger window that the event is triggered and an expected time for service to be provided to the service seeking entity by a selected service provider. The operations may include generate, by the processor, as a function of a geofence filter, an array of service provider profiles, each service provider profile corresponding to a service provider within a predetermined geographical boundary at least partially defined by the target location. The operations may include retrieve, from at least one data store, multiple service windows within the event trigger window for each service provider, each service window having an event trigger time. The operations may include generate, by the processor, for each of the multiple service windows at each of the service providers, an anticipated service flow for the service provider at the service window as a function of: (a) a predetermined historical behavior profile corresponding to the service provider, (b) the event trigger time of the service window, and (c) a machine learning prediction model configured to predict service flow times based on one or more input features and model coefficients, and associate the anticipated service flow with the corresponding service window. The operations may include select, by the processor, from the multiple service windows, multiple available service windows having an anticipated service flow less than or equal to the maximum offset time. The operations may include generate a display containing an interactive visual indicium of the selected multiple available service windows associated with at least one of the service providers. The visual indicium may include: the event trigger time of the available service window as an indication of the service window, and, the corresponding anticipated service flow at the service provider at the event trigger time. The operations may include, in a training mode, retrain the machine learning prediction model by retraining the model coefficients at least partially as a function of an offset between a predicted anticipated service flow corresponding to an event trigger time and an actual anticipated service flow corresponding to the event trigger time.

The operations may include automatically add the service seeking entity into an arrival queue of a selected service window based on satisfying a predetermined criterion. The predetermined criterion may include a predetermined later time such that the service seeking entity is automatically added to the arrival queue when a current time is equal to the predetermined later time. The predetermined criterion may include the maximum offset time such that the service seeking entity is automatically added to the arrival queue when the anticipated service flow is less than or equal to the maximum offset time. The predetermined criterion may include a predetermined geographical boundary such that the service seeking entity is automatically added to the arrival queue when the service seeking device is located within the predetermined geographical boundary.

The interactive visual indicium may include an interactive control configured to receive a user selection to change the maximum offset time such that, upon receiving a signal indicating an updated maximum offset time, the processor performs dynamic update operations. The dynamic update operations may include select, by the processor, from the multiple service windows, an updated multiple available service windows having an anticipated service flow less than or equal to the updated maximum offset time. The dynamic update operations may include dynamically generate a display including an updated interactive visual indicium of the updated multiple available service windows.

The operations may include generate a confirmation display including a reminder message indicating the event trigger time of the available service window. The operations may include generate an expected service time based on an assumption that the service seeking entity is added to an arrival queue corresponding to the event trigger time on or before the event trigger time. The confirmation display may include an interactive visual indicium configured to receive an input of a deviation of an expected event trigger time and the scheduled event trigger time. The operations may include, upon receiving the input, determine a new event trigger time based on the deviation. The operations may include generate, based on the new event trigger time, a new anticipated service flow at the service provider at the new event trigger time. The operations may include increase a confidence interval of the corresponding service seeking entity to fulfill the scheduled trigger event.

In an illustrative aspect, a computer-implemented method may be performed by at least one processor to automatically generate an interactive display for event scheduling based on a maximum expected wait time at a user selected trigger time. The method may include receive from a service seeking device of a service seeking entity a signal representing selection criteria. The selection criteria may include a target location; a selected service; an event trigger window; and, a maximum offset time corresponding to a maximum permissible time offset between a time within the event trigger window that the event is triggered and an expected time for service to be provided to the service seeking entity by a selected service provider. The method may include generate, by the processor, as a function of a geofence filter, an array of service provider profiles, each service provider profile corresponding to a service provider within a predetermined geographical boundary at least partially defined by the target location. The method may include retrieve, from at least one data store, multiple service windows within the event trigger window for each service provider, each service window having an event trigger time. The method may include generate, by the processor, for each of the multiple service windows at each of the service providers, an anticipated service flow for the service provider at the service window as a function of: (a) a predetermined historical behavior profile corresponding to the service provider and (b) the event trigger time of the service window, and associate the anticipated service flow with the corresponding service window. The method may include select, by the processor, from the multiple service windows, a multiple available service windows having an anticipated service flow less than or equal to the maximum offset time. The method may include generate a display containing an interactive visual indicium of the selected multiple available service windows associated with at least one of the service providers. The visual indicium may include: the event trigger time of the available service window as an indication of the service window, and, the corresponding anticipated service flow at the service provider at the event trigger time.

The method may include automatically add the service seeking entity into an arrival queue of a selected service window based on satisfying a predetermined criterion. The predetermined criterion may include a predetermined later time such that the service seeking entity is automatically added to the arrival queue when a current time is equal to the predetermined later time. The predetermined criterion may include the maximum wait time such that the service seeking entity is automatically added to the arrival queue when the anticipated service flow is less than or equal to the maximum wait time. The predetermined criterion may include a predetermined geographical boundary such that the service seeking entity is automatically added to the arrival queue when the service seeking device is located within the predetermined geographical boundary.

The interactive visual indicium may include an interactive control configured to receive a user selection to change the maximum offset time such that, upon receiving a signal indicating an updated maximum offset time, the processor performs dynamic update operations. The dynamic update operations may include select, by the processor, from the multiple f service windows, an updated multiple available service windows having an anticipated service flow less than or equal to the updated maximum offset time. The dynamic update operations may include dynamically generate a display including an updated interactive visual indicium of the updated multiple available service windows. The method may include generate a confirmation display including a reminder message indicating the event trigger time of the available service window. The method may include generate an expected service time based on an assumption that the service seeking entity is added to an arrival queue corresponding to the event trigger time on or before the event trigger time. The confirmation display may include an interactive visual indicium configured to receive an input of a deviation of an expected event trigger time and the scheduled event trigger time. The method may include upon receiving the input, determine a new event trigger time based on the deviation. The method may include generate, based on the new event trigger time, a new anticipated service flow at the service provider at the new event trigger time. The method may include increase a confidence interval of the corresponding service seeking entity to fulfill the scheduled trigger event.

Generate the anticipated service flow may include apply a prediction model configured to predict a service flow at the service provider, wherein the prediction model generates the service flow as a function of input features and model coefficients. The input features may include historical behavior profiles of the service provider associated with times at and around the service window; and, historical behavior profiles of the service seeking entities currently receiving service at the service provider. The prediction model may include a machine learning prediction model configured to predict service flow times of a selected service at a corresponding scheduled trigger event based on the input features and the model coefficients; and configured to retrain the model coefficients at least periodically as a function of an offset between a predicted anticipated service flow corresponding to an event trigger time and an actual anticipated service flow corresponding to the event trigger time.

In an illustrative aspect, a computer program product (CPP) may include a program of instructions tangibly embodied on a non-transitory computer readable medium wherein, when the instructions are executed on a processor, the processor causes operations to be performed to automatically prioritize predicted events in a dynamic predicted queueing profile data structure for a service provider for a finite future time period. The operations may include generate, by the processor, in response to receiving a request signal originating from a first device associated with a first service seeking entity and representing a request for service from the first service seeking entity seeking service from a first service provider at a first future time period, a first dynamic queueing event profile including an association of the first service seeking entity with a first predicted queueing profile for the first service provider at the first future time period, wherein the first predicted queueing profile is stored in a first datastore and corresponds to a single time block for providing a service sought by the service seeking entity, and wherein the first predicted queueing profile includes associations with multiple dynamic queueing event profile associating a corresponding service seeking entity and the first service provider with the first predicted queueing profile for the first future time period, wherein the multiple dynamic queueing event profiles are stored in a second at least one data store, and wherein the multiple dynamic queueing event profiles includes the first dynamic queueing event profiles. The operations may include retrieve, from a third at least one data store, by the processor, a predetermined historical behavior profile of the first service provider and a predetermined historical behavior profile of the first service seeking entity. The operations may include generate, by an execution confidence engine, for each of the multiple dynamic queueing event profiles associated with the first predicted queueing profile, a confidence level of execution that the service seeking entity will receive service from the service provider in the first future time period represented by the single time block, wherein the confidence level of execution is based at least on a historical behavior profile of the first service provider, a historical behavior profile of the corresponding service seeking entity, and a historical behavior profile of at least one service seeking entity associated with the multiple dynamic queueing event profiles other than the first dynamic queueing event profile. The operations may include apply a dynamic queueing engine to each of the multiple dynamic queueing event profiles to determine based on the corresponding confidence level of execution for each of the multiple dynamic queueing event profiles, a corresponding priority in the first predicted queueing profile. The operations may include associate the first dynamic queueing event profile with the corresponding priority in the first predicted queueing profile such that the first dynamic queueing event profile is automatically prioritized in the first predicted queueing profile as a function of the corresponding historical behavior profile of the first service seeking entity and the historical behavior profile of the first service provider. The operations may include, in response to an update signal corresponding to at least one of the first dynamic queueing event profile and the first predicted queueing profile, repeat the steps of generate a confidence level of execution and apply the dynamic queueing engine such that the first dynamic queueing event profile is automatically dynamically reprioritized in the first predicted queueing profile. The operations may include, when the confidence level of execution for the first dynamic queueing event profile in the first predicted queueing profile meets at least one predetermined criterion, then generate a signal to associate the first dynamic queueing event profile with a guaranteed status in the first predicted queueing profile.

The operations may include generate a predicted convergence time of the first dynamic queueing event profile corresponding to a maximum confidence level based at least on the first historical behavior profile of the first service seeking entity. The operations may include, if the predicted convergence time is not within the first future time period, then add an association between the first dynamic queueing event profile and at least one additional predicted queueing profile for the first service provider and corresponding to the predicted convergence time.

The first historical behavior profile of the first service seeking entity may include a dynamic queueing event profile execution profile associated with a first at least one historical predicted queueing profile. The first historical behavior profile of the first service provider may include at least one predicted queueing profile fulfillment profile associated with a second at least one historical predicted queueing profile. The confidence level of execution for the first dynamic queueing event profile in the first predicted queueing profile may be at least partially determined as a function of the dynamic queueing event profile execution profile of the first historical behavior profile of the first service seeking entity and the predicted queueing profile fulfillment profile of the first historical behavior profile of the first service provider.

The confidence level of execution for the first dynamic queueing event profile in the first predicted queueing profile may be at least partially determined as a function of a predicted queueing profile preferences profile of the first service provider, the predicted queueing profile preferences profile containing an availability of service of the service provider for at least one future predicted queueing profile. The operations may include apply the predicted queueing profile preferences profile of the first service provider and the confidence level of execution for each dynamic queueing event profile associated with the first predicted queueing profile to assign at least one of the dynamic queueing event profiles a guaranteed service status.

A second dynamic queueing event profile of the dynamic queueing event profiles associated with the predicted queueing profile may be assigned a guaranteed booking status. A third dynamic queueing event profile of the dynamic queueing event profiles associated with the predicted queueing profile may be assigned to a standby list associated with the service provider. The third dynamic queueing event profile may be associated with a service availability profile defining availability of a second service seeking entity for at least one future time period. The operations may include receive a service booking cancellation of the second dynamic queueing event profile. The operations may include, if the service availability profile associated with the third dynamic queueing event profile defines availability of the second service seeking entity for a time period defined by the first predicted queueing profile, then: associate the third dynamic queueing event profile with the first predicted queueing profile and generate at least one electronic message to notify the second service seeking entity of the association of the third dynamic queueing event profile with the first predicted queueing profile.

The request signal representing the request for service further may represent a request for service for at least one additional service provider. The operations may include prioritize, for the at least one additional service provider, the first dynamic queueing event profile in a corresponding at least one additional predicted queueing profile. The operations may include generate a dynamic queueing event profile confidence level of execution for each of the first predicted queueing profile and the at least one additional predicted queueing profile as a function of the priority of the first dynamic queueing event profile in each predicted queueing profile.

The operations may include receive current geolocation coordinates of the first service seeking entity in a predetermined time window before the future time period of the first predicted queueing profile. The operations may include determine whether the geolocation coordinates are within a predetermined geofence associated with the first service provider. The operations may include automatically regenerate the confidence level of execution corresponding to the dynamic queueing event profile in the predicted queueing profile based at least on a presence of the geolocation coordinates of the first service seeking entity within the predetermined geofence associated with the first service provider.

The operations may include receive a networking request from each of multiple entities, each entity having an historical behavior profile. The operations may include associate the multiple entities together as the first service seeking entity. The operations may include generate the first historical behavior profile of the service seeking entity based on each historical behavior profile of the multiple entities.

The operations may include retrieve multiple predicted queueing profile. The operations may include, for each of the predicted queueing profile, generate an anticipated flow state based on a historical behavior profile of the first service seeking entity and the historical behavior profile of the first service provider and other service seeking entity associated with the currently selected predicted queueing profile. The operations may include, for each of the anticipated flow states, generate an anticipated wait time associated with the first service seeking entity. The operations may include generate, at the first device, a graphical display corresponding to the anticipated wait time of the first service provider at the multiple predicted queueing profile corresponding to the first finite time period.

At least two of the first data store, the second at least one data store, and the third at least one data store may, for example, be the same.

In an illustrative aspect, a computer-implemented method may be performed by at least one processor to automatically prioritize predicted events in a dynamic predicted queueing profile data structure for a service provider for a finite future time period. The method may include generate, in response to a request signal originating from a first device associated with a first service seeking entity and representing a request for service from a first service seeking entity seeking service from the first service provider at a first future time period, a first dynamic queueing event profile associating the first service seeking entity with a first predicted queueing profile for the first service provider at the first future time period, wherein the first predicted queueing profile is stored in a first datastore and corresponds to a single time block for providing a service sought by the service seeking entity, and wherein the first predicted queueing profile includes associations with multiple dynamic queueing event profiles associating a corresponding service seeking entity and the first service provider with the first predicted queueing profile for the first future time period, wherein the multiple dynamic queueing event profiles are stored in a second at least one data store, and wherein the multiple dynamic queueing event profiles includes the first dynamic queueing event profile. The method may include generate, by an execution confidence engine, for each of the multiple dynamic queueing event profiles associated with the first predicted queueing profile, a confidence level of execution that the service seeking entity will receive service from the service provider in the first future time period, for the first service provider at the first future time period based at least on both a historical behavior profile of the first service provider and a historical behavior profile of the corresponding service seeking entity. The method may include apply a dynamic queueing engine to each of the multiple dynamic queueing event profiles to automatically determine, based on the corresponding confidence level of execution for each of the multiple competing dynamic queueing event profiles, a priority of the first dynamic queueing event profile in the first predicted queueing profile.

The method may include generate a predicted convergence time of the first dynamic queueing event profile corresponding to a maximum confidence level based at least on the historical behavior profile of the first service seeking entity. The method may include, if the predicted convergence time is not within the first future time period, then also associate the first dynamic queueing event profile with at least one additional predicted queueing profile corresponding to the predicted convergence time for the service provider.

The historical behavior profile of the first service seeking entity may include a dynamic queueing event profile execution profile associated with a first at least one historical predicted queueing profile. The historical behavior profile of the first service provider may include at least one predicted queueing profile fulfillment profile associated with a second at least one historical predicted queueing profile. The confidence level of execution for the first dynamic queueing event profile in the first predicted queueing profile may be at least partially determined as a function of the dynamic queueing event profile execution profile of the historical behavior profile of the first service seeking entity and the predicted queueing profile fulfillment profile of the historical behavior profile of the first service provider.

The confidence level of execution for the first dynamic queueing event profile in the first predicted queueing profile may be at least partially determined as a function of a predicted queueing profile preferences profile of the first service provider, the predicted queueing profile preferences profile containing an availability of service of the first service provider for at least one future predicted queueing profile. The method may include apply the predicted queueing profile preferences profile of the first service provider and the confidence level of execution for each of the multiple dynamic queueing event profiles associated with the first predicted queueing profile to assign at least one of the multiple dynamic queueing event profiles a guaranteed service status.

A second dynamic queueing event profile of the multiple dynamic queueing event profiles associated with the first predicted queueing profile may be assigned a guaranteed booking status. A third dynamic queueing event profile of the dynamic queueing event profiles associated with the first predicted queueing profile may be assigned to a standby list associated with the first service provider. The third dynamic queueing event profile may be associated with a service availability profile defining availability of a second service seeking entity for at least one future time period. The method may include receive a service booking cancellation of the second dynamic queueing event profile. The method may include, if the service availability profile associated with the third dynamic queueing event profile defines availability of the second service seeking entity for a time period defined by the first predicted queueing profile, then: associate the third dynamic queueing event profile with the first predicted queueing profile and generate at least one electronic message to notify the second service seeking entity of the association of the third dynamic queueing event profile with the first predicted queueing profile. The service provider may include a hospitality provider. The third dynamic queuing event profile may include a hospitality service availability profile, the hospitality service availability profile may be generated as a function of corresponding historical behavior profiles of the hospitality provider and of multiple previous service seeking entities currently associated with at least one predicted queuing profile corresponding to the at least one future time period.

The request signal representing the request for service further may represent a request for service for at least one additional service provider. The method may include prioritize, for the at least one additional service provider, the first dynamic queueing event profile in a corresponding at least one additional predicted queueing profile. The method may include generate a dynamic queueing event profile confidence level of execution for each of the first predicted queueing profile and the at least one additional predicted queueing profile as a function of the priority of the first dynamic queueing event profile in each predicted queueing profile.

The method may include receive current geolocation coordinates of the first service seeking entity in a predetermined time window before the future time period of the first predicted queueing profile. The method may include determine whether the geolocation coordinates are within a predetermined geofence associated with the first service provider. The method may include automatically regenerate the confidence level of execution for the first dynamic queueing event profile in the first predicted queueing profile and automatically reprioritize the first dynamic queueing event profile in the first predicted queueing profile based at least on a presence of the geolocation coordinates of the first service seeking entity within the predetermined geofence associated with the first service provider.

The method may include receive a networking request from each of multiple entities, each entity having an historical behavior profile The method may include associate the multiple entities together as the first service seeking entity. The method may include generate the historical behavior profile of the first service seeking entity based on each historical behavior profile of the multiple entities.

The method may include retrieve multiple predicted queueing profiles. The method may include, for each of the multiple predicted queueing profiles, generate an anticipated flow state based on the historical behavior profile of the first service seeking entity, the historical behavior profile of the first service provider, and a historical behavior profile of at least one other service seeking entity associated with the currently selected predicted queueing profile. The method may include, for each of the anticipated flow states, generate an anticipated wait time associated with the first service seeking entity. The method may include generate, at the first device, a graphical display corresponding to the anticipated wait time of the first service provider at the multiple predicted queueing profile corresponding to the first finite time period.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A computer program product comprising:
    a program of instructions tangibly embodied on a computer readable medium wherein when the instructions are executed on a processor, the processor causes operations to be performed to automatically generate an interactive display for event scheduling based on a maximum expected wait time at a user selected trigger time, the operations comprising:
    receive from a service seeking device of a service seeking entity a signal representing selection criteria, the selection criteria comprising:
        a target location;
        a selected service;
        an event trigger window; and,
        a maximum offset time corresponding to a maximum permissible time offset between a time within the event trigger window that the event is triggered and an expected time for service to be provided to the service seeking entity by a selected service provider;
    generate, by the processor, as a function of a geofence filter, an array of service provider profiles, each service provider profile corresponding to a service provider within a predetermined geographical boundary at least partially defined by the target location;
    retrieve, from at least one data store, a plurality of service windows within the event trigger window for each service provider, each service window having an event trigger time;
    generate, by the processor, for each of the plurality of service windows at each of the service providers, an anticipated service flow for the service provider at the service window as a function of: (a) a predetermined historical behavior profile corresponding to the service provider, (b) the event trigger time of the service window, and (c) a machine learning prediction model configured to predict service flow times based on one or more input features and model coefficients, and associate the anticipated service flow with the corresponding service window;

select, by the processor, from the plurality of service windows, a plurality of available service windows having an anticipated service flow less than or equal to the maximum offset time;

generate a display such that it is displayed at the service seeking device, the display containing an interactive visual indicium of the selected plurality of available service windows associated with a plurality of the service providers, such that the visual indicium provides an aggregated interface to multiple service queues associated with the plurality of the service providers, wherein the visual indicium comprises:

the event trigger time of the available service window as an indication of the service window, and, the corresponding anticipated service flow at the service provider at the event trigger time;

in response to interaction of the service seeking entity with the visual indicium such that the selection criteria are changed, repeat at least the steps of select from the plurality of service windows, and generate a display, such that the visual indicium is updated; and, in a training mode, retrain the machine learning prediction model by retraining the model coefficients at least partially as a function of an offset between a predicted anticipated service flow corresponding to an event trigger time and an actual anticipated service flow corresponding to the event trigger time.

2. The computer program product of claim 1, further comprising automatically add the service seeking entity into an arrival queue of a selected service window based on satisfying a predetermined criterion.

3. The computer program product of claim 2, wherein the predetermined criterion comprises a predetermined later time such that the service seeking entity is automatically added to the arrival queue when a current time is equal to the predetermined later time.

4. The computer program product of claim 2, wherein the predetermined criterion comprises the maximum offset time such that the service seeking entity is automatically added to the arrival queue when the anticipated service flow is less than or equal to the maximum offset time.

5. The computer program product of claim 2, wherein the predetermined criterion comprises a predetermined geographical boundary such that the service seeking entity is automatically added to the arrival queue when the service seeking device is located within the predetermined geographical boundary.

6. The computer program product of claim 1, wherein the interactive visual indicium comprises an interactive control configured to receive a user selection to change the maximum offset time such that, upon receiving a signal indicating an updated maximum offset time, the processor performs dynamic update operations, the dynamic update operations comprising:

select, by the processor, from the plurality of service windows, an updated plurality of available service windows having an anticipated service flow less than or equal to the updated maximum offset time; and, dynamically generate a display comprising an updated interactive visual indicium of the updated plurality of available service windows.

7. The computer program product of claim 1, further comprising:

generate a confirmation display comprising a reminder message indicating the event trigger time of the available service window; and, an expected service time based on an assumption that the service seeking entity is added to an arrival queue corresponding to the event trigger time on or before the event trigger time.

8. The computer program product of claim 7, wherein the confirmation display further comprises an interactive visual indicium configured to receive an input of a deviation of an expected event trigger time and the scheduled event trigger time.

9. The computer program product of claim 8, further comprising:

upon receiving the input, determine a new event trigger time based on the deviation;

generate, based on the new event trigger time, a new anticipated service flow at the service provider at the new event trigger time; and, increase a confidence interval of the corresponding service seeking entity to fulfill the scheduled trigger event.

10. A computer-implemented method performed by at least one processor to automatically generate an interactive display for event scheduling based on a maximum expected wait time at a user selected trigger time, the method comprising:

receive from a service seeking device of a service seeking entity a signal representing selection criteria, the selection criteria comprising:

a target location;

a selected service;

an event trigger window; and, a maximum offset time corresponding to a maximum permissible time offset between a time within the event trigger window that the event is triggered and an expected time for service to be provided to the service seeking entity by a selected service provider;

generate, by the processor, as a function of a geofence filter, an array of service provider profiles, each service provider profile corresponding to a service provider within a predetermined geographical boundary at least partially defined by the target location;

retrieve, from at least one data store, a plurality of service windows within the event trigger window for each service provider, each service window having an event trigger time;

generate, by the processor, for each of the plurality of service windows at each of the service providers, an anticipated service flow for the service provider at the service window as a function of: (a) a predetermined historical behavior profile corresponding to the service provider and (b) the event trigger time of the service window, and associate the anticipated service flow with the corresponding service window;

select, by the processor, from the plurality of service windows, a plurality of available service windows having an anticipated service flow less than or equal to the maximum offset time;

generate a display such that it is displayed at the service seeking device, the display containing an interactive visual indicium of the selected plurality of available service windows associated with a plurality of the service providers, such that the visual indicium provides an aggregated interface to multiple service queues associated with the plurality of the service providers, wherein the visual indicium comprises:
- the event trigger time of the available service window as an indication of the service window, and,
  - the corresponding anticipated service flow at the service provider at the event trigger time and,
- in response to interaction of the service seeking entity with the visual indicium such that the selection criteria are changed, repeat at least the steps of select from the plurality of service windows, and generate a display, such that the visual indicium is updated.

11. The computer-implemented method of claim 10, further comprising automatically add the service seeking entity into an arrival queue of a selected service window based on satisfying a predetermined criterion.

12. The computer-implemented method of claim 11, wherein the predetermined criterion comprises a predetermined later time such that the service seeking entity is automatically added to the arrival queue when a current time is equal to the predetermined later time.

13. The computer-implemented method of claim 11, wherein the predetermined criterion comprises the maximum wait time such that the service seeking entity is automatically added to the arrival queue when the anticipated service flow is less than or equal to the maximum wait time.

14. The computer-implemented method of claim 11, wherein the predetermined criterion comprises a predetermined geographical boundary such that the service seeking entity is automatically added to the arrival queue when the service seeking device is located within the predetermined geographical boundary.

15. The computer-implemented method of claim 10, wherein the interactive visual indicium comprises an interactive control configured to receive a user selection to change the maximum offset time such that, upon receiving a signal indicating an updated maximum offset time, the processor performs dynamic update operations, the dynamic update operations comprising:
- select, by the processor, from the plurality of service windows, an updated plurality of available service windows having an anticipated service flow less than or equal to the updated maximum offset time; and,
- dynamically generate a display comprising an updated interactive visual indicium of the updated plurality of available service windows.

16. The computer-implemented method of claim 10, further comprising:
- generate a confirmation display comprising a reminder message indicating the event trigger time of the available service window; and,
- an expected service time based on an assumption that the service seeking entity is added to an arrival queue corresponding to the event trigger time on or before the event trigger time.

17. The computer-implemented method of claim 16, wherein the confirmation display further comprises an interactive visual indicium configured to receive an input of a deviation of an expected event trigger time and the scheduled event trigger time.

18. The computer-implemented method of claim 17, further comprising:
- upon receiving the input, determine a new event trigger time based on the deviation;
- generate, based on the new event trigger time, a new anticipated service flow at the service provider at the new event trigger time; and,
- increase a confidence interval of the corresponding service seeking entity to fulfill the scheduled trigger event.

19. The computer-implemented method of claim 10, wherein generate the anticipated service flow further comprises:
- apply a prediction model configured to predict a service flow at the service provider, wherein the prediction model generates the service flow as a function of input features and model coefficients, the input features comprising:
  - historical behavior profiles of the service provider associated with times at and around the service window; and,
  - historical behavior profiles of the service seeking entities currently receiving service at the service provider.

20. The computer-implemented method of claim 19, wherein the prediction model comprises a machine learning prediction model configured to predict service flow times of a selected service at a corresponding scheduled trigger event based on the input features and the model coefficients; and configured to retrain the model coefficients at least periodically as a function of an offset between a predicted anticipated service flow corresponding to an event trigger time and an actual anticipated service flow corresponding to the event trigger time.

* * * * *